United States Patent [19]

Wagner et al.

[11] Patent Number: 5,949,891
[45] Date of Patent: Sep. 7, 1999

[54] FILTERING AUDIO SIGNALS FROM A COMBINED MICROPHONE/SPEAKER EARPIECE

[75] Inventors: Larry Wagner, Oakland, Calif.; Carol Wu, Beaverton, Oreg.

[73] Assignee: Intel Corporation, Santa Clara, Calif.

[21] Appl. No.: 08/342,270

[22] Filed: Nov. 16, 1994

Related U.S. Application Data

[63] Continuation-in-part of application No. 08/340,172, Nov. 15, 1994, which is a continuation-in-part of application No. 08/157,694, Nov. 24, 1993.

[51] Int. Cl.⁶ .................................................. H03G 5/00
[52] U.S. Cl. ................................. 381/98; 381/26; 381/66; 379/406
[58] Field of Search ............................. 381/68–68.6, 71, 381/95, 94, 71.8, 66, 98, 103, 26, 151; 379/390, 399, 406–407, 410–411

[56] References Cited

U.S. PATENT DOCUMENTS

| H417 | 1/1988 | Miles ........................................ 381/94 |
|---|---|---|
| 3,786,188 | 1/1974 | Allen ........................................ 381/66 |
| 4,475,193 | 10/1984 | Brown . |
| 4,731,850 | 3/1988 | Levitt ..................................... 381/68.2 |
| 4,888,795 | 12/1989 | Ando et al. . |
| 4,998,243 | 3/1991 | Kao . |
| 5,014,267 | 5/1991 | Tompkins et al. . |
| 5,056,136 | 10/1991 | Smith . |
| 5,072,442 | 12/1991 | Todd . |
| 5,073,926 | 12/1991 | Suzuki et al. . |
| 5,157,491 | 10/1992 | Kassatly . |
| 5,224,168 | 6/1993 | Martinez et al. ....................... 381/71.8 |
| 5,231,492 | 7/1993 | Dangi et al. . |
| 5,251,263 | 10/1993 | Andrea ................................... 381/71.6 |
| 5,315,633 | 5/1994 | Champa . |
| 5,319,793 | 6/1994 | Hancock et al. . |
| 5,331,111 | 7/1994 | O'Connell ................................. 84/602 |
| 5,333,133 | 7/1994 | Andrews et al. . |
| 5,335,321 | 8/1994 | Harney et al. . |
| 5,367,629 | 11/1994 | Chu et al. . |
| 5,374,952 | 12/1994 | Flohr . |
| 5,375,068 | 12/1994 | Palmer et al. . |
| 5,384,598 | 1/1995 | Rodriguez et al. . |
| 5,384,772 | 1/1995 | Marshall . |
| 5,390,177 | 2/1995 | Nahumi .................................... 370/62 |
| 5,392,223 | 2/1995 | Caci . |
| 5,402,497 | 3/1995 | Nishimoto ............................... 381/95 |
| 5,539,896 | 7/1996 | Lisle ....................................... 395/477 |

FOREIGN PATENT DOCUMENTS 0523629  7/1992  European Pat. Off. .

OTHER PUBLICATIONS

Eleftheriadis et al., "Algorithms and Performance Evaluation of the Xphone Multimedia Communication System." ACM Multimedia 93–Proceedings First ACM International Conference On Multimedia, Aug. 1, 1993, Anaheim (US).
Zhang et al., "Video Communication on LANs — Multimedia CSCW Applications." CCECE/CCGEI '93.

(List continued on next page.)

*Primary Examiner*—Vivian Chang
*Assistant Examiner*—Duc Nguyen
*Attorney, Agent, or Firm*—William H. Murray; N. Stephan Kinsella

[57] ABSTRACT

An audio processing system applies a filter to convert the audio signals generated by the microphone of a combined microphone/speaker earpiece into filtered audio signals, where the filter is designed to correct for distortions in the audio signals that result from the microphone being part of the combined earpiece.

26 Claims, 57 Drawing Sheets

OTHER PUBLICATIONS

Ramanathan et al., Integrating Virtual Reality, Tele–Conferencing, and Entertainment into Multimedia Home Computers. IEEE Transactions on Consumer Electronics, vol. 38, No. 2, May 1992.

Nakamura et al., "Personal Multimedia Teleconferencing Terminal." IEEE International Conference on Communications ICC 90–Session 211. vol. 1, 15 Apr. 1990, Atlanta (US).

Maeno et al., "Distributed Desktop Conferencing System (Mermaid) Based on Group Communication Architecture." IEICE Transactions, vol. E74, No. 9, Sep. 1991, Tokyo JP.

Tanigawa et al, "Personal Multimedia–Multipoint Teleconference System." IEEE Infocom 91–Conference on Computer Communications—Session 9D, vol. 3, Apr. 7, 1991, Bal Harbour (US).

Computer Conferencing: IBM Scientists Demo Prototype of Affordable Computer Conferencing System, Nov. 2, 1992. EDGE, on & about AT&T, v7, n223, p22.

Chen et al., "A Multimedia Desktop Collaboration System," GLOBECOM 92—EEE Global Telecommunications Conference, vol. 2, Dec. 6, 1992 –Dec. 9, 1992. Orlando (US).

Vin et al., "Multimedia Conferencing in the Etherphone Environment." *Computer*, vol. 24, No. 10, Oct. 1991. Long Beach (US).

FIG. 1. POINT-TO-POINT CONFERENCING NETWORK

FIG. 2. CONFERENCING SYSTEM HARDWARE CONFIGURATION 100

FIG. 3. VIDEO BOARD HARDWARE CONFIGURATION

FIG. 4. AUDIO/COMM BOARD (ISDN) HARDWARE CONFIGURATION

FIG. 11. VIDEO MANAGER COMPONENTS

FIG. 12. WALKING KEY FRAME

FIG. 24. COMPRESSED VIDEO BITSTREAM FORMAT

FIG. 25. COMPRESSED VIDEO DATA FIELD

FIG. 26. COMPRESSED AUDIO FORMAT

FIG. 27. RELIABLE TRANSPORT COMM PACKET FORMAT

FIG. 28. UNREALIABLE TRANSPORT COMM PACKET FORMAT

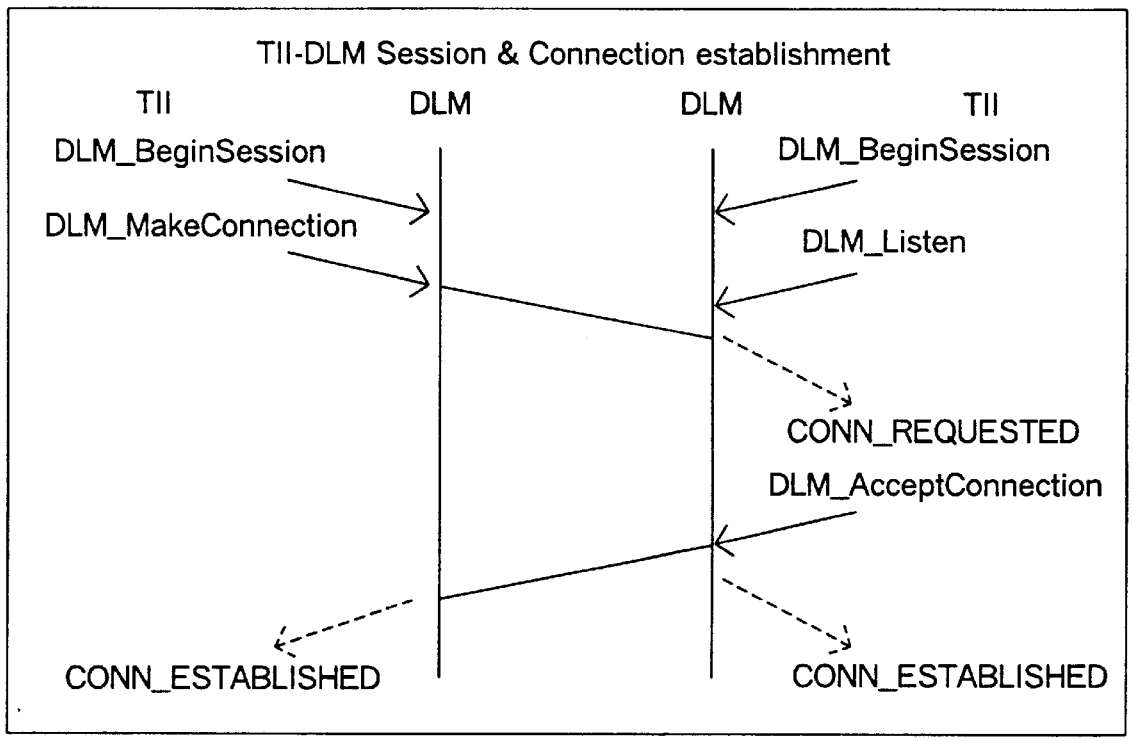
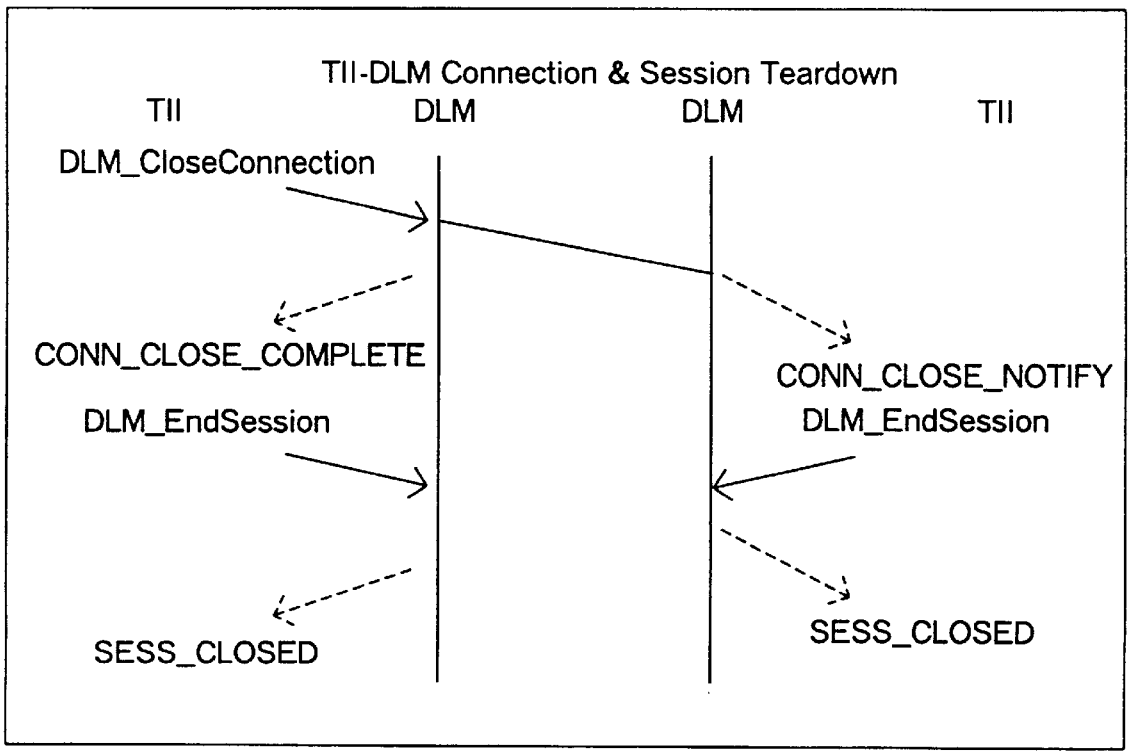
FIG. 29

FIG. 33. ON-DEMAND INVOCATION

FIG. 34. MANAGING MULTIPLE APPLICATIONS

FIG. 35. REMOTE MAINTENANCE OF HIGH-RESOLUTION COUNTERS

FIG. 36. FLOW CONTROL OVER RELIABLE CHANNELS

FIG. 37. PREEMPTIVE PRIORITY-BASED TRANSMISSION

FIG. 38. RATE NEGOTIATION

FIG. 39. CALLED NODE PERFORMANCE DURING 64 KBPS UPGRADE.

FIG. 40. CALLING NODE PERFORMANCE DURING 64 KBPS UPGRADE.

FIG. 41. LOOPBACK LINE PERFORMANCE DURING 64KBPS UPGRADE.

FIG. 42. AUTOMATIC TRANSPORT DETECTION AT INSTALL TIME

FIG. 43. AUTOMATIC TRANSPORT DETECTION AT RUN TIME

FIG. 44. DLM LAN PACKET FORMAT

FIG. 45. MDM PACKET FORMAT

FIG. 47. VIDEO NEGOTIATION

FIG. 48. CALL PROGRESS PROCESSING

FIG. 49. INTERRUPT-TIME PROCESSING FOR RECEIVING DATA SIGNALS.

FIG. 50. INTERRUPT-TIME PROCESSING FOR TRANSMITTING DATA SIGNALS.

FIG. 51. AUTO REGISTRATION ENVIRONMENT

FIG. 52. AUTO REGISTRATION ARCHITECTURE

FIG. 53.   AUTO REGISTRATION PROCESSING

FIG. 54. NEW NODE (CLIENT) PROCESSING

FIG. 55. CONFIDENCE TEST SERVER PROCESSING

FIG. 56. AUTO REGISTRATION FILE FORMAT

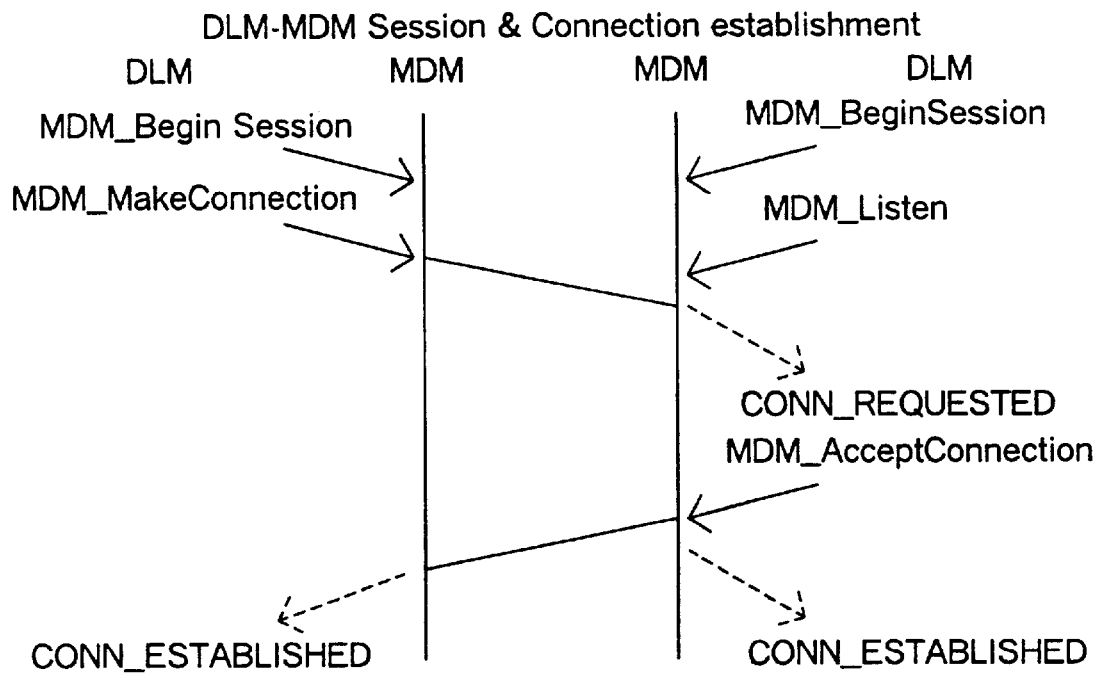
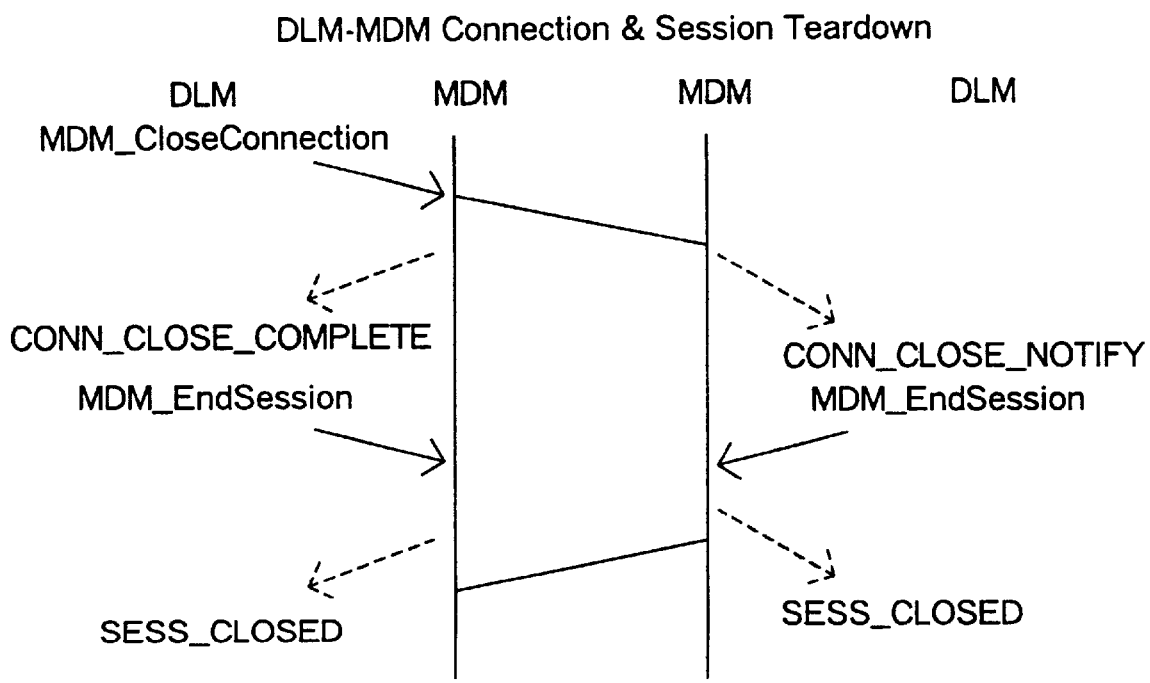
FIG. 57

FILTERING AUDIO SIGNALS FROM A COMBINED MICROPHONE/SPEAKER EARPIECE

RELATED APPLICATIONS

This application is a continuation-in-part of U.S. patent application Ser. No. 08/340,172, filed Nov. 15, 1994, entitled "Synchronizing Computer Systems" of Benjamin Vrvilo, which is a continuation-in-part of U.S. patent application Ser. No. 08/157,694, filed Nov. 24, 1993. This application is related to U.S. patent application Ser. No. 08/342,076, filed Nov. 16, 1994, entitled "Managing Bandwidth Over a Computer Network" of Robert Alexander Marshall, et al. This application is also related to U.S. patent application Ser. No. 08/305,206 (filed Sep. 13, 1994), U.S. patent application Ser. No. 08/137,319 (filed Oct. 14, 1993), U.S. patent application Ser. No. 08/170,146 (filed Dec. 20, 1993), U.S. patent application Ser. No. 08/235,955 (filed Apr. 28, 1994), and U.S. patent application Ser. No. 08/133,612 (filed Oct. 12, 1993).

BACKGROUND OF THE INVENTION

1. Field of the Invention

The present invention relates to audio/video conferencing, and, in particular, to systems for real-time audio, video, and data conferencing in windowed environments on personal computer systems.

2. Description of the Related Art

It is desirable to provide real-time audio, video, and data conferencing between personal computer (PC) systems operating in windowed environments such as those provided by versions of Microsoft® Windows™ operating system. There are difficulties, however, with providing real-time conferencing in non-real-time windowed environments. It is also desirable to provide conferencinig between PC systems over two or more different transports.

It is accordingly an object of this invention to overcome the disadvantages and drawbacks of the known art and to provide real-time audio, video, and data conferencing between PC systems operating in non-real-time windowed environments over two or more different transports.

It is a particular object of the present invention to provide real-time audio, video, and data conferencing between PC systems operating under a Microsoft® Windows™ operating system over ISDN and LAN networks.

Further objects and advantages of this invention will become apparent from the detailed description of a preferred embodiment which follows.

SUMMARY OF THE INVENTION

The present invention comprises a process and system for processing audio signals. According to a preferred embodiment, the system comprises an earpiece with a microphone, and an audio processing system, electrically connected to the microphone. The microphone generates audio signals and the audio processing system converts the audio signals into filtered audio signals by applying a filter to the audio signals. The filter is designed to correct for distortions in the audio signals that result from the microphone being part of the combined earpiece.

BRIEF DESCRIPTION OF THE DRAWINGS

Other objects, features, and advantages of the present invention will become more fully apparent from the following detailed description, the appended claims, and the accompanying drawings in which:

FIG. 29 are diagrams indicating typical TII-DLM connection setup and teardown sequences;

FIG. 57 are connection diagrams that show the interactions between a DLM and an MDM in connection and session establishment and tear-down.

DESCRIPTION OF THE PREFERRED EMBODIMENT(S)

Point-To-Point Conferencing Network

Figure 1:
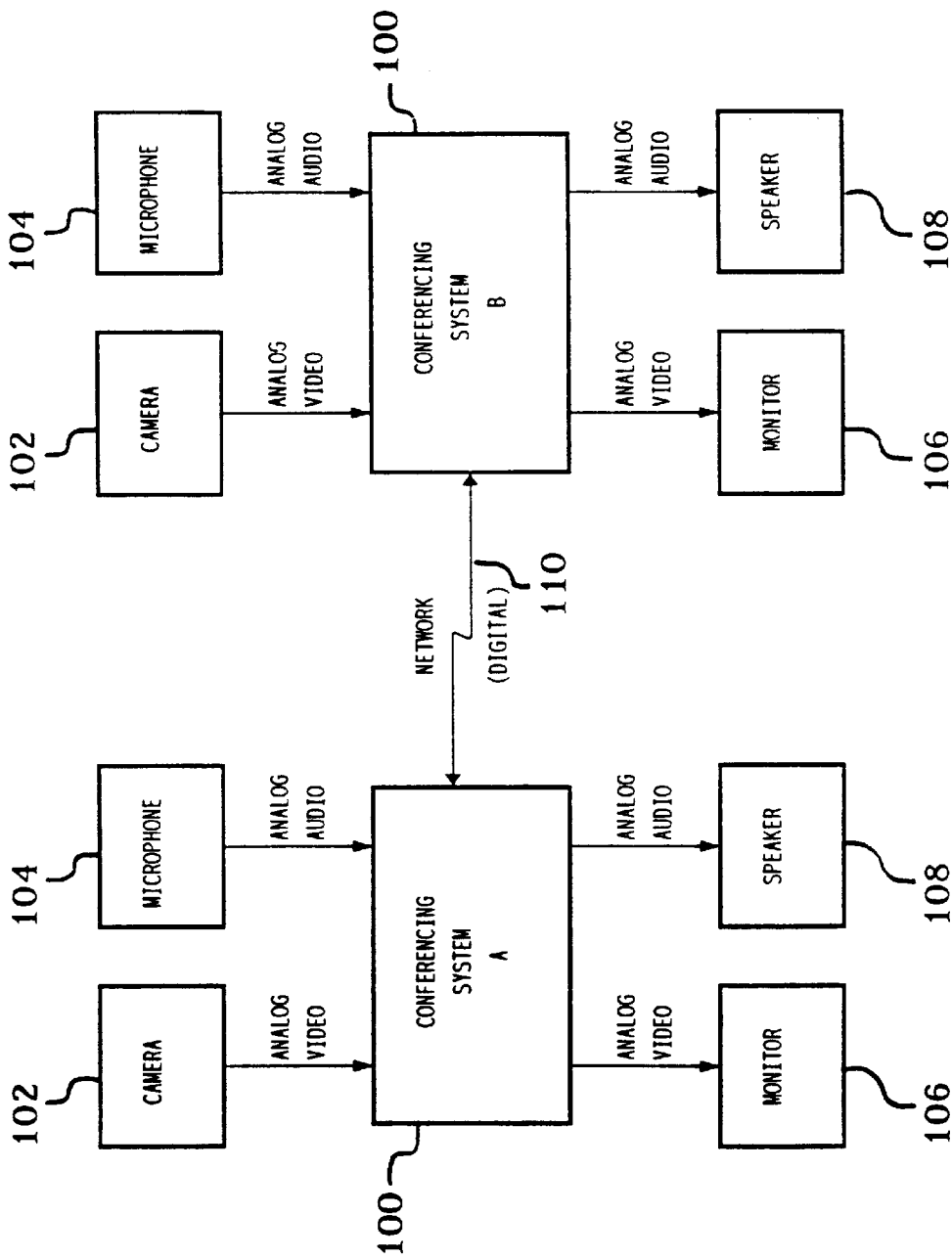
FIG. 1 is a block diagram representing real-time point-to-point audio, video, and data conferencing between two PC systems.

Referring now to FIG. 1, there is shown a block diagram representing real-time point-to-point audio, video, and data conferencing between two PC systems, according to a preferred embodiment of the present invention. Each PC system has a conferencing system 100, a camera 102, a microphone 104, a monitor 106. and a speaker 108. The conferencing systems communicate via network 110, which may be either an integrated services digital network (ISDN), a local area network (LAN), or a wide area network (WAN). Each conferencing system 100 receives, digitizes, and compresses the analog video signals generated by camera 102 and the analog audio signals generated by microphone 104. The compressed digital video and audio signals are transmitted to the other conferencing system via network 110, where they are decompressed and converted for play on monitor 106 and speaker 108, respectively. In addition, each conferencing system 100 may generate and transmit data signals to the other conferencing system 100 for play on monitor 106. The video and data signals are displayed in different windows on monitor 106. Each conferencing system 100 may also display the locally generated video signals in a separate window.

Camera 102 may be any suitable camera for generating NSTC or PAL analog video signals. Microphone 104 may be any suitable microphone for generating analog audio signals. Monitor 106 may be any suitable monitor for displaying video and graphics images and is preferably a VGA monitor. Speaker 108 may be any suitable device for playing analog audio signals and is preferably a headset.

Conferencing System Hardware Configuration

Figure 2:
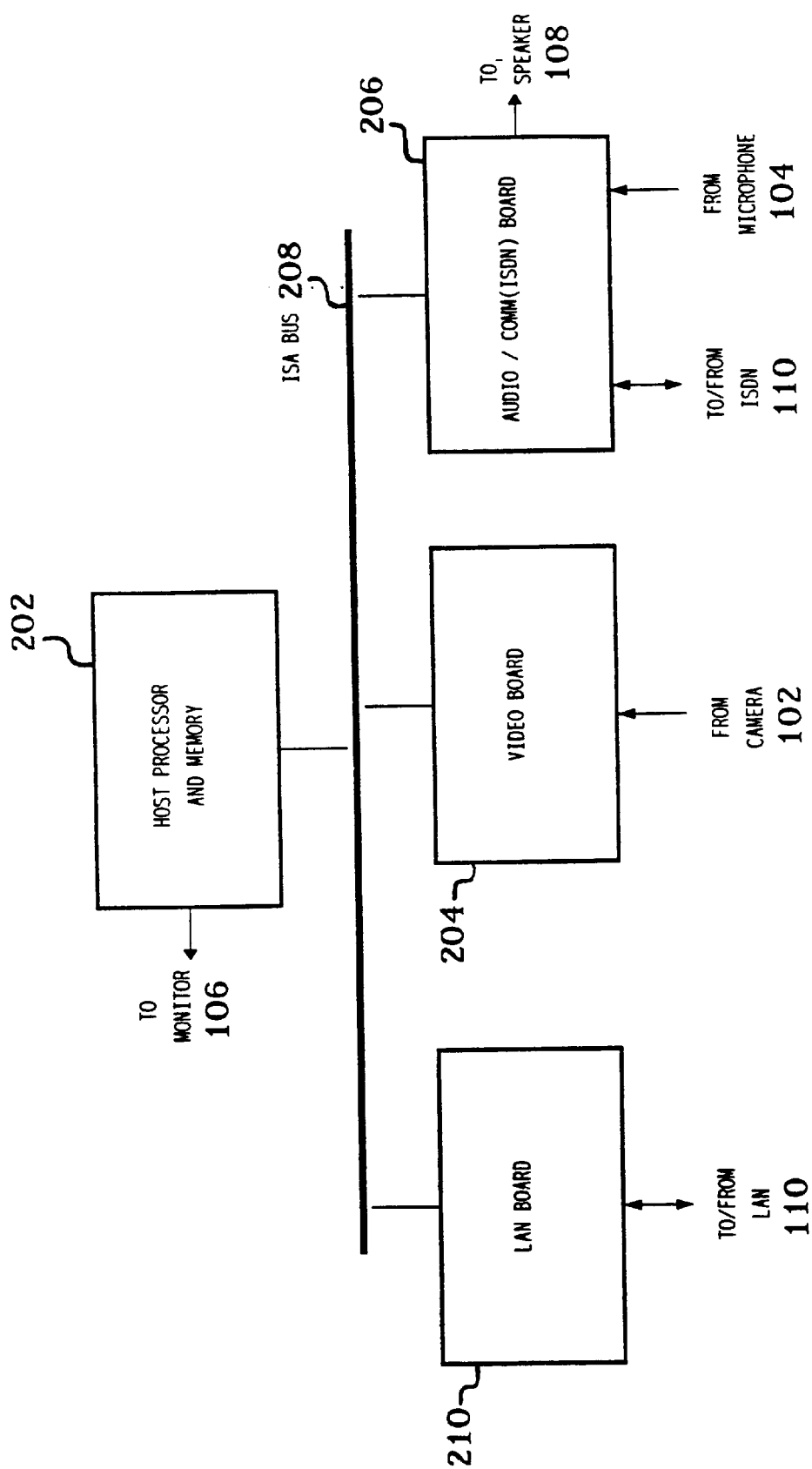
FIG. 2 is a block diagram of the hardware configuration of the conferencing system of each PC system of FIG. 1.

Referring now to FIG. 2, there is shown a block diagram of the hardware configuration of each conferencing system 100 of FIG. 1. Each conferencing system 100 comprises host processor 202, video board 204, audio/comm (ISDN) board 206, LAN board 210, and ISA bus 208.

Figure 3:
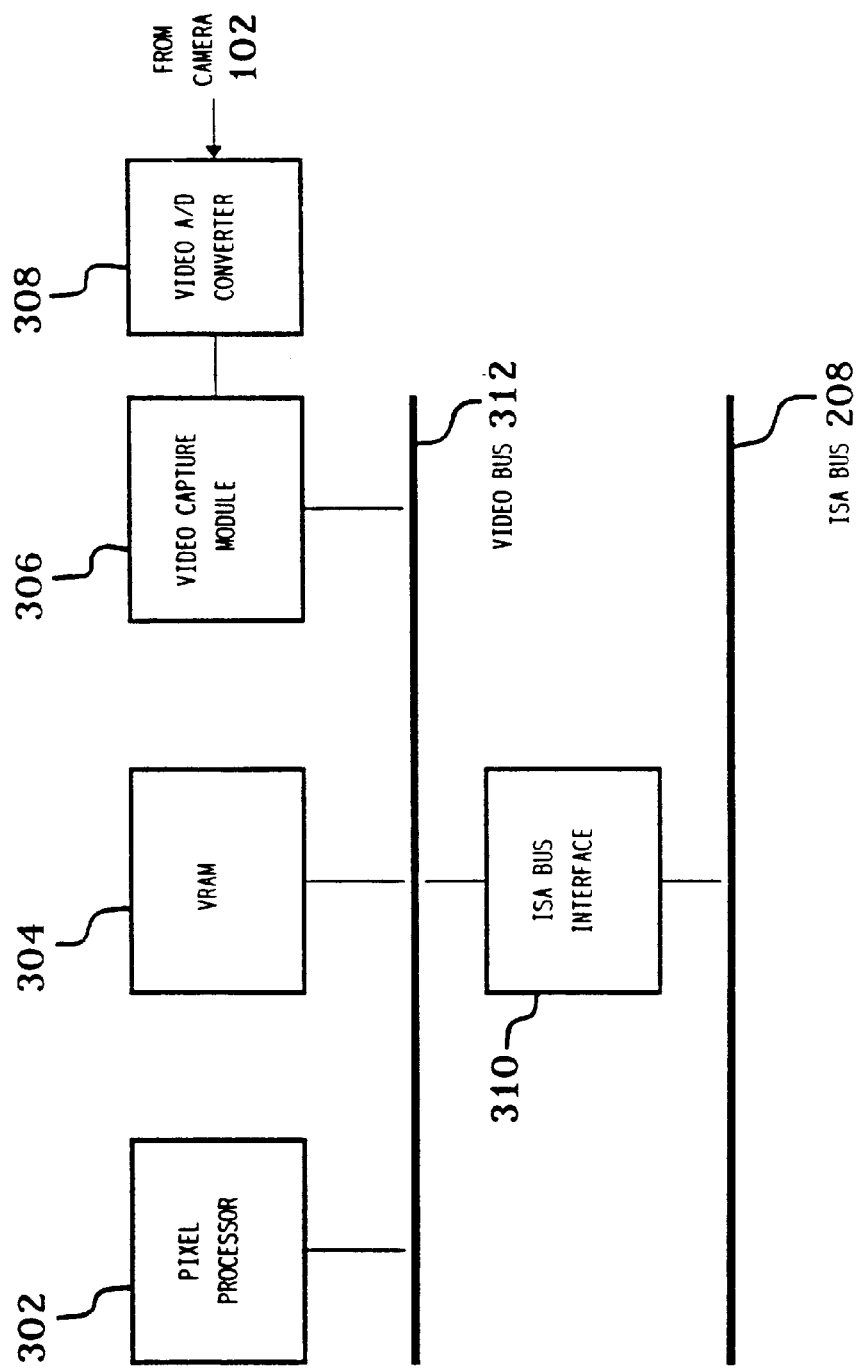
FIG. 3 is a block diagram of the hardware configuration of the video board of the conferencing system of FIG. 2.

Referring now to FIG. 3, there is shown a block diagram of the hardware configuration of video board 204 of FIG. 2. Video board 204 comprises industry standard architecture (ISA) bus interface 310, video bus 312, pixel processor 302, video random access memory (VRAM) device 304, video capture module 306, and video analog-to-digital (A/D) converter 308.

Figure 4:
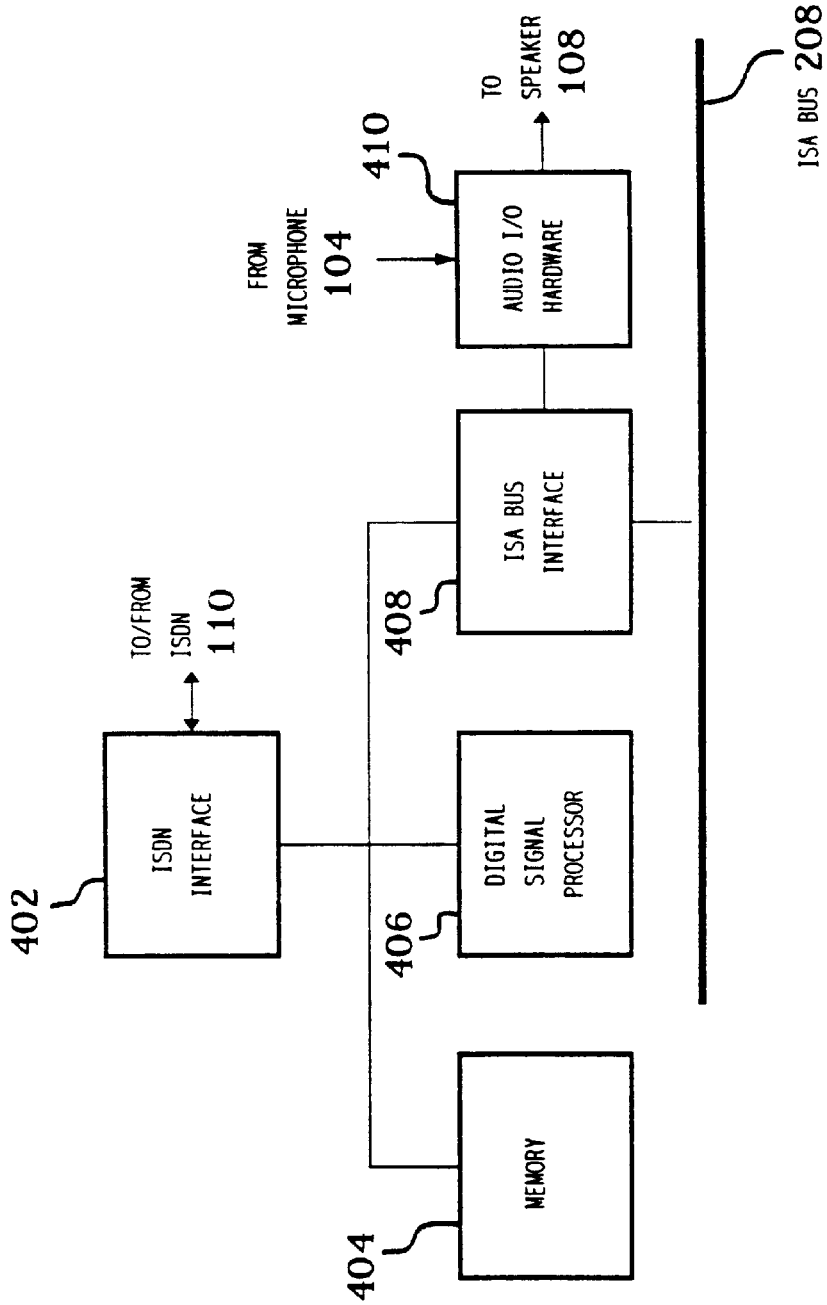
FIG. 4 is a block diagram of the hardware configuration of the audio/comm (ISDN) board of the conferencing system of FIG. 2.

Referring now to FIG. 4, there is shown a block diagram of the hardware configuration of audio/comm (ISDN) board 206 of FIG. 2. Audio/comm (ISDN) board 206 comprises ISDN interface 402, memory 404, digital signal processor (DSP) 406, and ISA bus interface 408, audio input/output (I/O) hardware 410.

LAN board 210 of FIG. 2 may be any conventional LAN card that supports standard driver interfaces and is preferably an Intel® EtherExpress™ 16C LAN Combo Card.

Conferencing System Software Configuration

Figure 5:
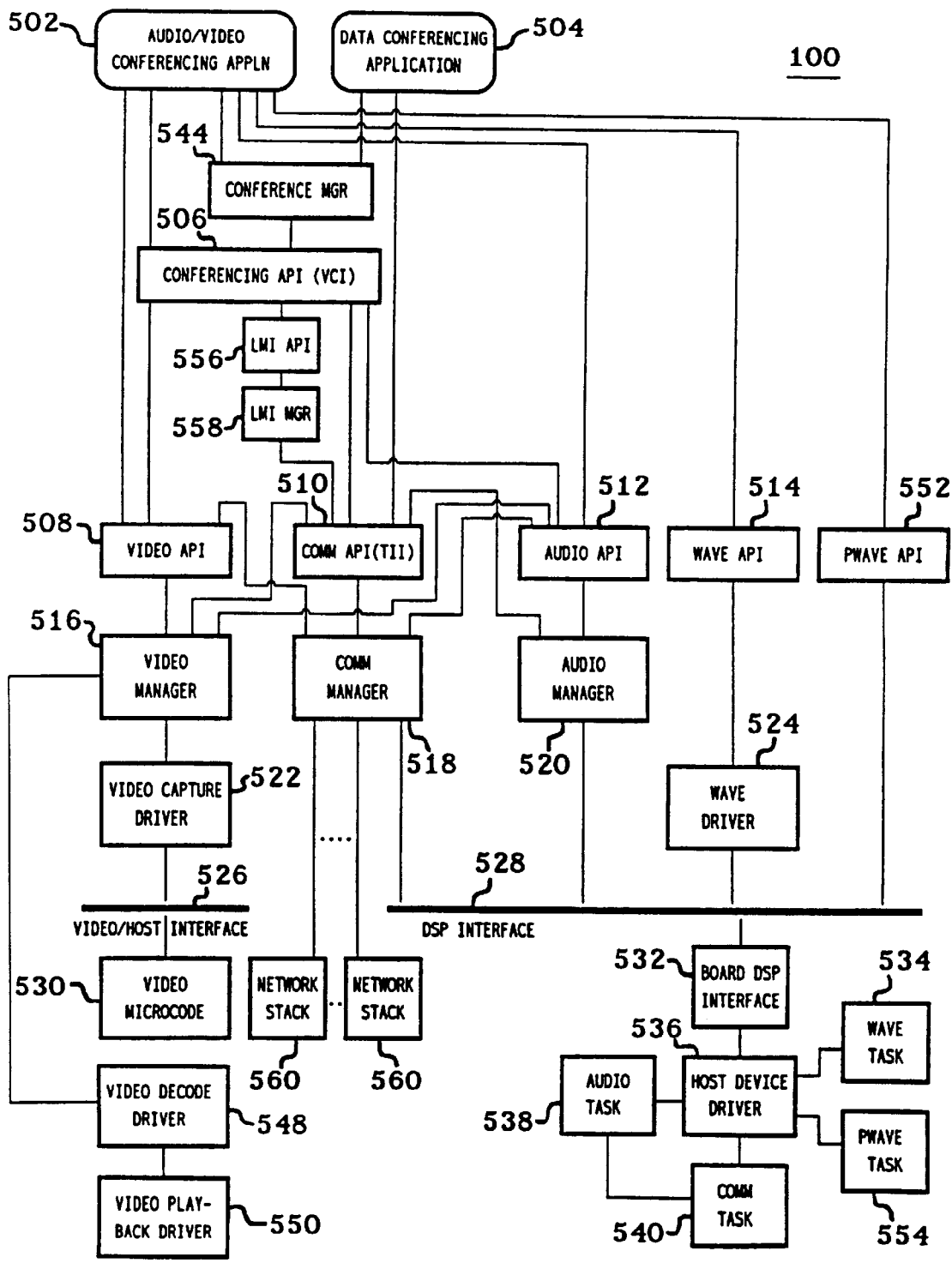
FIG. 5 is a block diagram of the software configuration of the conferencing system of each PC system of FIG. 1.

Referring now to FIG. 5, there is shown a block diagram of the software configuration each conferencing system 100 of FIG. 1. Video microcode 530 resides and runs on pixel processor 302 of video board 204 of FIG. 3. Comm task 540 and audio task 538 reside and run on DSP 406 of audio/comm (ISDN) board 206 of FIG. 4. The one or more network stacks 560 reside and run partially on host processor 202 of FIG. 2 and partially on LAN board 210 of FIG. 2. All of the other software modules depicted in FIG. 5 reside and run on host processor 202.

Video, Audio, and Data Processing

Referring now to FIGS. 3, 4, and 5, audio/video conferencing application 502 running on host processor 202 provides the top-level local control of audio and video conferencing between a local conferencing system (i.e., local site or endpoint) and a remote conferencing system (i.e., remote site or endpoint). Audio/video conferencing application 502 controls local audio and video processing and establishes links with the remote site for transmitting and receiving audio and video over the ISDN or LAN network 110. Similarly, data conferencing application 504, also running on host processor 202, provides the top-level local control of data conferencing between the local and remote sites. Conferencing applications 502 and 504 communicate with the audio, video, and comm subsystems using conference manager 544, conferencing application programming interface (API) 506, LAN management interface (LMI) API 556, LMI manager 558, video API 508, comm API 510, and audio API 512. The functions of conferencing applications 502 and 504 and the APIs they use are described in further detail later in this specification.

Audio Processing

During conferencing, audio I/O hardware 410 of audio/comm (ISDN) board 206 digitizes analog audio signals received from microphone 104 and stores the resulting uncompressed digital audio to memory 404 via ISA bus interface 408. Audio task 538, running on DSP 406, controls the compression of the uncompressed audio and stores the resulting compressed audio back to memory 404.

Audio Processing for ISDN-Based Processing

For ISDN-based conferencing, comm task 540, also running on DSP 406, formats the locally-generated compressed audio for ISDN transmission and transmits the compressed ISDN-formatted audio to ISDN interface 402 for transmission to the remote site over ISDN network 110.

During ISDN-based conferencing, ISDN interface 402 also receives from ISDN network 110 compressed ISDN-formatted audio generated by the remote site and stores the compressed ISDN-formatted audio to memory 404. Comm task 540 then reconstructs the compressed audio format and stores the compressed audio back to memory 404. Audio task 538 controls the decompression of the compressed audio and stores the resulting decompressed audio back to memory 404. ISA bus interface then transmits the decompressed audio to audio I/O hardware 410, which digital-to-analog (D/A) converts the decompressed audio and transmits the resulting analog audio signals to speaker 108 for play.

Thus, for ISDN-based conferencing, audio capture/compression and decompression/playback are performed entirely within audio/comm (ISDN) board 206 without going through the host processor. As a result, audio is continuously played during an ISDN-based conferencing session regardless of what other applications are running on host processor 202.

Audio Processing for LAN-Based Processing

For LAN-based conferencing, audio task 538 passes the locally-generated compressed audio to the audio manager 520 which sends the compressed audio via comm API 510 to the comm manager 518 for transmission by the network stack 560 to the remote site via the LAN network 110.

During LAN-based conferencing, the network stack 560 also receives from LAN network 110 compressed LAN-formatted audio generated by the remote site and passes the compressed LAN-formatted audio to comm manager 518. Comm manager 518 then reconstructs the compressed audio format and passes the compressed audio via audio API 512 to audio manager 520, which stores the compressed audio into memory 404 of the audio/comm (ISDN) board 206 of FIG. 4. As in ISDN-based conferencing, audio task 538 controls the decompression of the compressed audio and stores the resulting decompressed audio back to memory 404. ISA bus interface then transmits the decompressed audio to audio I/O hardware 410, which digital-to-analog (D/A) converts the decompressed audio and transmits the resulting analog audio signals to speaker 108 for play.

Video Processing

Concurrent with the audio processing, video A/D converter 308 of video board 204 digitizes analog video signals received from camera 102 and transmits the resulting digitized video to video capture module 306. Video capture module 306 decodes the digitized video into YUV color components and delivers uncompressed digital video bitmaps to VRAM 304 via video bus 312. Video microcode 530, running on pixel processor 302, compresses the uncompressed video bitmaps and stores the resulting compressed video back to VRAM 304. ISA bus interface 310 then transmits via ISA bus 208 the compressed video to video/host interface 526 running on host processor 202.

Video/host interface 526 passes the compressed video to video manager 516 via video capture driver 522. Video manager 516 calls audio manager 520 using audio API 512 for synchronization information. Video manager 516 then time-stamps the video for synchronization with the audio. Video manager 516 passes the time-stamped compressed video to comm manager 518 via comm API 510.

Video Processing for ISDN-Based Conferencing

For ISDN-based conferencing, comm manager 518 passes the locally-generated compressed video through digital signal processing (DSP) interface 528 to ISA bus interface 408 of audio/comm (ISDN) board 206, which stores the compressed video to memory 404. Comm task 540 then formats the compressed video for ISDN transmission and transmits the ISDN-formatted compressed video to ISDN interface 402 for transmission to the remote site over ISDN network 110.

During ISDN-based conferencing, ISDN interface 402 also receives from ISDN network 110 ISDN-formatted compressed video generated by the remote site system and stores the ISDN-formatted compressed video to memory 404. Comm task 540 reconstructs the compressed video format and stores the resulting compressed video back to memory 404. ISA bus interface then transmits the compressed video to comm manager 518 via ISA bus 208 and DSP interface 528. Comm manager 518 passes the compressed video to video manager 516 via video API 508. Video manager 516 passes the compressed video to video decode driver 548 for decompression processing. Video decode driver 548 passes the decompressed video to video playback driver 550, which formats the decompressed video for transmission to the graphics device interface (GDI) (not shown) of the Microsoft® Windows™ operating system for eventual display in a video window on monitor 106.

Video Processing for LAN-Based Conferencing

For LAN-based conferencing, comm manager 518 formats the locally-generated compressed video for LAN transmission and transmits the LAN-formatted compressed video to the network stack 560 for transmission to the remote site over LAN network 110.

During LAN-based conferencing, the network stack 560 also receives from LAN network 110 LAN-formatted compressed video generated by the remote site system and passes the LAN-formatted compressed video to comm manager 518. Comm manager 518 then reconstructs the compressed video format and passes the compressed video via video API 508 to video manager 516. As in ISDN-based conferencing, video manager 516 passes the compressed video to video decode driver 548 for decompression processing. Video decode driver 548 passes the decompressed video to video playback driver 550, which formats the decompressed video for transmission to the graphics device interface (GDI) (not shown) of the Microsoft® Windows™ operating system for eventual display in a video window on monitor 106.

Data Processing

For data conferencing, concurrent with audio and video conferencing, data conferencing application 504 generates and passes data to comm manager 518 using conferencing API 506 and comm API 510.

Data Processing for ISDN-Based Conferencing

For ISDN-based conferencing, comm manager 518 passes the locally-generated data through board DSP interface 532 to ISA bus interface 408, which stores the data to memory 404. Comm task 540 formats the data for ISDN transmission and stores the ISDN-formatted data back to memory 404. ISDN interface 402 then transmits the ISDN-formatted data to the remote site over ISDN network 110.

During ISDN-based conferencing, ISDN interface 402 also receives from ISDN network 110 ISDN-formatted data generated by the remote site and stores the ISDN-formatted data to memory 404. Comm task 540 reconstructs the data format and stores the resulting data back to memory 404. ISA bus interface 408 then transmits the data to comm manager 518, via ISA bus 208 and DSP interface 528. Comm manager 518 passes the data to data conferencing application 504 using comm API 510 and conferencing API 506. Data conferencing application 504 processes the data and transmits the processed data to Microsoft® Windows™ GDI (not shown) for display in a data window on monitor 106.

Data Processing for LAN-Based Conferencing

For LAN-based conferencing, comm manager 518 formats the locally-generated data for LAN transmission and transmits the LAN-formatted data video to the network stack 560 for transmission to the remote site over LAN network 110.

During LAN-based conferencing, the network stack 560 also receives from LAN network 110 LAN-formatted data generated by the remote site system and passes the LAN-formatted data to comm manager 518. Comm manager 518 then reconstructs the data and passes the data to data conferencing application 504 using comm API 510 and conferencing API 506. As in ISDN-based conferencing, data conferencing application 504 processes the data and transmits the processed data to Microsoft® Windows™ GDI (not shown) for display in a data window on monitor 106.

Hardware Configuration for Conferencing System

LAN board 210 of FIG. 2 may be any suitable board for transmitting and receiving digital packets over a local (or wide) area network and is preferably an Intel® EtherExpress™ 16 card with appropriate control and network protocol software. Conferencing system 100 is capable of supporting LAN-based conferencing under different LAN transport standards (e.g., Novell IPX, Internet User Datagram Protocol (UDP), and/or NetBIOS standards). Furthermore, conferencing system 100 is capable of supporting LAN-based conferencing with different LAN products for a single LAN transport standard (e.g., LAN WorkPlace (LWPUDP) by Novell and FTPUDP by FTP Software, Inc., both of which conform to the LAN UDP standard). Thus, LAN board 210 corresponds to the LAN transports that are supported in conferencing system 100. Those skilled in the art will understand that more than one network stack 560 may be used to interface with a single LAN board 210.

Figure 6:
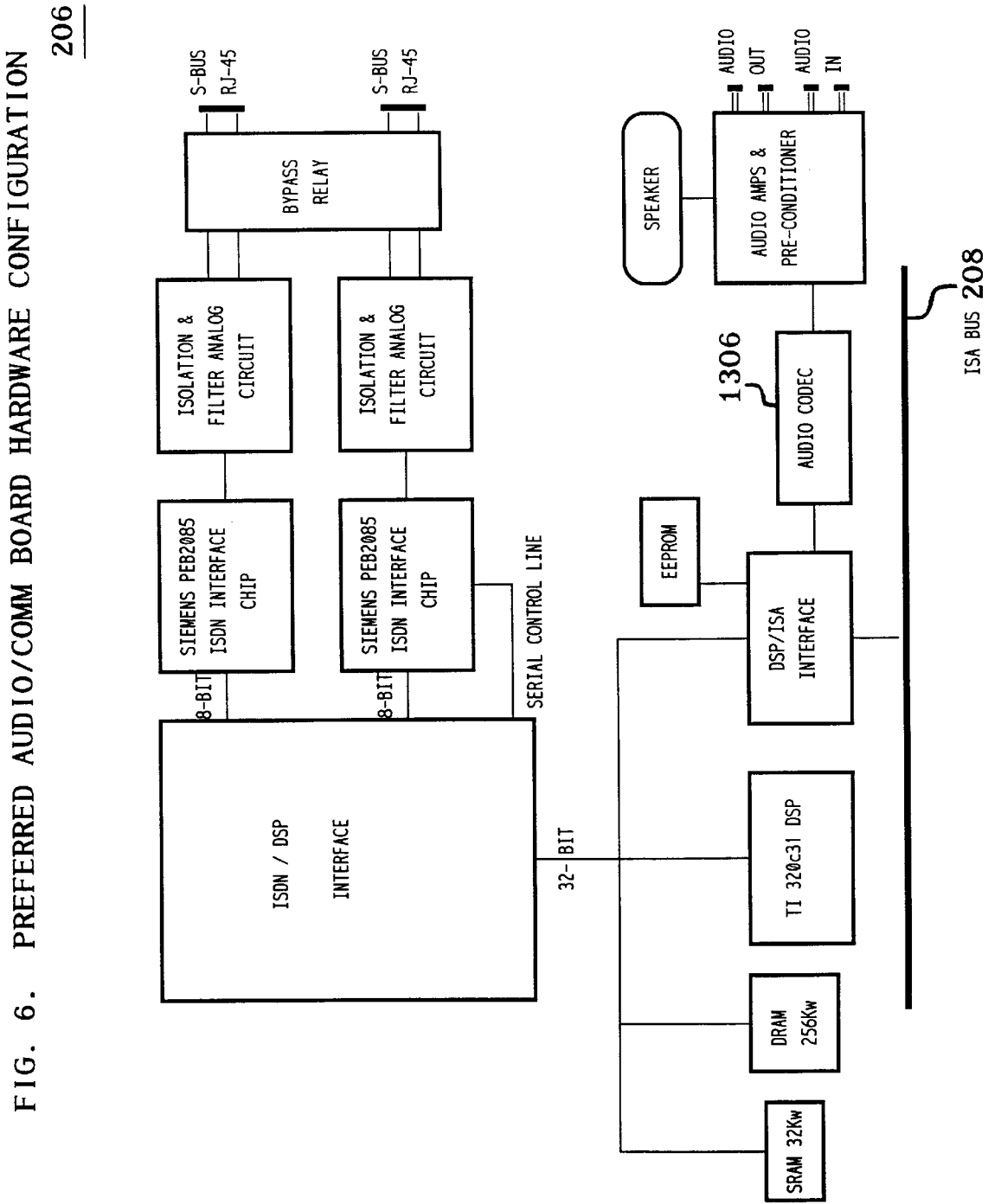
FIG. 6 is a block diagram of the hardware configuration of the audio/comm (ISDN) board of FIG. 4.
Figure 30:
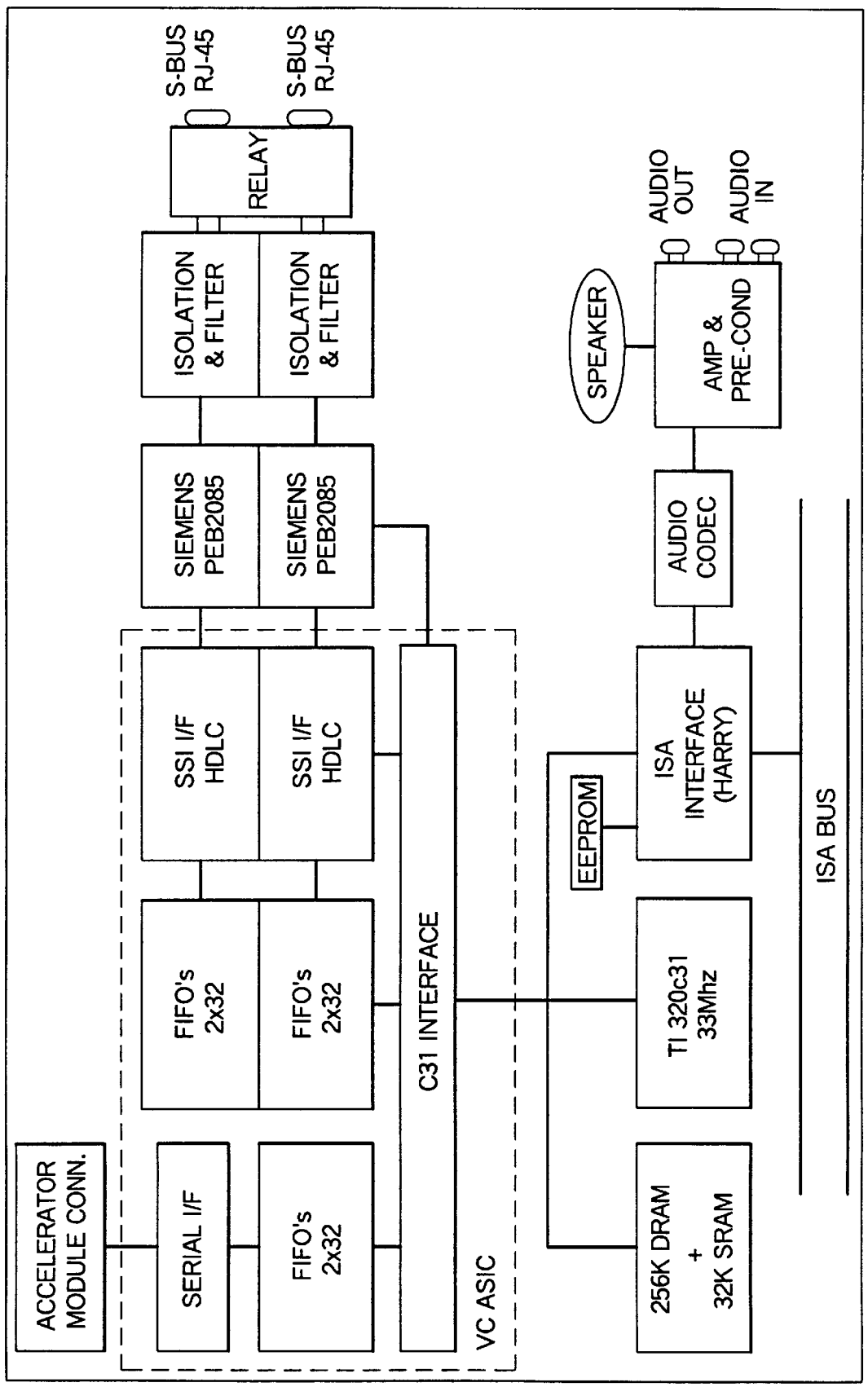
FIGS. 30 and 31 are diagrams of the architecture of the audio/comm (ISDN) board.
Figure 31:
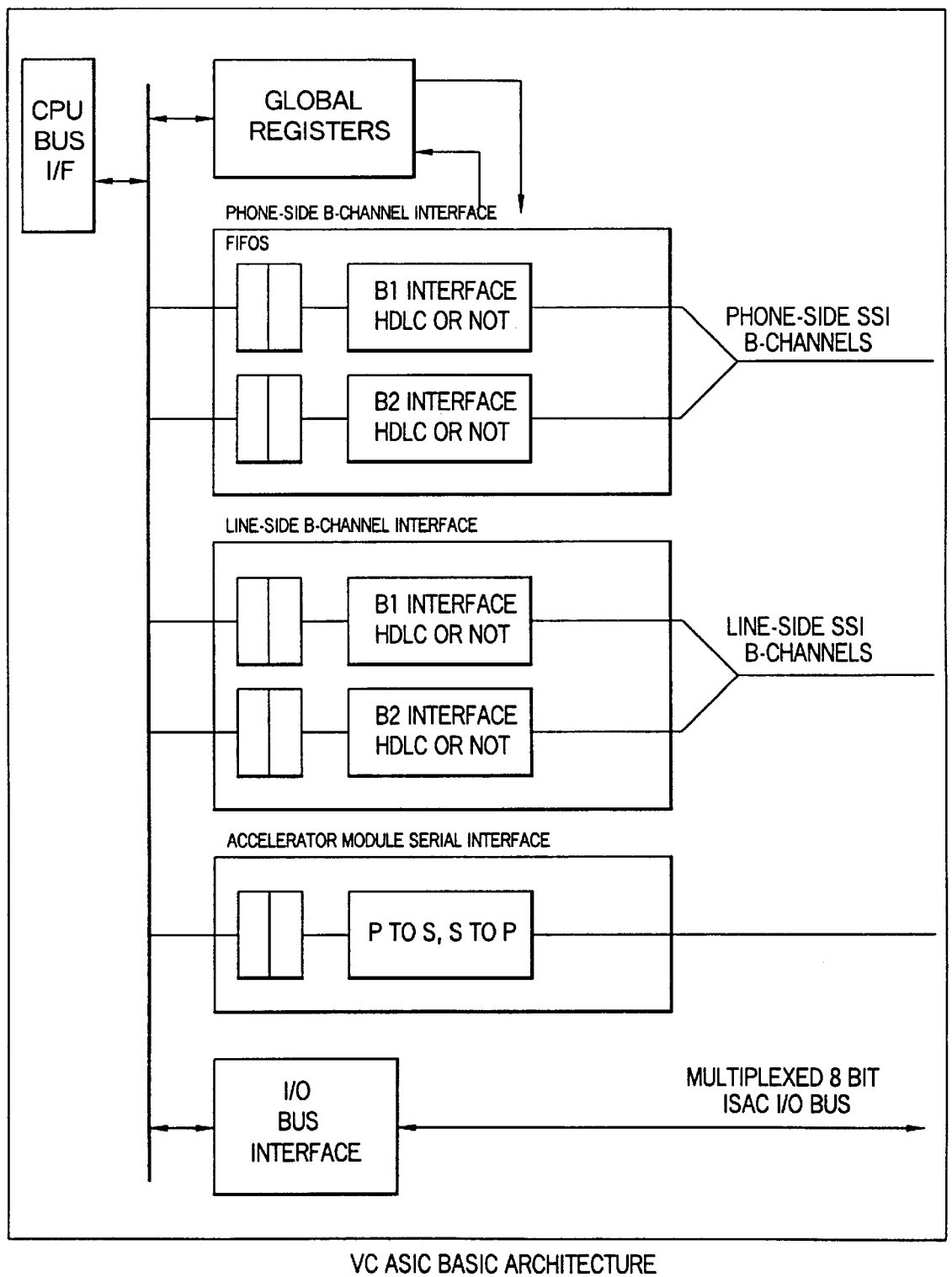
Figure 32:
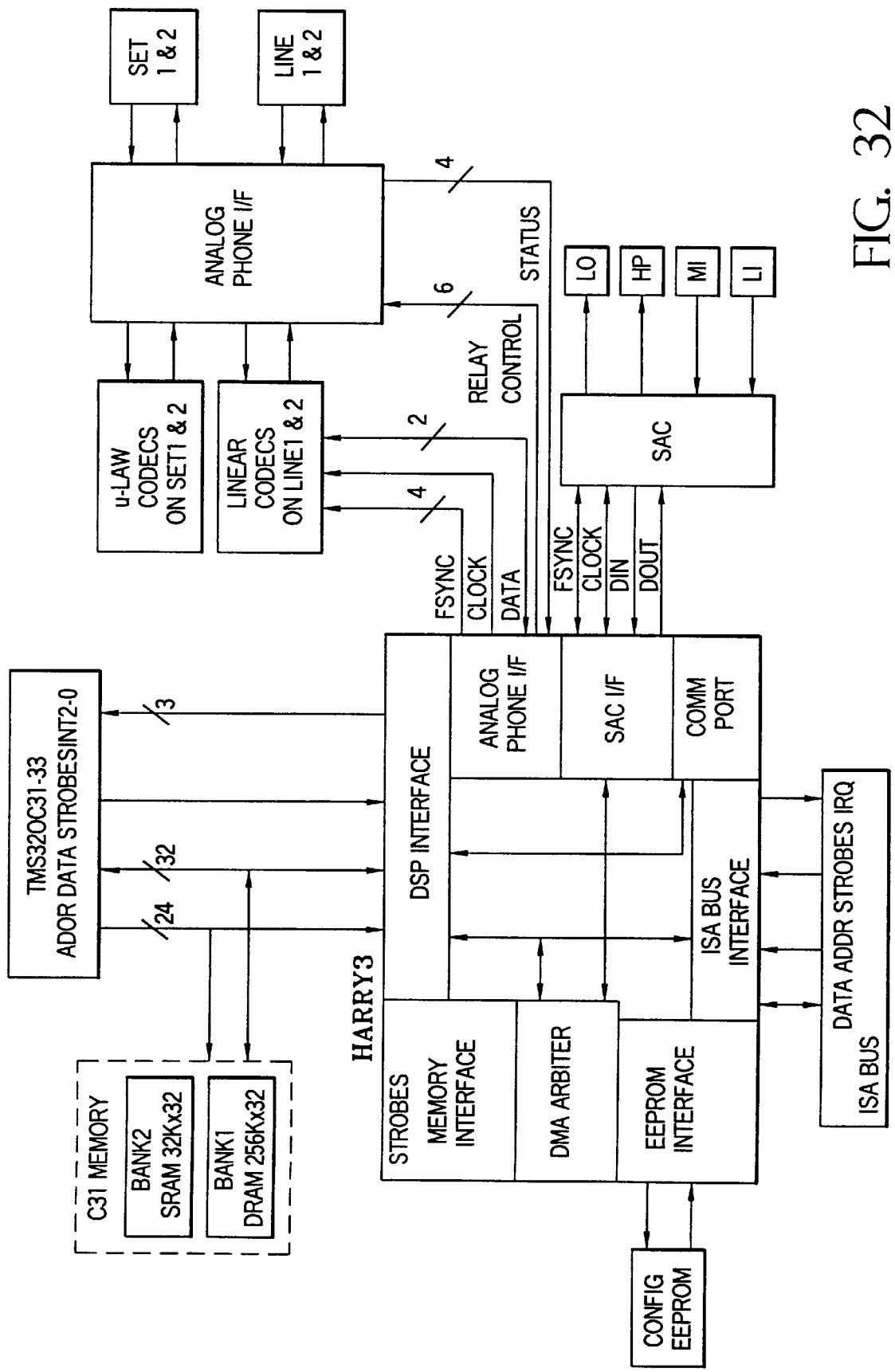
FIG. 32 is a diagram of the audio/comm (ISDN) board environment.

Referring now to FIG. 6, there is shown a block diagram of the hardware configuration of audio/comm (ISDN) board 206 of FIG. 4. Referring now to FIGS. 30 and 31, there are shown diagrams of the architecture of the audio/comm (ISDN) board 206. Referring now to FIG. 32, there is shown a diagram of the audio/comm (ISDN) board environment. The description for the rest of this section is the same as the description for the section of the same name in U.S. patent application Ser. No. 08/157,694.

Software Architecture for Conferencing System

The software architecture of conferencing system 100 of FIGS. 2 and 5 has three layers of abstraction. A computer supported collaboration (CSC) infrastructure layer comprises the hardware (i.e., video board 204, audio/comm (ISDN) board 206, and LAN board 210) and host/board driver software (i.e., video/host interface 526, DSP interface 528, and network stack 560) to support video, audio, and comm, as well as the encode method for video (running on video board 204) and encode/decode methods for audio (running on audio/comm (ISDN) board 206). The capabilities of the CSC infrastructure are provided to the upper layer as a device driver interface (DDI).

A CSC system software layer provides services for instantiating and controlling the video and audio streams, synchronizing the two streams, and establishing and gracefully ending a call and associated communication channels. This functionality is provided in an application programming interface (API). This API comprises the extended audio and video interfaces and the communications APIs (i.e., conference manager 544, conferencing API (VCI) 506, LAN management interface (LMI) API 556, LMI manager 558, video API 508, video manager 516, video capture driver 522, video decode driver 548, video playback driver 550, comm API 510, comm manager 518, Wave API 514, Wave driver 524, PWave API 552, audio API 512, and audio manager 520).

A CSC applications layer brings CSC to the desktop. The CSC applications may include video annotation to video mail, video answering machine, audio/video/data conferencing (i.e., audio/video conferencing application 502 and data conferencing application 504), and group decision support systems.

Audio/video conferencing application 502 and data conferencing application 504 rely on conference manager 544 and conferencing API 506, which in turn rely upon video API 508, comm API 510, and audio API 512 to interface with video manager 516, comm manager 518, and audio manager 520, respectively. Comm API 510 and comm manager 518 provide a transport-independent interface (TII) that provides communications services to conferencing applications 502 and 504. The communications software of conferencing system 100 may be designed to support different transport mechanisms, such as ISDN, SW56, and LAN (e.g., SPX/IPX, TCP/IP, or NetBIOS). The TII isolates the conferencing applications from the underlying transport layer (i.e., transport-medium-specific DSP interface 528). The TII hides the network/connectivity specific operations. In conferencing system 100, the TII hides the ISDN and LAN layers. The DSP interface 528 is hidden in a datalink module (DLM). The LAN interface is hidden within a media dependent module (MDM). The TII provides services to the conferencing applications for opening communication channels (within the same session) and dynamically managing the bandwidth. The bandwidth is managed through a transmission priority scheme.

In an embodiment in which conferencing system 100 performs software video decoding, AVI capture driver 522 is implemented on top of video/host interface 526 (the video driver). In an alternative embodiment in which conferencing system 100 performs hardware video decoding, an AVI display driver is also implemented on top of video/host interface 526.

The software architecture of conferencing system 100 comprises three major subsystems: video, audio, and communication. The audio and video subsystems are decoupled and treated as "data types" (similar to text or graphics) with conventional operations like open, save, edit, and display. The video and audio services are available to the applications through video-management and audio-management extended interfaces, respectively.

Conferencing system 100 is implemented mostly in the C++ computer language using the Microsoft® Foundation Classes (MFC) with portions implemented in the C7.0 computer language.

Audio/Video Conferencing Application

The description for this section is the same as the description for the section of the same name in U.S. patent application Ser. No. 08/340,172 filed Nov. 15, 1994 [using U.S. Express Mail Label No. EG029471669].

CMIF.LIB

The description for this section is the same as the description for the section of the same name in U.S. patent application Ser. No. 08/340,172 filed Nov. 15, 1994 [using U.S. Express Mail Label No. EG029471669].

CCm

The description for this section is the same as the description for the section of the same name in U.S. patent application Ser. No. 08/340,172 filed Nov. 15, 1994 [using U.S. Express Mail Label No. EG029471669].

Loading and Unloading

The description for this section is the same as the description for the section of the same name in U.S. patent application Ser. No. 08/340,172 filed Nov. 15, 1994 [using U.S. Express Mail Label No. EG029471669].

Registering and Unregistering

The description for this section is the same as the description for the section of the same name in U.S. patent application Ser. No. 08/340,172 filed Nov. 15, 1994 [using U.S. Express Mail Label No. EG029471669].

Call Support

The description for this section is the same as the description for the section of the same name in U.S. patent application Ser. No. 08/340,172 filed Nov. 15, 1994 [using U.S. Express Mail Label No. EG029471669].

Channel Pair Support

The description for this section is the same as the description for the section of the same name in U.S. patent application Ser. No. 08/340,172 filed Nov. 15, 1994 [using U.S. Express Mail Label No. EG029471669].

Stream Support

The description for this section is the same as the description for the section of the same name in U.S. patent application Ser. No. 08/340,172 filed Nov. 15, 1994 [using U.S. Express Mail Label No. EG029471669].

CMDLL Callback

The description for this section is the same as the description for the section of the same name in U.S. patent application Ser. No. 08/340,172 filed Nov. 15, 1994 [using U.S. Express Mail Label No. EG029471669].

NO VCI Support

The description for this section is the same as the description for the section of the same name in U.S. patent application Ser. No. 08/340,172 filed Nov. 15, 1994 [using U.S. Express Mail Label No. EG029471669].

Miscellaneous

The description for this section is the same as the description for the section of the same name in U.S. patent application Ser. No. 08/340,172 filed Nov. 15, 1994 [using U.S. Express Mail Label No. EG029471669].

CImgeSize

The description for this section is the same as the description for the section of the same name in U.S. patent application Ser. No. 08/340,172 filed Nov. 15, 1994 [using U.S. Express Mail Label No. EG029471669].

CImageState

The description for this section is the same as the description for the section of the same name in U.S. patent application Ser. No. 08/340,172 filed Nov. 15, 1994 [using U.S. Express Mail Label No. EG029471669].

PSVIDEO.EXE

The description for this section is the same as the description for the section of the same name in U.S. patent application Ser. No. 08/340,172 filed Nov. 15, 1994 [using U.S. Express Mail Label No. EG029471669].

Frame, View, and Image

The description for this section is the same as the description for the section of the same name in U.S. patent application Ser. No. 08/340,172 filed Nov. 15, 1994 [using U.S. Express Mail Label No. EG029471669].

Class Descriptions

The description for this section is the same as the description for the section of the same name in U.S. patent application Ser. No. 08/340,172 filed Nov. 15, 1994 [using U.S. Express Mail Label No. EG029471669].

Ccyapp

The description for this section is the same as the description for the section of the same name in U.S. patent application Ser. No. 08/340,172 filed Nov. 15, 1994 [using U.S. Express Mail Label No. EG029471669].

CCyFrameWnd

The description for this section is the same as the description for the section of the same name in U.S. patent application Ser. No. 08/340,172 filed Nov. 15, 1994 [using U.S. Express Mail Label No. EG029471669].

CCyAppFrame

The description for this section is the same as the description for the section of the same name in U.S. patent application Ser. No. 08/340,172 filed Nov. 15, 1994 [using U.S. Express Mail Label No. EG029471669].

CVideoFrame

The description for this section is the same as the description for the section of the same name in U.S. patent application Ser. No. 08/340,172 filed Nov. 15, 1994 [using U.S. Express Mail Label No. EG029471669].

CVideoController

The description for this section is the same as the description for the section of the same name in U.S. patent application Ser. No. 08/340,172 filed Nov. 15, 1994 [using U.S. Express Mail Label No. EG029471669].

Auto-Sizing of Video Windows

The description for this section is the same as the description for the section of the same name in U.S. patent application Ser. No. 08/340,172 filed Nov. 15, 1994 [using U.S. Express Mail Label No. EG029471669].

Split and Combined Modes

The description for this section is the same as the description for the section of the same name in U.S. patent application Ser. No. 08/340,172 filed Nov. 15, 1994 [using U.S. Express Mail Label No. EG029471669].

Control Channel Management

The description for this section is the same as the description for the section of the same name in U.S. patent application Ser. No. 08/340,172 filed Nov. 15, 1994 [using U.S. Express Mail Label No. EG029471669].

Mute Message

The description for this section is the same as the description for the section of the same name in U.S. patent application Ser. No. 08/340,172 filed Nov. 15, 1994 [using U.S. Express Mail Label No. EG029471669].

High-Quality Snapshot Message

The description for this section is the same as the description for the section of the same name in U.S. patent application Ser. No. 08/340,172 filed Nov. 15, 1994 [using U.S. Express Mail Label No. EG029471669].

Application Launch

The description for this section is the same as the description for the section of the same name in U.S. patent application Ser. No. 08/340,172 filed Nov. 15, 1994 [using U.S. Express Mail Label No. EG029471669].

Application Launch Response

The description for this section is the same as the description for the section of the same name in U.S. patent application Ser. No. 08/340,172 filed Nov. 15, 1994 [using U.S. Express Mail Label No. EG029471669].

CChanPair

The description for this section is the same as the description for the section of the same name in U.S. patent application Ser. No. 08/340,172 filed Nov. 15, 1994 [using U.S. Express Mail Label No. EG029471669].

Video View Class Relationships

The description for this section is the same as the description for the section of the same name in U.S. patent application Ser. No. 08/340,172 filed Nov. 15, 1994 [using U.S. Express Mail Label No. EG029471669].

Handset Class Relationships

The description for this section is the same as the description for the section of the same name in U.S. patent application Ser. No. 08/340,172 filed Nov. 15, 1994 [using U.S. Express Mail Label No. EG029471669].

Dialog Boxes

The description for this section is the same as the description for the section of the same name in U.S. patent application Ser. No. 08/340,172 filed Nov. 15, 1994 [using U.S. Express Mail Label No. EG029471669].

Helper Classes

Dialog Helper

The description for this section is the same as the description for the section of the same name in U.S. patent application Ser. No. 08/340,172 filed Nov. 15, 1994 [using U.S. Express Mail Label No. EG029471669].

Fast Bitmap Buttons

The description for this section is the same as the description for the section of the same name in U.S. patent application Ser. No. 08/340,172 filed Nov. 15, 1994 [using U.S. Express Mail Label No. EG029471669].

Data Conferencing Application

The description for this section is the same as the description for the section of the same name in U.S. patent application Ser. No. 08/340,172 filed Nov. 15, 1994 [using U.S. Express Mail Label No. EG029471669].

Conference Manager

The description for this section is the same as the description for the section of the same name in U.S. patent application Ser. No. 08/340,172 filed Nov. 15, 1994 [using U.S. Express Mail Label No. EG029471669].

Conference Manager Overview

The description for this section is the same as the description for the section of the same name in U.S. patent application Ser. No. 08/340,172 filed Nov. 15, 1994 [using U.S. Express Mail Label No. EG029471669].

Implementation Details

The description for this section is the same as the description for the section of the same name in U.S. patent application Ser. No. 08/340,172 filed Nov. 15, 1994 [using U.S. Express Mail Label No. EG029471669]. Additional information on the conference manager API is found in APPENDIX A of this specification.

Conference Application Installation

The description for this section is the same as the description for the section of the same name in U.S. patent application Ser. No. 08/340,172 filed Nov. 15, 1994 [using U.S. Express Mail Label No. EG029471669].

Conference Application Registration

The description for this section is the same as the description for the section of the same name in U.S. patent application Ser. No. 08/340,172 filed Nov. 15, 1994 [using U.S. Express Mail Label No. EG029471669].

VCI Call Handler Callback

The description for this section is the same as the description for the section of the same name in U.S. patent application Ser. No. 08/340,172 filed Nov. 15, 1994 [using U.S. Express Mail Label No. EG029471669].

Channel Pair Establishment

The description for this section is the same as the description for the section of the same name in U.S. patent application Ser. No. 08/340,172 filed Nov. 15, 1994 [using U.S. Express Mail Label No. EG029471669].

Critical Sections

The description for this section is the same as the description for the section of the same name in U.S. patent application Ser. No. 08/340,172 filed Nov. 15, 1994 [using U.S. Express Mail Label No. EG029471669].

Call Notification and Caller ID

The description for this section is the same as the description for the section of the same name in U.S. patent application Ser. No. 08/340,172 filed Nov. 15, 1994 [using U.S. Express Mail Label No. EG029471669].

Audible Call Progress

The description for this section is the same as the description for the section of the same name in U.S. patent application Ser. No. 08/340,172 filed Nov. 15, 1994 [using U.S. Express Mail Label No. EG029471669].

On Demand Application Invocation

Figure 33:
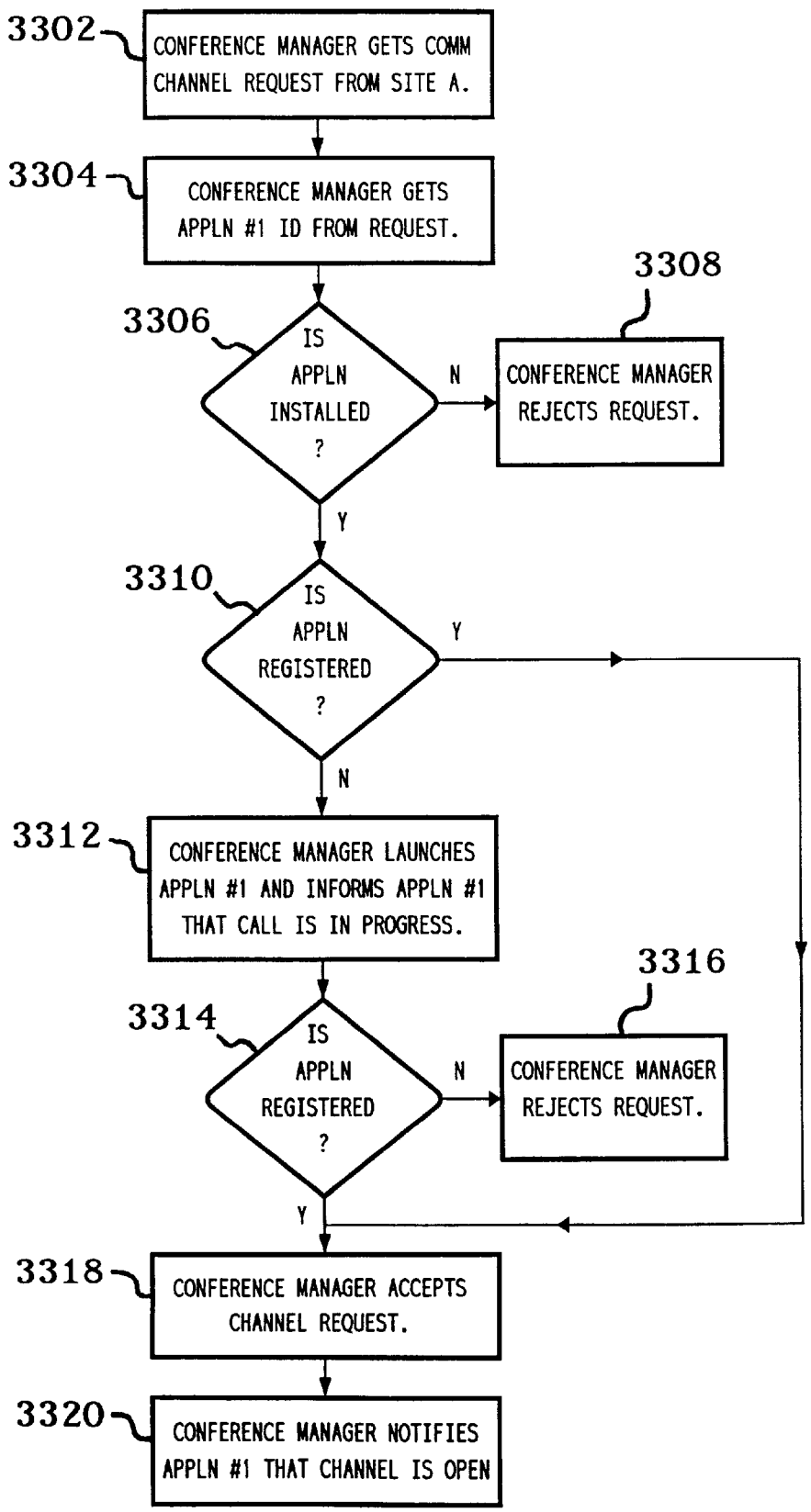
FIG. 33 is a flow diagram of the on-demand application invocation processing of the conferencing system of FIG. 5.

Referring now to FIG. 33, there is shown a flow diagram of the on-demand application invocation processing of conferencing system 100 of FIG. 5. The description for this section is the same as the description for the section of the same name in U.S. patent application Ser. No. 08/340,172 filed Nov. 15, 1994 [using U.S. Express Mail Label No. EG029471669].

Managing Multiple Applications

Figure 34:
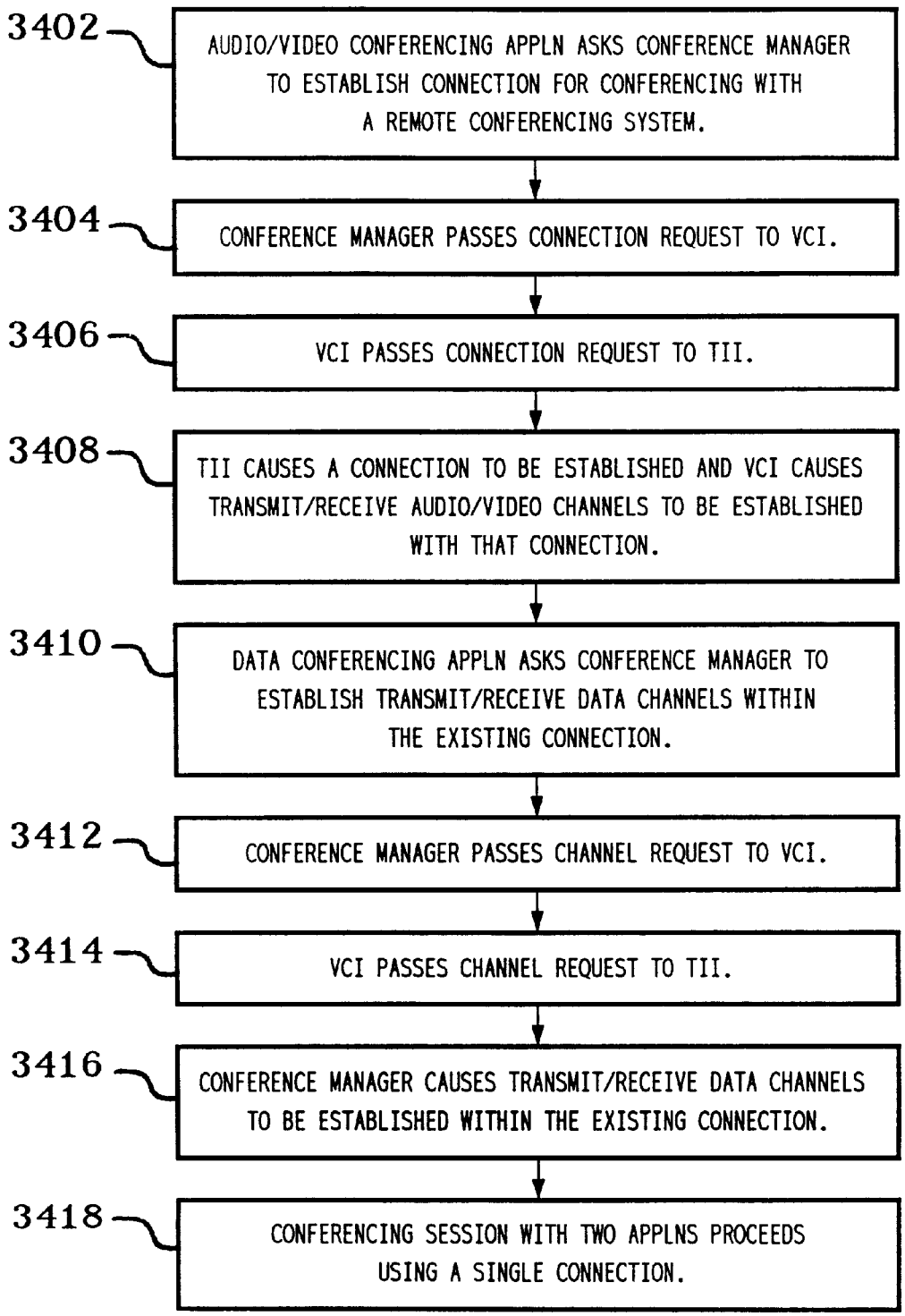
FIG. 34 is a flow diagram of an example of the processing implemented within the conferencing system of FIG. 5 to manage two conferencing applications in a single conferencing session with a remote conferencing system.

Referring now to FIG. 34, there is shown a flow diagram of an example of the processing implemented within conferencing system 100 of FIG. 5 to manage two conferencing applications in a single conferencing session with a remote conferencing system. The description for this section is the same as the description for the section of the same name in U.S. patent application Ser. No. 08/340,172 filed Nov. 15, 1994 [using U.S. Express Mail Label No. EG029471669].

Conferencing API

Figure 7:
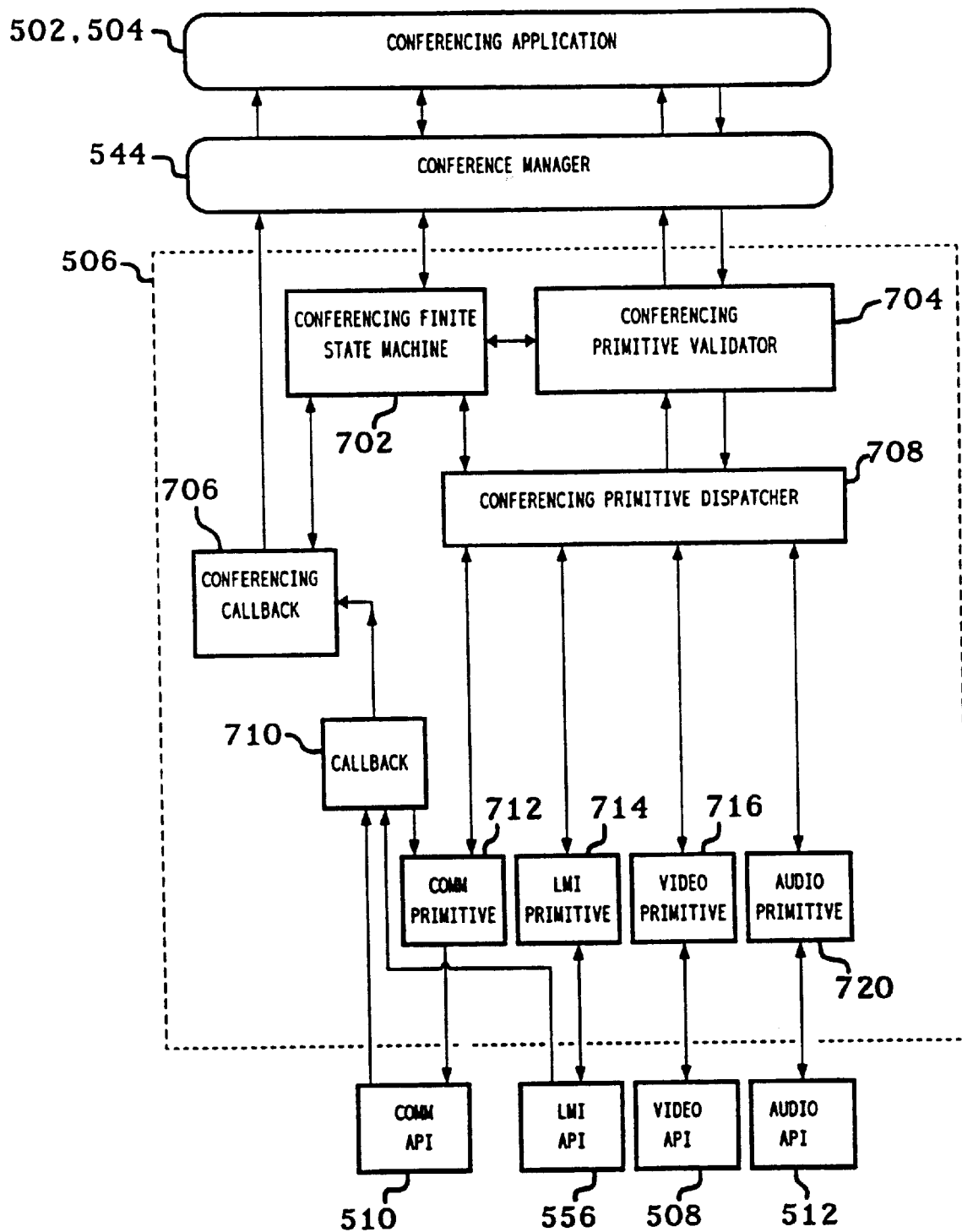
FIG. 7 is a block diagram of the conferencing interface layer between the conferencing applications of FIG. 5, on one side, and the comm, video, and audio managers of FIG. 5, on the other side.

Referring now to FIG. 7, there is shown a block diagram of conference manager 544 and conferencing API 506 between conferencing applications 502 and 504, on one side, and comm API 508, LMI API 556, video API 510, and audio API 512, on the other side. The description for this section is the same as the description for the section of the same name in U.S. patent application Ser. No. 08/340,172 filed Nov. 15, 1994 [using U.S. Express Mail Label No. EG029471669]. Additional information on theconferencing API is found in APPENDIX B of this specification.

Interfacing with the Comm Subsystem

Conferencing API 506 supports the following comm services with the comm subsystem:

Comm initialization—initialize a session in the comm subsystem on which the call will be made.

Call establishment—place a call to start a conference.

Channel establishment—establish two comm channels for video conferencing control information, two comm channels for audio (incoming/outgoing), four comm channels for video (incoming data and control and outgoing data and control).

Call termination—hang up a call and close all active channels.

Comm Initialization/Uninitialization

Initialization of a session in the comm subsystem on which a call may be made by the user of conferencing system A of FIG. 1 and the user of conferencing system B of FIG. 1 is implemented as follows:

Conferencing APIs A and B call LMI_AddLANTransport to initialize their LAN management interface (LMI) subsystems.

Conferencing APIs A and B receive a LMI_ADDTRANS_RESPONSE callback from the LMI subsystem.

Conferencing APIs A and B call BeginSession to initialize their comm subsystems.

Conferencing APIs A and B receive a SESS_BEGIN callback from the comm subsystem.

Conferencing APIs A and B then notify the conferencing applications with a CFM_INIT_TRANSP_NTFY callback.

Uninitialization of a session in the comm subsystem is implemented as follows:

Conferencing APIs A and B call LMI_DeleteLANTransport to uninitialize their LAN management interface (LMI) subsystems.

Conferencing APIs A and B receive a LMI_DELTRANS_RESPONSE callback from the LMI subsystem.

Conferencing APIs A and B call EndSession to uninitialize their comm subsystems.

Conferencing APIs A and B receive a SESS_CLOSED callback from the comm subsystem.

Conferencing APIs A and B then notify the conferencing applications with a CFM_UNINIT_TRANSP_NTFY callback.

Call Establishment

Establishment of a call between the user of conferencing system A of FIG. 1 and the user of conferencing system B of FIG. 1 is implemented as follows:

Conferencing API A calls LMI_RequestPermission to request permission to make the conference call from the management computer.

Confrencing API A receives a LMI_PERM_RESPONSE callback from the LMI subsystem. If permission is denied, conferencing API A notifies the conferencing application with a CFM_REJECT_NTFY callback. If permission is granted, establishment of the call is continued.

Conferencing API A calls LMI_CallCommit to indicate to LMI that the call will be made.

Conferencing API A calls MakeConnection to dial conferencing API B's number.

Conferencing API B receives a CONN_REQUESTED callback from the comm subsystem.

Conferencing API B calls LMI_RequestPermission to request permission to accept the conference call from the management computer.

Conferencing API B receives a LMI_PERM_RESPONSE callback from the LMI subsystem. If permission is denied, conferencing API B rejects the call with RejectConnection, and notifies the conferencing application with a CFM_DENIAL_NTFY callback. If permission is granted, establishment of the call is continued.

Conferencing API B sends the call notification to the graphic user interface (GUI) with a CFM_CALL_NTFY callback; and, if user B accepts the call via the GUI, conferencing API B proceeds with the following steps.

Conferencing API B calls LMI_CallCommit to indicate to LMI that the call will be accepted.

Conferencing API B calls AcceptConnection to accept the incoming call from conferencing API A.

Conferencing APIs A and B receive CONN_ACCEPTED callback from the comm subsystem.

Conferencing API A calls OpenChannel to open its outgoing conferencing control channel.

Conferencing API B receives the CHAN_REQUESTED callback for the incoming control channel and accepts it via AcceptChannel. Then conferencing API B calls OpenChannel to open its outgoing conferencing control channel.

Conferencing API A receives the CHAN_ACCEPTED callback for its outgoing control channel and calls RegisterChanHandler to receive channel callbacks from the comm subsystem. Then conferencing API A receives the CHAN_REQUESTED callback for the incoming control channel and accepts it via AcceptChannel.

Conferencing API B receives the CHAN_ACCEPTED callback for its outgoing control channel and calls RegisterChanHandler to receive channel callbacks from the comm subsystem.

Conferencing API A sends a Login Request on the control channel, which conferencing API B receives.

Conferencing API B sends a Login Response on the control channel, which conferencing API A receives.

Conferencing APIs A and B negotiate conference capabilities between themselves. Capabilities that are negotiated include: negotiation protocol version, audio compression algorithm, video compression algorithm, video frame rate, video capture resolution, video bitrate, and data sharing capabilities.

Conferencing API A sends a Capabilities Request on the control channel, specifying conference requirements, which conferencing API B receives.

Conferencing API B sends a Capabilities Response on the control channel, accepting or modifying conference requirements, which conferencing API A receives.

When conferencing APIs A and B agree upon conference capabilities, the capabilities are saved and will be communicated to the application via the CFM_ACCEPT_NTFY callback.

Conferencing API A calls OpenChannel to open its outgoing audio channel.

Conferencing API B receives the CHAN_REQUESTED callback for the incoming audio channel and accepts it via AcceptChannel.

Conferencing API A receives the CHAN_ACCEPTED callback for the outgoing audio channel.

The last three steps are repeated for the video data channel and the video control channel.

Conferencing API B then turns around and repeats the above 4 steps (i.e., opens its outbound channels for audio/video data/video control).

Conferencing API A sends Participant Information on the control channel, which conferencing API B receives.

Conferencing API B sends Participant Information on the control channel, which conferencing API A receives.

Conferencing APIs A and B call LMI_ConferenceCommit to indicate to LMI that the conference is in progress.

Conferencing APIs A and B then notify the conferencing applications with a CFM_ACCEPT_NTFY callback.

Channel Establishment

Video and audio channel establishment is implicitly done as part of call establishment, as discribed above, and need not be repeated here. For establishing other channels such as data conferencing, the conferencing API passes through the request to the comm manager, and sends the comm manager's callback to the user's channel manager.

Call Termination

Termination of a call between users A and B is implemented as follows (assuming user A hangs up):

Conferencing API A unlinks local/remote video/audio streams from the network.

Conferencing API A calls LMI_ConferenceLeave to indicate to LMI that the conference is being closed.

Conferencing API A then calls the comm subsystem's CloseConnection.

The comm subsystem implicitly closes all channels, and sends CHAN_CLOSED callbacks to the conferencing API A.

Conferencing API A closes its remote audio/video streams on receipt of the CHAN_CLOSED callback for its inbound audio/video channels, respectively.

Conferencing API A then receives the CONN_CLOSE_RESP callback after the call is cleaned up completely. Conferencing API A notifies its conferencing application with a CFM_HANGUP_NTFY callback.

In the meantime, conferencing API B would have received the CHAN_CLOSED callbacks from the comm subsystem for all the closed channels.

Conferencing API B closes its remote audio/video streams on receipt of the CHAN_CLOSED callback for its inbound audio/video channels, respectively.

Conferencing API B unlinks its local audio/video streams from the network on receipt of the CHAN_CLOSED callback for its outbound audio/video channels, respectively.

Conferencing API B then receives a CONN_CLOSED callback from the comm subsystem.

Conferencing API B calls LMI_ConferenceLeave to indicate to LMI that the conference is being closed.

Conferencing API B then notifies its conferencing application with a CFM_HANGUP_NTFY callback.

Interfacing with the Audio and Video Subsystems

The description for this section is the same as the description for the section of the same name in U.S. patent application Ser. No. 08/340,172 filed Nov. 15, 1994 [using U.S. Express Mail Label No. EG029471669].

Capture/Monitor/Transmit Local Streams

The description for this section is the same as the description for the section of the same name in U.S. patent application Ser. No. 08/340,172 filed Nov. 15, 1994 [using U.S. Express Mail Label No. EG029471669].

Receive/Play Remote Streams

The description for this section is the same as the description for the section of the same name in U.S. patent application Ser. No. 08/340,172 filed Nov. 15, 1994 [using U.S. Express Mail Label No. EG029471669].

Control Local/Remote Streams

The description for this section is the same as the description for the section of the same name in U.S. patent application Ser. No. 08/340,172 filed Nov. 15, 1994 [using U.S. Express Mail Label No. EG029471669].

Snap an Image from Local Video Streams

Figure 8:
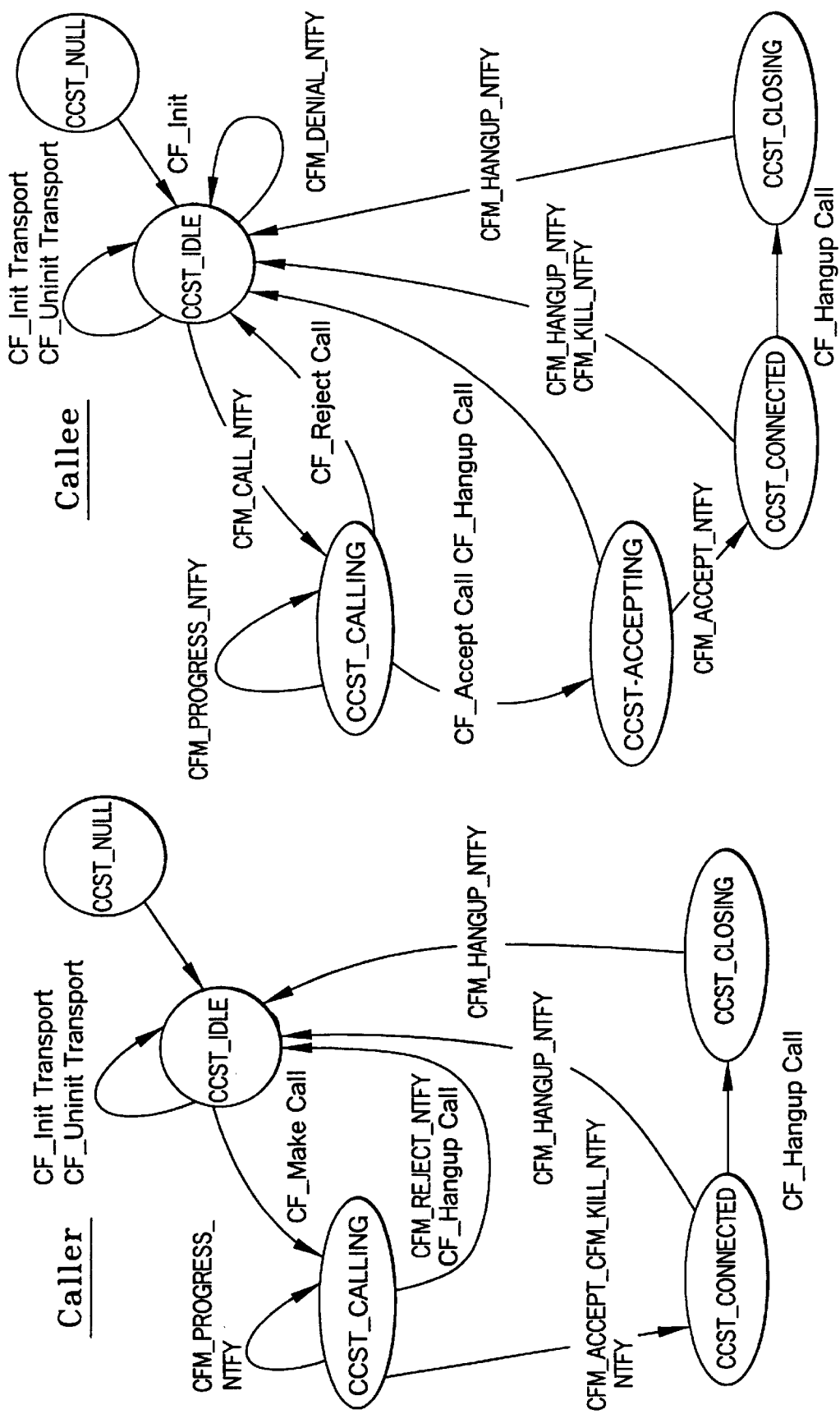
FIG. 8 is a representation of the conferencing call finite state machine (FSM) for a conferencing session between a local conferencing system (i.e., caller) and a remote conferencing system (i.e., callee)
Figure 9:
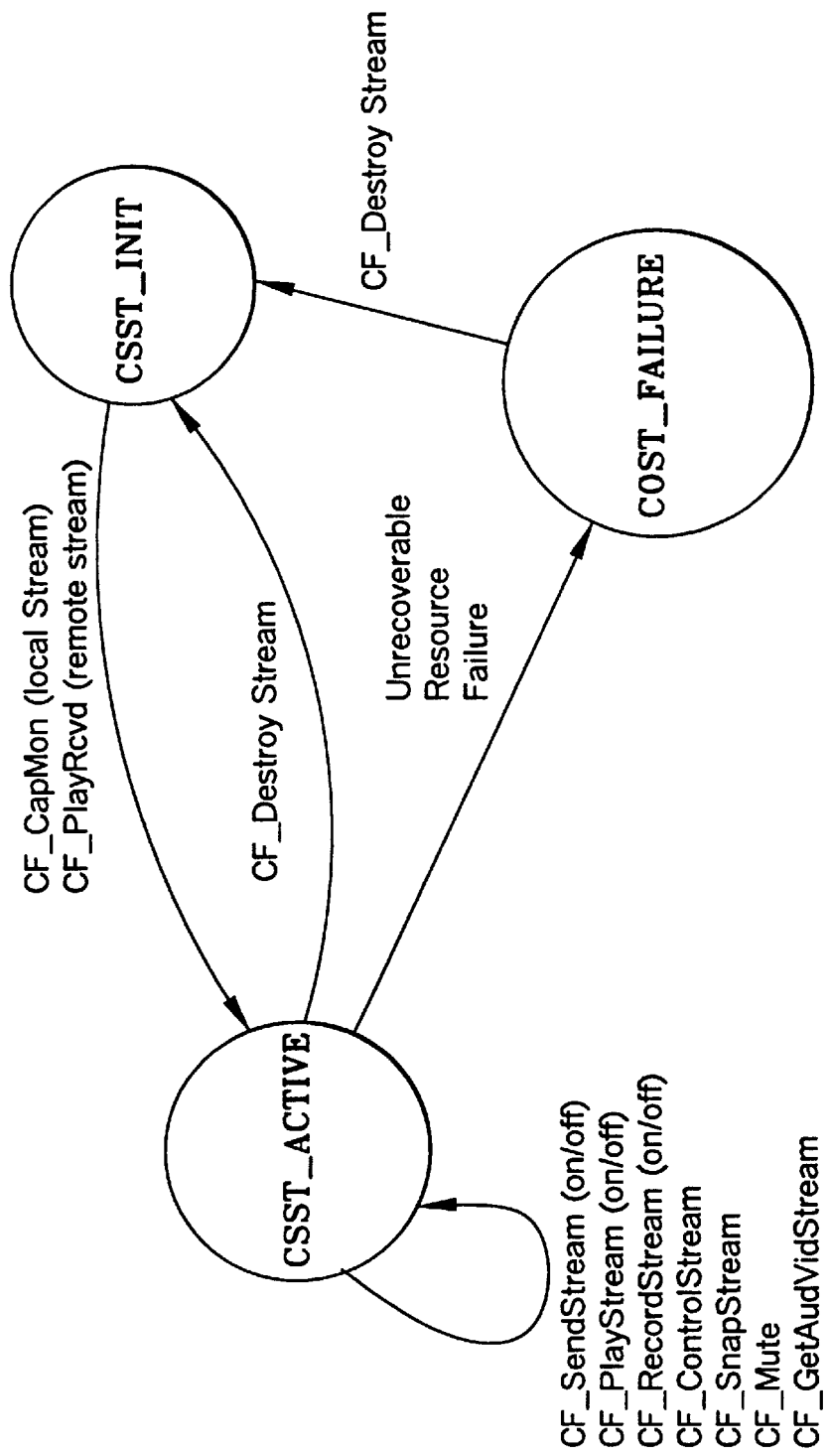
FIG. 9 is a representation of the conferencing stream FSM for each conferencing system participating in a conferencing session.

Referring now to FIG. 8, there is shown a representation of the conferencing call finite state machine (FSM) for a conferencing session between a local conferencing system (i.e., caller) and a remote conferencing system (i.e., callee). Referring now to FIG. 9, there is shown a representation of the conferencing stream FSM for each conferencing system participating in a conferencing session. The description for this section is the same as the description for the section of the same name in U.S. patent application Ser. No. 08/340,172 filed Nov. 15, 1994 [using U.S. Express Mail Label No. EG029471669]. Differences include changes to the CF_Init function and new functions CF_Uninit, CF_InitTransport, CF_UninitTransport, and CF_ChangeTransportMaxVideoBitrate, as follows:

| | |
|---|---|
| CF_Init | Initializes the LAN management interface (LMI), audio and video subsystems, and initializes data structures required for conferencing. |
| CF_Uninit | Uninitializes the LMI, audio, and video subsystems. If a conference call is in progress, it is gracefully destroyed. |
| CF_InitTransport | Initializes a LAN or ISDN transport stack so that conference calls may be made or received on a particular transport type. The maximum video bitrate allowed on this transport is specified. |
| CF_UninitTransport | Uninitializes a transport stack, so calls may no longer be made or received on a particular transport type. |
| CF_ChangeTransportMaxVideoBitrate | Changes the maximum video bitrate allowed on a transport. |

These functions are defined in further detail later in this specification in APPENDIX B.

In addition, conferencing API 506 supports the following additional messages returned to conferencing applications 502 and 504 from the video, comm, and audio subsystems in response to some of the above-listed functions:

| | |
|---|---|
| CFM_INIT_TRANSP_NTFY | Indicates that transport stack initialization has completed successfully or unsuccessfully. |
| CFM_UNINIT_TRANSP_NTFY | Indicates that transport stack uninitialization has completed. |
| CFM_UNINIT_NTFY | Indicates that the conferencing API subsystem uninitialization has completed. |
| CFM_DENIAL_NTFY | Indicates that a call request initiated from the remote site has been received, but the local site was denied permission to accept the call by the management computer. |
| CFM_ERROR_NTFY | Indicates that an error has occurred in the comm subsystem. |
| CFM_KILL_NTFY | Indicates that the management computer has demanded the conference call be terminated. |

Video Subsystem

The video subsystem of conferencing system 100 of FIG. 5 comprises video API 508, video manager 516, video decode driver 548, video playback driver 550, video capture driver 522, and video/host interface 526 running on host processor 202 of FIG. 2 and video microcode 530 running on video board 204.

In an embodiment of the invention of U.S. Pat. Ser. No. 08/157,694 (filed Nov. 24, 1993), the video subsystem encoded and decoded video according to a single video compression technique, that, for purposes of this patent application, may be referred to as the ISDN-rate video (IRV) technique. The video processing and video bitstream format described in defined in U.S. patent application Ser. No. 08/157,694 corresponded to that IRV technique.

The video subsystem of the present invention, however, is capable of encoding and decoding video according to more than one video compression technique. In one embodiment, the video system is capable of encoding and decoding video using both the IRV technique and a multi-rate video (MRV) technique. The following sections of this specification refer primarily to the IRV technique. The MRV technique is described in further detail in later sections of this specification starting with the section entitled "Compressed Multi-Rate Video Bitstream."

Video API

Figure 10:
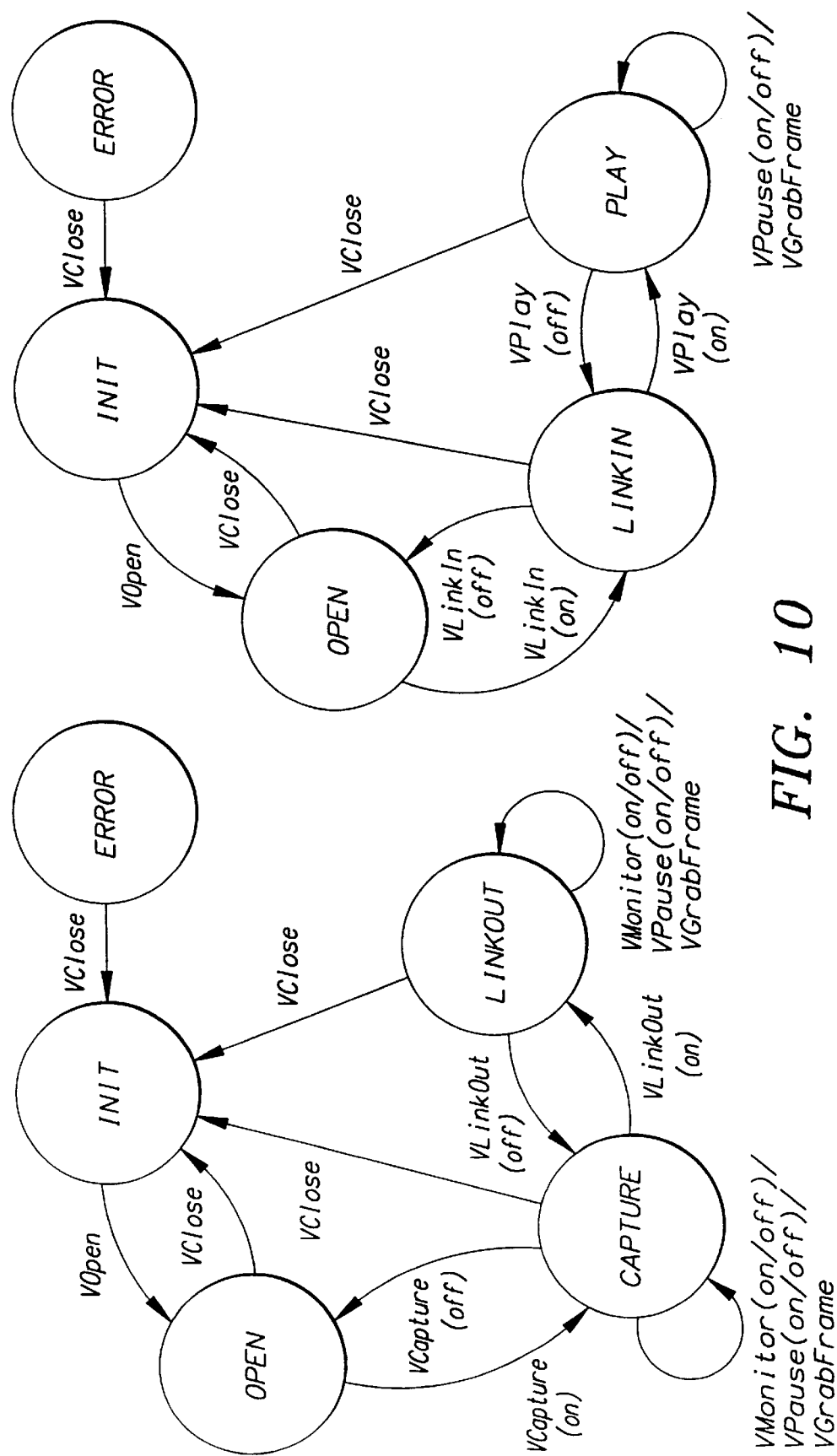
FIG. 10 is a representation of the video FSM for the local video stream and the remote video stream of a conferencing system during a conferencing session.

Referring now to FIG. 10, there is shown a representation of the video FSM for the local video stream and the remote video stream of a conferencing system during a conferencing session. The description for this section is the same as the description for the section of the same name in U.S. patent application Ser. No. 08/157,694. Additional information on the video API is found in APPENDIX C of this specification.

Video Manager

Figure 11:
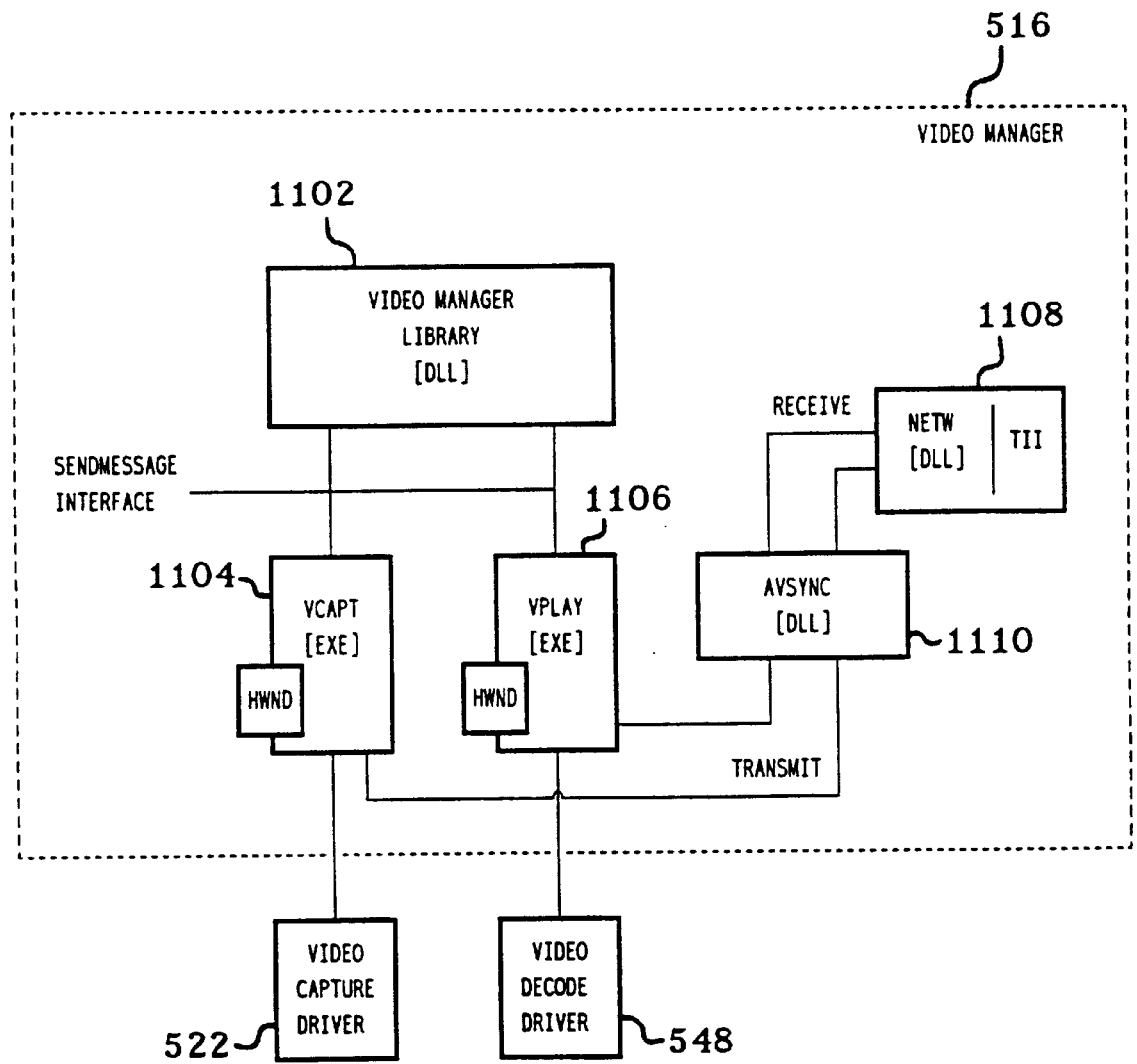
FIG. 11 is a block diagram of the software components of the video manager of the conferencing system of FIG. 5.

Referring now to FIG. 11, there is shown a block diagram of the software components of video manager (VM) 516 of FIG. 5. The description for this section is the same as the description for the section of the same name in U.S. patent application Ser. No. 08/157,694.

Capture/Playback Video Effects

The description for this section is the same as the description for the section of the same name in U.S. patent application Ser. No. 08/157,694.

Video Stream Restart

Figure 12:
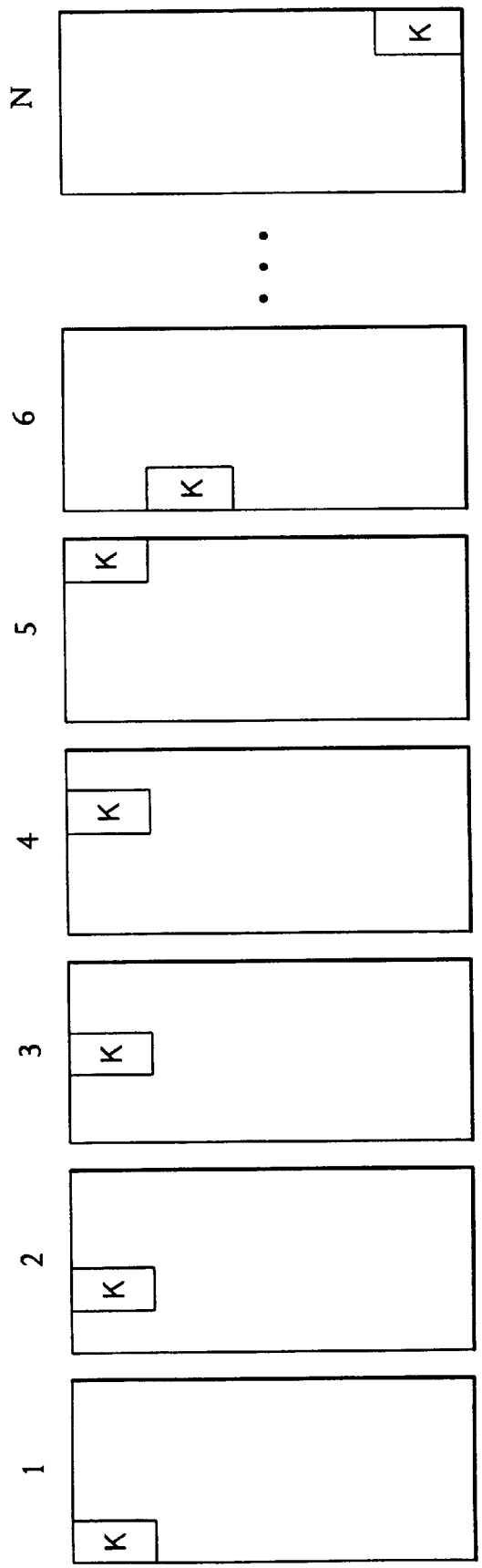
FIG. 12 is a representation of a sequence of N walking key frames.

Referring now to FIG. 12, there is shown a representation of a sequence of N walking key frames. The description for this section is the same as the description for the section of the same name in U.S. patent application Ser. No. 08/157,694.

Audio/Video Synchronization

The description for this section is the same as the description for the section of the same name in U.S. patent application Ser. No. 08/340,172 filed Nov. 15, 1994 [using U.S. Express Mail Label No. EG029471669].

Alternative Timestamp Driver

Figure 35:
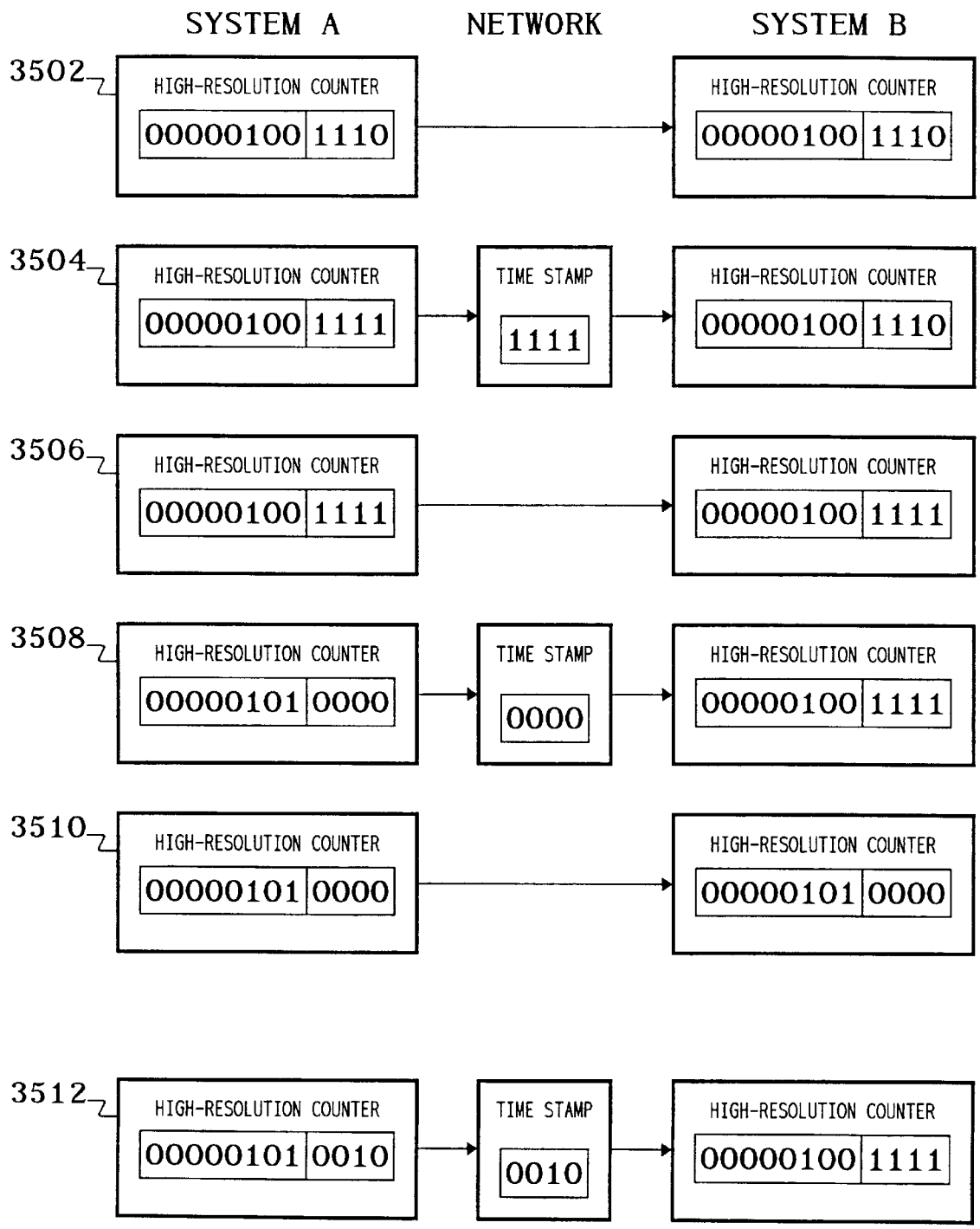
FIG. 35 represents the flow of bits between two remote high-resolution counters used to maintain clock values over a conferencing network.

FIG. 35 represents the flow of bits between two remote high-resolution counters used to maintain clock values over a conferencing network. The description for this section is the same as the description for the section of the same name in U.S. patent application Ser. No. 08/340,172 filed Nov. 15, 1994 [using U.S. Express Mail Label No. EG029471669].

Bit Rate Throttling

The description for this section is the same as the description for the section of the same name in U.S. patent application Ser. No. 08/340,172 filed Nov. 15, 1994 [using U.S. Express Mail Label No. EG9029471669].

Multiple Video Formats

The description for this section is the same as the description for the section of the same name in U.S. patent application Ser. No. 08/340,172 filed Nov. 15, 1994 [using U.S. Express Mail Label No. EG029471669].

Normal Display Resolution

The description for this section is the same as the description for the section of the same name in U.S. patent application Ser. No. 08/340,172 filed Nov. 15, 1994 [using U.S. Express Mail Label No. EG029471669].

Quarter Display Resolution

The description for this section is the same as the description for the section of the same name in U.S. patent application Ser. No. 08/340,172 filed Nov. 15, 1994 [using U.S. Express Mail Label No. EG029471669].

Video Frame Format/Capture Interface

The description for this section is the same as the description for the section of the same name in U.S. patent application Ser. No. 08/340,172 filed Nov. 15, 1994 [using U.S. Express Mail Label No. EG029471669].

Playback Implementation

The description for this section is the same as the description for the section of the same name in U.S. patent application Ser. No. 08/340,172 filed Nov. 15, 1994 [using U.S. Express Mail Label No. EG029471669].

Self-Calibration

The description for this section is the same as the description for the section of the same name in U.S. patent application Ser. No. 08/340,172 filed Nov. 15, 1994 [using U.S. Express Mail Label No. EG029471669].

Measurement

The description for this section is the same as the description for the section of the same name in U.S. patent application Ser. No. 08/340,172 filed Nov. 15, 1994 [using U.S. Express Mail Label No. EG029471669].

File-Based Capture (File Playback)

The description for this section is the same as the description for the section of the same name in U.S. patent application Ser. No. 08/340,172 filed Nov. 15, 1994 [using U.S. Express Mail Label No. EG029471669].

Playback Statistics

The description for this section is the same as the description for the section of the same name in U.S. patent application Ser. No. 08/340,172 filed Nov. 15, 1994 [using U.S. Express Mail Label No. EG029471669].

VCost Function

The description for this section is the same as the description for the section of the same name in U.S. patent application Ser. No. 08/340,172 filed Nov. 15, 1994 [using U.S. Express Mail Label No. EG029471669].

VM DLL

The description for this section is the same as the description for the section of the same name in U.S. patent application Ser. No. 08/157,694.

VCapt EXE

The description for this section is the same as the description for the section of the same name in U.S. patent application Ser. No. 08/157,694.

VPlay EXE

The description for this section is the same as the description for the section of the same name in U.S. patent application Ser. No. 08/157,694.

Palette Creation

The description for this section is the same as the description for the section of the same name in U.S. patent application Ser. No. 08/340,172 filed Nov. 15, 1994 [using U.S. Express Mail Label No. EG029471669].

Extra RealizePalette Logic

The description for this section is the same as the description for the section of the same name in U.S. patent application Ser. No. 08/340,172 filed Nov. 15, 1994 [using U.S. Express Mail Label No. EG029471669].

Netw DLL

The description for this section is the same as the description for the section of the same name in U.S. patent application Ser. No. 08/340,172 filed Nov. 15, 1994 [using U.S. Express Mail Label No. EG029471669].

AVSync DLL

The description for this section is the same as the description for the section of the same name in U.S. patent application Ser. No. 08/157,694.

Video Capture Driver

Video capture driver 522 of FIG. 5 follows driver specifications set forth in the Microsof® Video for Windows™ (VfW) Developer Kit documentation. This documentation specifies a series of application program interfaces (APIs) to which video capture driver 522 responds. Microsoft® Video for Windows™ (VfW) is a Microsoft® extension to the Microsoft® Windows™ operating system. VfW provides a common framework to integrate audio and video into an application program. Video capture driver 522 extends the basic Microsoft® API definitions by providing nine "custom" APIs that provide direct control of enhancements to the standard VfW specification to enable and control bit rate throttling and local video monitoring. Video capture driver 522 captures images in the "raw" YVU9 format and compresses them using either the IRV or the MRV compression technique. Video capture driver 522 controls bit rate throttling and local video monitoring differently for IRV and MRV compression.

Bit rate throttling controls the bit rate of a transmitted video conference data stream. Bit rate throttling is based on the quality of the captured video image and the image capture frame rate. A high-quality image has more fine detail information than a low-quality image. A user of conferencing system 100 is able to vary the relative importance of image quality and frame capture rate with a custom capture driver API.

The data bandwidth capacity of the video conference communication channel is fixed. The amount of captured video data to be transmitted is variable, depending upon the amount of motion that is present in the video image. The capture driver is able to control the amount of data that is captured by changing the quality of the next captured video frame and by not capturing the next video frame (i.e., "dropping" the frame).

The image quality is determined on a frame-by-frame basis using the following equation:

$$\text{Quality} = \frac{(\text{TargetSize} - \text{ActualFrameSize})}{\text{ConstantScaleFactor}}$$

Quality is the relative image quality of the next captured frame. A lower Quality number represents a lower image quality (less image detail). TargetSize is the desired size of a captured and compressed frame. TargetSize is based on a fixed, desired capture frame rate.

Normally, video capture driver 522 captures new video frames at a fixed, periodic rate which is set by the audio/video conference application program. Video capture driver 522 keeps a running total of the available communication channel bandwidth. When video capture driver 522 is ready to capture the next video frame, it first checks the available channel bandwidth and if there is insufficient bandwidth (due to a large, previously captured frame), then video capture driver 522 delays capturing the next video frame until sufficient bandwidth is available. Finally, the size of the captured video frame is subtracted from the available channel bandwidth total.

A user of conferencing system 100 may control the relationship between reduced image quality and dropped frames by setting image quality characteristics. For IRV compression, the user may set a minimum image quality value which controls the range of permitted image qualities, from a wide range down to a narrow range of only the best image qualities. For MRV compression, the user may set image quality using three parameters: motion estimation, spatial filtering, and temporal filtering. The effects of these parameters on image quality are discussed in U.S. patent application Ser. No. 08/235,955 (filed Apr. 28, 1994).

Bit rate throttling is implemented inside of the video capture driver and is controlled by the following VfW extension APIs:

| | |
|---|---|
| CUSTOM_SET_DATA_RATE | Sets the data rate of the communications channel. |
| CUSTOM_SET_FPS | Sets the desired capture frame rate. |
| CUSTOM_SET_QUAL_PERCENT | Sets the minimum image quality value (IRV only). |
| CUSTOM_SET_MOTION_EST | Enables or disables motion estimation (MRV only). |
| CUSTOM_SET_SPATIAL_FILT | Enables or disables spatial filtering (MRV only). |
| CUSTOM_SET_TEMPORAL_FILT | Sets the level of temporal filtering (MRV only). |

The local video monitoring extension to VfW gives the video capture driver 522 the ability to output simultaneously both a compressed and a non-compressed image data stream to the application, while remaining fully compatible with the Microsoft® VfW interface specification. Without this capability, audio/video conferencing application 502 would have to decompress and display the image stream generated by the capture driver in order to provide local video monitoring, which would place an additional burden on the host processor and may decrease the frame update rate of the displayed image.

According to the VfW interface specification, the compressed image data is placed in an output buffer. When local video monitoring is active, an uncompressed copy of the same image frame is appended to the output buffer immediately following the compressed image data. The capture driver generates control information associated with the output buffer. This control information reflects only the compressed image block of the output buffer and does not indicate the presence of the uncompressed image block, making local video monitoring fully compatible with other VfW applications. A reserved, 32-bit data word in the VfW control information block indicates to a local video monitor aware application that there is a valid uncompressed video image block in the output buffer. The application program may then read and directly display the uncompressed video image block from the output buffer.

For the IRV technique, the uncompressed image data may be in either Device Independent Bitmap (DIB) or YUV9 format. For the MRV technique, the YVU9 format is used for the uncompressed image data. DIB format images are a fixed size, whereas YUV9 format images may be increased in size while retaining image quality. For both IRV and MRV techniques, the YUV9 images are converted into DIB format by the video display driver before they are displayed on the computer monitor.

The capture driver allows the uncompressed video image to be captured either normally or mirrored (reversed left to right). In normal mode, the local video monitoring image appears as it is viewed by a video camera—printing appears correctly in the displayed image. In mirrored mode, the local video monitoring image appears as if it were being viewed in a mirror.

The CUSTOM_SET_DIB_CONTROL extension API controls the local video monitoring capabilities of the video capture driver.

Custom APIs for Video Capture Driver

The CUSTOM_SET_FPS message sets the frame rate for a video capture. This message is used while in streaming capture mode.

The CUSTOM_SET_KEY message informs the capture driver to produce one key frame as soon as possible. The capture driver will typically produce one delta frame before the key frame. Once the key frame has been encoded, delta frames will typically follow.

The CUSTOM_SET_DATA_RATE message informs the capture driver to set an output data rate. This data rate value is in KBits per second and typically corresponds to the data rate of the communications channel over which the compressed video data will be transmitted.

The CUSTOM_SET_QUAL_PERCENT message controls the relationship between reducing the image quality and dropping video frames when the IRV compressed video data stream size exceeds the data rate set by the CUSTOM_SET_DATA_RATE message. For example, a CUSTOM_SET_QUAL_PERCENT value of 0 means that the driver should reduce the image quality as much as possible before dropping frames and a value of 100 means that video frames should be dropped before the image quality is lowered. The CUSTOM_SET_QUAL_PERCENT message is used only with IRV compression.

The CUSTOM_SET_DIB_CONTROL messag e controls the uncompressed DIB or YUV9 format image output. With IRV compression, the uncompressed image may be in DIB format at either (80×60) or (160×120) pixel resolution or may be in YVU9 format at (160×120) resolution. With MRV compression, only the (160×120) YVU9 image format is supported. All images are available in either mirrored (reversed left to right) or a normal image. This API controls the following four parameters:

Uncompressed image enable/disable

Mirrored/normal image

The uncompressed image size

Im age data format (DIB or YVU9)

The default condition is for the uncompressed image to be disabled. Once set, these control flags remain in effect until changed by another CUSTOM_SET_DIB_CONTROL message. The uncompressed image data is appended to the video data buffer immediately following the compressed image data. The uncompressed DIB or YUV9 data have the bottom scan-line data first and the top scan-line data last in the buffer.

The CUSTOM_SET_VIDEO message controls the video demodulator CONTRAST, BRIGHTNESS, HUE (TINT), and SATURATION parameters. These video parameters are also set by the capture driver at initialization and via a video control dialog box.

The CUSTOM_SET_MOTION_EST message allows MRV motion estimation to be enabled or disabled to improve image quality. This message is used only with MRV compression.

The CUSTOM_SET_SPATIAL_FILT message allows MRV spatial filtering to be enabled or disabled to improve image quality. This message is used only with MRV compression.

The CUSTOM_SET_TEMPORAL_FILT message allows the MRV temporal filter strength to be altered to Improve image quality. This message is used only with MRV compression.

Video Microcode

The video microcode 530 of FIG. 5 running on video board 204 of FIG. 2 performs video compression. The preferred video compression techniques are disclosed in later sections of this specification starting with the section entitled "Compressed Video Bitstream."

Audio Subsystem

Figure 13:
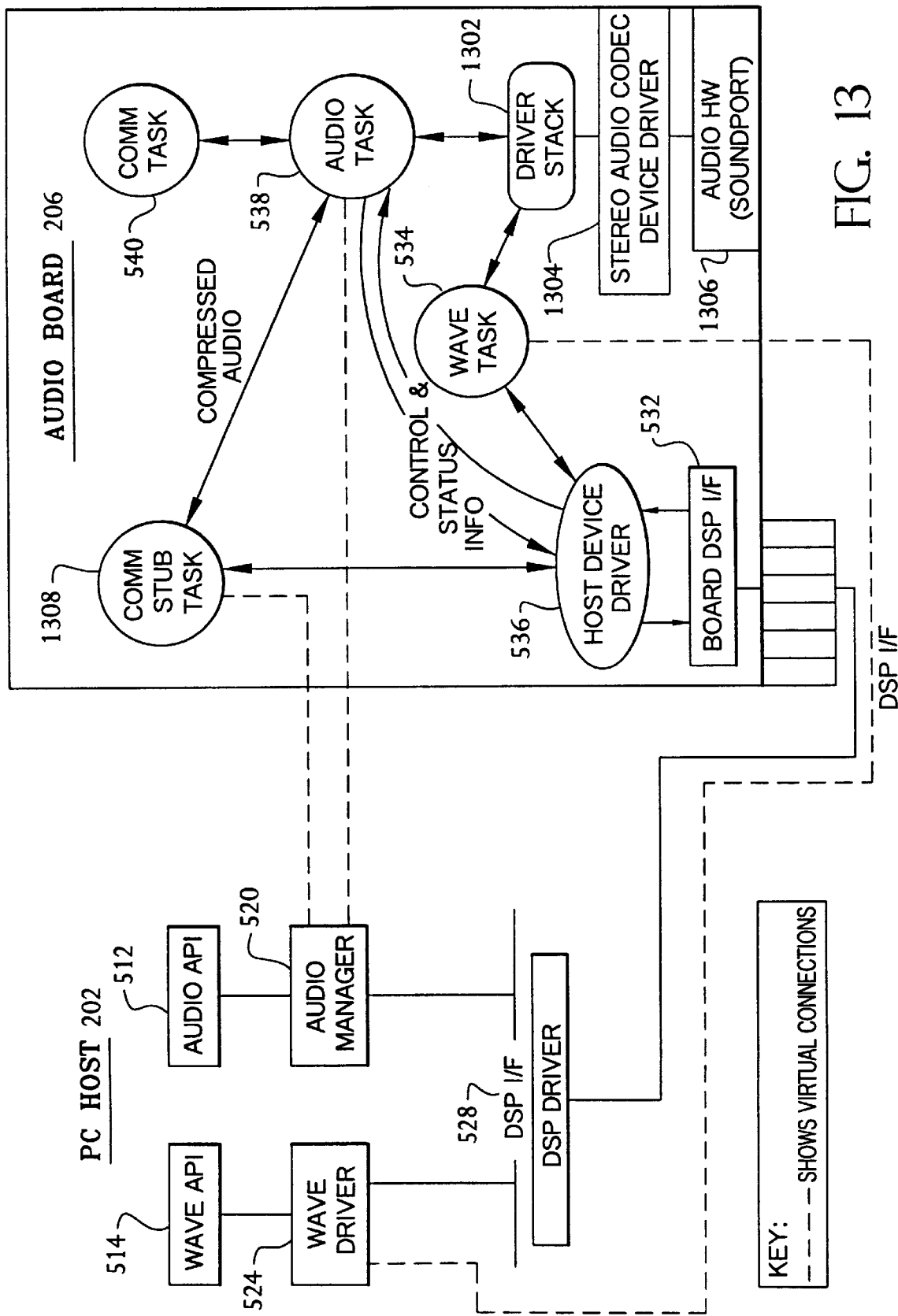
FIG. 13 is a representation of the audio FSM for the local audio stream and the remote audio stream of a conferencing system during a conferencing session.

Referring now to FIG. 13, there is shown a block diagram of the architecture of the audio subsystem. The description for this section is the same as the description for the section of the same name in U.S. patent application Ser. No. 08/157,694. In addition, referring again to FIG. 13, if the network connection is over a LAN, then the audio task 538 on System A sends the packetized, time-stamped audio data to the commstub task 1308, which sends it to the audio manager 520 on the host processor 202. The audio manager 520 passes the data to TII 510 for delivery to the remote system. The audio data from System B is delivered by TII 510 to the audio manager 520 on System A (on the host). The audio manager 520 sends the packet to the commstub task 1308 which passes it on to the audio task 538.

Audio API

Figure 14:
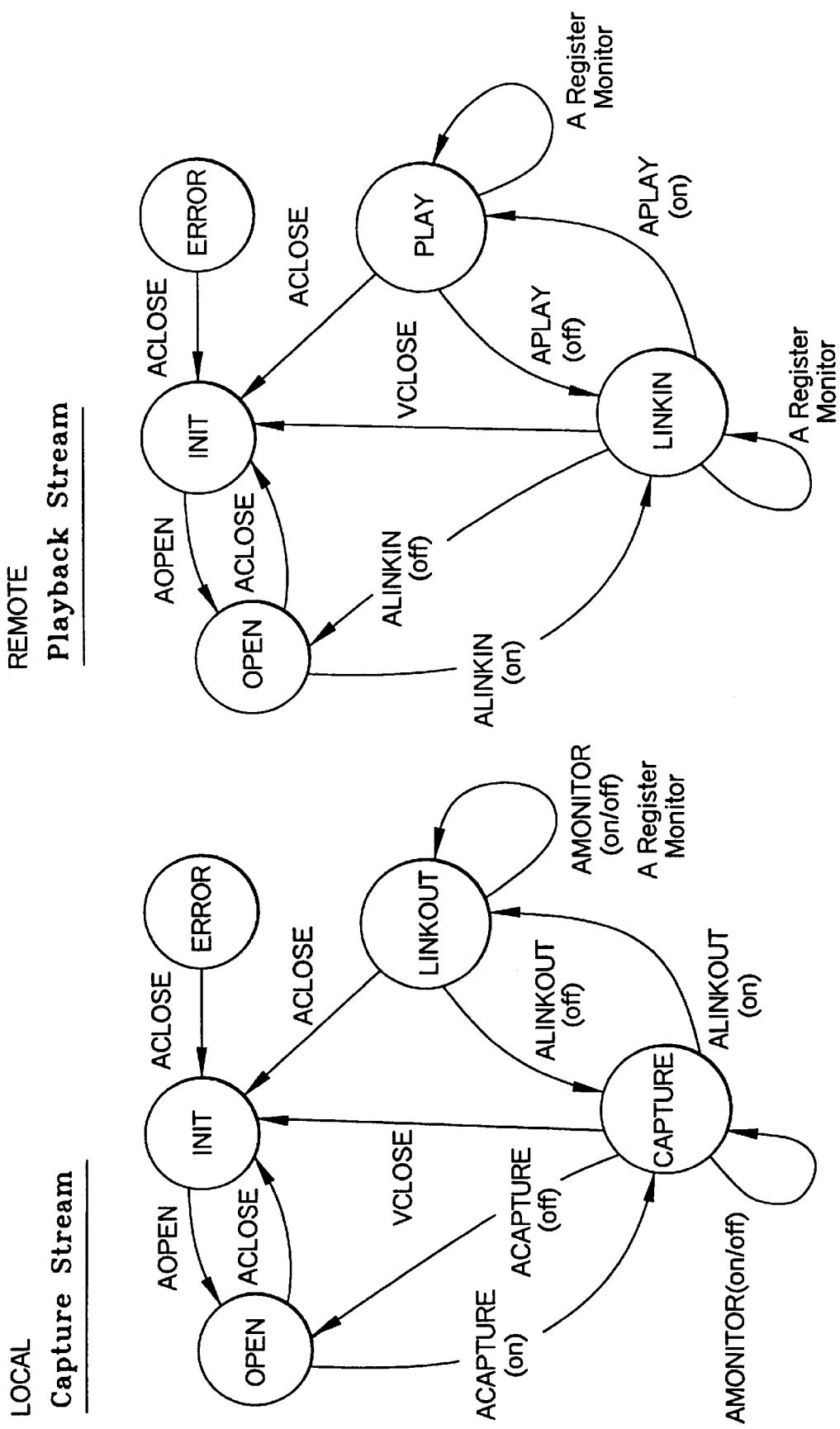
FIG. 14 is a block diagram of the architecture of the audio subsystem of the conferencing system of FIG. 5.

Referring now to FIG. 14, there is shown a representation of the audio FSM for the local audio stream and the remote audio stream of a conferencing system during a conferencing session. The description for this section is the same as the description for the section of the same name in U.S. patent application Ser. No. 08/157,694. Additional information on the audio API is found in APPENDIX D of this specification.

Audio Manager

The description for this section is the same as the description for the section of the same name in U.S. patent application Ser. No. 08/157,694.

Audio Manager Device Driver Interface

The description for this section is the same as the description for the section of the same name in U.S. patent application Ser. No. 08/157,694, except for the following. The expected messages (generated by a Microsoft® OpenDriver SDK call to installable device drivers) and the drivers response are as follows:

| | |
|---|---|
| DRV_LOAD | Reads any configuration parameters associated with the driver. Allocates any memory required for execution. This call is only made the first time the driver is opened. |
| DRV_ENABLE | Ensures that an audio/comm board is installed and functional. For audio/comm board 206 of FIG. 2, this means the DSP interface 532 is accessible. This call is only made the first time the driver is opened. |
| DRV_OPEN | This call is made each time OpenDriver is called. The audio manager can be opened once for input, once for output (i.e., it supports one full duplex conversation), and any number of times for device capabilities query. This call allocates the per application data. This includes information such as the callback and the application instance data and buffers for transferring audio between the host and the audio board for LAN connections. If this is an input or output call, it starts the DSP audio task and sets up communication between host and DSP audio task (e.g. setup mail boxes, register callbacks). If this is the first open of an input or output stream, it starts the commstub task. |

The installable device driver will respond to the close protocol messages defined by Microsoft®. The expected messages (generated by the Microsoft® SDK CloseDriver call to installable device drivers) and the drivers response are as follows:

| | |
|---|---|
| DRV_CLOSE | Frees the per application data allocated in DRV_OPEN message. |
| DRV_DISABLE | Ignored. |
| DRV_FREE | Ignored. |

This call sequence is symmetric with respect to the call sequence generated by OpenDriver. It has the same characteristics and behavior as the open sequence does. Namely, it receives one to three messages from the CloseDriver call dependent on the driver's state and it generates one callback per CloseDriver call. Three messages are received when the driver's final instance is being closed. Only the DRV_CLOSE message is generated for other CloseDriver calls.

DRV_CLOSE message closes the audio thread that corresponds to the audio stream indicated by HASTRM. The response to the close message is in response to a message sent back from the board indicating that the driver has closed. Therefore, this call is asynchronous.

AM_LINKIN Message

The AM_LINKIN message is sent to the driver whenever the audio manager function ALinkin is called. Param1 is a pointer to the following structure:

```
typedef struct _ALinkStruct {
    BOOL    ToLink;
    CHANID  ChanId;
} ALinkStruct, FAR * lpALinkStruct;
```

ToLink contains a BOOL value that indicates whether the stream is being linked in or unlinked (TRUE is linked in and FALSE is unlinked). If no error is detected and ToLink is TRUE, the channel and the playback stream should be linked together. The driver calls TII to determine whether the transport associated with the channel is ISDN. If so, the driver calls TII to determine the ID of the channel on the board associated with the TII channel ID. It then sends the Audio Task the ALINKIN_TMSG message with the board channel ID as a parameter. This causes the Audio Task to link up with the specified comm channel and begin playing incoming audio. If the transport associated with the channel is not ISDN, the driver prepares to receive data from the specified TII channel and send the data to the commstub task. It then sends the Audio Task the ALINKIN_HOST_TMSG. This causes the Audio Task to link up with the commstub task to receive the audio data and play it.

Breaking the link between the audio stream handle and the channel ID is done when the ToLink field is set to FALSE. The audio manager sends the ALINKIN_TMSG to the task along with the channel ID. The Audio Task responds to this message by unlinking the specified channel ID (i.e., it does not play any more audio).

Errors that the host task will detect are as follows:

The channel ID does not represents a valid read stream.

The audio stream handle is already linked or unlinked (detected on host).

The audio stream handle is not a playback handle.

If those or any interface errors (e.g. message pending) are detected the callback associated with this stream is notified immediately. If no errors are detected, the ALINKIN_TMSG or ALINKIN_HOST_TMSG is issued to the DSP interface and the message pending flag is set for this stream. Upon receiving the callback for this message, the callback associated with this stream is made, and finally the message pending flag is unset.

AM_LINKOUT Message

The AM_LINKOUT message is sent to the driver whenever the audio manager function ALinkOut is called. Param1 is a pointer to the following structure:

```
typedef struct _ALinkStruct {
    BOOL     ToLink;
    CHANID   ChanId;
} ALinkStruct, FAR * lpALinkStruct;
```

ToLink contains a BOOL value that indicates whether the stream is being linked out or unlinked (TRUE is linked out and FALSE is unlinked). If no error is detected and ToLink is TRUE, the channel and the audio in stream should be linked together. The driver calls TII to determine whether the transport associated with the channel is ISDN. If so, the driver calls TII to determine the ID of the channel on the board associated with the TII channel ID. It then sends the Audio Task the ALINKOUT_TMSG message with the board channel ID as a parameter. This causes the Audio Task to link up with the specified comm channel and send it captured audio. If the transport associated with the channel is not ISDN, the driver prepares to receive data from the commstub task and send it to the specified TII channel. It then sends the Audio Task the ALINKOUT_HOST_TMSG. This causes the Audio Task to link up with the commstub task to send it captured audio data.

Breaking the link between the audio stream handle and the channel ID is done when ToLink field is set to FALSE. The audio manager will send the ALINKOUT_TMSG to the task along with the channel ID. The Audio Task will respond to this message by unlinking the specified channel ID (i.e. it won't send any more audio).

Errors that the host task will detect are as follows:

The channel ID does not represents a valid write stream.

The audio stream handle is already linked or unlinked (detected on host).

The audio stream handle is not a audio in handle.

If those or any interface errors (e.g., message pending) are detected, the callback associated with this stream is notified immediately. If no errors are detected, the ALINKOUT_TMSG or ALINKOUT_HOST_TMSG is issued to the DSP interface and the message pending flag is set for this stream. Upon receiving the callback for this message, the callback associated with this stream is made, and finally the message pending flag is unset.

Audio Manager Interface with the DSP Interface

The description for this section is the same as the description for the section of the same name in U.S. patent application Ser. No. 08/157,694.

Host Processor to Audio/Comm Board Messages

The description for this section is the same as the description for the section of the same name in U.S. patent application Ser. No. 08/157,694, except for the following:

| | |
|---|---|
| ALINKIN_TMSG: | Connects/disconnects the audio task with a virtual circuit supported by the network task. The local and remote channel IDs (valid on the board) are passed to the audio task in the first two DWORDs of the dwArgs array. The flag specifying whether to link or unlink is passed in the third DWORD. |
| ALINKIN_HOST_TMSG: | Connects/disconnects the audio task with the commstub task to receive audio to the host. The flag specifying whether to link or unlink is passed to the audio task in the third DWORD of the dwArgs array. The first two DWORDS are ignored. |
| ALINKOUT_TMSG: | Connects the audio task with a virtual circuit supported by the network task. The local and remote channel IDs (valid on the board) are passed to the audio task in the first two DWORDs of the dwArgs array. The flag specifying whether to link or unlink is passed in the third DWORD. |
| ALINKOUT_HOST_TMSG: | Connects the audio task with a virtual circuit supported by the network task. The flag specifying whether to link or unlink is passed to the audio task in the third DWORD of the dwArgs array. The first two DWORDS are ignored. |

Audio/Comm Board to Host Processor Messages

The description for this section is the same as the description for the section of the same name in U.S. patent application Ser. No. 08/157,694.

Wave Audio Implementation

The description for this section is the same as the description for the section of the same name in U.S. patent application Ser. No. 08/157,694.

Audio Subsystem Audio/Comm (ISDN) Board-Resident Implementation

The description for this section is the same as the description for the section of the same name in U.S. patent application Ser. No. 08/157,694. In addition, the audio task 538 of FIG. 13 connects with the commstub task 1308. This interface allows the audio task to exchange compressed data packets of audio samples with the host 202, which is responsible for delivering them to the remote system when the network is not ISDN (e.g., LAN). As the name implies, this task is a standin for the comm task. The interface is the same as that between the audio task 538 and the comm task 540.

Audio Task Interface with Host Device Driver

The description for this section is the same as the description for the section of the same name in U.S. patent application Ser. No. 08/157,694.

Audio Task Interface with Audio Hardware

Figure 15:
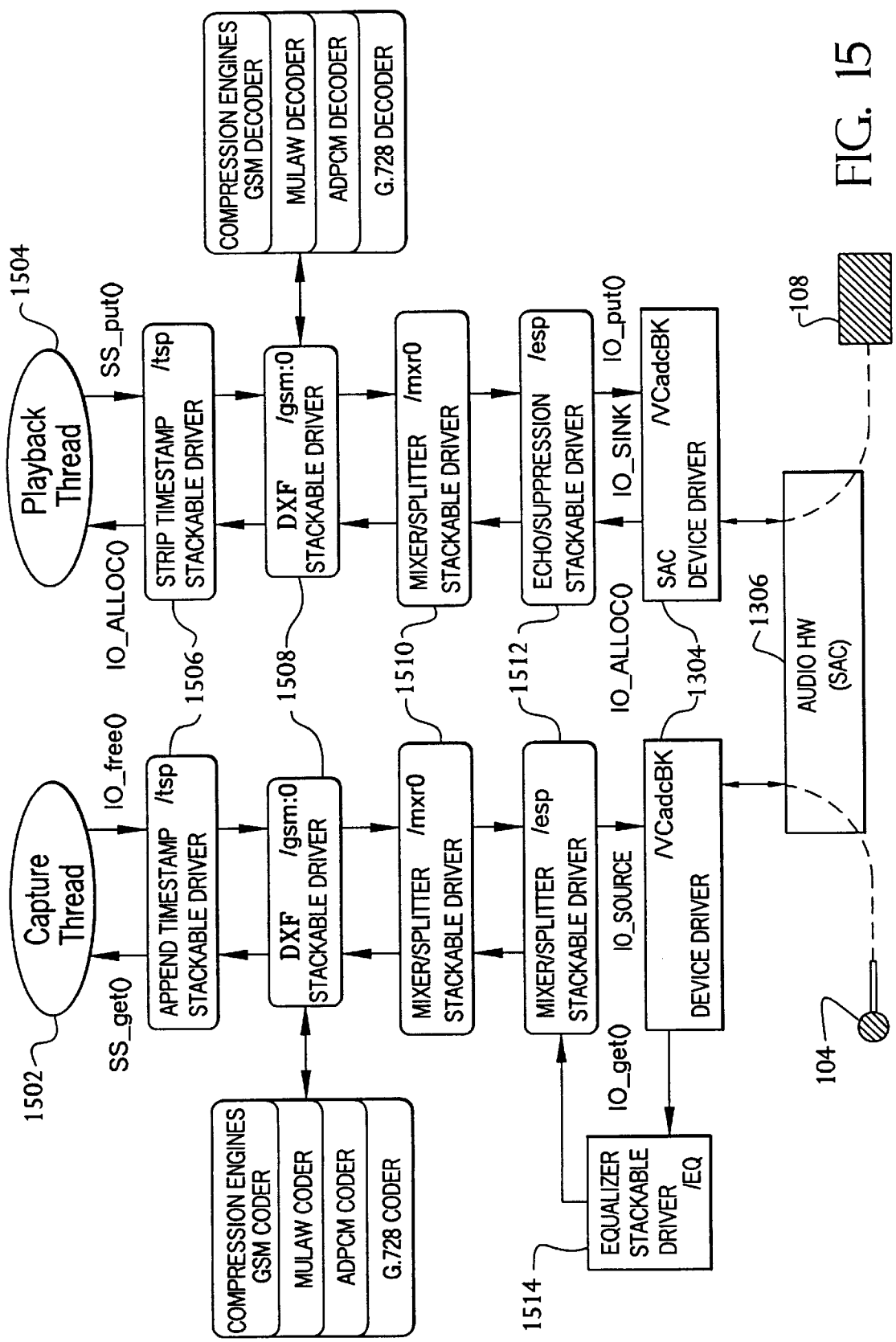
FIG. 15 is a block diagram of the interface between the audio task of FIG. 5 and the audio hardware of audio/comm (ISDN) board of FIG. 2.

Referring now to FIG. 15, there is shown a block diagram of interface between the audio task 538 and the audio hardware of audio/comm (ISDN) board 206 of FIG. 13. The description for this section is the same as the description for the section of the same name in U.S. patent application Ser. No. 08/157,694.

Timestamp Driver

The description for this section is the same as the description for the section of the same name in U.S. patent application Ser. No. 08/157,694.

(De)Compression Drivers

The description for this section is the same as the description for the section of the same name in U.S. patent application Ser. No. 08/157,694.

Mixer/Splitter Driver

The description for this section is the same as the description for the section of the same name in U.S. patent application Ser. No. 08/157,694.

Mixer Internal Operation

The description for this section is the same as the description for the section of the same name it, U.S. patent application Ser. No. 08/157,694.

Echo Suppression Driver

The description for this section is the same as the description for the section of the same name in U.S. patent application Ser. No. 08/340,172 filed Nov. 15, 1994.

Spectral Equalization

In one embodiment of the present invention, the microphone 104 and speaker 108 of a conferencing node of FIG. 1 are part of a single earpiece component, such as an Enterprise™ headset sold by Plantronics. Because the microphone is located away from the mouth and in physical contact with the user's head near the ear, the audio signals may become distorted. These distortions may be due to reverberation signals that reflect off the user's cheek, sounds from the user's mouth that become out of phase at the microphone, and/or the directionality/loss of the higher frequencies. These distortions may combine with artifacts of the audio coder to degrade the quality of the audio portion of a conferencing session.

Digital filtering is applied to the audio signals to attempt to correct for the distortions that result from using a combined microphone/speaker earpiece. When using the Plantronics Enterprise™ microphone, the digital filter is implemented using a cascade of a second-order high-pass Chebyshev Type I Infinite Impulse Response filter and a sixth-order Infinite Impulse Response filter designed using the Steiglitz approximation, which produces a 3 dB bump at 2 kHz to enhance perception.

This digital filtering is implemented as part of the equalizer stackable driver 1514 in the capture side audio processing as shown in FIG. 15. The equalizer driver 1514 can be selectively enabled or disabled. When the user selects a combined earpiece headset, then the equalizer driver 1514 is enabled and each audio frame is digitally filtered before being passed to the next driver on the audio stack (i.e., echo/suppression stackable driver 1512 of FIG. 15). When the user selects another configuration of microphone and speaker (e.g., a speakerphone or a directional boom microphone headset), then the equalizer driver 1514 is disabled and each audio frame is passed on to the echo/suppression driver 1512 without any processing. The equalizer driver 1514 is implemented as a driver under the Spectron Microsystems SPOX™ operating system.

Audio Task Interface with Comm Task

Referring again to FIG. 13, the audio task 538 sends and receives audio packets from either the comm task 540 or the commstub task 1308, depending on whether the network connection is over ISDN or LAN. The interface the audio task uses in the same in either case. Throughout this section, references to comm task 540 also apply to commstub task 1308.

The interface between the audio task to the audio hardware is based on SPOX streams. Unfortunately, SPOX streams connect tasks to source and sink device drivers, not to each other. Audio data are contained within SPOX array objects and associated with streams. To avoid unnecessary buffer copies, array objects are passed back and forth between the comm and audio subsystems running on the audio/comm board using SPOX streams and a pipe driver. The actual pipe driver used will be based on a SPOX driver called NULLDEV. Like Spectron's version, this driver simply redirects buffers it receives as an IO_SINK to the IO_SOURCE stream; no buffer copying is performed. Unlike Spectron's pipe driver, however, NULLDEV does not block the receiving task if no buffers are available from the sending stream and discards buffers received from the IO_SOURCE stream if no task has made the IO_SINK stream connection to the driver. In addition, NULLDEV will not block or return errors to the sender. If no free buffers are available for exchange with the sender's live buffer, NULLDEV returns a previously queued live buffer. This action simulates a dropped packet condition.

Setup and teardown of these pipes will be managed by a message protocol between the comm task and audio task threads utilizing the existing TMB mailbox architecture built into the Mikado DSP interface. The interface assumes that the comm task or commstub task is running, a network connection has been established, and channel ID's (i.e., virtual circuit ID's) have been allocated to the audio subsystem by the conferencing API. The interface requires the comm task and commstub task each to make available to the audio threads the handle to its local mailbox TMB_MYMBOX. This is the mailbox a task uses to receive messages from the host processor. The mailbox handle is copied to a global memory location and retrieved by the threads using the global data package discussed later in this specification. The audio task chooses which mailbox to use, and thus whether to communicate with the comm task or the commstub task, based on which message it receives from the host. ALINKOUT_TMSG and ALINKIN_TMSG cause it to use the comm task mailbox, and ALINKOUT_HOST_TMSG and ALINKIN_HOST_TMSG cause ti to use the commstub task mailbox. In the case of an ISDN connection, the audio task becomes the channel handler for the audio channels. Otherwise, the audio driver on the host becomes the channel handler.

Message Protocol

Figure 16:
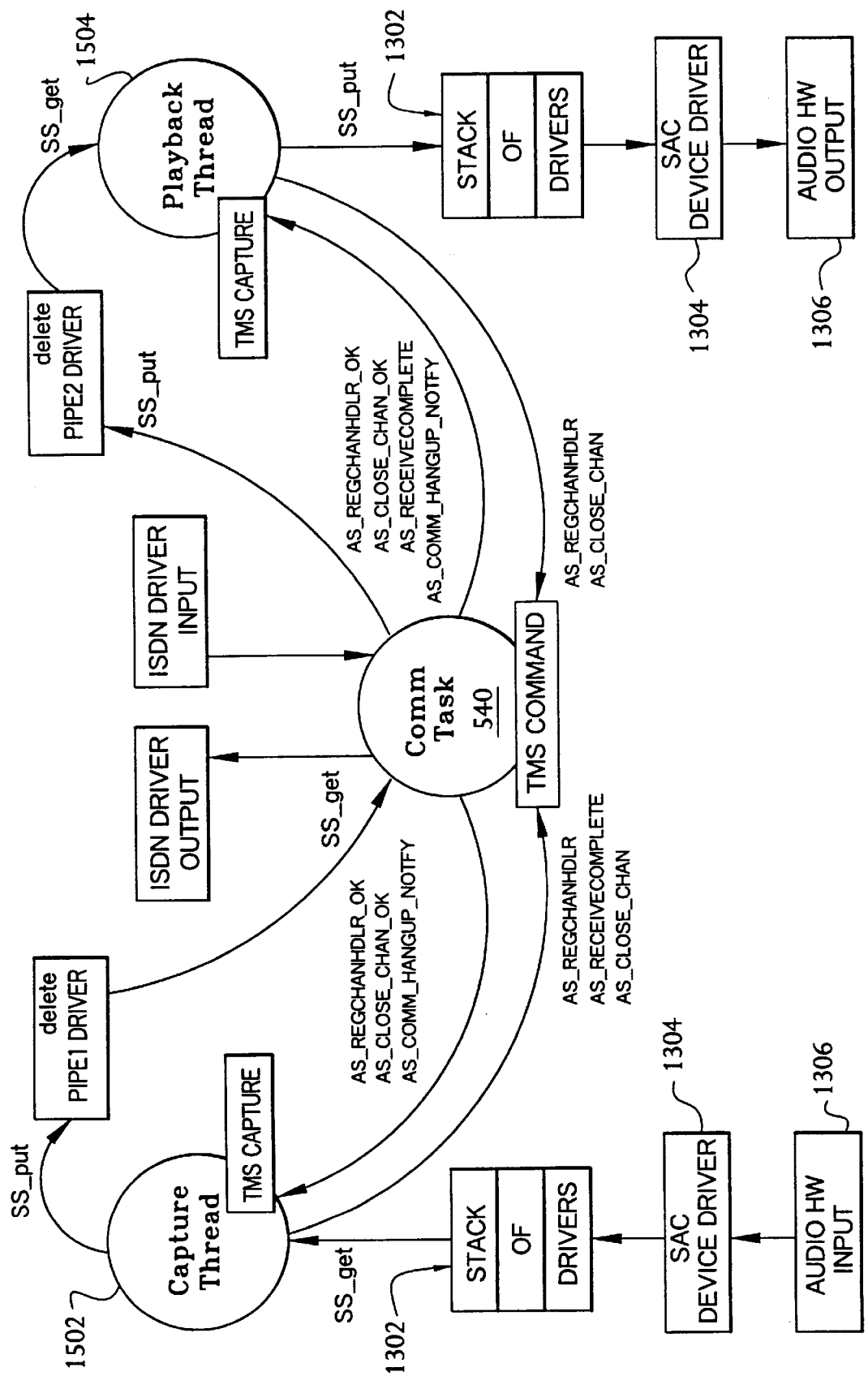
FIG. 16 is a block diagram of the interface between the audio task and the comm task of FIG. 5.

Referring now to FIG. 16, there is shown a block diagram of the interface between the audio task 538 and the comm task 540 of FIGS. 5 and 13. The description for this section is the same as the description for the section of the same name in U.S. patent application Ser. No. 08/157,694, which applies to conferencing over an ISDN connection. In addition, for a LAN connection, the processing is analogous as for the ISDN connection, with the following differences:

The commstub task replaces the comm task.

The ALINKOUT_HOST_TMSG message replaces the ALINKOUT_TMSG message.

The ALINKIN_HOST_TMSG message replaces the ALINKIN_TMSG message.

The commstub task sends buffers to and receives buffers from the host.

Global Data Package

The description for this section is the same as the description for the section of the same name in U.S. patent application Ser. No. 08/157,694.

NULLDEV Driver

The SPOX image for the audio/comm board contains a device driver that supports interprocess communication though the stream (SS) package. The number of distinct streams supported by NULLDEV is controlled by a defined constant NBRNULLDEVS in NULLDEV.H. NULLDEV supports three streams. One is used for the audio task capture thread to communicate with the comm task for ISDN connection. Another is used by the playback thread to communicate with the comm task. The third is for the audio capture task to communicate with the commstub task for LAN connection. The assignment of device names to tasks is done by the following three constants in ASTASK.H:

```
#define AS_CAPTURE_PIPE        "/null"
#define AS_PLAYBACK_PIPE       "/null2"
#define AS_HOST_CAPTURE_PIPE   "/null3"
```

Support for additional streams may be obtained by changing the NBRNULLDEVS constant and recompiling NULLDVR.C. The SPOX config file is also adjusted by adding additional device name strings to this section as follows:

```
driver NULLDEV_driver {
    "/null":   devid = 0;
    "/null2":  devid = 1;
    "/null3":  devid = 2;
};
```

The next device in the sequence has devid=3.

SS_get() calls to NULLDEV receive an error if NULLDEV's ready queue is empty. It is possible to SS_put() to a NULLDEV stream that has not been opened for SS_get() on the other end. Data written to the stream in this case is discarded. In other words, input live buffers are simply appended to the free queue. SS_put() never returns an error to the caller. If no buffers exist on the free queue for exchange with the incoming live buffer, NULLDEV removes the buffer at the head of the ready queue and returns it as the free buffer.

PWave Subsystem

The PWave subsystem provides high-priority playback of digital audio signals contained in Microsoft® standard Wave files.

PWave API

The description for this section is the same as the description for the section of the same name in U.S. patent application Ser. No. 08/340,172 filed Nov. 15, 1994.

High Priority Playback Task

The description for this section is the same as the description for the section of the same name in U.S. patent application Ser. No. 08/340,172 filed Nov. 15, 1994.

PWave Protocol

The description for this section is the same as the description for the section of the same name in U.S. patent application Ser. No. 08/340,172 filed Nov. 15, 1994.

Comm Subsystem

The communications (comm) subsystem of conferencing system 100 of FIG. 5 comprises:

Comm API 510, comm manager 518, DSP interface 528, and portions of the network stacks 560 running on host processor 202 of FIG. 2, Portions of the network stacks 560 running on LAN board 210, and Comm task 540 running on audio/comm (ISDN) board 206.

The comm subsystem provides connectivity functions to the conferencing application programs 502 and 504. It maintains and manages the session, connection, and the virtual channel states. All the connection control, as well as data communication are done through the communication subsystem.

Figure 17:
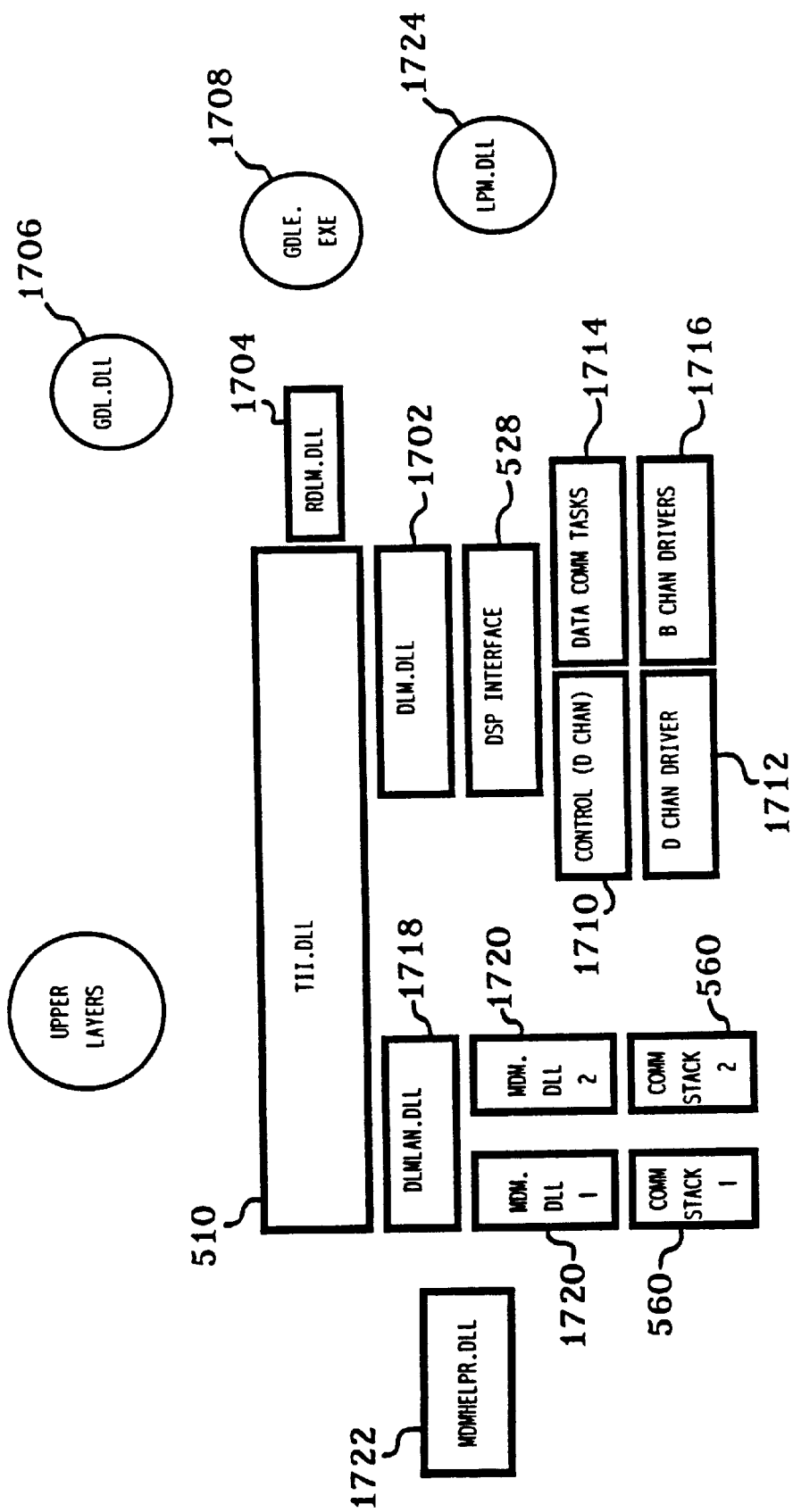
FIG. 17 is a block diagram of the comm subsystem of the conferencing system of FIG. 5.

Referring now to FIG. 17, there is shown a block diagram of the comm subsystem of conferencing system 100 of FIG. 5. The comm subsystem consists of the following layers that reside on host processor 202, the audio/comm (ISDN) board 206, and LAN board 210:

Transport independent interface 510 (TII.DLL),

Datalink module 1702 (DLM.DLL+KPDAPI.DLL, where KPDAPI.DLL is the backend of the DLM which communicates with the DSP interface 528), Reliable datalink module 1704 (RDLM.DLL), Global dynamic loader 1706 (GDL.DLL), Global dynamic loader executable 1708 (GDLE.EXE), Control (D channel) 1710, D channel driver 1712, Data comm tasks 1714, B channel drivers 1716, LAN datalink module 1718 (DLMLAN.DLL), The appropriate LAN media dependent modules 1720 (MDM.DLLs), The appropriate comm stacks 560, and The MDM helper task 1722 (MDMHELPR.DLL).

TII 510, DLM 1702, DSP interface 528, RDLM 1704, DLMLAN 1718, the MDMs 1720, portions of the comm stacks 560, MDMHELPR 1722, GDL 1706, and GDLE.EXE 1708 reside entirely on the host processor. Control (D channel) 1710, D channel driver 1712, data comm tasks 1714, and B channel drivers 1716 reside on audio/comm (ISDN) board 206. Portions of the comm stacks 560 reside on the LAN board 210.

The comm interface provides a "transport independent interface" for the conferencing applications. This means that the comm interface hides all the network dependent features of the conferencing system. For ISDN connections, conferencing system 100 uses the ISDN Basic Rate Interface (BRI) which provides 2*64 KBits/sec data (B) channels and one signaling (D) channel (2B+D). Conferencing system 100 also uses conventional LAN connections.

The comm subsystem provides an interface by which the conferencing applications can gain access to the communication hardware. The goal of the interface is to hide the implementation of the connectivity mechanism and provide an easy to use interface. This interface provides a very simple (yet functional) set of connection control features, as well as data communication features. The conferencing applications use virtual channels for data communication. Virtual channels are simplex, which means that two virtual channels are open for full duplex communication between peers. Each conferencing application opens its outgoing channel which is write-only. The incoming (read-only) channels are created by "accepting" an "open channel" request from the peer.

ISDN-Based Conferencing

Figure 18:
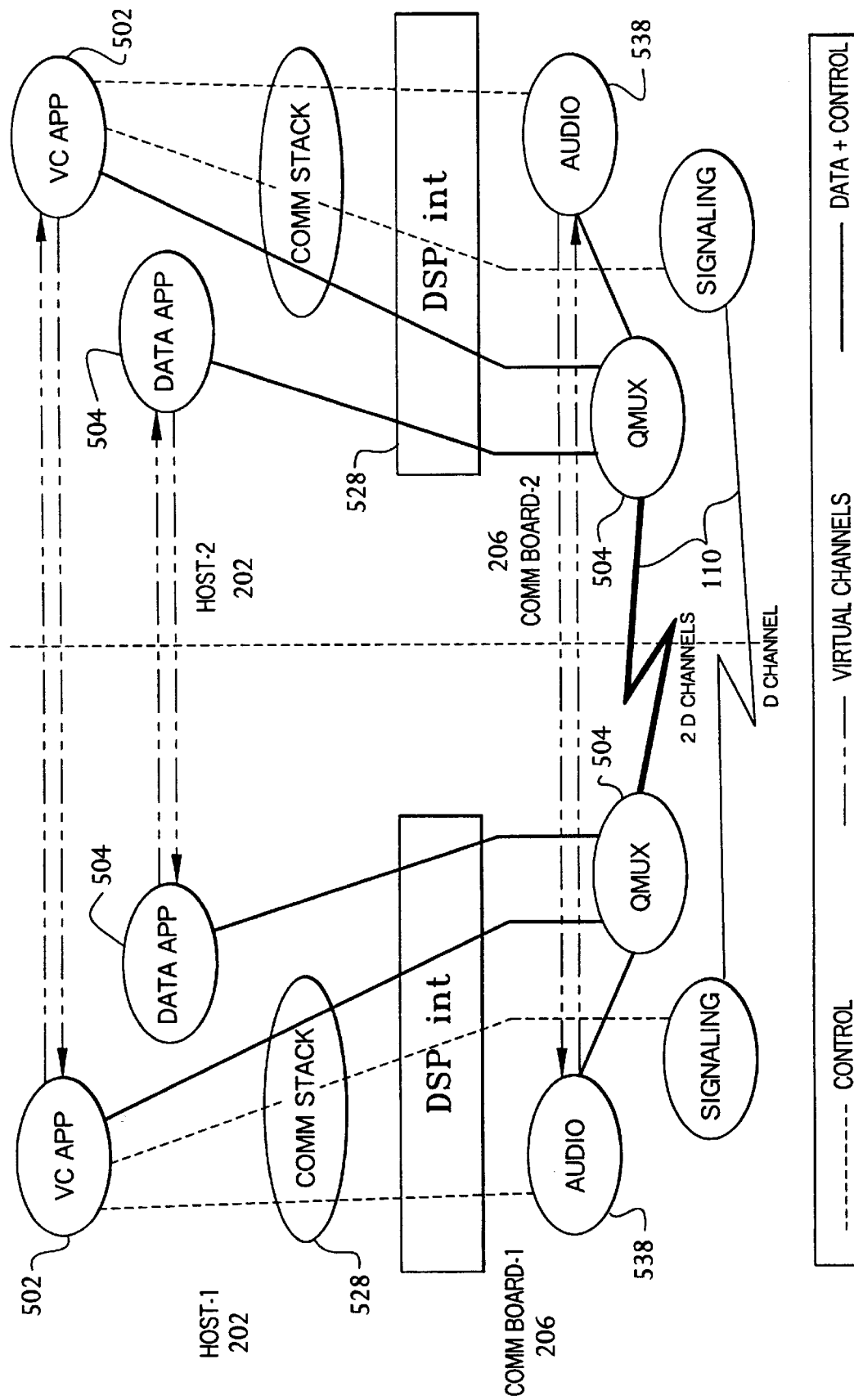
FIG. 18 is a block diagram of the comm subsystem architecture for two conferencing systems of FIG. 5 participating in a conferencing session over an ISDN connection.

Referring now to FIG. 18, there is shown a block diagram of the comm subsystem architecture for two conferencing systems 100 participating in a conferencing session over an ISDN connection. The comm subsystem provides an asynchronous interface between the audio/comm (ISDN) board 206 and the conferencing applications 502 and 504.

The comm subsystem provides all the software modules that manage the two ISDN B channels. The comm subsystem provides a multiple virtual channel interface for the B channels. Each virtual channel is associated with transmission priority. The data queued for the higher priority channels are transmitted before the data in the lower priority queues. The virtual channels are unidirectional. The conferencing applications open write-only channels. The conferencing applications acquire read-only channels as a result of accepting a open channel request from the peer. The DLM supports the virtual channel interface.

During an ISDN-based conferencing session, the comm subsystem software handles all the multiplexing and inverse multiplexing of virtual channels over the B channels. The number of available B channels (and the fact that there is more than one physical channel available) is not a concern to the application.

The comm subsystem provides the D channel signaling software to the audio/comm (ISDN) board. The comm subsystem is responsible for providing the ISDN B channel device drivers for the audio/comm (ISDN) board. The comm subsystem provides the ISDN D channel device drivers for the audio/comm (ISDN) board. The comm software is certifiable in North America (U.S.A., Canada) and Europe. The signaling software is compatible with NI1, AT&T Custom, and Northern Telecom DMS-100.

LAN-Based Conferencing

For LAN-based conferencing, the comm subsystem provides an asynchronous interface between the LAN board 210 and the conferencing applications 502 and 504. The comm subsystem provides all the software modules that manage the LAN communication network 110. The comm subsystem provides a multiple virtual channel interface for the LAN interconnecton between the conferencing machines. Each virtual channel is associated with a transmission priority. The data queued for the higher priority channels are transmitted before the data in the lower priority queues. The virtual channelsl are unidirectional. The conferencing applications open write-only channels. The conferencing applications acquire read-only channels as a result of accepting an open channel request from the peer. The DLMLAN modules supports the virtual channel interface.

During a LAN-based conferencing session, the comm subsystem handles all the multiplexing and inverse multiplexing of virtual channels over the typically singular LAN interconnection. The number of network 'sockets' or connection points is not a concern to the application.

When the video conferencing connection is across the LAN, comm stack 506 receives the compress audio generated by the remote site and stores it to host memory. The appropriate LAN MDM 1720 of FIG. 17 and DLMLAN 1718 then reconstructs the compressed audio stream as the sequence of packets supplied by the audio manager on the remote site to that site's LAN comm subsystem. The comm manager 518 then passes the audio packets to the audio manager 520, which sends the packets to the audio task on audio/comm (ISDN) board 206 for playback.

qMUX MULTIPLE CHANNEL STREAMING MODULE

The description for this section is the same as the description for the section of the same name in U.S. patent application Ser. No. 08/157,694. In addition, for LAN-based conferencing, the LAN implementation of the DLM interface (DLMLAN) 1718 provides the same functionality on the LAN that DLM 1702 does for ISDN-based conferencing, i.e., virtual channels and transport independent message sizes. The DLMLAN implementation is supported on another abstraction layer, the media dependent modules (MDMs) 1720. The MDMs have a common MDM API and they implement the required functionality on top of an existing LAN protocol stack (e.g., IPX, TCP/IP) A single MDM helper task (MDMHELPR) 1722 assists the MDMs by generating threads of execution for callbacks and data transmission.

Comm API

The description for this section is the same as the description for the section of the same name in U.S. patent application Ser. No. 08/157,694. In addition, sessions and connections have associated addresses, represented by the TADDR structure. A TADDR consists of a transport type and up to 80 bytes of addressing information. The transport type specifies if this is an ISDN or LAN address. Referring again to FIG. 17, TII 510 determines which DLM will be servicing a given address by passing it to the Global Dynamic Loader (GDL) module 1706. GDL 1706 and its associated helper task GDLE 1708 load the appropriate module into memory and return all of the DLM entry points to TII 510. If this is a LAN address, the DLMLAN 1718 will then consult GDL 1706 in order to load the appropriate MDM 1720. DLMLAN 1718 receives back from GDL 1706 a list of the appropriate MDM entry points. GDL 1706 and GDLE 1708 determine the appropriate DLM and MDM to load by reading the file GDL.INI which is written when the product is installed. This file specifies the MDMs that are appropriate based on the configuration of the user's machine. Further description of the operations of global dynamic loaders and global dynamic loader executables is presented in U.S. patent application Ser. No. 08/133,612. Additional information on the comm API is found in APPENDIX E of this specification.

Automatic Transport Detection

Conferencing system 100 of FIG. 1 is capable of supporting conferencing over different types of transports (e.g., ISDN and LAN). Moreover, conferencing system 100 is capable of supporting LAN-based conferencing under different LAN transport standards (e.g., Novell IPX, Internet User Datagram Protocol (UDP), and/or NetBIOS standards). Further still, conferencing system 100 is capable of supporting LAN-based conferencing with different LAN products for a single LAN transport standard (e.g., LAN WorkPlace (LWPUDP) by Novell and FTPUDP by FTP Software, Inc., both of which conform to the LAN UDP standard).

In order for a particular conferencing system 100 to be able to exercise the full range of its conferencing options, it knows which of the supported transports are installed. Conferencing system 100 is able to determine automatically which supported transports are installed. This automatic transport detection may be implemented at install time (i.e., when conferencing system 100 is installed in a PC node) and/or at run time (i.e., when conferencing system 100 is ready to begin conferencing).

Although different LAN products that conform to the same transport standard will generate data with the same packet format, they may have different APIs for generating and interpreting those packets. Thus, automatic transport detection determines which transport products are installed as well as which transport types and standards are supported. Each different supported transport will typically have a corresponding media dependent module (MDM). A goal of automatic transport detection is to identify (and store in the GDL.INI file) the specific MDMs to be used to communicate with the specific network transport stacks that are supported and installed in conferencing system 100.

Install-Time Processing

Conferencing systems 100 may be configured to support conferencing over different sets of transports. For example, a particular conferencing system 100 may support conferencing over ISDN, Novell IPX, and UDP, but not NetBIOS. The supported transports are presented to the conferencing application 502 of conferencing system 100 as a list of numbers corresponding to the supported transports. Possible supported transports are identified as follows:

ISDN: 0
NetBIOS: 1
Novell IPX: 7
UDP: 8

For the conferencing system 100 in the example, a list of supported transports is (0, 7, 8).

Figure 42:
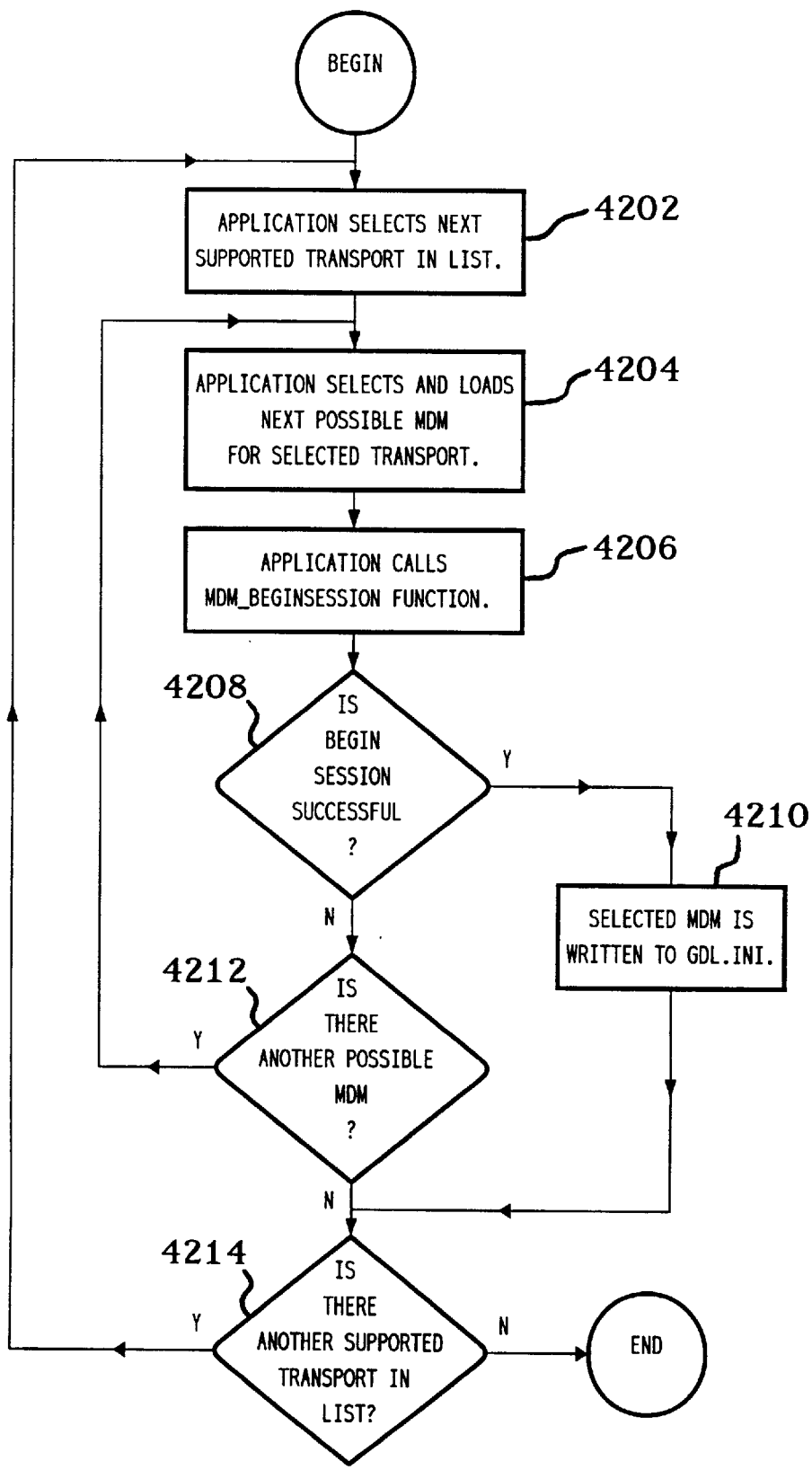
FIG. 42 is a flow diagram of the processing by the conferencing system of FIGS. 5 and 17 during the automatic transport detection implemented at install time.

Referring now to FIG. 42, there is shown a flow diagram of the processing by conferencing system 100 of FIGS. 5 and 17 during the automatic transport detection implemented at install time. The conferencing application selects the next (in this case, first) supported transport in the list of supported transports for that particular conferencing system 100 (step 4202 of FIG. 42).

Conferencing system 100 should have one or more possible corresponding MDMs for each supported transport, where there may be more than one MDM when there is more than one product for particular transport type/standard. The conferencing application selects and loads the next (in this case, first) possible MDM for the currently selected transport (step 4204). The conferencing application calls the MDM__BeginSession function to attempt to initialize the network transport stack (step 4206). A session may be defined as the use by an application of a specific transport to send and/or receive data packets on a particular network address. The conferencing application calls the MDM__BeginSession function to request that a session be initiated by the local network stack.

If the attempt to begin a session is successful (step 4208), then the currently selected MDM is the MDM that corresponds to the network transport stack (for the currently selected transport) that is actually configured in conferencing system 100. In that case, the identity of the currently selected MDM is written to the GDL.INI file for the currently selected transport (step 4210). Processing then continues to step 4214.

If, however, the attempt to begin the session is unsuccessful (step 4208), then the currently selected MDM is not the correct MDM for the configured network transport stack. In that case, the conferencing application determines whether there are any other possible MDMs for the currently selected transport (step 4212). If so, then processing returns to step 4204 to select and load the next possible MDM and attempt to begin a session using it. If there are no more possible MDMs for the currently selected transport, then the conferencing application determines whether there are any more transports in the list of supported transports (step 4214). If so, then processing returns to step 4202 to repeat the processing for the next supported transport. Otherwise, install-time automatic transport detection is complete.

A result of automatic transport detection is a GDL.INI file that has, for each configured transport, the correct MDM to service that transport. The GDL.INI file is used by the conferencing application at run time to select the MDM to load and use for conferencing over a particular transport.

Run-Time Processing

Automatic transport detection is implemented at run time to determine which transports can be used for an impending conferencing session. Inputs to run-time automatic transport detection are the list of supported transports and the GDL.INI file that was generated by running automatic transport detection at install time. For each supported transport and using the corresponding MDM identified in the GDL.INI file, the conferencing application attempts to begin a session. If the attempt to begin the session is successful, then the conferencing application knows it can use that transport for the conferencing session.

Figure 43:
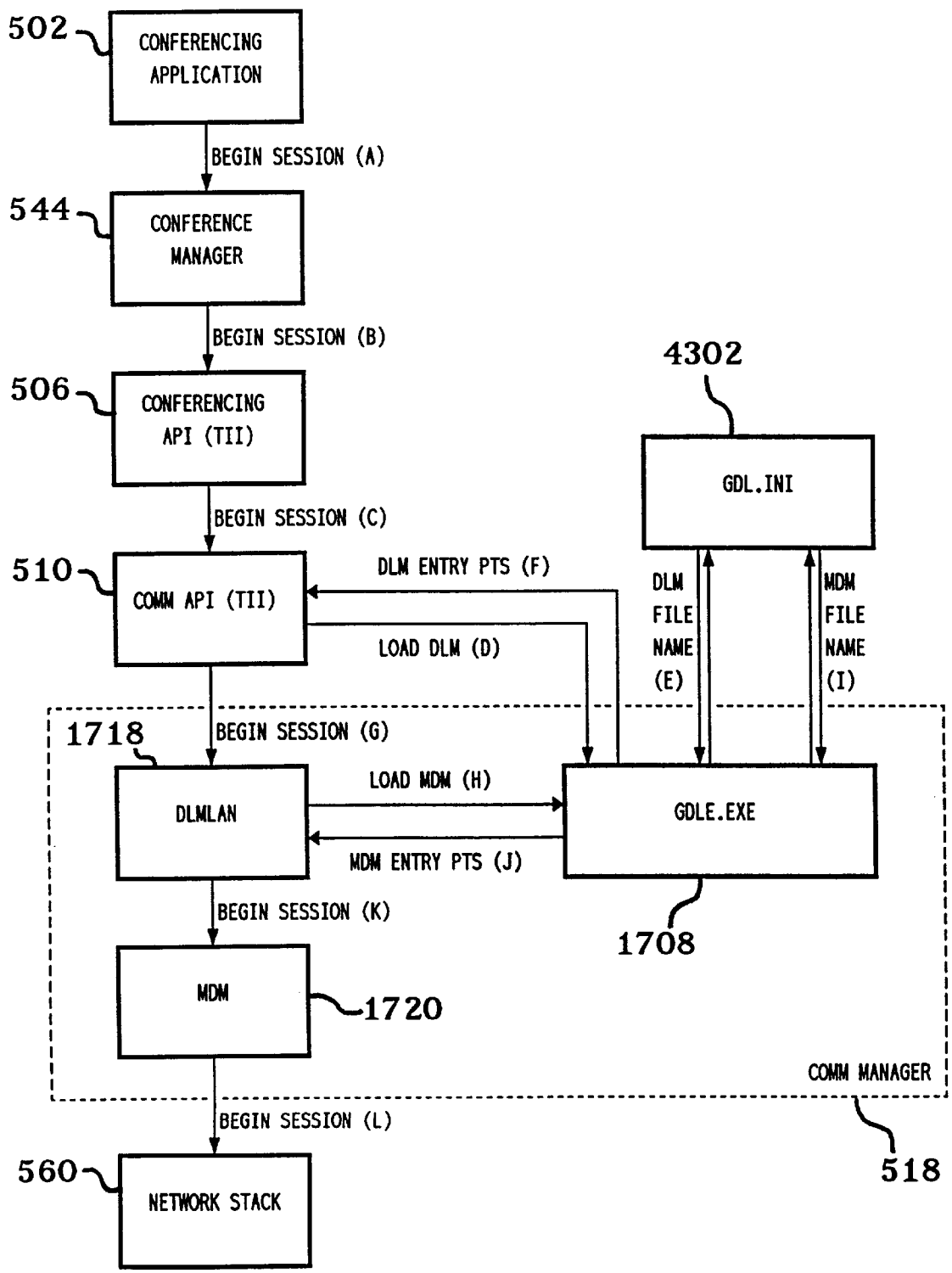
FIG. 43 is a block diagram showing the network connections made by the conferencing system of FIGS. 5 and 17 during the automatic transport detection implemented at run time.

Referring now to FIG. 43, there is shown a block diagram showing the network connections made by conferencing system 100 of FIGS. 5 and 17 during the automatic transport detection implemented at run time. The sequence shown in FIG. 43 may be enumerated as follows:

(A) Conferencing application 502 calls conferencing manager 544 to begin a session using a specified transport.

(B) Conferencing manager 544 passes begin session request to conferencing API 506.

(C) Conferencing API 506 passes begin session request to comm API 510.

(D) Comm API 510 calls GDLE.EXE 1708 to load the LAN data link manager (DLMLAN) 1718 corresponding to the specified transport.

(E) GDLE.EXE 1708 accesses the GDL.INI file 4302 to determine the file name for the DLMLAN 1718 that services the specified transport.

(F) GDLE.EXE 1708 loads the appropriate DLMLAN 1718 into memory and sends the corresponding entry points into DLMLAN 1718 back to comm API 510.

(G) Comm API 510 calls DLMLAN 1718 to begin a session.

(H) DLMLAN 1718 calls GDLE.EXE 1708 to load the media dependent module (MDM) corresponding to the specified transport.

(I) GDLE.EXE 1708 accesses the GDL.INI file 4302 to determine the file name for the MDM that services the specified transport.

(J) GDLE.EXE 1708 loads the appropriate MDM 1720 into memory and sends the corresponding entry points into MDM 1720 back to DLMLAN 1718.

(K) DLMLAN 1718 calls MDM 1720 to begin a session.

(L) MDM 1720 tries to communicate with the network stack for which it is designed to begin a session.

If the MDM's attempt to communicate with the network stack is successful, then that success is communicated from MDM 1720 to DLMLAN 1718 to comm API 510 to conferencing API 506 to conference manager 544 to the conferencing application 502. The conferencing application 502 then knows that it can use that transport for the impending conferencing session. Similarly, if the MDM's attempt to communicate with the network stack does not succeed, then that failure is communicated through the various levels to the conferencing application 502, which then knows that the conferencing session cannot proceed over that transport. In this latter case, as the MDM's attempt to begin the session fails, DLMLAN 1718 calls GDLE.EXE 1708 to unload MDM 1720, and, as the DLMLAN's attempt to begin the session fails, comm API 510 calls GDLE.EXE 1708 to unload DLMLAN 1718.

The scenario presented in FIG. 43 is repeated for each of the supported transports in the conferencing application's list of supported transports to determine all of the transports that are currently available for the conferencing session. When presenting the user with a list of possible callee addresses for the conferencing session (as part of a dialog box), the conferencing application 502 only lists addresses that correspond to transports that the conferencing application 502 has determined are available.

Transport-Independent Interface

The description for this section is the same as the description for the section of the same name in U.S. patent application Ser. No. 08/340,172 filed Nov. 15, 1994. These functions are defined in further detail later in this specification in Appendix E.

Message and Callback Parameters

The description for this section is the same as the description for the section of the same name in U.S. patent application Ser. No. 08/157,694.

Session Handler Messages

The description for this section is the same as the description for the section of the same name in U.S. patent application Ser. No. 08/340,172 filed Nov. 15, 1994.

Channel Manager Messages

The description for this section is the same as the description for the section of the same name in U.S. patent application Ser. No. 08/157,694.

Channel Handler Messages

The description for this section is the same as the description for the section of the same name in U.S. patent application Ser. No. 08/157,694.

iTone

The description for this section is the same as the description for the section of the same name in U.S. patent application Ser. No. 08/340,172 filed Nov. 15, 1994. Further description of the iTone string and its use may be found in U.S. patent application Ser. No. 08/305,206, filed Sep. 13, 1994.

Data Structures

Figure 19:
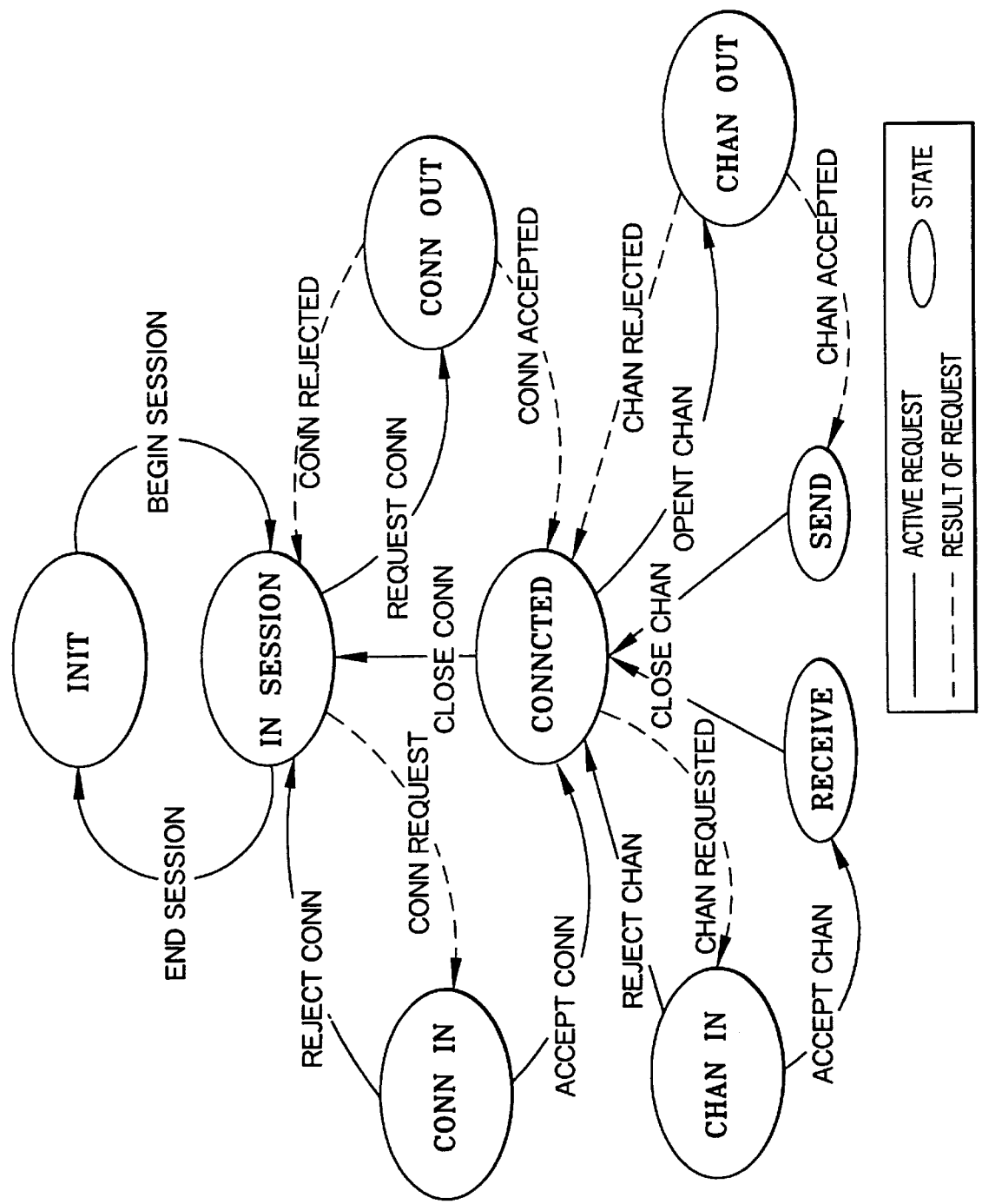
FIG. 19 is a representation of the comm subsystem application FSM for a conferencing session between a local site and a remote site.
Figure 20:
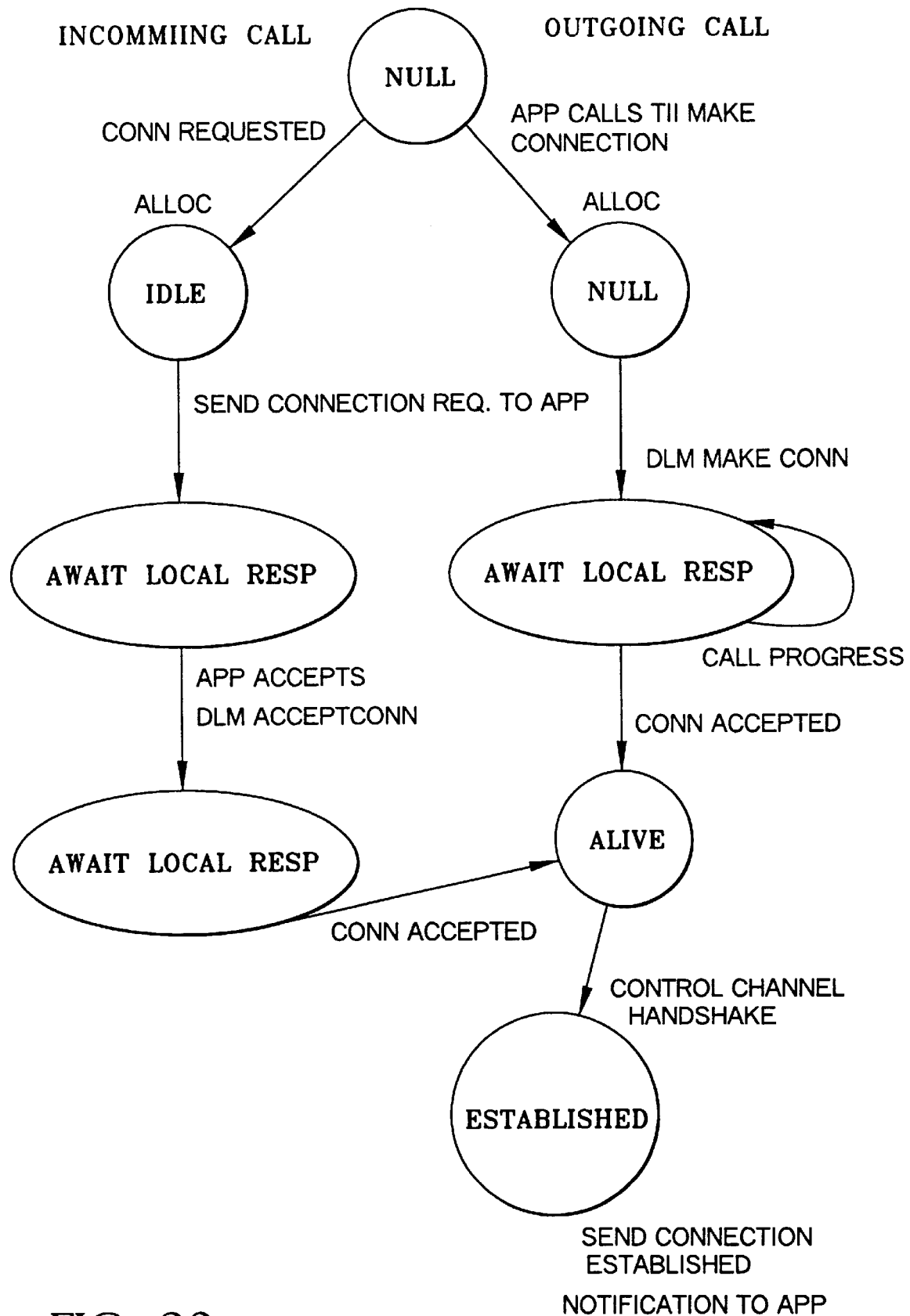
FIG. 20 is a representation of the comm subsystem connection FSM for a conferencing session between a local site and a remote site.
Figure 21:
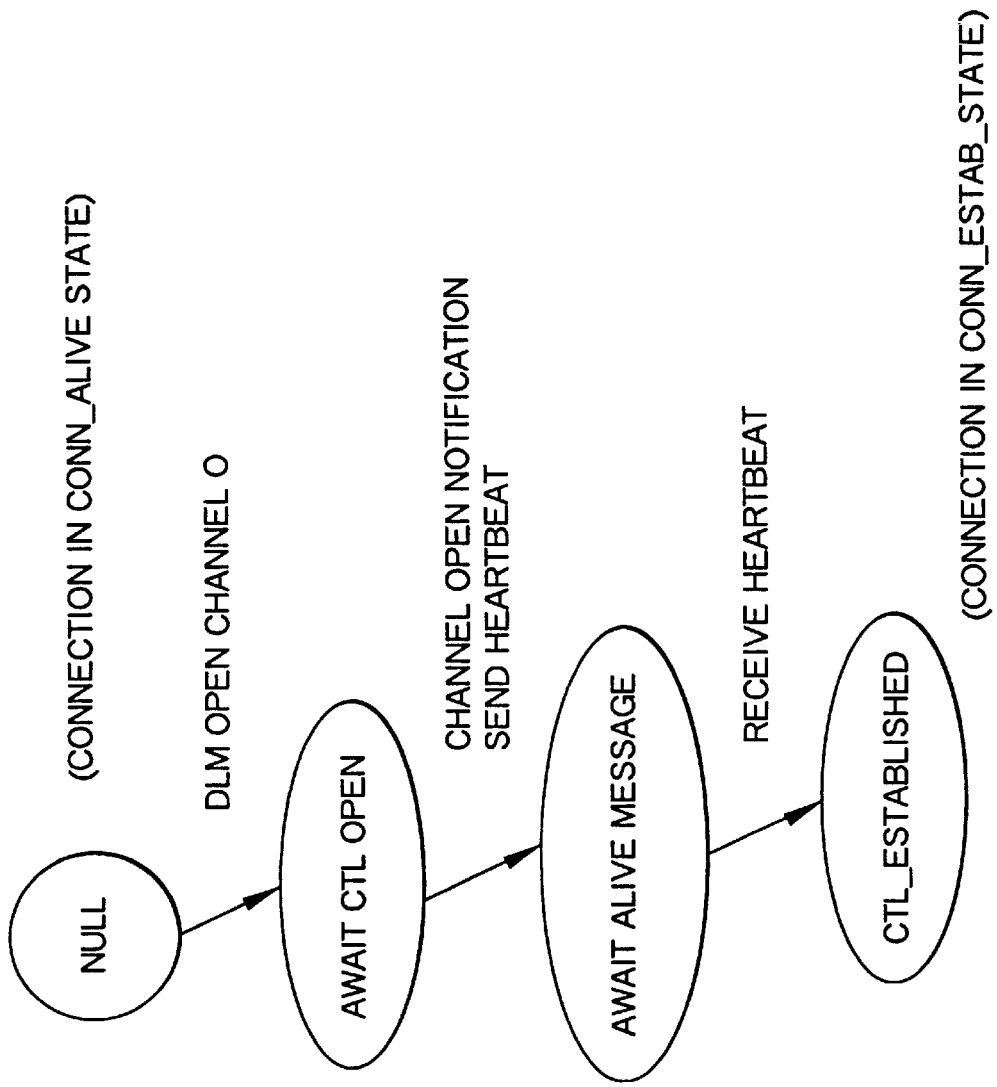
FIG. 21 is a representation of the comm subsystem control channel handshake FSM for a conferencing session between a local site and a remote site.
Figure 22:
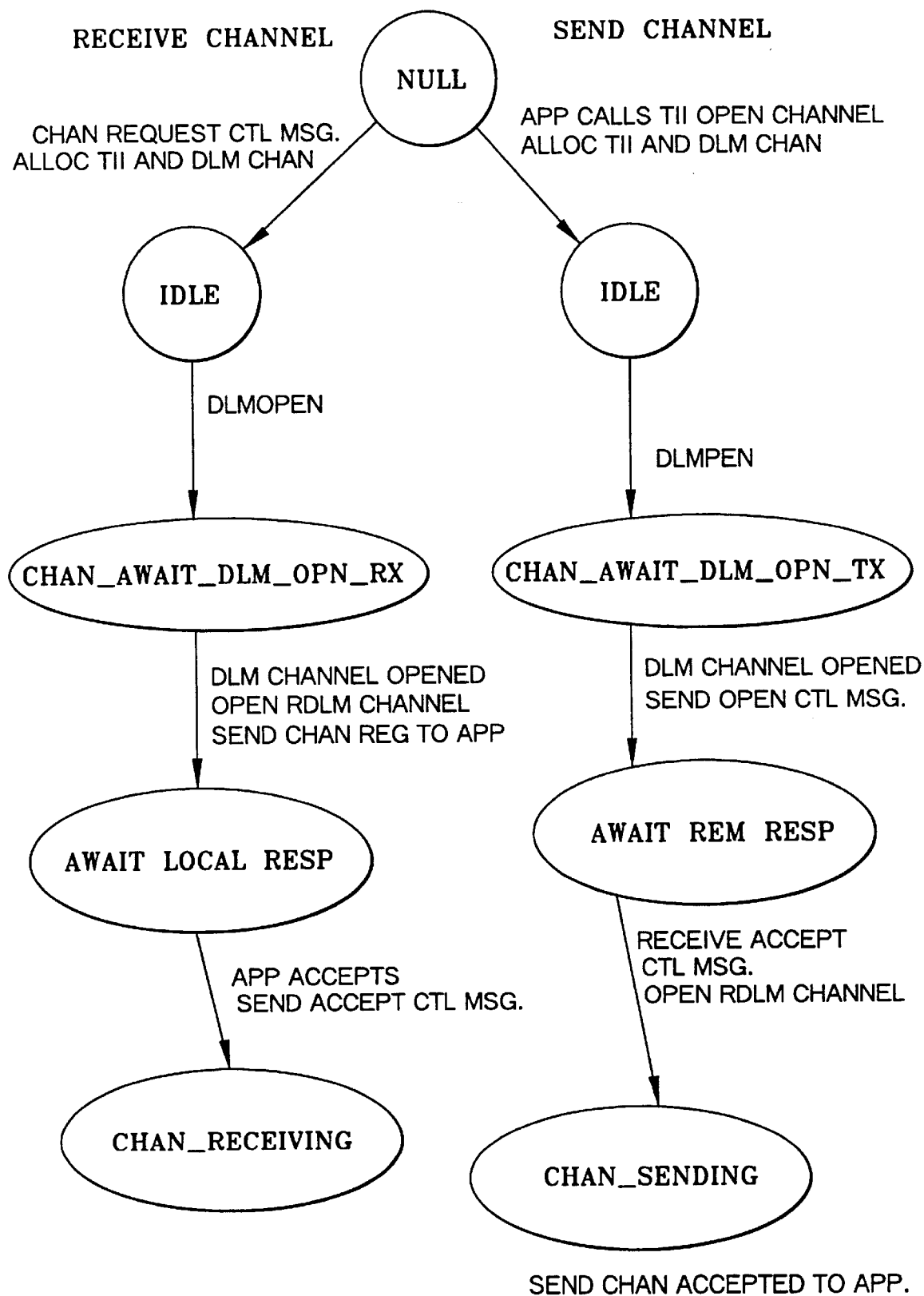
FIG. 22 is a representation of the comm subsystem channel establishment FSM for a conferencing session between a local site and a remote site.
Figure 23:
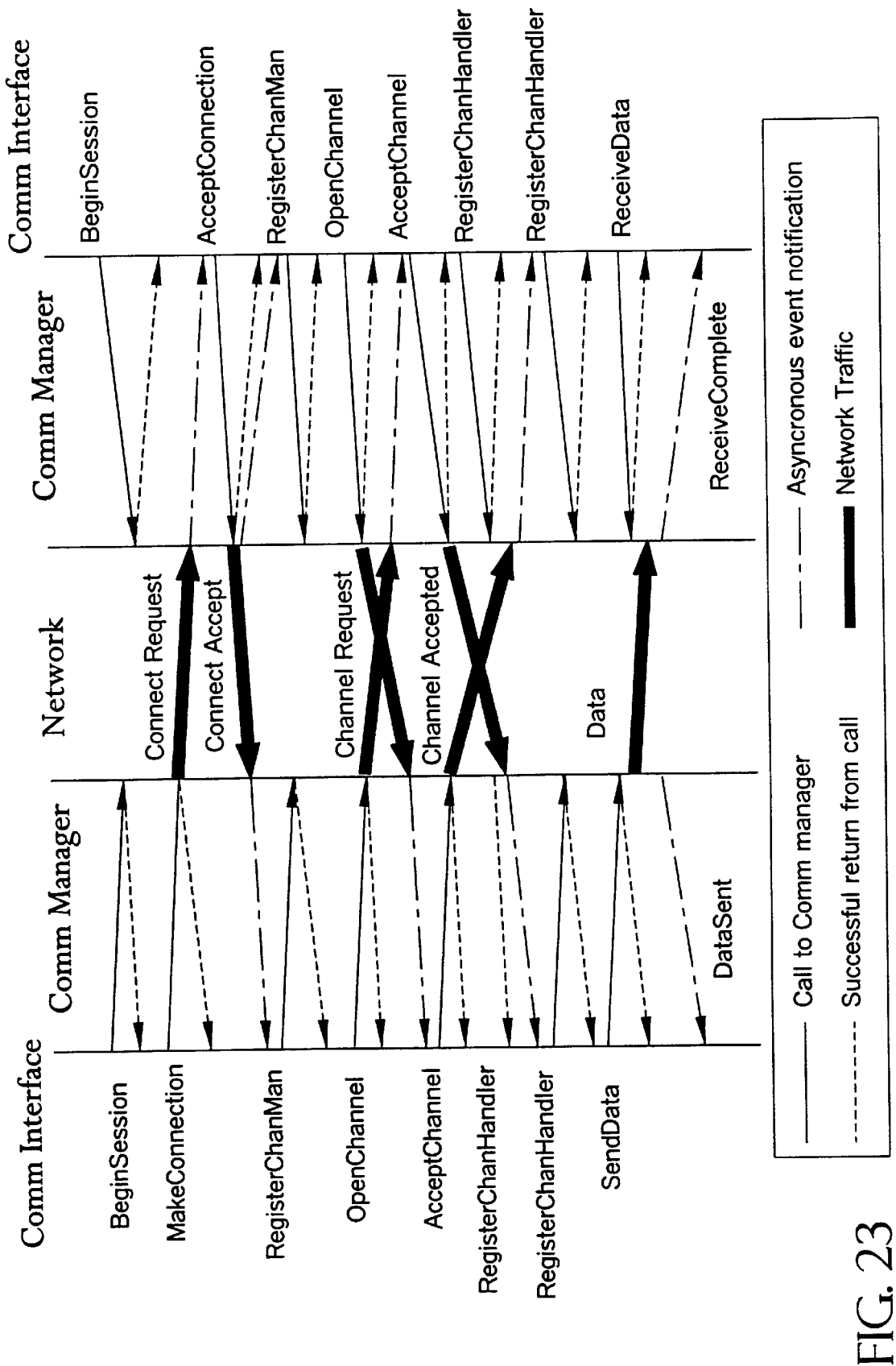
FIG. 23 is a representation of the comm subsystem processing for a typical conferencing session between a caller and a callee.

Referring now to FIG. 19, there is shown a representation of the comm subsystem application finite state machine (FSM) for a conferencing session between a local conferencing system (i.e., local site or caller) and a remote conferencing system (i.e., remote site or callee). Referring now to FIG. 20, there is shown a representation of the comm subsystem connection FSM for a conferencing session between a local site and a remote site. Referring now to FIG. 21, there is shown a representation of the comm subsystem control channel handshake FSM for a conferencing session between a local site and a remote site. Referring now to FIG. 22, there is shown a representation of the comm subsystem channel establishment FSM for a conferencing session between a local site and a remote site. Referring now to FIG. 23, there is shown a representation of the comm system processing for a typical conferencing session between a caller and a callee. The description for this section is the same as the description for the section of the same name in U.S. patent application Ser. No. 08/157,694.

Comm Manager

The comm manager 518 of FIG. 5 comprises the following dynamically linked libraries of FIG. 17:

Transport independent interface (TII) 510,

Reliable datalink module (RDLM.DLL) 1704,

Datalink module interface (DLM.DLL) 1702,

LAN datalink module interface (DLMLAN.DLL) 1718,

One or more media dependent modules (MDM.DLL) 1720,

Global dynamic loader (GDL.DLL) 1706,

Global dynamic loader executable (GDLE.EXE) 1708, and

MDM helper (MDMHELPR.DLL) 1722.

The DLM interface is used by the TII to access the services of the ISDN audio/comm board 206. The DLMLAN interface is used by the TII to access the services of the LAN board 210. Other modules (i.e., KPDAPI.DLL and DSP.DRV) function as the interface to the audio/comm board and have no other function (i.e., they provide means of communication between the host processor portion of the DLM and the audio/comm portion of the DLM. The host processor portion of the DLM (i.e., DLM.DLL) uses the DSP interface 528 of FIG. 5 (under Microsoft® Windows™ 3.x operating system) to communicate with the ISDN audio/comm board side portions.

The TII provides the ability to specify whether or not a virtual channel is reliable. For reliable channels, TII employs the RDLM to provide reliablility on a virtual channel. This feature is used to indicate that the audio and video virtual channels are unreliable, and the data virtual channel is reliable.

Referring again to FIG. 17, TII 510 is a dynamic link library (DLL) that implements the comm API. There is only a single instance of the TII library running on the host and it supports multiple transport media and multiple connections. At the bottom, the TII library makes DLM calls that are directed to the specific DLM capable of handling the address (transport) type in question.

A data link manager (e.g., DLM 1702, DLMLAN 1718) handles one or more transport types. A DLM provides:

Fragmentation and re-assembly of large messages,

Implementation of logical channels within a connection,

Prioritization of data across channels, and

In-order delivery of messages, with message boundaries preserved.

A DLM may directly interface to the transport media device (e.g., in the case of ISDN connections) or it may call the relevant media dependent module (MDM) (e.g., in the case of LAN connections) for services.

All transport media specific functionality is encapsulated into a media dependent module (MDM) 1720. There is one MDM per transport medium/protocol. Possible MDMs are NetBIOS, IPX, POTS Modems, and TAPI (Mikado PBX). If the underlying transport medium inherently supports multiple connections (e.g., NetBIOS), then the MDM should provide it to the upper layers. Some MDMs will provide a only single connection (e.g., a POTS Modem MDM that supports a single external modem). The MDM provides functionality for connection establishment and tear-down, and reliable data transfer over the connection(s). It does not have any knowledge of logical data channels. In conferencing system 100, each MDM is implemented as a DLL.

Additionally, there are two support modules. The link packet manager (LPM) 1724 creates, destroys, and allocates link packets for the communications stack. A link packet is data structure shared between the host-resident DLM and an MDM. Link packets allow for efficient transfer of data between the DLM and MDM. The global dynamic loader (GDL) 1706 is responsible for bringing DLMs and MDMs into the system as needed and for discarding them when they are no longer used.

Data Link Manager

Referring now to FIG. 29, there are shown diagrams indicating typical TII-DLM connection setup and teardown sequences. The description for this section is the same as the description for the section of the same name in U.S. patent application filed Nov. 15, 1994 using U.S. Express Mail Label No. EG029471669. One difference is the event structure EVENTSTRUCT, which is extended to return the data block on CONN_REQUESTED and is defined as follows:

```
struct EVENTSTRUCT
{
    WORD        EventType;
    WORD        Status;
    BYTE        DlmId;
    BYTE        MdmId;
    DWORD       DlmSessionId;
    DWORD       DlmConnId;
    DWORD       CallReference;
    DWORD       Token;
    LPTADDR     Addr;
    LPCONNCHR   Characteristics;
    LPVOID      UserData;
    WORD        UserDataLen;
}
```

Parameters:

| | |
|---|---|
| EventType | Specifies the type of event which triggered the callback. |
| Status | Indicates the status of the event. |
| DlmId | Unique ID of the DLM performing the callback. |
| MdmId | Unique ID of the MDM which processed the event. |
| DlmSessionId | Indicates the Session ID, assigned by DLM, on which this event occurred. |
| DlmConnId | Indicates the Connection Id, assigned by DLM, on which this event occurred. |
| Token | The token value was given in the call to initiate an action. When the callback notifies the user that the action is complete, the token is returned in this field. |
| Addr | Specifies the LPTADDR of the caller. |
| Characteristics | This field is a LPCONNCHR to the connection characteristics. |
| UserData | Pointer to the data specified in the UserData parameter of the DLM_MakeConnection call for this connection. |
| UserDataLen | Number of valid bytes in the UserData block. |

The UserData and UserDataLen fields are valid only for the CONN_REQESTED callback and may be used for CallerID information. If the user did not specify any data, the UserData field is NULL and UserDataLen is 0.

Other differences are the DLM_MakeConnection and DLM_RejectConnection functions, which are defined as follows:

DLM MakeConnection
  WORD DLM_MakeConnection (DWORD DlmSessionId, LPCONNCHR Characteristics, DWORD Token, LPTADDR RemoteAddress, LPDWORD DLMConnID, LPVOID UserData, WORD UserDataLen);
Parameters:

| | |
|---|---|
| DlmSessionID | Session identifier returned in DLM_BeginSession |
| Characteristics | Desired characteristics of the connection. Passed uninterpreted to the lower layers. |
| Token | Uninterpreted token returned to the upper layer in the response callback. |
| RemoteAddress | Address on the remote site on which to make the connection. |
| DLMConnID | Output parameter specifying the DLM connection ID that will be valid when this connection is established. |
| UserData | Pointer to up to 64 bytes of user defined data that is to be transmitted to the remote site with the connection request. |
| UserDataLen | Number of bytes in the UserData block. If more than 64 bytes are specified, the first 64 are transmitted. |

DLM RejectConnection
  WORD DLM_RejectConnection (DWORD DlmConnId, DWORD CallReference, WORD ReasonCode);
Parameters:

| | |
|---|---|
| DlmConnID | Connection identifier returned in the CONN_REQESTED callback. |
| CallReference | Identifier returned previously in the CONN_REQESTED callback. |
| ReasonCode | Uninterpreted word that is transmitted to the remote site as the reason for the rejection. |

The reason code will be returned in the Status field of the DLM event structure for the CONN_REJECTED callback. If the remote user did not specify a reason, the Status will be 0.

Interfaces-Channel Management & Data Transfer

The description for this section is the same as the description for the section of the same name in U.S. patent application Ser. No. 08/157,694.

MDM Interface

The media dependent module (MDM) 1720 of FIG. 17 hides the network specifics from the layers above it on the communications stack. It is the only module that is affected by a change in the physical network. Media dependent modules are described in further detail in U.S. patent application Ser. No. 08/133,612. Additional information on the MDM API is found in APPENDIX F of this specification.

MDMHelpr

The MDM helper component (MDMHelpr) 1722 of FIG. 17 is a server of all system level services to its client MDMs. In order to centralize critical system timer resources, MDMHelpr 1722 task centralizes all access Microsoft® Windows™ messages, task time timers, multi-media timers and MDM messages. The first MDM starts the MDMHelpr task, which creates a ten-millisecond multimedia timer, a one-second task time timer, and a client registration service. Subsequently, each MDM registers as a client for the timers and message passing services. This centralizes the Microsoft® Windows™ system resources which are multiplexed within the helper eliminating redundancy as new MDMs are loaded. The MDMs utilize the helper's multi-media timer for both send and receive queue processing, the one-second task timer for packet retries and updating the log file, and the message queues for communication messages and control flow. As each MDM is closed, the clients are registered with the last MDM causing the shutdown of the helper task. Also, during abnormal termination, the helper catches the Microsoft® Windows™ close message and correctly cleans up its resources avoiding crashes by Microsoft® Windows™ from improper shutdown. Additional information on the MDMHelpr API is found in APPENDIX G of this specification.

Link Packet Manager

The link packet manager (LPM) 1724 of FIG. 17 maintains the pool of free link packets. Both DLM and MDM request link packets and, when they are finished with them, send them back to the LPM to be returned to the free pool. Since requests for link packets can occur at interrupt time, the LPM can not allocate packets on the fly. It allocates all of its free pool of packets when it is initialized and continues to re-use only those packets. Therefore, both DLM and MDM are able to handle the case that a link packet is not available. Link packet managers are described in further detail in U.S. patent application Ser. No. 08/133,612. Additional information on the LPM API is found in APPENDIX H of this specification.

Global Dynamic Loader

The global dynamic loader (GDL) 1706 of FIG. 17 is responsible for loading all necessary DLMs and MDMs into memory. The advantage over statically loading the libraries is that the communications stack need not be fixed when the application is started. The application may decide which network transport to use and consequently which MDM to load. Global dynamic loaders are described in further detail in U.S. patent application Ser. No. 08/133,612. Additional information on the GDL API is found in APPENDIX I of this specification.

DSP Interface

The description for this section is the same as the description for the section of the same name in U.S. patent application Ser. No. 08/157,694.

Comm Task

The description for this section is the same as the description for the section of the same name in U.S. patent application Ser. No. 08/157,694.

LAN Management Interface (LMI) Subsystem

The LAN management interface (LMI) module controls the communications between conferencing system 100 and a management computer to obtain LAN bandwidth allocations from the management computer for conferences. LMI consists of LMI API 556 and LMI manager 558 of FIG. 5. LMI maintains an internal interface to its own windows application (LMITRD.EXE) which provides a windows task thread to LMI. A management computer manages the allocation of bandwidth for conferences on a network. Management computers and how they manage bandwidth allocation for network conferences are described in greater detail in U.S. patent application Ser. No. 08/342,076 filed Nov. 16, 1994, entitled "Managing Bandwidth Over a Computer Network" of Robert Alexander Marshall, et al. Additional information on the LMI API is found in APPENDIX J of this specification.

Application-Level Protocols

The application-level protocols for conferencing system 100 of FIG. 5 are divided into those for the video, audio, and data streams.

Video Protocol

Figure 24:
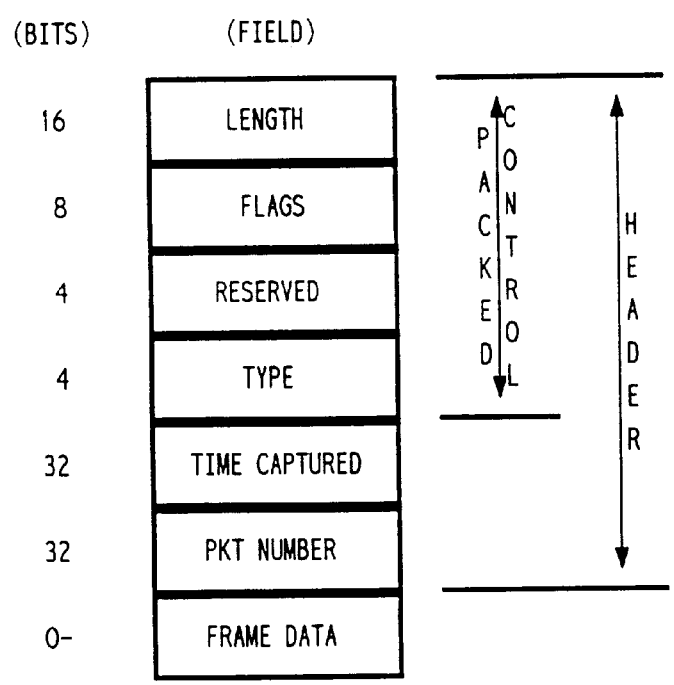
FIG. 24 is a representation of the structure of a video packet as sent to or received from the comm subsystem of the conferencing system of FIG. 5.

Referring now to FIG. 24, there is shown a representation of the structure of a video packet as sent to or received from the comm subsystem. The description for this section is the same as the description for the section of the same name in U.S. patent application Ser. No. 08/340,172. In addition, conferencing system 100 is capable of encoding and decoding video signals in more than one bitstream format. Conferencing system 100 supports an ISDN rate video (IRV) bitstream format and a multi-rate video (MRV) bitstream format. These formats are described in the following sections.

Compressed ISDN Rate Video Bitstream

Figure 25:
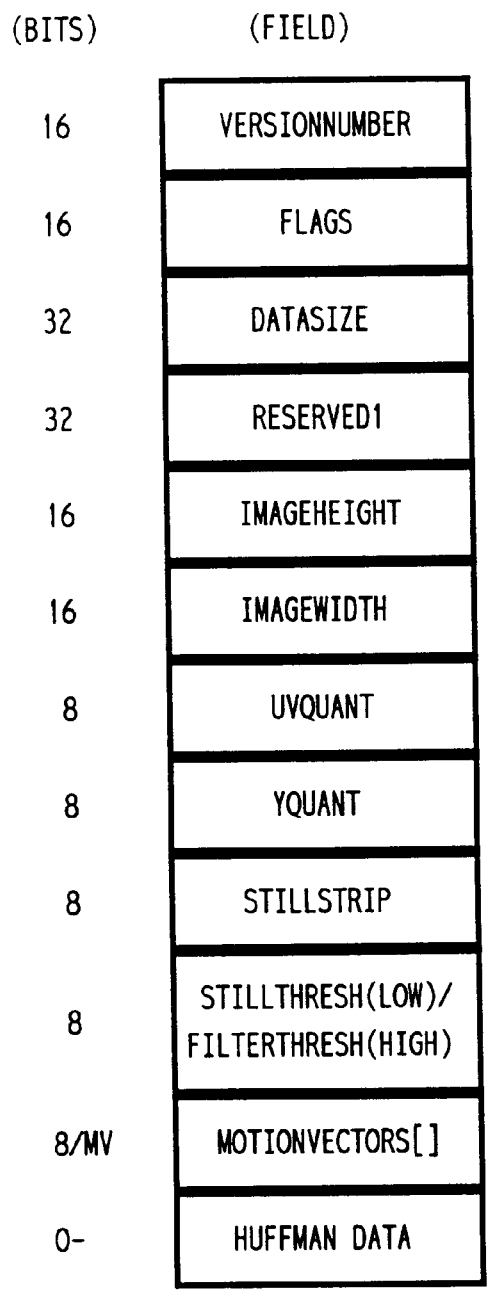
FIG. 25 is a representation of the compressed video bitstream for the conferencing system of FIG. 5.

Referring now to FIG. 25, there is shown a representation of the compressed ISDN rate video (IRV) bitstream for conferencing system 100. The description for this section is the same as the description for the section entitled "Compressed Video Bitstream" in U.S. patent application Ser. No. 08/157,694.

Video Decoding Procedure for IRV Bitstream Format

The description for this section is the same as the description for the section entitled "Video Decoding Procedure" in U.S. patent application Ser. No. 08/157,694.

Intra/Inter Decision Rules

The description for this section is the same as the description for the section of the same name in U.S. patent application Ser. No. 08/157,694.

Post Reconstruction Loop Filtering

The description for this section is the same as the description for the section of the same name in U.S. patent application Ser. No. 08/157,694.

Adaptive Loop Filter Switching Criteria

The description for this section is the same as the description for the section of the same name in U.S. patent application Ser. No. 08/157,694.

Design of Quantization Tables

The description for this section is the same as the description for the section of the same name in U.S. patent application Ser. No. 08/157,694.

Adaptive Transform Coefficient Scanning

The description for this section is the same as the description for the section of the same name in U.S. patent application Ser. No. 08/157,694.

Spatially Adaptive Quantization

The description for this section is the same as the description for the section of the same name in U.S. patent application Ser. No. 08/157,694.

Fast Statistical Decode

The description for this section is the same as the description for the section of the same name in U.S. patent application Ser. No. 08/157,694.

Contrast, Brightness, and Saturation Controls

The description for this section is the same as the description for the section of the same name in U.S. patent application Ser. No. 08/157,694.

Compressed Multi-Rate Video Bitstream

Encode and decode processing of one embodiment of the multi-rate video (MRV) bitstream are described in U.S. patent application Ser. No. 08/235,955.

Picture Layer

According to a current embodiment, the compressed data for one picture has the following format:

PictureHeader [SliceData] [SliceHeader SliceData] [SliceHeader SliceData] . . .

The format of the picture header is as follows:

|   | # Bits | Field |
|---|---|---|
| * | 18 | Picture start code (00000000 00000000 10) |
|   | 2 | VersionNumber |
|   | 7 | FrameNumber |
|   | 5 | SliceStructure |
| * | 3 | PictureSize |
|   | 4 | Reserved |
|   | 1 | ExtraInfo |
| * | 3 | QuantMatrices |
|   | 2 | TempFiltStrength |
|   | 1 | UsesSLF |
|   | 1 | UsesBlockMV |
|   | 1 | IntraFlag |
| [* | 8 | PictureXsize] |
| [* | 8 | PictureYsize] |
| [* | 16 | ExtraInfoSize] |
| [* | var | ExtraInfoData] |
| [* | var | QuantData] | where * indicates a field that starts on a byte boundary, [ ] indicates an optional field, and var indicates a variable number of bits. The meaning of these fields is as follows:

| | |
|---|---|
| Picture start code | A unique code that cannot occur anywhere else in the bit stream that identifies the start of a frame. |
| VersionNumber | Identifies a version of the MRV video bit stream. The current version number is 1. |
| FrameNumber | A counter that indicates to the decoder the receipt of successive frames. An encoder should increment this field by 1 for each frame it encodes (with wraparound, so that the FrameNumber after 127 is 0). A decoder can then determine by looking at this field if a frame has been "lost", except for the rare case in which a multiple of 128 frames in a row are lost. |
| SliceStructure | Optionally specifies the slice structure of the picture. The binary value of this field has the following meanings:<br>SliceStructure    Meaning<br><br>0                          No slice structure specified here. Each slice has a slice header.<br>1                          All slices are of size 1, planes are encoded in order YUV.<br>2                          All slices are of size 1, planes are encoded in order UVY.<br>3                          Each plane is encoded as a slice, planes are encoded in order YUV.<br>4                          Each plane is encoded as a slice, planes are encoded in order UVY.<br>5–31                    Reserved.<br>If SliceStructure = 0, information about slices is contained in the slice headers which appear later in the bitstream. If SliceStructure = 1, 2, 3, or 4, the slice structure of the picture is specified here, as shown in the table above, and there are no slice headers in the bitstream for this picture. |
| PictureSize | Identifies the size of the encoded picture. The binary value of this field has the following interpretation:<br>PictureSize    Resolution<br><br>0                   80 × 60<br>1                   160 × 120<br>2                   240 × 180<br>3                   320 × 240<br>4–6               reserved<br>7                   escape - size is in PictureXsize and PictureYsize fields. |
| Reserved | This field is reserved for future use, and is set to zero. |
| ExtraInfo | This bit specifies whether there is extra information in the picture header. |
| QuantMatrices | Specifies what quantization matrices the decoder should use for this frame. There are 32 quantization matrices to be defined: 16 for use in intra blocks and 16 for use in inter blocks. These 32 matrices are specified by the contents of two base matrices (one for intra, one for inter), five quantization parameters, and a flag (PowersOf2). The possible values of the QuantMatrices field specify what the base matrices, parameters, and PowersOf2 flag are, according to the following table:<br>QuantMatrices    BaseMatrices         Parameters         PowersOf2<br><br>0                         . . . not used . . .<br>1                         default                     default                 0<br>2                         default                     default                 1<br>3                         default                     in QuantData     in QuantData<br>4                         in QuantData         in QuantData     in QuantData<br>5                         from the past         from the past     from the past<br>6–7                     . . . reserved . . .<br>In this table, "in QuantData" means that the given item is to be found in the QuantData field of the picture header. "From the past" means that the parameter values (which were set on a previous frame) are inherited from the past. |
| TempFiltStrength | Specifies the strength of the temporal loop-filter. If this field is 00, the temporal filter is turned off for this picture. |
| UsesSLF | Specifies whether this picture uses the spatial loop filter or not. The setting of this bit changes the meaning of macroblock types read from the bit stream. |
| UsesBlockMV | If set, specifies that this picture may contain block-based (as opposed to macroblock-based) motion vectors. The setting of this bit changes the meaning of macroblock types read from the bit stream. |
| IntraFlag | If set to 1, denotes that this picture is entirely intra coded. |
| PictureXsize and PictureYsize | Contain the picture sizes divided by 4. Since these are 8-bit fields, this means that MRV video can support picture sizes up to 1020 × 1020. These fields are present only if the PictureSize field = 7. |
| ExtraInfoSize | This field is present only if the ExtraInfo bit is set earlier in the picture header. It specifies the number of bytes of extra information (not including this field) that is present in the picture header. |
| ExtraInfoData | Extra information for private use by an encoder or decoder. An MRV video decoder should simply skip over any ExtraInfoData present in a bitstream. |
| QuantData | If present (as indicated by the QuantMatrices field), contains a definition of the quantization parameters, the PowersOf2 flag, and possibly the two base matrices as well. If this field is present, its first four bytes are as follows:<br># Bits    Field<br><br>6             QuantStart<br>6             QuantStep<br>6             DCstep<br>6             Tilt[0] (for inter) |

-continued

| | |
|---|---|
| 6 | Tilt[1] (for intra) |
| 1 | PowersOf2 |
| 1 | Reserved |

If indicated by the QuantMatrices field, the definition of the two base matrices follows. Each matrix consists of 64 6-bit fields packed into 48 bytes. The inter base matrix is first, followed by the intra. Each matrix is stored in "raster-scan" order.

Slice Layer

The data for one MRV video picture consists of a series of data groups for one or more slices. A slice is a contiguous group of one or more rows of macroblocks in the picture. The slices present in the bit stream "covers" all three planes (Y, U, and V) of the picture exactly (i.e., the whole picture is coded and no part of the picture is encoded more than once). Some slices may contain very little data (for example, if all macroblocks in the slice are empty), but they are all present in the data stream. Each slice in a picture is specified by start and size fields specifying the row and plane where the slice starts and its size (i.e., how many rows of macroblocks the slice contains). A slice is required to be confined to a single plane. The data for one slice consists of three sections, as follows:

SliceHeader MacroblockData BlockData
The format of the slice header is as follows:

| # Bits | Field |
|---|---|
| * 18 | Slice start code (00000000 00000000 11) |
| 6 | SliceStart |
| 6 | SliceSize |
| 2 | Reserved | where:

| | |
|---|---|
| Slice start code | Identifies the start of a slice. This unique code cannot occur elsewhere in the bit stream. |
| SliceStart | Specifies where the slice starts in the picture. The units of SliceStart are interpreted as follows: Take the rows of macroblocks in each of the Y, U, and V planes and arrange them in scan-line order, then concatenate the rows for the planes into one long list. The value of SliceStart is the (zero-based) index into this list. For example, in a (160×120) picture, there are 8 rows of macroblocks in the Y plane and 2 rows in each of the U and V planes. So SliceStart would take on a value of 0 to 11, where 0 represents the top row of macroblocks in the Y plane, 7 is the bottom row of the Y plane, 8 is the top row of the U plane, etc. |
| SliceSize | Specifies the size of the slice in rows of macroblocks. A slice is confined to a single plane, but is allowed to start and end on any row. A value of SliceSize which describes a slice extending past the end of the plane is illegal. Slices in a picture need not appear in the bit stream "in order". For example, a picture could have 4 slices, in the following order: U plane, top half of Y plane, V plane, bottom half of Y plane. |
| Reserved | A 2-bit field reserved for future use (0 for now). |

Following the slice header is the Huffman-encoded macroblock and block data for one slice. The macroblock data always starts on a byte boundary, but the block data need not, as it is simply concatenated to the end of the macroblock data.

Macroblock Layer

The macroblock data describes the structure of each macroblock in a slice. The consists of a series of "records" of the form:

empty [empty . . . ] type [Qvalue] [MV] [MV2 MV3 MV4] [cbp]

followed by the "separator" symbol 00011111, which separates the macroblock data from the block data for the slice. All of the symbols in the above record are encoded using the Macroblock Huffinan table. The meaning of each of these fields is as follows:

The empty field gives information about how many empty macroblocks there are between this non-empty macroblock and the previous one. There may be more than one empty value, to indicate a long run of empty macroblocks.

The type field actually contains several bits of information about the macroblock. The decoded Huffman value is used as an index into one of the following four tables. The table to use is determined (on a per-picture basis) by the settings of the UsesSLF and UsesBlockMV bits in the picture header.

Table for UsesSLF=0 and UsesBlockMV=0:

| Huff Value | Intra | NewQ | MV | Cbp |
|---|---|---|---|---|
| 0 | 0 | 0 | 0 | 1 |
| 1 | 0 | 0 | 1 | 1 |
| 2 | 0 | 1 | 0 | 1 |
| 3 | 0 | 1 | 1 | 1 |
| 4 | 1 | 0 | 0 | 0 |
| 5 | 1 | 1 | 0 | 0 |
| 6 | 0 | 0 | 1 | 0 |

Table for UsesSLF=1 and UsesBlockMV 0:

| Huff Value | Intra | NewQ | Mv | Cbn | SLF |
|---|---|---|---|---|---|
| 0 | 0 | 0 | 0 | 1 | 0 |
| 1 | 0 | 0 | 1 | 1 | 1 |
| 2 | 1 | 0 | 0 | 0 | 0 |
| 3 | 0 | 1 | 0 | 1 | 0 |
| 4 | 0 | 1 | 1 | 1 | 1 |
| 5 | 0 | 0 | 1 | 0 | 1 |
| 6 | 1 | 1 | 0 | 0 | 0 |
| 7 | 0 | 0 | 1 | 1 | 0 |
| 8 | 0 | 0 | 1 | 0 | 0 |
| 9 | 0 | 1 | 1 | 1 | 0 |
| 10 | 0 | 0 | 0 | 1 | 1 |
| 11 | 0 | 1 | 0 | 1 | 1 |

Table for UsesSLF=0 and UsesBlockMV=1:

| Huff Value | Intra | NewQ | Mv | Cbp | BlockMV |
|---|---|---|---|---|---|
| 0 | 0 | 0 | 0 | 1 | 0 |
| 1 | 0 | 0 | 1 | 1 | 0 |
| 2 | 0 | 1 | 0 | 1 | 0 |
| 3 | 0 | 1 | 1 | 1 | 0 |
| 4 | 1 | 0 | 0 | 0 | 0 |
| 5 | 1 | 1 | 0 | 0 | 0 |
| 6 | 0 | 0 | 1 | 0 | 0 |
| 7 | 0 | 0 | 1 | 1 | 1 |
| 8 | 0 | 1 | 1 | 1 | 1 |
| 9 | 0 | 0 | 1 | 0 | 1 |

Table for UsesSLF=1 and UsesBlockMV=1:

| Huff Value | Intra | NewQ | MV | Cbp | SLF | BlockMV |
|---|---|---|---|---|---|---|
| 0  | 0 | 0 | 0 | 1 | 0 | 0 |
| 1  | 0 | 0 | 1 | 1 | 1 | 0 |
| 2  | 1 | 0 | 0 | 0 | 0 | 0 |
| 3  | 0 | 1 | 0 | 1 | 0 | 0 |
| 4  | 0 | 1 | 1 | 1 | 1 | 0 |
| 5  | 0 | 0 | 1 | 0 | 1 | 0 |
| 6  | 1 | 1 | 0 | 0 | 0 | 0 |
| 7  | 0 | 0 | 1 | 1 | 0 | 0 |
| 8  | 0 | 0 | 1 | 0 | 0 | 0 |
| 9  | 0 | 1 | 1 | 1 | 0 | 0 |
| 10 | 0 | 0 | 1 | 1 | 1 | 1 |
| 11 | 0 | 1 | 1 | 1 | 1 | 1 |
| 12 | 0 | 0 | 1 | 0 | 1 | 1 |
| 13 | 0 | 0 | 1 | 1 | 0 | 1 |
| 14 | 0 | 0 | 1 | 0 | 0 | 1 |
| 15 | 0 | 1 | 1 | 1 | 0 | 1 |
| 16 | 0 | 0 | 0 | 1 | 1 | 0 |
| 17 | 0 | 1 | 0 | 1 | 1 | 0 |

The bits in these tables have the following meaning:

| | |
|---|---|
| Intra | Says whether this macroblock is intra or not. |
| NewQ | Says whether a quantization index (Qvalue) is present in this record. |
| MV | Says whether a motion vector is present in this record. |
| Cbp | Says whether a Cbp (coded block pattern) value is present in this record. |
| SLF | Says whether the spatial loop filter is to be used for this macroblock. |
| BlockMV | Says whether this record contains four motion vectors (one for each block) or one. |

Following the type field are the QValue, MV, and cbp fields, which are present only if indicated by the corresponding bit in the type.

QValue is the Huffman-encoded differential quantization value. The quantization value for this macoblock (thisQ) is calculated from the previous macroblock's value (prevQ) as follows:

$$thisQ = prevQ + tosigned(Qvalue+1),$$

where tosigned() is a function which converts from an unsigned number to a signed number. The resulting thisQ value is a 4-bit value that specifies which of 16 quantization matrices to use. The value of prevQ is initialized to 8 at the start of each slice.

If MV=1, there is either one (if BlockMV=0) or four (if BlockMV=1) motion vectors present in this record. Each motion vector consists of two separate values, one for the x component and one for the y component. For both x and y, the actual vector component is calculated as:

$$this\ MV = prevMV + tosigned(huffman\_decoded\_value)$$

if (thisMV>21) thisMV−=43;
if (thisMV<−21) thisMV+=43;

In these equations, prevMV is the motion vector of the previous block or macroblock, depending on whether this macroblock has one or four motion vectors, and whether the previous macroblock had one or four motion vectors, as follows:

| #MVs in: | | Previous motion vector for: | | | |
|---|---|---|---|---|---|
| prev | this | MV(or MV1) | MV2 | MV3 | MV4 |
| 1 | 1 | MVprev | | | |
| 1 | 4 | MVprev | MV1 | MV2 | MV3 |
| 4 | 1 | MV4prev | | | |
| 4 | 4 | MV4prev | MV1 | MV2 | MV3 |

MVn corresponds to block number n in the macroblock (according to the numbering shown in Macroblock and Block Structure). At the start of each row of macroblocks, the x and y components of prevMV are reset to zero. prevMV refers to the immediately-preceding macroblock. In particular, this means that if the preceding macroblock is empty, prevMV=0. A positive motion vector x component means that the prediction block in the previous picture is to the right of the block in the current picture. A positive y component means that the prediction block is below the block in the current picture. The x and y components are values in the range −21 to +21.

The cbp value in the record specifies which blocks in the macroblock are empty (i.e., have no coded transform coefficients). The cbp value is obtained by taking the Huffman-decoded value (which will be in the range 0–14), and indexing into the following table:

Cbp Lookup Table: 15, 9, 3, 14, 7, 1, 11, 6, 2, 8, 13, 4, 12, 10, 5 cbp is never zero, since in that case the Cbp bit in the type field would be set to 0, and cbp would not be present in the record. The 4-bit cbp value specifies the emptiness of the 4 blocks in the macroblock, with bit=1 meaning "non-empty". The LSB of cbp applies to block #1, the next bit to block #2, etc. There are also two special cases:

(1) If the macroblock type says "intra," cbp is not present but is implied to be 15.
(2) If the macroblock type says "non-intra" and "cbp not present," cbp is implied to be 0.

Block Layer

The block data contains data for each of the coded (non-empty, non-phantom) blocks in a slice. Blocks are coded in macroblock scan order, and within each macroblock in counterclockwise order starting at the top left corner. The block data is terminated by a string of 14 zero bits, which is the first unused code in the block Huffinan table. There are two cases:

(1) If the block data is followed by a slice header for another slice, the block data is padded (with zero bits) to the next byte boundary. This can be followed by a string of zero or more "padding bytes" of zeros, followed by the slice header for the next slice. Regardless of the number of padding bits or bytes, the zero bits which begin the next slice header guarantee that the block data is terminated by a string of 14 zero bits.
(2) If the block data is not followed by a slice header (either because the picture header was used to specify the slice structure, or because this is the last slice of the picture), then the encoder explicitly inserts the 14 zero bits. Then, the block data is padded with zero bits to the next byte boundary. If another (header-less) slice follows, its macroblock data follow immediately and padding bytes are not allowed.

In both cases, the macroblock data for a slice starts on a byte boundary. The general format of the block data is as follows:

[Block1data] [Block2Data] . . . 00000000000000 and the format of each block's data is as follows:

[RunVal code or ESC run valLO valHI] . . . [RunVal code
    or ESC run valLO valLO] . . . EOB The basic unit of block data is the "run/value pair" or run/val pair for short. Each run/val pair represents one non-zero FST frequency-domain coefficient. The commonly-occurring run/val pairs are encoded with a single code; others are encoded as ESC followed by the explicit run and value.

Audio Protocol

Figure 26:
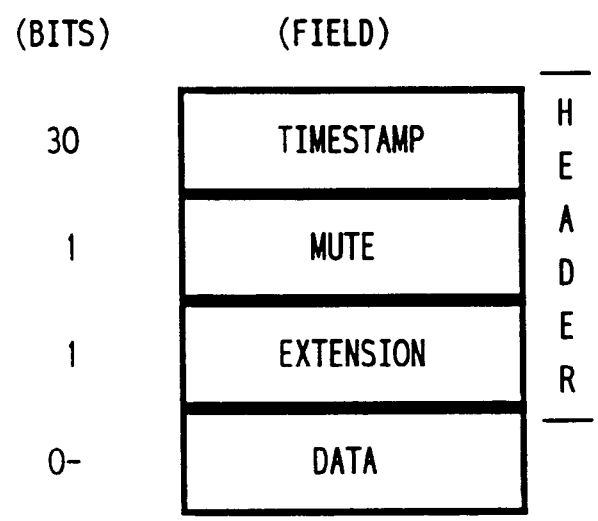
FIG. 26 is a representation of a compressed audio packet for the conferencing system of FIG. 5.

Referring now to FIG. 26, there is shown a representation of a compressed audio packet for conferencing system 100. The description for this section is the same as the description for the section of the same name in U.S. patent application Ser. No. 08/340,172 filed Nov. 15, 1994 [using U.S. Express Mail Label No. EG029471669].

Compressed Audio Bitstream

The description for this section is the same as the description for the section of the same name in U.S. patent application Ser. No. 08/340,172 filed Nov. 15, 1994 [using U.S. Express Mail Label No. EG029471669].

Data Protocol

The description for this section is the same as the description for the section of the same name in U.S. patent application Ser. No. 08/340,172 filed Nov. 15, 1994 [using U.S. Express Mail Label No. EG029471669]. Data conferencing application 504 is described in greater detail in U.S. patent application Ser. No. 08/137,319 (filed Oct. 14, 1993) and in U.S. patent application Ser. No. 08/170,146 (filed Dec. 20, 1993).

Communication-Level Protocols

The description for this section is the same as the description for the section of the same name in U.S. patent application Ser. No. 08/157,694.

Reliable Transport Comm Protocols

Figure 27:
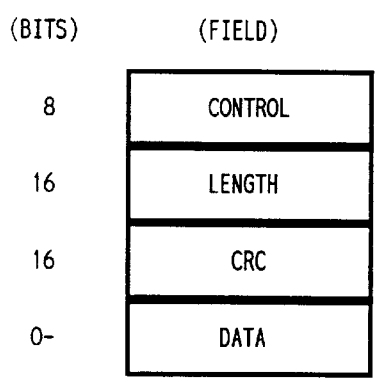
FIG. 27 is a representation of the reliable transport comm packet structure.

Referring now to FIG. 27, there is shown a representation of the reliable transport comm packet structure. The description for this section is the same as the description for the section of the same name in U.S. patent application Ser. No. 08/157,694.

Unreliable Transport Comm Protocols

Figure 28:
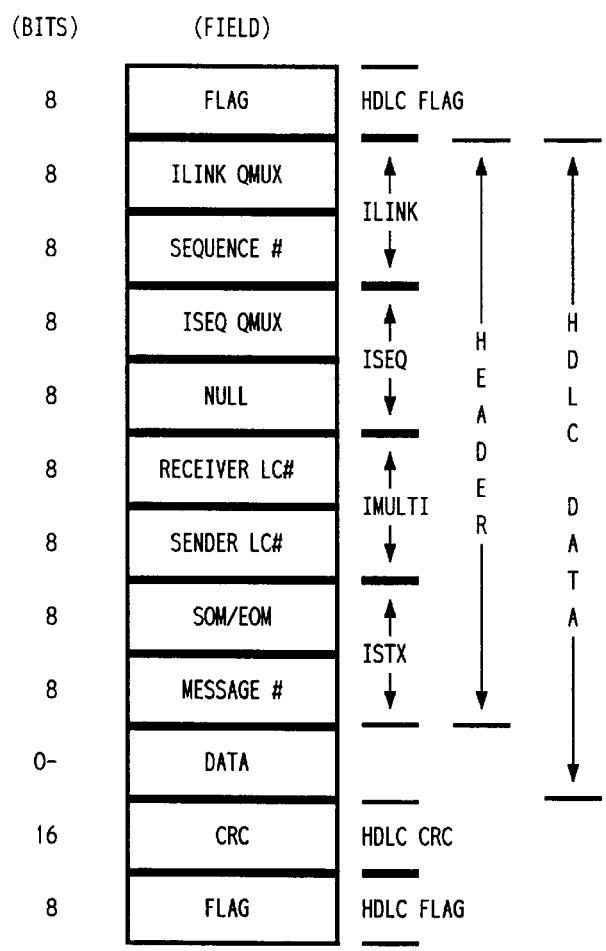
FIG. 28 is a representation of the unreliable transport comm packet structure.

Referring now to FIG. 28 there is shown a representation of the unreliable transport comm packet structure. The description for this section is the same as the description for the section of the same name in U.S. patent application Ser. No. 08/340,172 filed Nov. 15, 1994 [using U.S. Express Mail Label No. EG029471669].

DLMLAN Protocols

Figure 44:
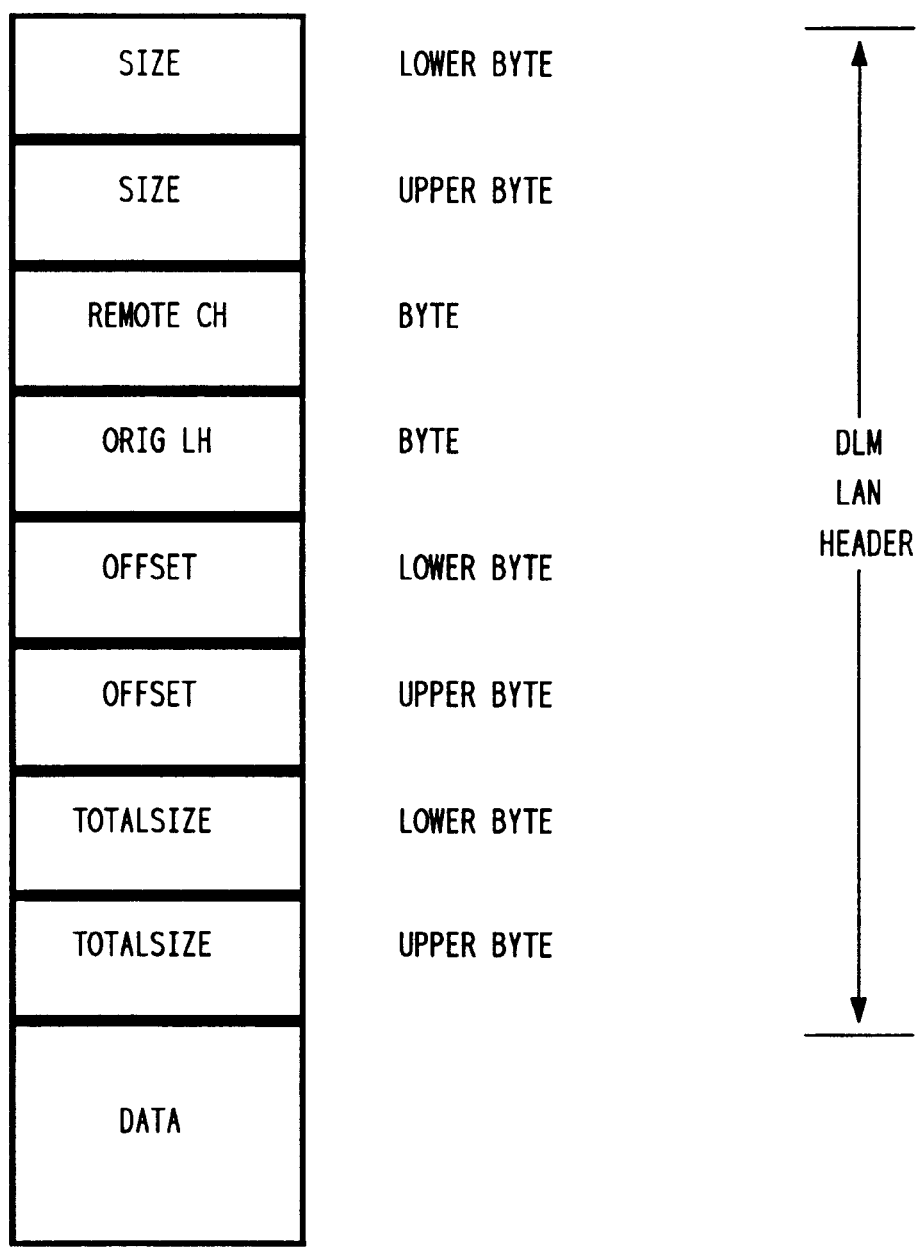
FIG. 44 is a representation of the DLMLAN packet header format.

The DLMLAN 1718 of FIG. 17 fragments the messages from TII 510 into packets to be transmitted to the network. As shown in FIG. 44, each packet contains the following header:

| Byte Offset | Item |
|---|---|
| 0 | Size of packets in bytes. (Format: WORD) |
| 2 | Remote receiving channel number. (Format: BYTE) |
| 3 | Local originating channel number. (Format: BYTE) |
| 4 | Offset into the current message of the start of this packet. (Format: WORD) |
| 6 | Total size of the current message in bytes. (Format: WORD) |

Following the DLM header is an implementation defined number of data bytes.

MDM Protocols

Figure 45:
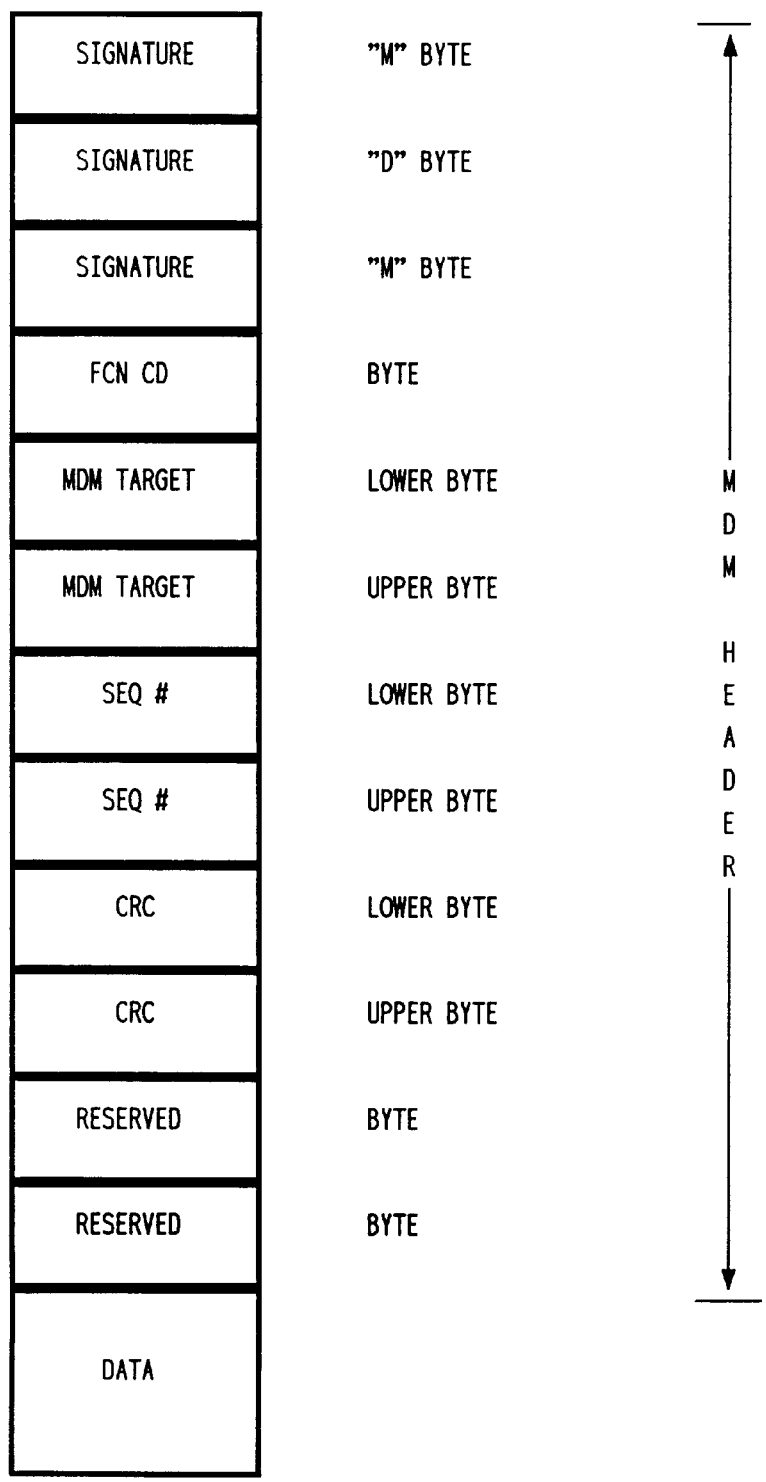
FIG. 45 is a representation of the MDM packet header format for LAN transmissions.

For LAN transmissions, the MDMs 1720 of FIG. 17 wrap the DLM packet with the folling header, as shown in FIG. 45:

| Byte Offset | Item |
|---|---|
| 0 | Signature on packet. (Format: 3 BYTEs containing ASCII representation of "MDM") |
| 3 | Function code. A value of 0 represents a data packet. (Format: BYTE) |
| 4 | MDM identifier for target connection. (Format: WORD) |
| 6 | Sequence number. Monotonically increasing for packets on a single connection. (Format: WORD) |
| 8 | 16-bit CRC checksum on data in packet. (Format: WORD) |
| 10 | Reserved. (Format: WORD) |

Folling the header is an implementation defined number of bytes containing the data of the packet.

MDM Protocol for Connection Setup, and Tear Down

The MDMs place logical connections on top of typically connectionless network protocols. Therefore, the MDMs exchange messages which build the MDM logical connection. There are four messages exchanged by the MDMs: connection request, connection acknowledgment, connection close, and clear to send.

Connection Request

The connection request message (Open) requests the creation of connection between two MDMs. This message requests the target MDM to respond using its listening connection to begin the conection accept and establish sequence. The response expected is either an ACK or NAK message. If neither is received in one second from transmitting the Open, another Open is sent. If no response is received by the requestor within the timeout period, then the Open request is cancelled. The connection request is sent as the result of a call to MDM_MakeConnection. It has the following format:

| Byte Offset | Item |
|---|---|
| 0 | Signature on packet. (Format: 3 BYTEs containing ASCII representation of "MDM") |
| 3 | Function code. A value of 1 represents a connection request. (Format: BYTE) |
| 4 | Reserved. (Format: 0) |
| 6 | MDM identifier for source connection making request. (Format: WORD) |
| 8 | Flags, indicates if checksumming should be done on the packets. Set if the value is 1. (Format: WORD) |
| 10 | Source Address. (Format: Variable size field depending on transport. For IPX, format: WORD containing the source socket. For UDP, format: DWORD containing UDP address of source followed by WORD containing the source socket. For NetBIOS, format: 16 bytes specifying the source name of the endpoint. |

Immediately following source address (byte offset: 12 for IPX, 16 for UDP, 26 for NetBIOS) is the size of the user data block following the message (format: WORD). Immediately following the user data block size (byte offset: 14 for IPX, 18 for UDP, 28 for NetBIOS) is the user data block (format: uninterpreted block of up to 64 bytes of data sent to the MDM in MDM_MakeConnection), which may be used for CallerID information.

Connection Acknowledgment

The connection acknowledgment message (ACK) is the response to the Open request, if the receiver has a connection listening and expects to establish a connection. The acknowledgement of the connection request has the following format:

| Byte Offset | Item |
|---|---|
| 0 | Signature on packet. (Format: 3 BYTEs containing ASCII representation of "MDM") |
| 3 | Function code. A value of 2 represents a connection acknowledgement. (Format: BYTE) |
| 4 | MDM identifier for target connection request completing. (Format: WORD) |
| 6 | MDM identifier for source connection making request. (Format: WORD) |
| 8– | Reserved. |

Any remaining bytes of the packet are 0.

Connection Close

The connection close message (NAK) is the response to the connection request, if the receiver has no connection listening or does not expect to establish a connection. NAK is the request by either side of an accepted or established connection to close or destroy the connection. Currently, there is no response to this request. The close or reject message has the following format:

| Byte Offset | Item |
|---|---|
| 0 | Signature on packet (Format: 3 BYTEs containing ASCII representation of "MDM") |
| 3 | Function code. A value of 3 represents a close connection message. (Format: BYTE) |
| 4 | MDM identifier for target connection request completing. (Format: WORD) |
| 6 | MDM identifier for source connection making request. (Format: WORD) |
| 8 | Flags, contains the reject or close reason code. (Format: WORD) |
| 10–... | Reserved. |

Any remaining bytes of the packet are 0.

Clear To Send

The clear to send message (CTS) is the request by the receiver of the connection request message that the connection has been accepted and that the connection is ready to receive connection data messages. The response expected is either CTS, NAK, or a connection data message. If no response is received by the requestor in one second from transmitting the CTS request, another CTS is sent. If no response is received by the requestor within the timeout period, the CTS request is cancelled and the connection is closed. The response to the CTS request if the receiver has requested a connection be opened and expects to establish a connection. A clear to send message has the following format:

| Byte Offset | Item |
|---|---|
| 0 | Signature on packet. (Format: 3 BYTEs containing ASCII representation of "MDM") |
| 3 | Function code. A value of 4 represents a clear to send indication. (Format: BYTE) |
| 4 | MDM identifier for target connection. (Format: WORD) |
| 6 | MDM identifier for source connection. (Format: WORD) |
| 8 | Flags, 0 if this is a clear to send request, 1 if this is a clear to send response. (Format: WORD) |
| 10–... | Reserved. |

Any remaining bytes of the packet are 0.

Figure 46:
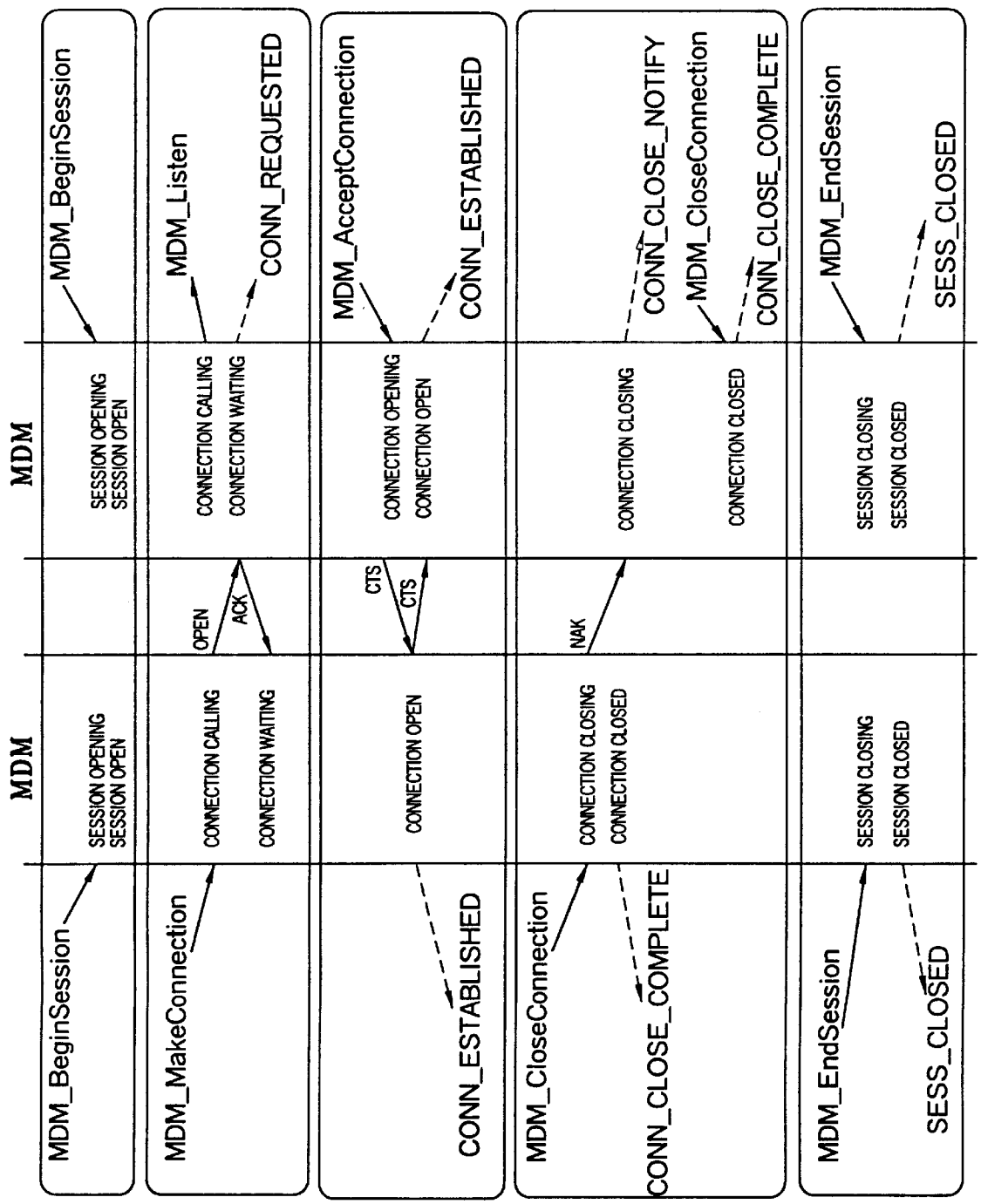
FIG. 46 is a representation of the connection messages for a typical conferencing session from the perspective of the MDMs on the local and remote nodes.

Referring now to FIG. 46, there is shown a representation of the connection messages for a typical conferencing session from the perspective of the MDMs on the local and remote nodes.

Feature and Capability Negotiation

Conferencing Management

The description for this section is the same as the description for the section of the same name in U.S. patent application Ser. No. 08/340,172 filed Nov. 15, 1994.

Connection Management

Connection and Channel Setup

The description for this section is the same as the description for the section of the same name in U.S. patent application Ser. No. 08/340,172 filed Nov. 15, 1994.

Connection Shutdown and Error Handling

The description for this section is the same as the description for the section of the same name in U.S. patent application Ser. No. 08/340,172 filed Nov. 15, 1994.

Conference Login

The description for this section is the same as the description for the section of the same name in U.S. patent application Ser. No. 08/340,172 filed Nov. 15, 1994.

Capability Negotiation

The description for this section is the same as the description for the section of the same name in U.S. patent application Ser. No. 08/340,172 filed Nov. 15, 1994.

Capabilities Structure

The description for this section is the same as the description for the section of the same name in U.S. patent application Ser. No. 08/340,172 filed Nov. 15, 1994.

Requests and Responses

The description for this section is the same as the description for the section of the same name in U.S. patent application Ser. No. 08/340,172 filed Nov. 15, 1994.

CallerCapRequest

The description for this section is the same as the description for the section of the same name in U.S. patent application Ser. No. 08/340,172 filed Nov. 15, 1994.

CallerCapCancel

The description for this section is the same as the description for the section of the same name in U.S. patent application Ser. No. 08/340,172 filed Nov. 15, 1994.

CalleeCapAccept

The description for this section is the same as the description for the section of the same name in U.S. patent application Ser. No. 08/340,172 filed Nov. 15, 1994.

CalleeCapReject

The description for this section is the same as the description for the section of the same name in U.S. patent application Ser. No. 08/340,172 filed Nov. 15, 1994.

CalleeCapResponse

The description for this section is the same as the description for the section of the same name in U.S. patent application Ser. No. 08/340,172 filed Nov. 15, 1994.

Video Negotiation

Conferencing system 100 is able to support different modes of video processing, where each different mode is defined by a set of four parameters:

(1) Bitstream format: the fonnat of the compressed video bitstream (may also imply the techniques used to code and decode the compressed video stream).

(2) Frame rate: the maximum number of video frames per second.

(3) Frame resolutions: the dimensions of the video frames in number of pixels wide and number of pixels high.

(4) Bit rate: the maximum bit rate for the compressed video bitstream.

In a possible embodiment of the present invention, these four parameters are independent and theoretically limitless in variety. In another embodiment, however, the parameters are both limited and dependent. As to the limits to the parameters:

(1) The possible bitstream formats are limited to the so-called IRV bitstream (as defined in FIG. 25) and the so-called MRV bitstream (as defined in this specification in the section entitled "Compressed Multi-Rate Video Bitstream").
(2) The possible maximum frame rates are limited to integer numbers of frames per second from 1 to 30 fps, inclusive.
(3) The possible frame resolutions are limited to (160× 120) and (320×240).
(4) The possible maximum bit rates are limited to 200 kilobits per second (kbps), 90 kbps, and 84 kbps.

As to the interdependency of the parameters, the allowable video modes are limited to a specified set of supported combinations of the four parameters. The set of supported combinations are enumerated in a table in the video subsystem, which identifies the relative preferences for the combinations. For example, a possible table may contain the following supported video mode:

| Choice | Bit Stream | Frame Rate | Resolution | Bit Rate | 32-bit Code |
|--------|-----------|------------|------------|----------|-------------|
| 1st | MRV | 15 fps | (160 × 120) | 200 kbps | 2048 |
| 2nd | MRV | 10 fps | (160 × 120) | 90 kbps | 1024 |
| 3rd | MRV | 10 fps | (160 × 120) | 84 kbps | 512 |
| 4th | IRV | 10 fps | (160 × 120) | 84 kbps | 2 |

Two nodes that want to have a video conference will negotiate with each other to select a video processing mode (i.e., a specific combination of the four parameters) for the conferencing session. In one mechanism for conducting video negotiation, each step in the video negotiation involves one node sending to the other node a capabilities data structure that encodes a particular set of video capabilities. The data structure contains a 32-bit field encoding the capabilities in separate bits, where each bit is a yes/no value for a different combination such as those listed in the previous table. For example, the capabilities for all four video mode choices listed in the previous table may be encoded as follows:

2 ORed with 512 ORed with 1024 ORed with 2048=0× 00000E02

In an alternative embodiment of the present invention, the mechanism for conducting video negotiation between two conferencing systems 100 of FIG. 1 assumes that the four video parameters are in fact independent. Under this mechanism, each step in the video negotiation involves one node sending to the other node a capabilities data structure that encodes a particular set of video capabilities. The data structure contains a 32-bit field, such that:

One byte encodes bitstream formats, where each bit is a yes/no value for a different bitstream format.
One byte encodes a maximum frame rate as an 8-bit value.
One byte encodes frame resolutions, where each bit is a yes/no value for a different frame resolution.
One byte encodes a maximum bit rate as an 8-bit value were the value of the LSB is 2.

For example, the capabilities for all four video mode choices listed above may be encoded as follows:

Bitstream format byte=(00000011), where the LSB indicates that the IRV bitstream is supported and the next LSB indicates that the MRV bitstream is supported.
Frame rate byte=(00001111) corresponding to 15 fps.
Frame resolution byte=(00000001), where the LSB indicates that the (160×120) frame resolution is supported and the next LSB indicates that the (320×240) frame resolution is not supported.
Bit rate byte=(01011111) corresponding to 200 kbps.

In yet another alternative embodiment, video negotiation is based on combinations of bitstream format, maximum fiame rate, and frame resolution, where the maximum bit rate is externally specified.

Figure 47:
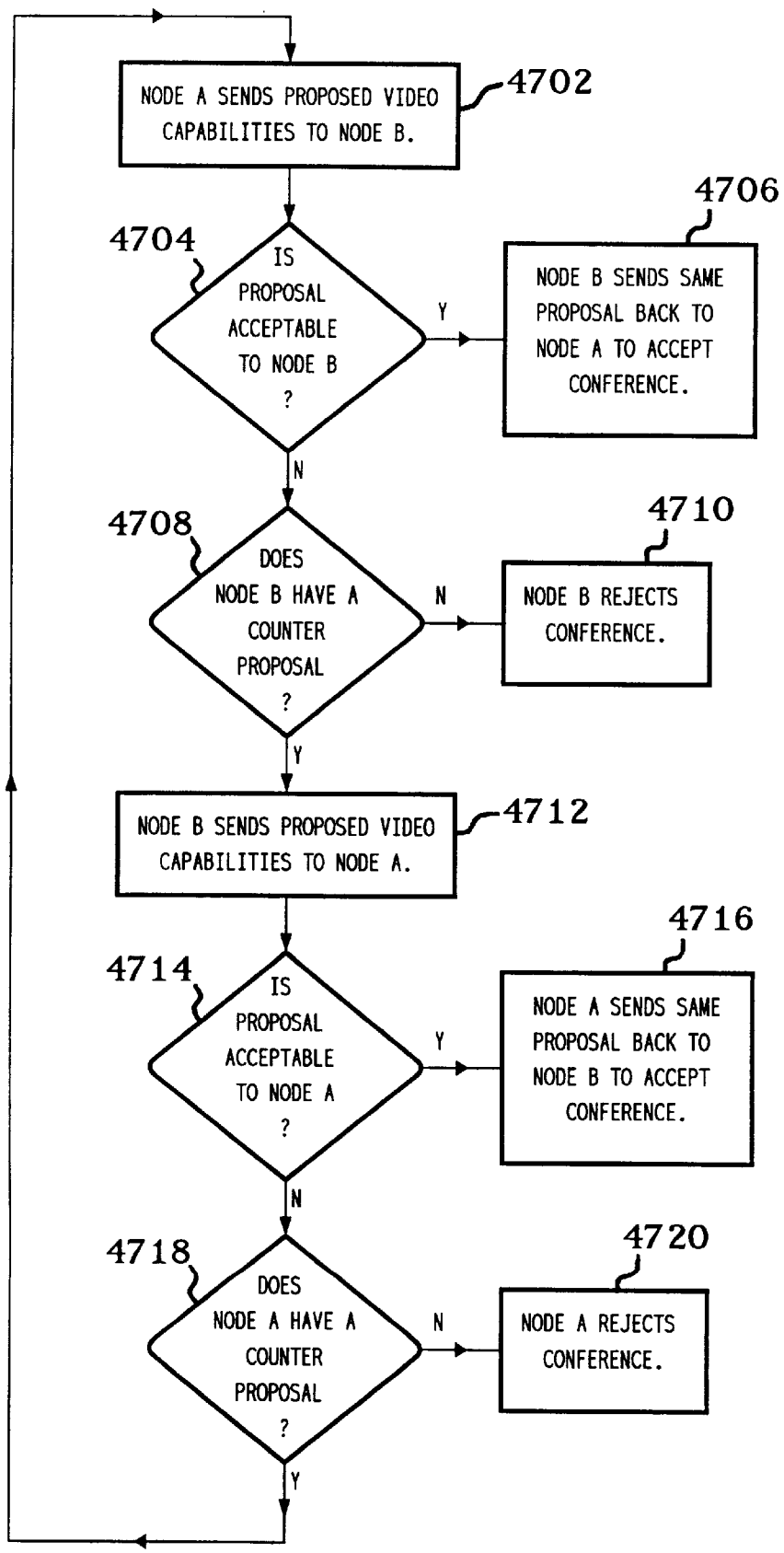
FIG. 47 is a flow diagram of the video negotiation processing between two conferencing systems of FIG. 1.

Referring now to FIG. 47, there is shown a flow diagram of the video negotiation processing between two conferencing systems 100 (i.e., node A and node B) of FIG. 1. Node A sends a negotiation proposal to node B, where the proposal contains a set of capabilities encoded in the 32-bit capabilities data structure as described above (step 4702). If the proposal corresponds to a unique video mode (i.e., the proposed capabilities include only one bitstream format and only one frame resolution) and if that proposed video mode is acceptable to node B (step 4704), then the video negotiations have successfully chosen a video mode acceptable to both nodes and node B sends the same proposal back to node A to accept the video mode for video conferencing (step 4706).

If, however, the proposal is not a unique video mode (e.g., there is more than one bitstrearn format and/or frame resolution) or if the proposal is not acceptable to node B (e.g., frame rate and/or bit rate is too high) (step 4704), node B determines whether it can make a counter proposal to node A (step 4708). A counter proposal is a subset of the capabilities contained in the previous proposal (e.g., lower frame rate or bit rate, fewer bitstream formats or frame resolutions). If node B does not have a counter proposal, then the video negotiations have failed and node B sends node A a message rejecting the conference (step 4710).

If node B does have a counter proposal, then node B sends its counter proposal to node A (step 4712). Steps 4712–4720 are analogous to steps 4702–4710 except that the roles of node A and node B are reversed. The video negotiation processing of FIG. 47 continues until either a mutually acceptable video mode is selected (i.e., successful video negotiation) or nodes A and B are unable to identify a mutually acceptable video mode (i.e., unsuccessful video negotiation).

In an embodiment in which the allowable video modes are contained in a table in the video subsystem, it will be understood that the proposals and counter proposals are constrained to being based on the specific modes in the table.

In theory, the processing within a node for determining whether a proposed unique mode is acceptable and for generating a counter proposal to a particular proposal may depend on one or more of the following influences:

The particular transport(s) that are available (e.g., LAN or ISDN).
The CPU processing bandwidth available for video processing.
The type of hardware installed in conferencing system 100 (e.g., the type of video board 204 of FIG. 2 may influence which bitstream formats are supported).

To a certain extent, these considerations are determined off line when the video subsystem table of mode choices is generated.

Video Manager Negotiation Support

Video manager 516 supports the following three interfaces to support video negotiation.

VSystemAttrMap

DWORD VSystemAttrMap (DWORD, DWORD);

The VSystemAttrMap function takes a DWORD bit rate parameter and a DWORD flags parameter. The bit rate parameter is used by the caller to indicate the maximum communications bandwidth that can be used by a video stream (unidirectional). Units are in kbits per second. The flags parameter is for future use, and is undefined. VSystemAttrMap returns DWORD bitmap used to code a range of video attributes. The returned attributes bitmap is a function of the bit rate specified. For example, the attributes map may differ if the communications media is ISDN or LAN, where the former may allocate approximately 90 kbits for video and the latter may allocate 150–300 kbits for video.

VDecodeAttrMap

VSTATUS VDecodeAttrMap (DWORD, LPVINFO);

The VDecodeAttrMap function decodes bitmap attributes into existing VINFO structure. VDecodeAttrMap takes DWORD bitmap which defines video attributes and a VINFO structure. VDecodeAttrMap modifies (or builds) VINFO structure to reflect the DWORD bitmap defined attributes. The VINFO fields wCaptureFormat, wMaxFrameRate, wWidth, and wHeight may be modified as a result of VDecodeAttrMap. The VINFO structure is of type LOCAL_STREAM. The decode produces a unique VINFO structure, and if the input attributes map defines multiple options, then the best case (latest algorithm, highest frame rate, greatest capture resolution) is chosen.

VNegotiate

DWORD VNegotiate (DWORD, DWORD);

The VNegotiate function carries out a negotiation/comparison between two system attribute maps. VNegotiate takes a DWORD bitmap of a local system and a DWORD bitmap of a remote system. VNegotiate returns a DWORD bitmap that is the result of an internal video manager negotiation of video attributes. If the returned value is zero, then negotiation failed. If the returned value is non-zero, then negotiation was successful and the returned value defines attributes common to the two systems. In order that repeated video negotiation is not required, if a non-zero value is returned, then it represents a unique set of video attributes which can be supported at both endpoints. This interface frees upper layer software (e.g., VCI 506) from interpreting and negotiating defined attribute bitmaps.

The following represents and example of the usage of these video negotiation functions:

```
dwAttributes  = VSystemAttrMap(DWORD)90, (DWORD)0); // ISDN call attempted.
wVStatus      = VDecodeAttrMap(dwAttributes, &stVInfo);
wVStatus      = VOpen(&stVInfo, &hVStrm, . . .);
wVStatus      = VCapture(hVStrm, ON);
wVStatus      = VMonitor(hVStrm, ON);
  . . .
// At call establishment VCI negotiation:
<"begin VCI negotiation" (produces dwRemoteAttributes)>
dwNegotiatedAttributes = VNegotiate(dwAttributes, dwRemoteAttributes);
<"end VCI negotiation">
if (!dwNegotiatedAttributes)    // Common video attributes between endpoints could
                                 not be established. Audio/data call only?
{
      return("Failed negotiation -- Video cannot be established between participants");
}
if (dwNegotiatedAttributes!=dwAttributes)  // Capture stream requires adjustment as a
                                              result of negotiation.
{
      // Rebuild VINFO structure to define new video.
      wVStatus   = VDecodeAttrMap(dwNegotiatedAttributes, &stVInfo);
      wVStatus   = VReOpen(hVStrm, &stVInfo, . . .);
      wVStatus   = VCapture(hVStrm, ON);
      wVStatus   = VMonitor(hVStrm, ON);
}
// Capture stream set correctly, call established, now link out video.
wVStatus = VLinkOut(hVStrm, . . .);
  . . .
```

Participant Information Exchange

The description for this section is the same as the description for the section of the same name in U.S. patent application Ser. No. 08/340,172 filed Nov. 15, 1994.

Caller Attributes and Call Progress

The MakeConnection message contains 64 bytes of user-interpreted data (i.e., a 64-byte field that the user is free to define). A user may use some or all of that field to identify certain attributes of the caller when the caller sends the MakeConnection message to a remote node (callee). These attributes may include the name of the user. In this case, the callee will know who is trying to place a conference call before the conference call is actually accepted by the callee. When the callee is not operating in an auto-answer mode, the callee displays the user-interpreted information contained in the MakeConnection message as part of a dialog box that gives the user of the remote node the option of accepting or rejecting the conference call based on that information.

When a caller attempts to place a conference call to a callee, the duration from the time that the user starts the process (e.g., selecting a "dial the selected phone number" option in a dialog box) until the time that the attempt to place the conference call succeeds or fails may be anywhere from a few seconds to as long as a minute. The caller user is presented with feedback to indicate the progress of the conference call during that duration. Similarly, the callee user is also presented with appropriate call-progress feedback.

The call-progress information presented to the caller user may include audible ringing or a display of simulated ringing (e.g., displaying a graphics image of a phone surrounded by vibration lines). When the attempt to place the conference call is successful, the caller notifies the user with an appropriate graphical display. Since a callee provides a reason code when rejecting a conference call, in that case, the caller displays the reason why the call was rejected to the user.

For the callee, the call-progress information may include a display notifying the callee that a connection has been requested. This display includes the name of the caller user when that information is provided in the user-interpreted data field. The callee also presents a graphical display to the user when the attempt to place the conference call is either successful or unsuccessful, in which case, the caller's reason for rejecting is presented.

Figure 48:
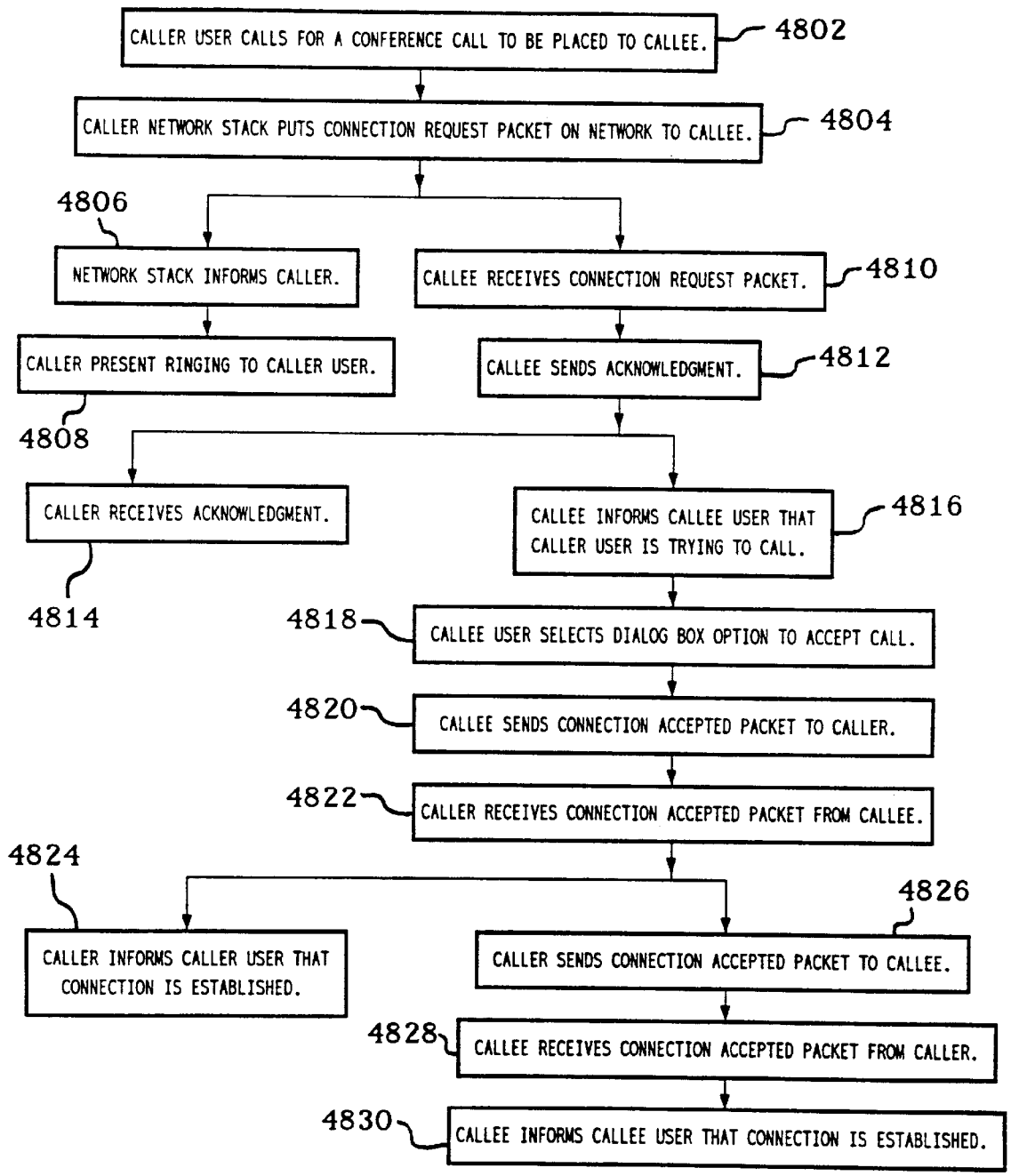
FIG. 48 is a flow diagram of the call-progress processing when the placement of a conference call is successful.

Referring now to FIG. 48, there is shown a flow diagram of the call-progress processing when the placement of a conference call is successful. The call-progress processing of FIG. 48 may be summarized as follows:

The caller user uses a dialog box to ask for a conference call to be placed to the callee (step 4802).

The caller network stack puts a connection request packet on the network to the callee (step 4804). It will be understood that steps 4802 and 4804 include all the necessary inter-layer communications from the caller conferencing application through to the caller network stack as shown in FIGS. 5 and 17.

The network stack informs the caller that the connection request was placed on the network (step 4806).

The caller presents ringing to the caller user (step 4808).

Some time after step 4804, the callee receives the connection request packet over the network (step 4810).

The callee sends an acknowledgment packet for the receipt of the connection request packet over the network to the caller (step 4812).

Some time after step 4812, the caller receives the acknowledgment packet from the callee over the network (step 4814).

After step 4812, the callee informs the callee user that the caller is trying to place a conference call, where the callee identifies the caller user to the callee user (step 4816).

The callee user selects the dialog box option to accept the conference call (step 4818).

The callee sends a connection accepted packet over the network to the caller (step 4820).

The caller receives the connection accepted packet over the network from the callee (step 4822).

The caller informs the caller user that the connection has been established (step 4824).

After step 4822, the caller sends a connection accepted packet back to the callee over the network (step 4826).

The callee receives the connection accepted packet over the network from the caller (step 4828).

The callee informs the callee user that the connection has been established (step 4830).

As shown in FIG. 48, the caller presents ringing to the user (step 4808) after it receives acknowledgment from the network stack that the connection request packet has been placed on the network (step 4806). In an alternative embodiment, the caller waits until after receiving the packet acknowledging receipt of the connection request packet by the callee (step 4814) before presenting ringing to the caller user.

If the callee rejects the conference call from the caller (instead of step 4818), then the callee sends a connection rejected packet to the caller over the network (instead of step 4820). In this case, after the caller receives the connection rejected packet (instead of step 4822), the caller informs the caller user that the conference call was rejected and present the callee's reason for the rejection (instead of step 4824). In this case, steps 4826, 4828, and 4830 are omitted.

Conference Particination Messages

The description for this section is the same as the description for the section of the same name in U.S. patent application Ser. No. 08/340,172 filed Nov. 15, 1994.

Flow Control Over Reliable Channels

Figure 36:
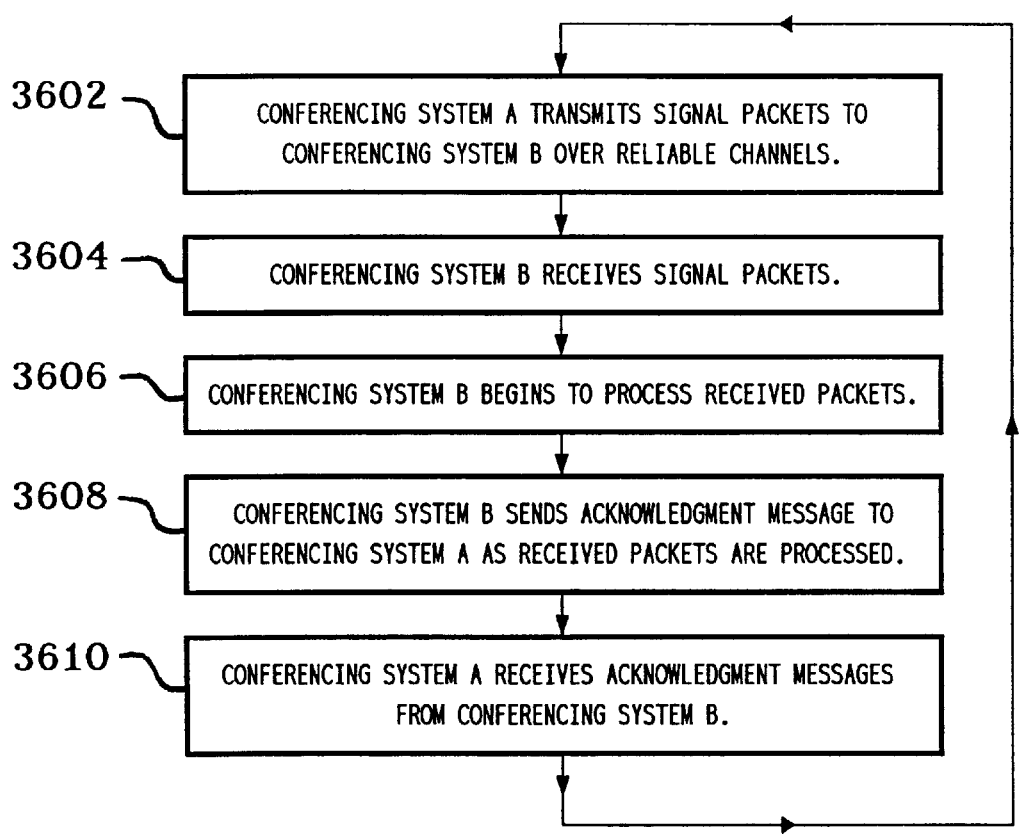
FIG. 36 is a flow diagram of the processing of the conferencing system of FIG. 1 to control the flow of signals over reliable channels.

Referring now to FIG. 36, there is shown a flow diagram of the processing of conferencing systems A and B of FIG. 1 to control the flow of signals over reliable channels. The description for this section is tile same as the description for the section of the same name in U.S. patent application Ser. No. 08/340,172 filed Nov. 15, 1994.

Preemptive Priority-Based Transmission

Figure 37:
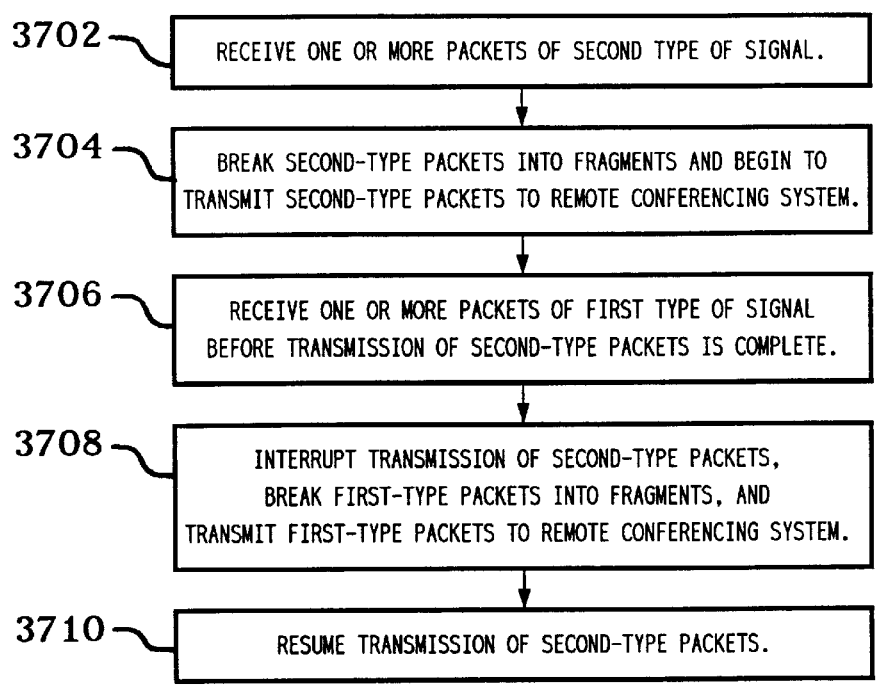
FIG. 37 is a flow diagram of the preemptive priority-based transmission processing implemented by the communications subsystem of the conferencing system of FIG. 1.
Figure 38:
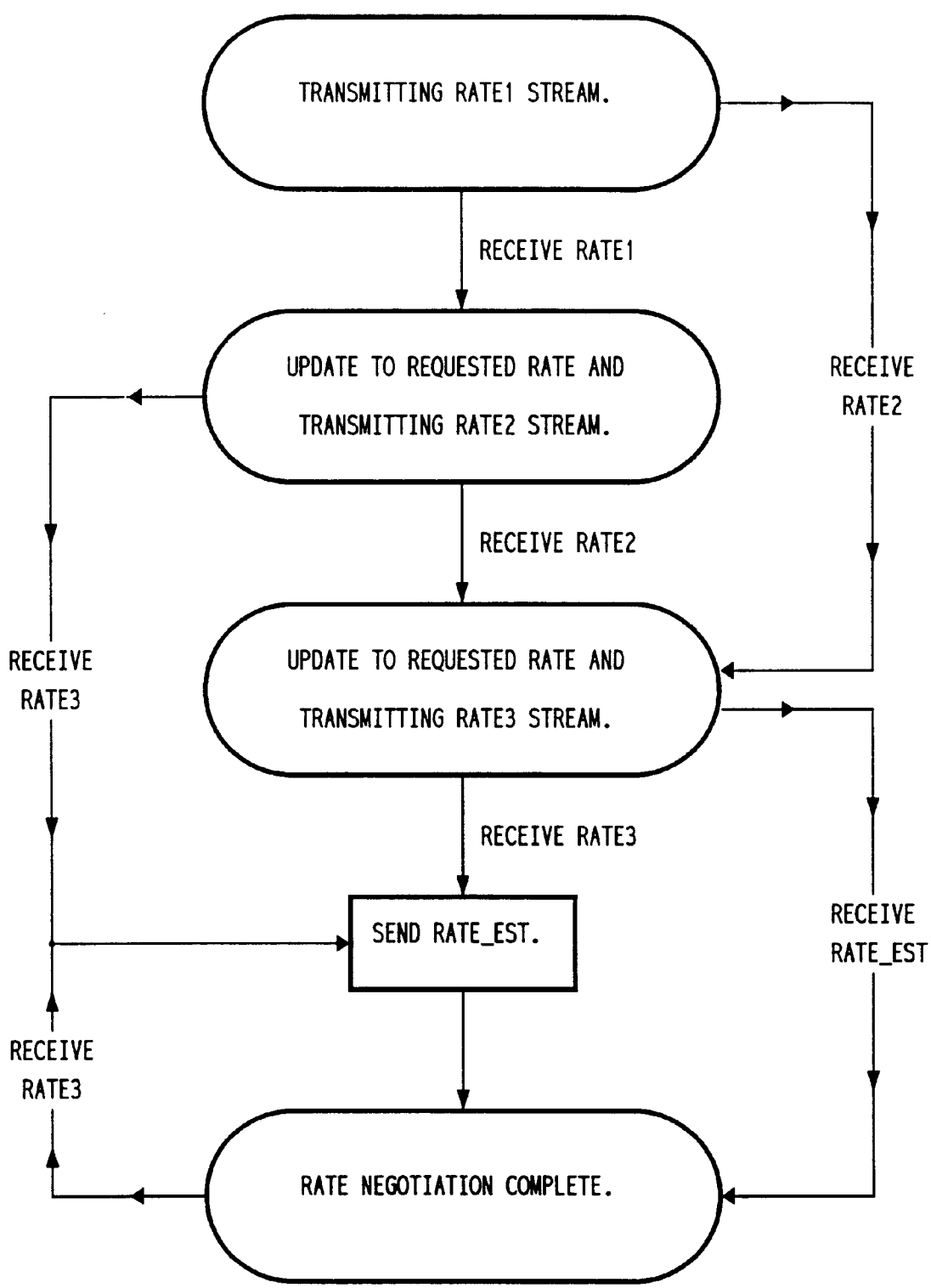
FIG. 38 is a state diagram for the complete rate negotiation processing.
Figure 39:
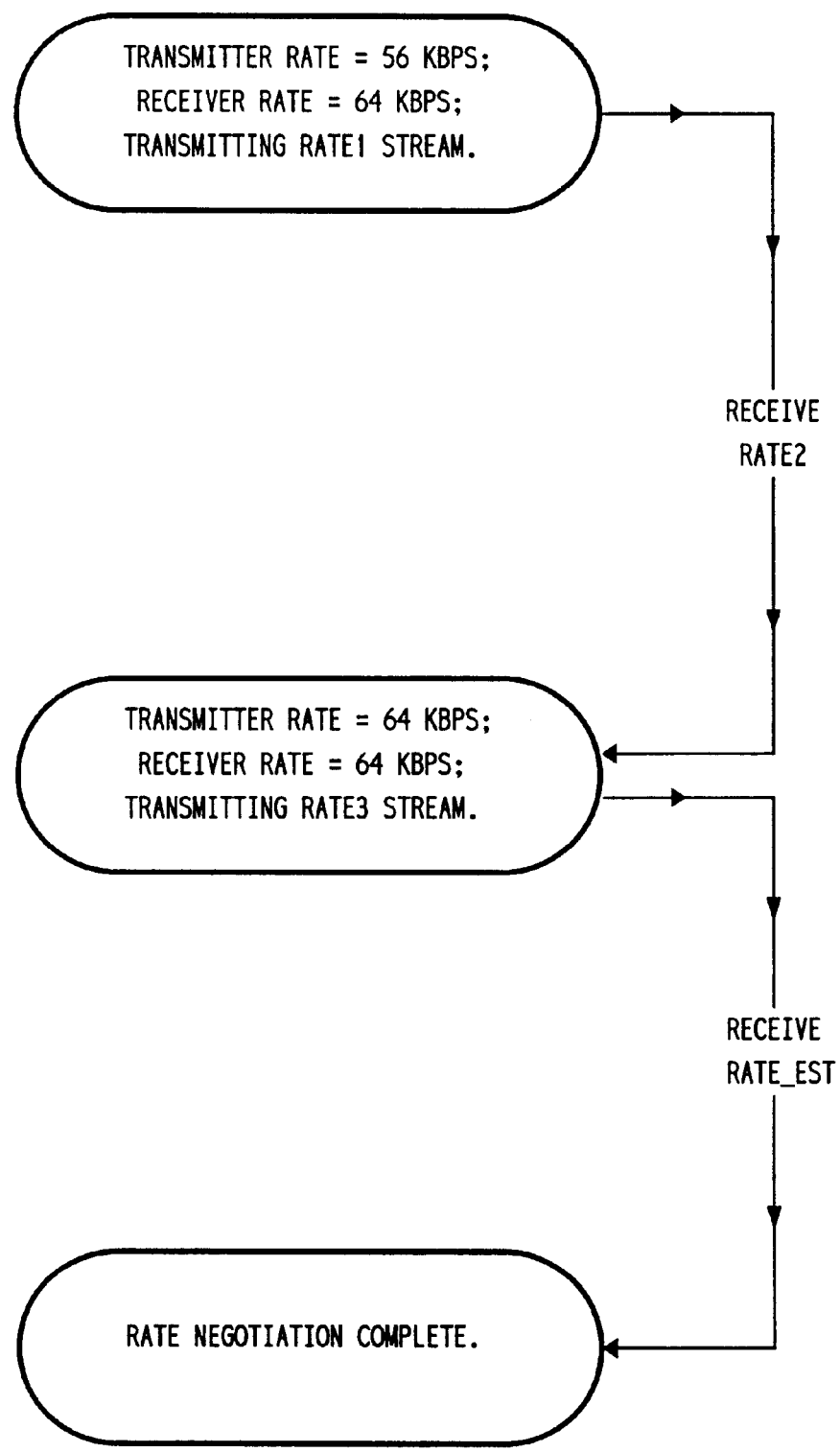
FIG. 39 is a state diagram for the rate negotiation processing for a called node during a 64 KBPS upgrade.
Figure 40:
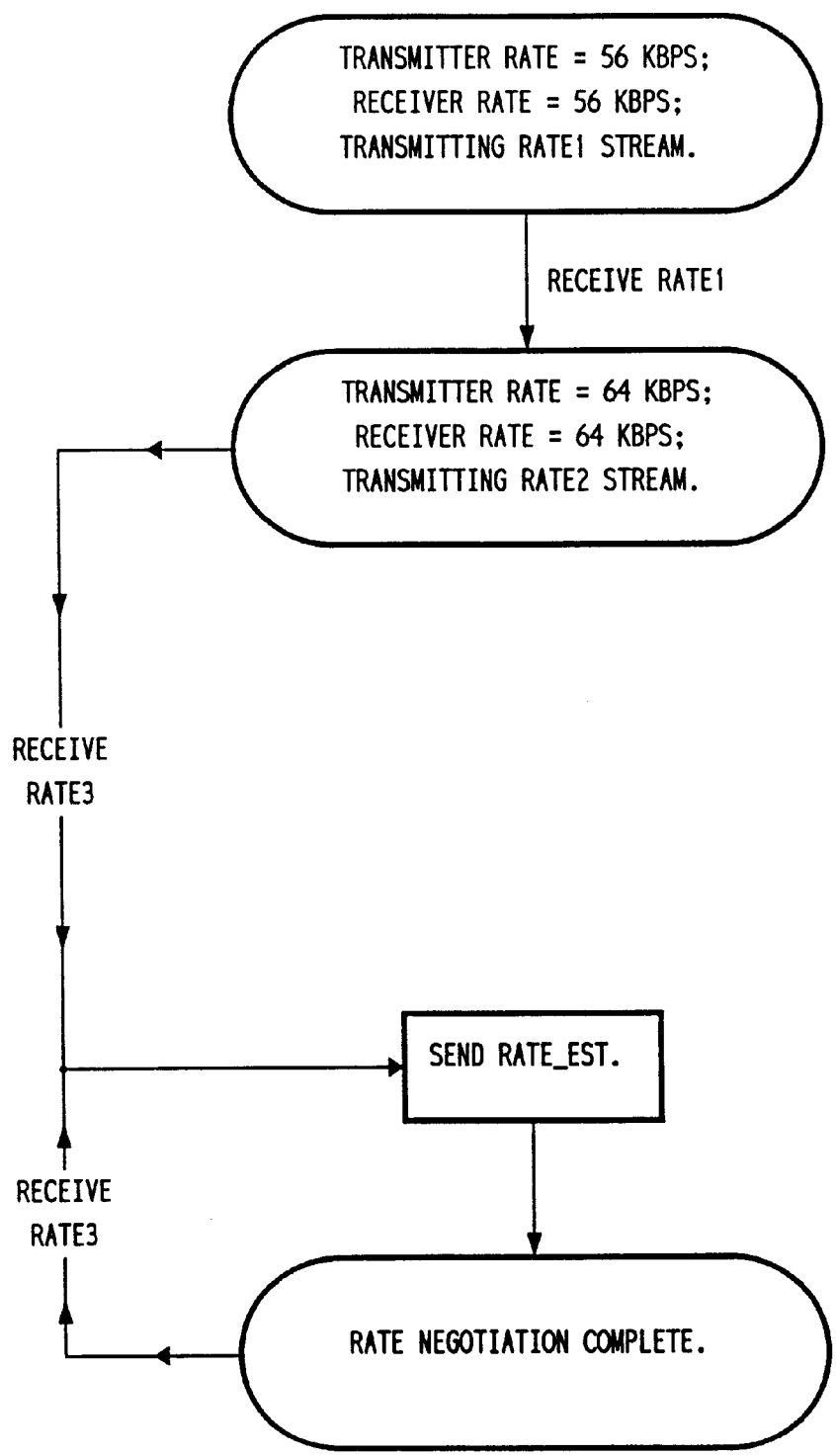
FIG. 40 is a state diagram for the rate negotiation processing for a calling node during a 64 KBPS upgrade.
Figure 41:
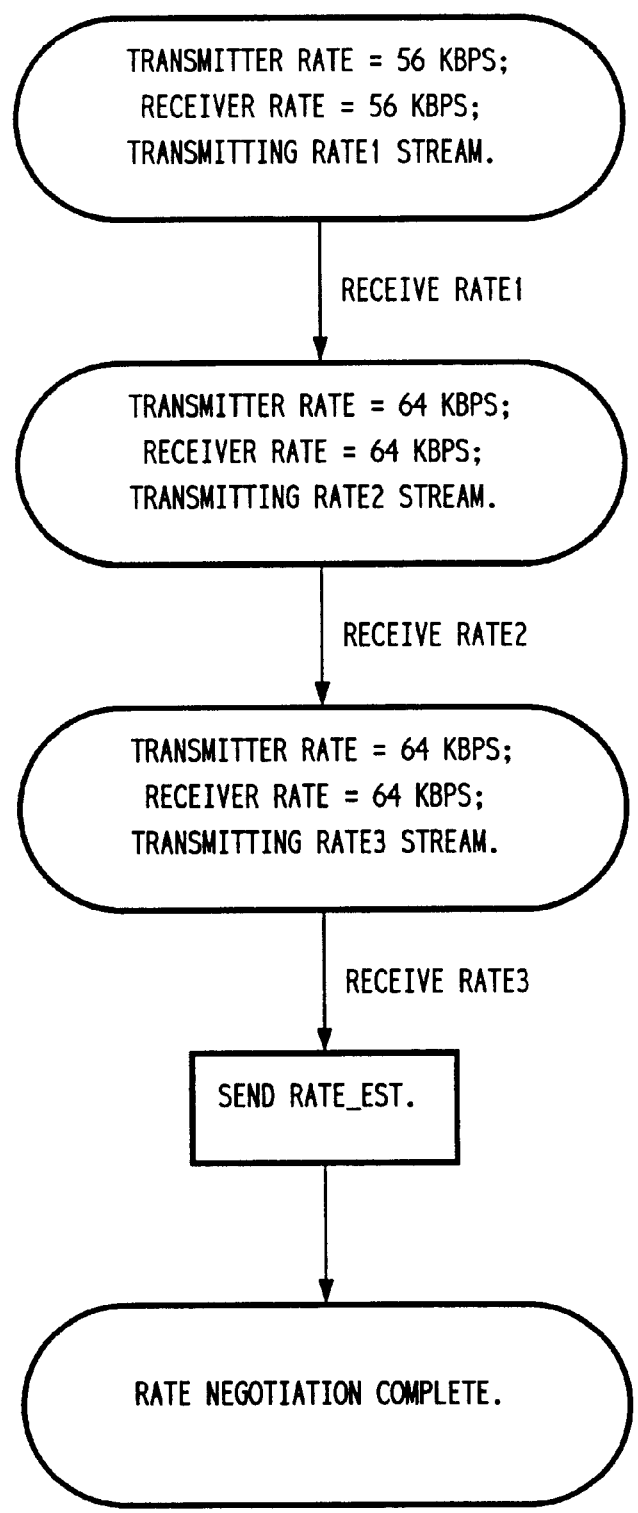
FIG. 41 is a state diagram for the rate negotiation processing in loopback mode during a 64 KBPS upgrade.

Referring now to FIG. 37, there is shown a flow diagram of the preemptive priority-based transmission processing implemented by the communications subsystem of conferencing system 100 of FIG. 1. The description for this section is the same as the description for the section of the same name in U.S. patent application Ser. No. 08/340,172 filed Nov. 15, 1994.

Rate Negotiation

Referring now to FIGS. 38–41, there are shown state diagrams for the rate negotiation processing. The description for this section is the same as the description for the section of the same name in U.S. patent application Ser. No. 08/340,172 filed Nov. 15, 1994.

Dial Lists

The conferencing application presents to the user a dialog box containing an alphabetized directory of possible callees for conferencing sessions. The user is able to initiate a conference call to one or more callees by selecting from the listed callees.

The conferencing systems support the ability to maintain and access different lists of possible callees. For example, there is a network list maintained by a network administrator and a personal list for each conferencing node. The network and personal lists may overlap (i.e., share a subset of possible callees). The node user is able to access and edit (i.e., read/write/delete) her own personal list, but can only access (i.e., read only) the network list and the personal lists of other nodes.

A node user is presented with the option of (1) accessing her personal list only or (2) accessing a combination (i.e., union) of her personal list and one other selected list (i.e., either the network list or the personal list of another node). When the combined list is selected, it is displayed as if it were a single alphabetized list with the callees from the user's personal list identified in some fashion (e.g., displayed in a different color)

Interrupt-Time Processing for Receiving Data Signals

As described earlier in this specification, video conferencing system 100 of FIG. 5 is implemented under a Microsoft® Windows™ operating system running on host processor 202 of conferencing system 100. Host processor 202 of conferencing system 100 receives data signals from and transmits data signals to hardware components that are external to host processor 202. For example, during a LAN-based audio/video conference, host processor 202 receives compressed video signals from video board 204 and compressed audio signals from audio/comm (ISDN) board 206, and transmits these compressed audio and video signals to LAN board 210 for transmission over the LAN to a remote conferencing system. Similarly, LAN board 210 transmits to host processor 202 the compressed audio and video signals which it receives over the LAN from the remote conferencing system. Host processor 202 then transmits the compressed audio signals to audio/comm (ISDN) board 206 for decompression and playback. The compressed video signals are decompressed by host processor 202.

Since host processor 202 is a serial processor, the various software components that run on host processor 202 operate serially, that is, only one software component operates at a time. The operating system of host processor 202 controls the operations of the various software components by establishing a task schedule by which the operating system allocates the processing time of host processor 202 to the software components.

In addition to being a serial processor, host processor 202 is also a preemptive processor. As a preemptive processor, the operating system is able to suspend the implementation of one function by host processor 202 to have host processor 202 perform a second function. After the second function has completed, the operating system causes host processor 202 to resume the implementation of the first function from where it left off.

An external hardware component (e.g., video board 204, LAN board 210, or audio/comm (ISDN) board 206) can ask the operating system to have host processor 202 perform a particular function by sending host processor 202 an interrupt signal. The operating system may cause the requested function to be performed as a scheduled task of the normal task schedule. In this case, the performance of the task is delayed until the operating system schedules the task. Alternatively, the operating system may perform the requested function preemptively. That is, the operating system may cause host processor 202 to suspend what it was doing long enough for host processor 202 to perform the requested function. In this case, the preemptive processing is said to be implemented during interrupt time.

For example, when LAN board 210 receives compressed audio and video signals over the LAN from a remote conferencing system, LAN board sends host processor 202 an interrupt signal to inform host processor 202 that LAN board 210 has received data signals for host processor 202 to process. In order to provide high quality playback during audio/video conferencing (especially for the audio signals), it is important to process the received data signals as quickly as possible. If host processor 202 were to process the received data signals during a normally scheduled task of the operating system, then the resulting quality of the audio/video conference may be relatively low, since there is no guarantee of a scheduled task executing within a reasonable period of time under the Microsoft® Windows™ operating system.

The audio/video conferencing system processes the received audio and video signals preemptively during interrupt time. By processing the received data signals at interrupt time, the audio/video conferencing system is able to provide higher quality audio and video playback than would otherwise be provided if such processing were implemented as a normally scheduled operating system task.

In a possible embodiment of an audio/video conferencing system, the processing of the received audio and video signals could be attempted to be implemented during the "receive" interrupt time that follows the interrupt signal from LAN card 210 which informs host processor 202 that LAN card 210 has received compressed audio and video signals for host processor 202 to process. It has been discovered, however, that, under Microsoft® Windows™ operating systems, when the audio/video conferencing system attempts to process completely the received data signals during the receive interrupt time, there may be undesirable results. For example, the operating system may crash (i.e., cease proper operations).

Figure 49:
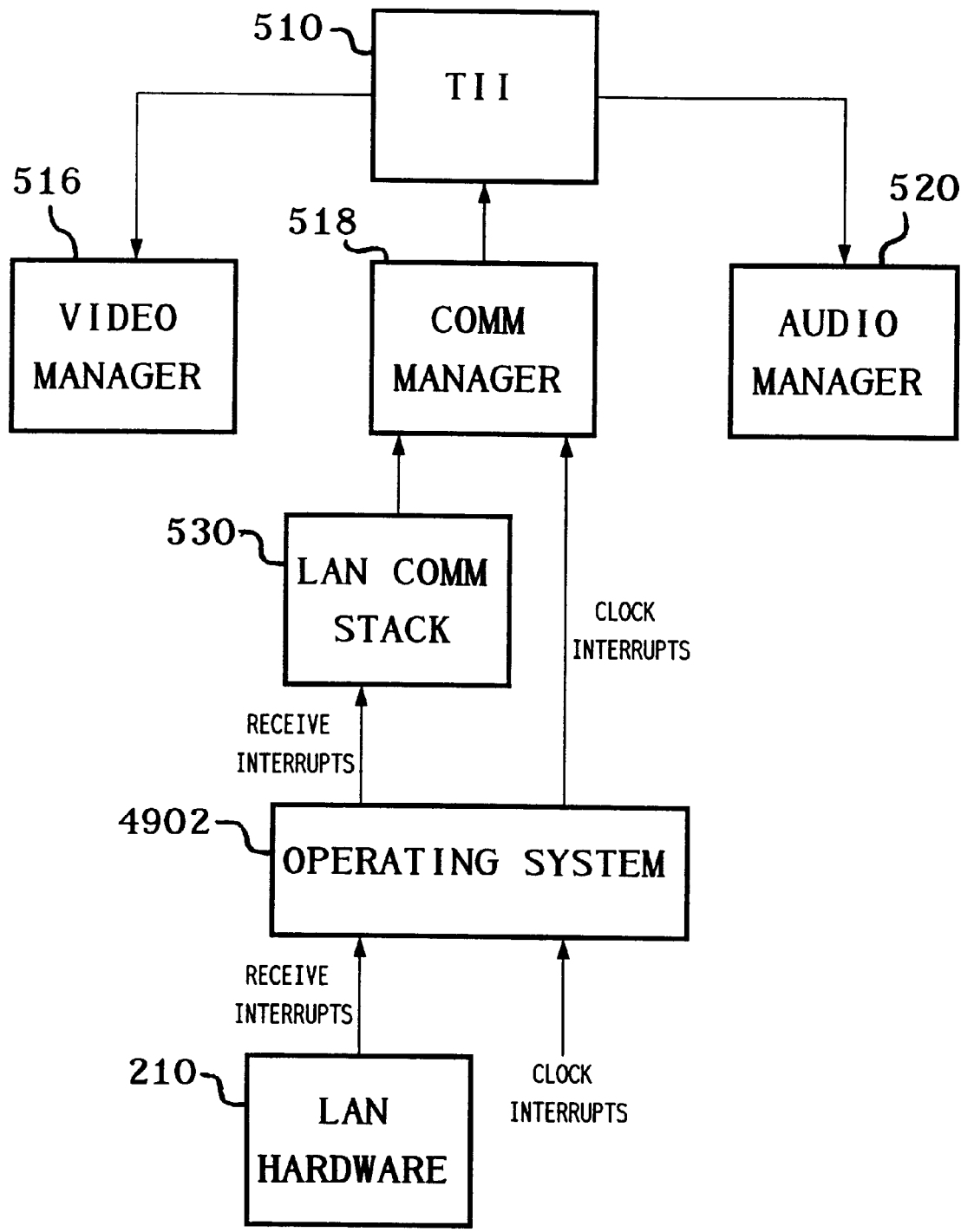
FIG. 49 is a representation of the interrupt-time processing for receiving data signals by the audio/video conferencing system of FIG. 5.

Referring now to FIG. 49, there is shown a representation of the interrupt-time processing for receiving data signals by audio/video conferencing system 100 of FIG. 5. When LAN board 210 sends host processor 202 a receive interrupt signal (i.e., informing operating system 4902 that LAN board 210 has received compressed audio/video signals), operating system 4902 suspends the current processing of host processor 202 and passes the interrupt signal to LAN comm stack 560. LAN comm stack 560 passes the interrupt signal to comm manager 518. Comm manager 518 causes the LAN comm software to read the received data signals from LAN board 210. The LAN comm software passes the received data signals to comm manager 518, which stores the received data signals into a queue in memory for subsequent processing. All of this processing occurs during the receive interrupt time that follows the receive interrupt signal. The interrupt processing then terminates and the operating system causes host processor 202 to resume the processing that had previously been suspended.

Operating system 4902 receives regular clock interrupt signals (e.g., every approximately 10 milliseconds). Operating system 4902 passes these clock interrupt signals to comm manager 518. Comm manager 518 uses the clock interrupt time (which follows a clock interrupt signal) to complete the processing of any received audio and video signals that were queued into memory during the previous receive interrupt time. This clock-interrupt-time processing includes passing the received audio and video signals from the comm manager 518 to the transport independent interface 510, which distributes the audio signals to the audio manager 520 and the video signals to the video manager 516 for decompression and playback processing. After the audio and video signals have been processed, the interrupt processing terminates and the operating system 4902 causes host processor 202 to resume the processing that had previously been suspended.

It has been discovered that this strategy of completing the processing of the received data signals during the clock interrupt time avoids the problems that may be associated with attempting to process completely the received data signals during the receive interrupt time.

Interrupt-Time Processing for Transmitting Data Signals

During a conferencing session, conferencing system 100 generates audio and video signals for transmission to a remote conferencing system. These data signals become available for transmission in discrete packets at discrete moments. That is, the data signals are not generated by conferencing system 100 in a perfectly steady stream. For example, when video signals are generated at a rate of 10 frames per second, a set of compressed video signals corresponding to a video frame is generated once every 100 milliseconds. The set becomes available for transmission only after the entire frame has been compressed. Thus, video signals become ready for transmission in discrete sets at discrete moments.

For typical video frames, each set of compressed video signals is broken up into a plurality of data packets for transmission, for example, over the LAN. If the conferencing system 100 attempted to transmit all of the data packets for a video frame as soon as the data packets were ready, the LAN board would transmit the packets one right after the other with very little time between packets and the remote conferencing system may not be able to receive and process all of the data packets in such a short period of time. As a result, some of the data packets may be dropped by the remote conferencing system causing the quality of the conferencing session to be adversely affected.

Figure 50:
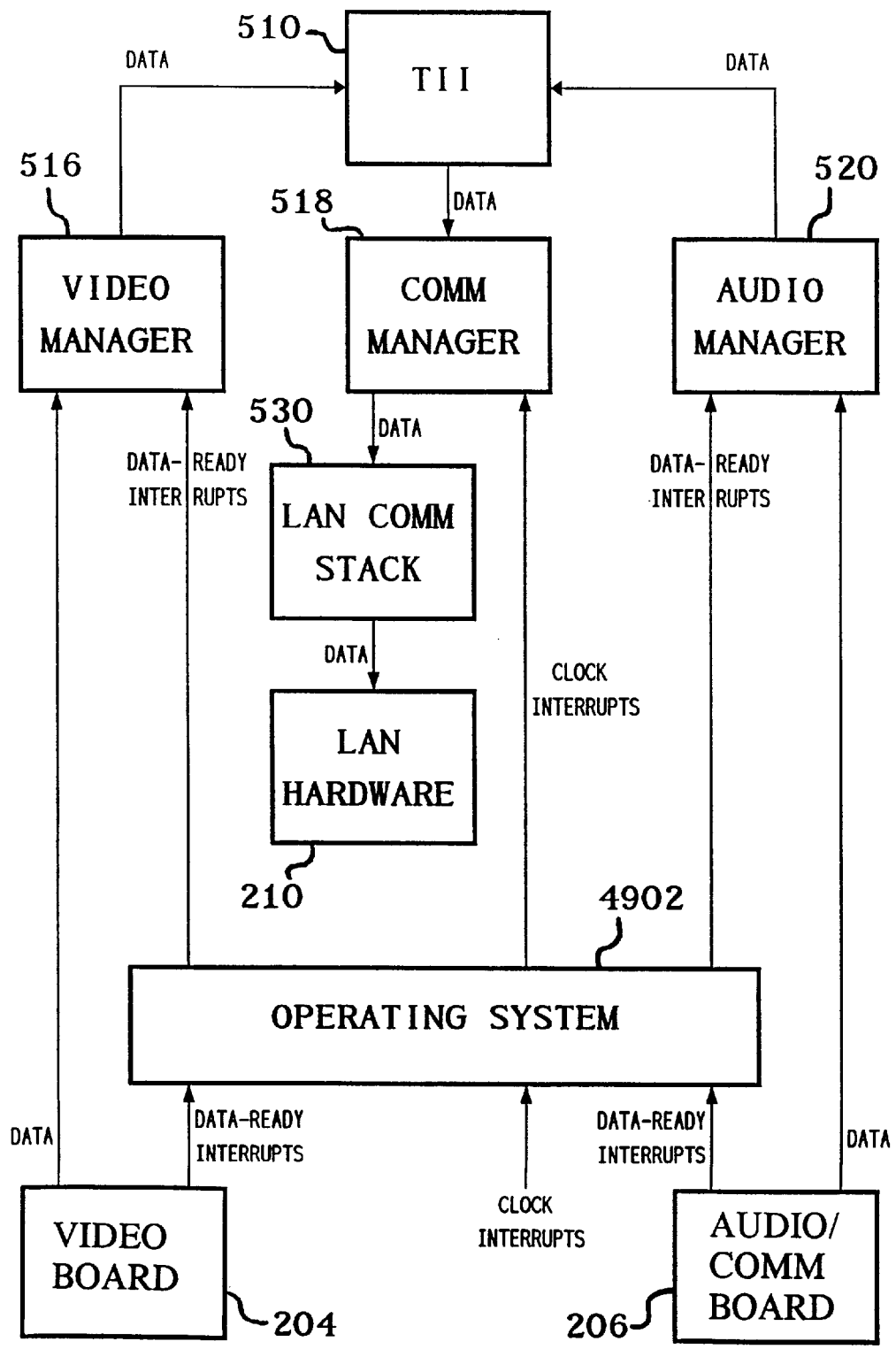
FIG. 50 is a representation of the interrupt-time processing for transmitting data signals by the audio/video conferencing system of FIG. 5.

Referring now to FIG. 50, there is shown a representation of the interrupt-time processing for transmitting data signals by audio/video conferencing system 100 of FIG. 5. Rather than transmitting all of the data packets as soon as they become available for transmission, conferencing system 100 uses the 10-msec clock interrupt signals (described in the previous section of this specification) to spread out the packet transmission.

As shown in FIG. 50, video board 204 sends a "data-ready" interrupt signal to the host processor 202 to inform the operating system 4902 that a set of compressed video signals corresponding to a video frame has been generated. The operating system 4902 passes this interrupt signal to the video manager 516. During the data-ready interrupt time, the video manager 516 reads the compressed video signals from the video board 204 and passes the compressed video signals to the transport independent interface 510. TII 510 passes the compressed video signals to the comm manager 518, which divides the video signals into packets for transmission over the LAN. Analogous processing is implemented for the compressed audio signals generated by the audio/comm (ISDN) board 206.

No packets are sent over the link to the remote conferencing system during the data-ready interrupt time. Rather, packets are sent during the interrupt times that follow the 10-msec clock interrupt signals. When the comm manager 518 receives a clock interrupt signal from the operating system 4902, if there are one or more packets ready to be sent, then the comm manager 518 sends a single packet to the LAN comm software 560 for transmission over the LAN to the remote conferencing system. The result is that the transmission of packets is spread over time with at most one packet being transmitted every 10 msec.

By spreading the transmission of packets over time, the conferencing system 100 increases the probability that the remote conferencing system will have time to receive and process all of the packets. The result is improved quality of the conferencing session due to the reduced number of packet drops by the remote conferencing system.

Those skilled in the art will understand that other embodiments fall within the scope of the present invention. For example, the time period between clock interrupt signals may be other than 10 msec. In addition, the maximum number of packets transmitted during any one clock interrupt time may be other than 1.

Auto Registration and Remote Confidence Testing

Auto registration is a process, along with appropriate mechanisms and utilities, for electronically registering a video conferencing product. The registration information is deposited in a customer support database for registered products. Auto registration is coupled with remote confidence testing, through which customers can test their ISDN line as well as the basic functionality of their conferencing product.

A purpose of auto registration is to collect registration data for the product manufacturer. Auto registration is designed to increase the percentage of customers who register their products by providing an easy and quick user interaction. The auto registration design allows for future changes and expansions.

Figure 51:
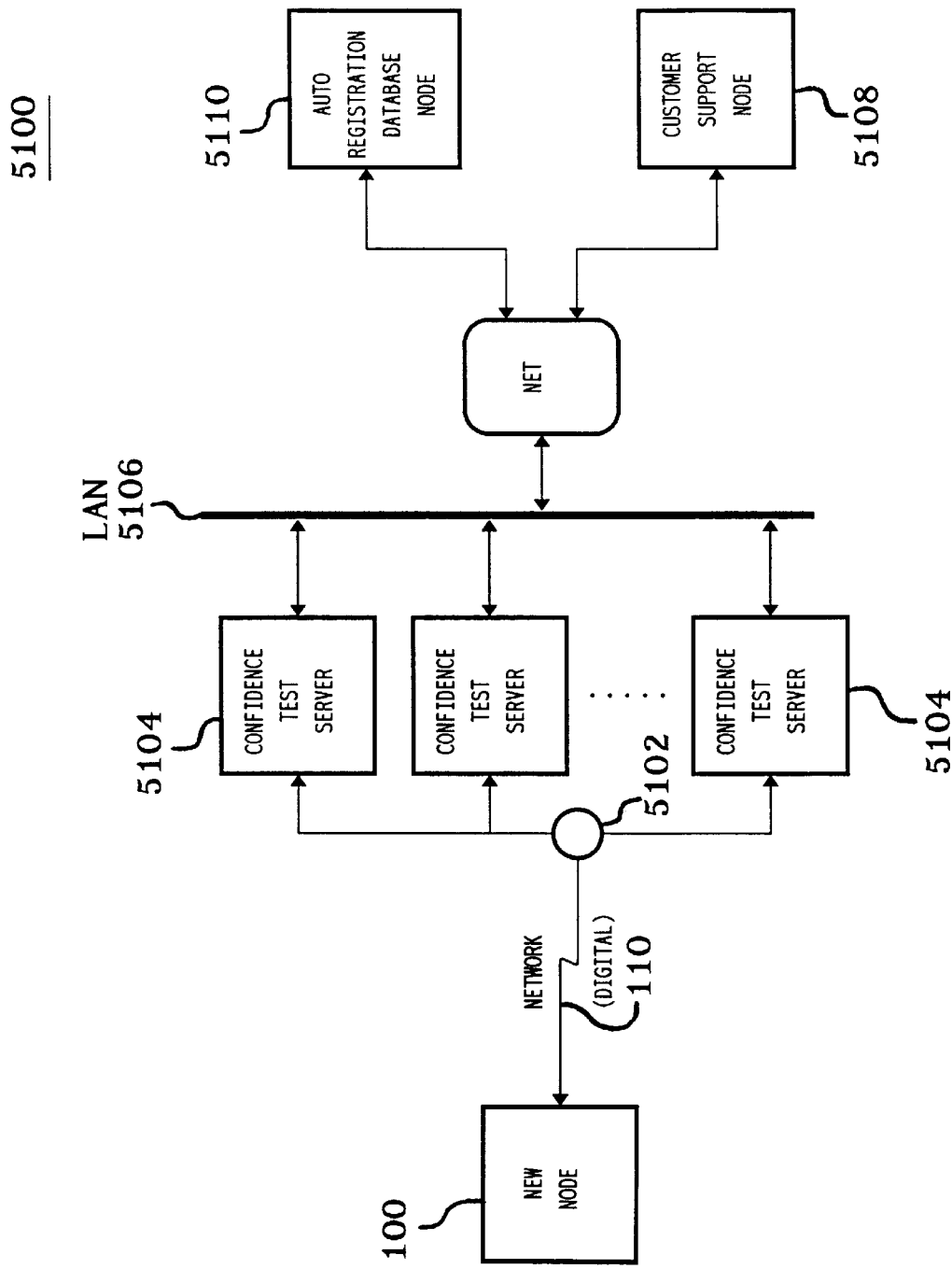
FIG. 51 is a representation of the auto registration environment for video conferencing.

Referring now to FIG. 51, there is shown a representation of auto registration environment 5100 for video conferencing. The auto registration environment 5100 comprises a new video conferencing node 100 connected via network 110 to one more confidence test servers 5104. The confidence test servers 5104 are in turn connected via local area network (LAN) 5106 to a network comprising an auto registration database (ARD) node 5110 and a customer support node 5108. It is assumed that, when network 110 is an ISDN network, the ISDN line is connected to new node 100 and has been tested for functionality by the appropriate regional phone company.

New node 100 is operated by a customer who has purchased a video conferencing product according to the present invention. New node 100 comprises the following components/software packages:

A personal computer with an Intel® i486™/33 MHz processor or higher, VGA monitor or better, and at least 8 megabytes of random access memory (RAM);

An audio/comm (ISDN) board such as audio/comm (ISDN) board 206 of FIG. 2;

A LAN board such as LAN board 210 of FIG. 2;

A video board such as video board 204 of FIG. 2;

Video conferencing system software and video conferencing application software, such as those shown in FIG. 5; and Installation and diagnostics software.

Each confidence test server (CTS) 5104 is a high-speed personal computer with an Intel® i486™ or better processor. The confidence test servers 5104 provide three types of services:

(1) Accepts a registration form from new node 100 and deposits it into the auto registration database of ARD node 5110.

(2) Plays an audio/video segment from a PC/VCR of CTS 5104 to test the basic video conferencing functionality of new node 100. In this case, CTS 5104 behaves exactly like a remote node to the new node. That is, the video and audio streams go through the real-time video conferencing mechanisms that two live nodes would go through.

(3) Downloads an applet (e.g., answering machine software) to new node 100 and installs it in the appropriate directory.

A typical configuration for confidence test server 5104 is as follows:

A personal computer with an Intel® i486™/33 MHz processor or higher, VGA monitor or better, at least 8 megabytes of random access memory (RAM), at least 380 megabytes of hard drive;

An audio/comm (ISDN) board such as audio/comm (ISDN) board 206 of FIG. 2;

A LAN board such as LAN board 210 of FIG. 2;

A video board such as video board 204 of FIG. 2;

A high-speed FAX/Modem 400E (e.g., to dial via a modem into the auto registration database of ARD node 5110);

A 32-bit LAN adapter card;

A personal computer video cassette recorder (PCNCR) connected to the host processor through the serial port:

Video conferencing system software, such as that shown in FIG. 5; and

Microsoft® Windows for Workgroup™ or other appropriate software.

In an auto registration environment having more than one new node 100, all of the new nodes access the confidence test servers 5104 using the same telephone number. In such an environment, when two or more new nodes 100 are simultaneously calling into two or more confidence test servers 5104, hub 5102 dispatches each incoming call to the next available CTS 5104.

A PC/VCR is connected to the communications port of the host processor of each CTS 5104 via a serial line. The PC/VCR plays an audio/video segment (up to approximately 30 seconds long) to the new node. The audio and video signals from the PC/VCR are input to the audio/comm (ISDN) board and the video board, respectively. In an alternative embodiment, a programmable laser disk is used instead of a PC/VCR. In another alternative embodiment, the confidence test server 5104 is able to record the user of the new node in real time and play back the session to the user as part of the confidence testing. In yet another alternative embodiment, a live operator operates the confidence test server 5104 to provide confidence testing services to the new nodes.

In another embodiment, the CTS consists of a PC that plays an audio-video clip recorded in an AVI (audio-video-interleaved) file. The AVI file is played on a PC running Microsoft® Video for Windows™ software. A video capture board is used on this machine to generate NTSC (National Television Standards Committee) video signals. These video signals are then fed as camera input to a CTS.

Auto registration database (ARD) node 5110 provides the auto registration database into which the confidence test servers 5104 deposit the completed registration forms. The confidence test servers 5104 are connected to ARD node 5110 over a local area network, such as LAN 5106, and the registration forms are transmitted from CTS 5104 to ARD node 5110 over the LAN. Alternatively, a modem may be used for the registration form transfer. The registration forms are deposited into the auto registration database of ARD node 5110 as a transaction to assure data integrity.

Figure 52:
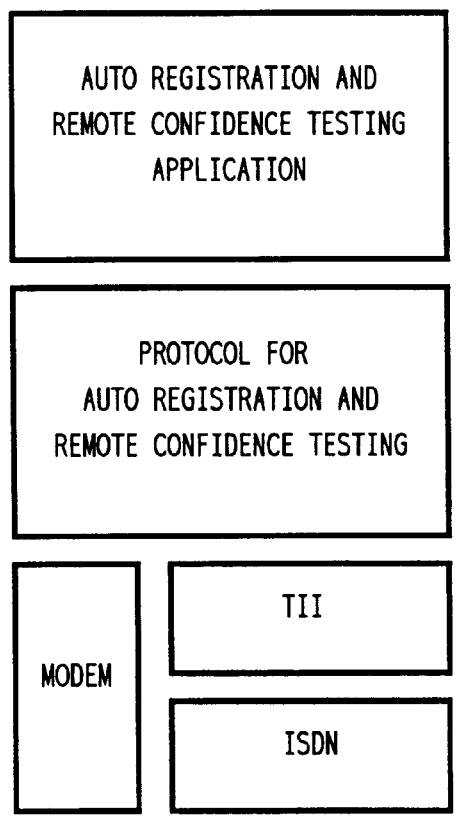
FIG. 52 is a representation of the architecture for auto registration and remote confidence testing for the new node of FIG. 51.

Referring now to FIG. 52, there is shown a representation of the architecture for auto registration and remote confidence testing for the new node of FIG. 51. Auto registration software consists of a library module that manages the registration user interface for all products and independent communication modules that support different communication media such as modem and ISDN. The user interface uses the services of the communication modules in a media-independent fashion through a common communication interface. All the necessary information required to create dialog boxes is stored in two files: the ICOMM.INI file and a product-specific table.

As a step in initialization during setup, ICOMM.INI is created. The registration status for each product may be one of two states: SETUP and REGISTERED. On initialization, the status for each product is set to SETUP. The state SETUP is meant mainly for the case where the system is rebooted. Every time the product application is run, it will read ICOMM.INI to check the registration status. In the case of the first run after a reboot, the registration status will have the entry set to SETUP. This will tell the application that it has to bring up the dialog box. Once the dialog box is invoked, the state SETUP has no more meaning. The complete product status entry will be deleted in both reboot and no reboot cases. Thereon, depending on the choice of the user to register or not, the registration status will be modified.

If the user decides to register and if the registration is successful, then the product status entry is created and its value is set to REGISTERED. If registration fails, then there is no action and the product status entry will not be present. In that case, the next time a standalone auto registration program is run, it will fail to find the product status entry in ICOMM.INI and thereby know that the product was not registered earlier.

Auto registration will be invoked at different times depending on whether installation requires the system to be rebooted or not. If the product requires no additional hardware for installation, then auto registration is called as the last step in the setup process. The user's choice to register or not is recorded in ICOMM.INI. When the main application is started again, ICOMM.INI will be read and if the product status entry is SETUP, the auto registration will be invoked again. The user's new choice will be recorded in ICOMM.INI and registration will proceed if required.

If the system needs to be rebooted after installing any hardware, then auto registration will be called only by the main application and not by setup. The application will read ICOMM.INI and find the product status entry to be set to SETUP. In that case, the application will prompt the user to register. The user's new choice will be recorded in ICOMM.INI and registration will proceed if required.

Figure 53:
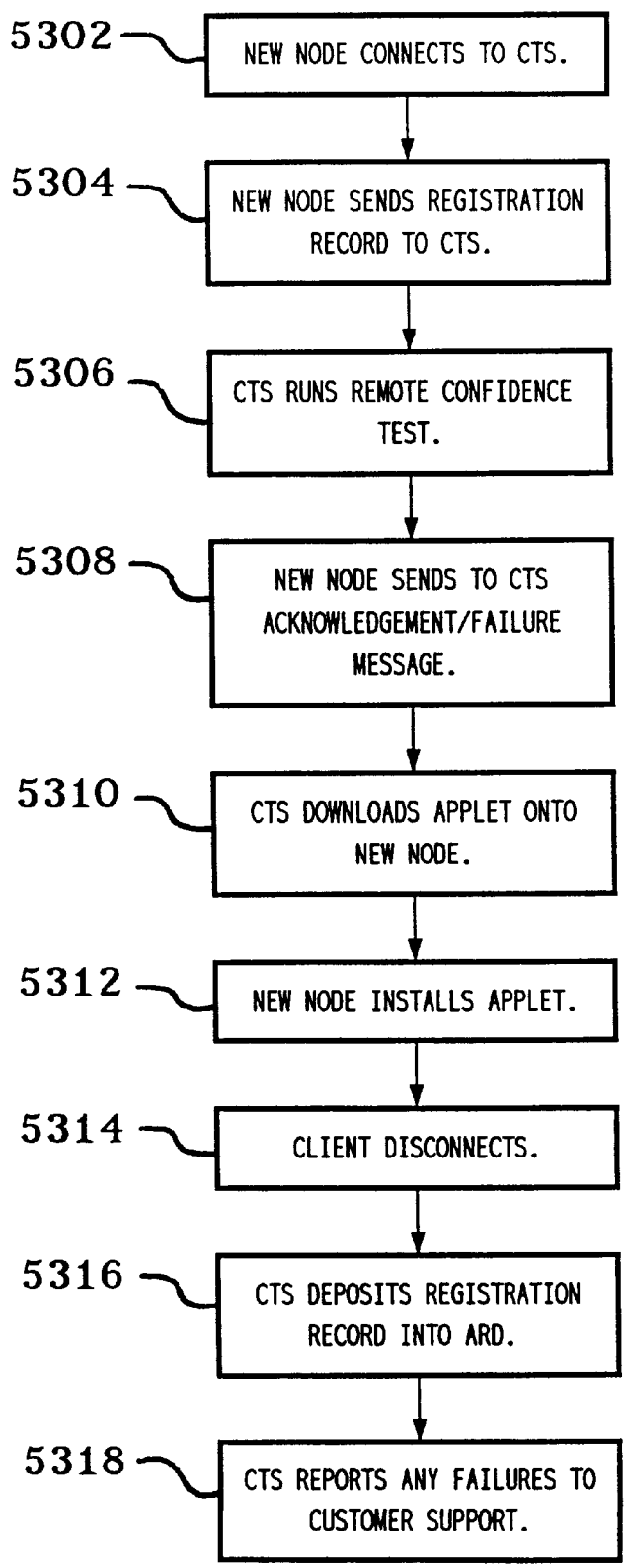
FIG. 53 is a flow diagram of the processing for the auto registration and remote confidence testing of the auto registration environment of FIG. 51.

Referring now to FIG. 53, there is shown a flow diagram of the processing for the auto registration and remote confidence testing of auto registration environment 5100 of FIG. 51. This processing is implemented as a client/server application, where the client is a new node 100 and the server is a confidence test server 5104.

New node 100 places a call to connect to a CTS 5104 (step 5302 of FIG. 53) and transmits a registration record (step 5304). In response, CTS 5104 runs the remote confidence test (step 5306). Depending upon the results of the remote confidence test, new node 100 sends CTS 5104 an appropriate acknowledgement/failure message (step 5308). CTS 5104 may then download a free applet onto new node 100 (step 5310), which installs the applet (step 5312). A purpose of the free applet is to encourage new users to register their nodes. After CTS 5104 disconnects (step 5314), CTS 5104 deposits the registration record into the auto registration database of ARD node 5110 (step 5316) and reports any failures to customer support node 5108 (step 5318).

The processing shown in FIG. 53 may be altered to cover a number of possible alternatives for auto registration, such as:

Auto registration only (i.e., no incentives);
Auto registration+confidence testing;
Auto registration+free applet; and
Auto registration+confidence testing+free applet.

Figure 54:
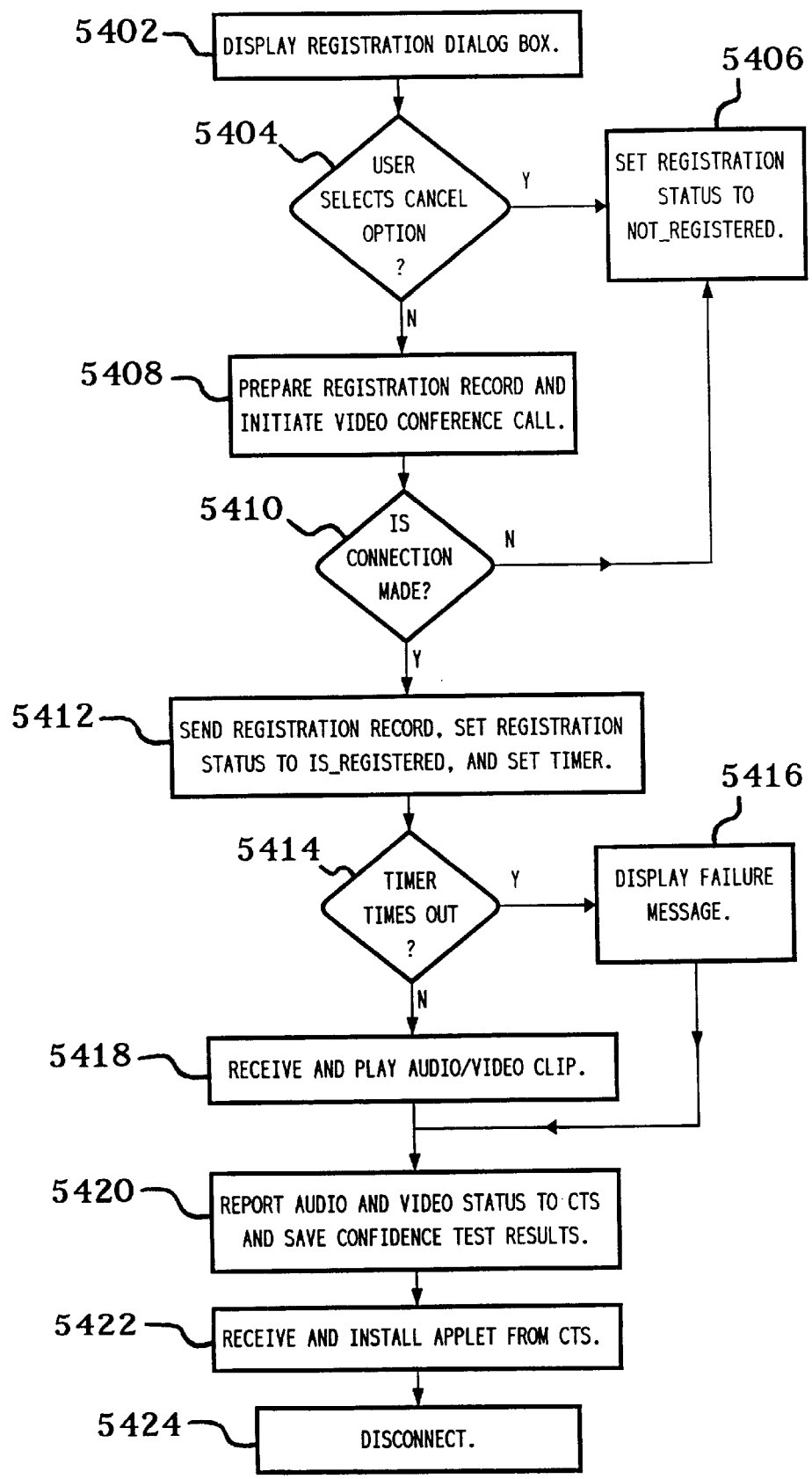
FIG. 54 is a flow diagram of the processing implemented by the client (i.e., a new node) for the auto registration processing of FIG. 53.

Referring now to FIG. 54, there is shown a flow diagram of the processing implemented by the client (i.e., new node 100) for the auto registration processing of FIG. 53. As one of the last steps in installation (or re-installation) and diagnostics for new node 100, a dialog box is displayed to inform the user that he/she may complete the installation by implementing remote confidence testing of the product and registering the product at the same time (step 5402 of FIG. 54). Alternatively, auto registration may be invoked by the main application after the point where the detection of the presence of hardware and drivers is found to be successful. If the user does not want to register the new node 100 and selects the "Cancel" option (step 5404), then the product registration status variable Auto_Reg_State is set to the value NOT_REGISTERED (step 5406) and the auto registration processing is terminated.

If the user does want to register the new node 100 and the "OK" option is selected, then a registration record is prepared (step 5408). A registration record contains user information, extended user information, communications settings, communication port settings, the phone/ISDN number, the product serial number, username/password for server, and the date that the registration record is prepared. The information is stored in the ICOMM.INI file.

User information includes the name, address, phone number, facsimile number, and position of the user. User information is common for the registration of all products of that user. Extended user information, on the other hand, is information that may vary from product to product and includes answers to specific questions posed to the user about the particular product. Extended user information is stored in a separate table for each product.

Communications settings information is the source of information required to set up communications. In the case of modem, it includes port, baud rate, word length, start bits, stop bits, and parity. Communications port settings provides auto registration with information as to how the communications ports are mapped to the PC interrupt request levels. The phone/ISDN number is the server phone number or ISDN number that is to be dialed in order to transmit the registration record.

The product serial number may be stored either on the installation diskettes or in a word in the EEPROM. During setup, the setup program obtains the serial number from the appropriate source and writes it under a SERIAL_NUMBER key in the ICOMM.INI file. Since the serial number in ICOMM.INI may get corrupted, if the user decides to register the product at a time other than during the initial setup, instead of reading the serial number form the ICOMM.INI file, the application is requested to read the serial number form the appropriate source and write it to ICOMM.INI. In other words, the serial number is buffered in ICOMM.INI for auto registration to read.

After the registration record is prepared, the user initiates a video conference call from the new node 100 to confidence test server 5104, using a designated toll-free number (step 5408). If the call is not completed (either because the line is busy or because of a line problem (step 5410), then the product registration status variable Auto_Reg_State is set to the value NOT_REGISTERED (step 5406) and the auto registration processing is terminated.

If the connection to CTS 5104 is established, then the new node 100 sends the registation record to CTS 5104, sets the product registration status variable Auto_Reg_State to the value IS_REGISTERED, sets the confidence test timer, and waits for remote confidence testing (step 5412). If the confidence timer times out without receiving any messages or active streams from CTS 5104 (step 5414), then a failure message is displayed (step 5416) and the auto registration processing continues to step 5420.

Otherwise, the new node 100 receives and renders an audio/video clip from CTS 5104 (step 5418). Dialog boxes are then displayed for the user to report to CTS 5104 the audio and video status of the clip and to save the confidence test results (step 5420). The new node 100 then receives and installs the free applet from the CTS 5104 (step 5422). The new node terminates the auto registration processing by disconnecting from the CTS 5104 (step 5424).

Figure 55:
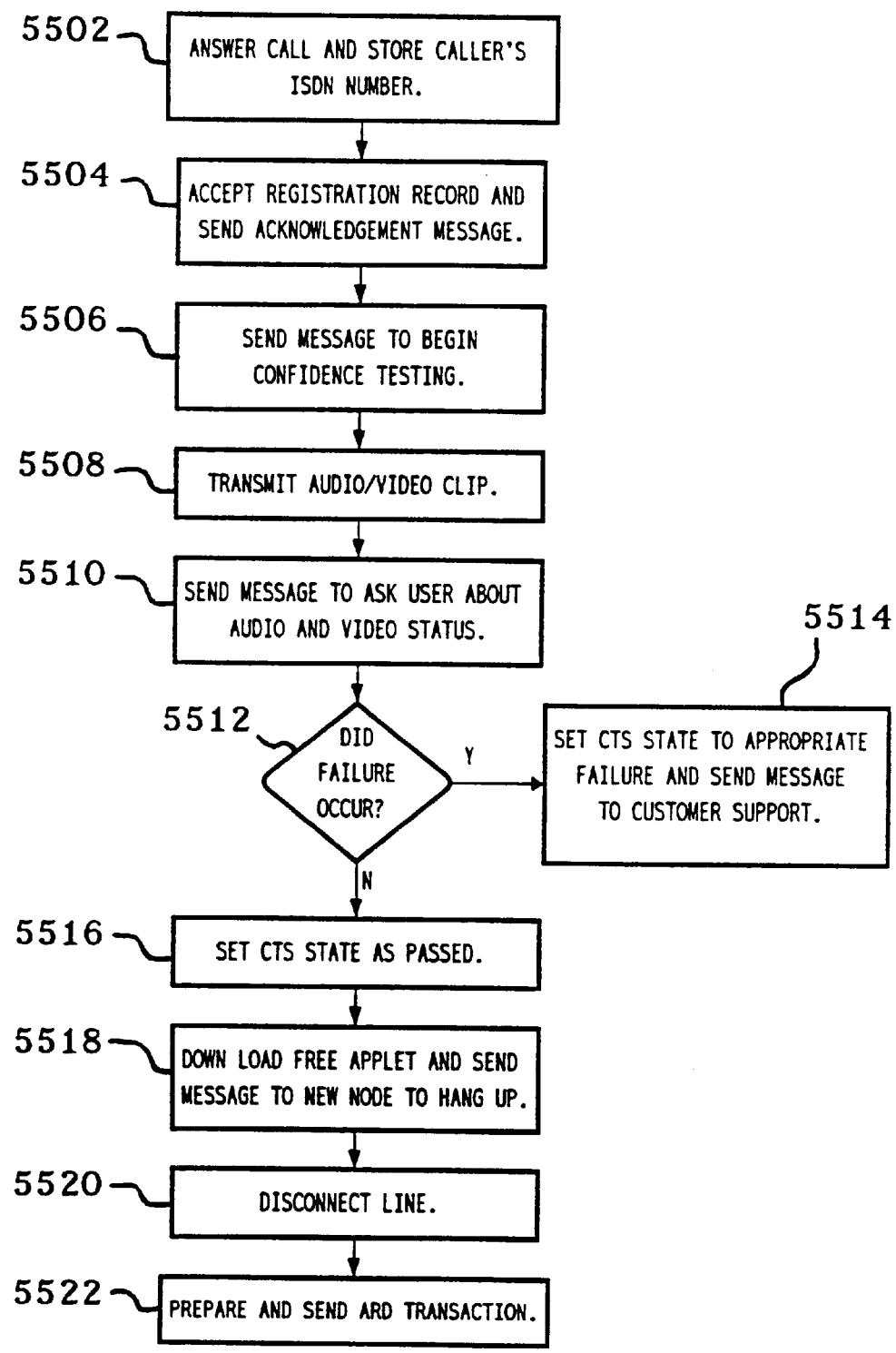
FIG. 55 is a flow diagram of the processing implemented by a confidence test server for the auto registration processing of FIG. 53.

Referring now to FIG. 55, there is shown a flow diagram of the processing implemented by a confidence test server 5104 for the auto registration processing of FIG. 53. The CTS 5104 answers the call from the new node 100 and stores the caller's ISDN number (step 5502 of FIG. 55). The CTS 5104 accepts a registration record from the new node 100 and sends an acknowledgement message to the new node 100 (step 5504). The CTS 5104 starts the confidence testing process bv sending a message to the new node 100 to display the proper instructions to the user (e.g., "Make sure your head set is connected.") (step 5506). The CTS 5104 then transmits the audio/video clip from its PC/VCR to the new node 100 (step 5508).

After the audio/video clip is over, the CTS 5104 a message instructing the new node 100 to question the user for the audio and video status of the clip (step 5510). If the messages returned from the new node 100 indicate there was a failure in either the audio or video streams (step 5512), then the CTS 5104 sets the CTS_State variable to the appropriate value (i.e., AUDIO_FAILURE, VIDEO_FAILURE, or BOTH_FAILED), and prepares and sends a message to the customer support node 5108 (step 5514). If there were no failures, then the confidence test was passed and the CTS_Status variable is set to the value CTS_PASSED (step 5516). The free applet is then downloaded to the new node 100 and a message is sent to instruct the new node 100 to hang up (step 5518). After the line is disconnected (step 5520), the CTS 5104 prepares an auto registration database transaction and sends the ARd transaction to ARD node 5110 (step 5522). The ARD transaction comprises the registration record, the new node's ISDN number, and the confidence test results.

The unique product serial number is stored in a word in the EEPROM of the product hardware. Alternatively, the product serial number may be stored in the installation disks that are shipped with the video conferencing product. In the latter case, the number is then saved in a location in the EEPROM on the audio/comm (ISDN) board.

The product auto registration status variable Auto_Reg_State has one of two values: NOT_REGISTERED and IS_REGISTERED. These values are coded in a word in the EEPROM on the audio/comm (ISDN) board.

The CTS status variable CTS_State stores the results of the confidence testing and has one of four values: AUDIO_FAILURE, VIDEO_FAILURE, BOTH_FAILURE, and CTS_PASSED. The values are coded in a word in the EEPROM on the audio/comm (ISDN) board.

The auto registration and remote confidence testing procedures may be repeated periodically to register and/or validate system upgrades or updates.

Figure 56:
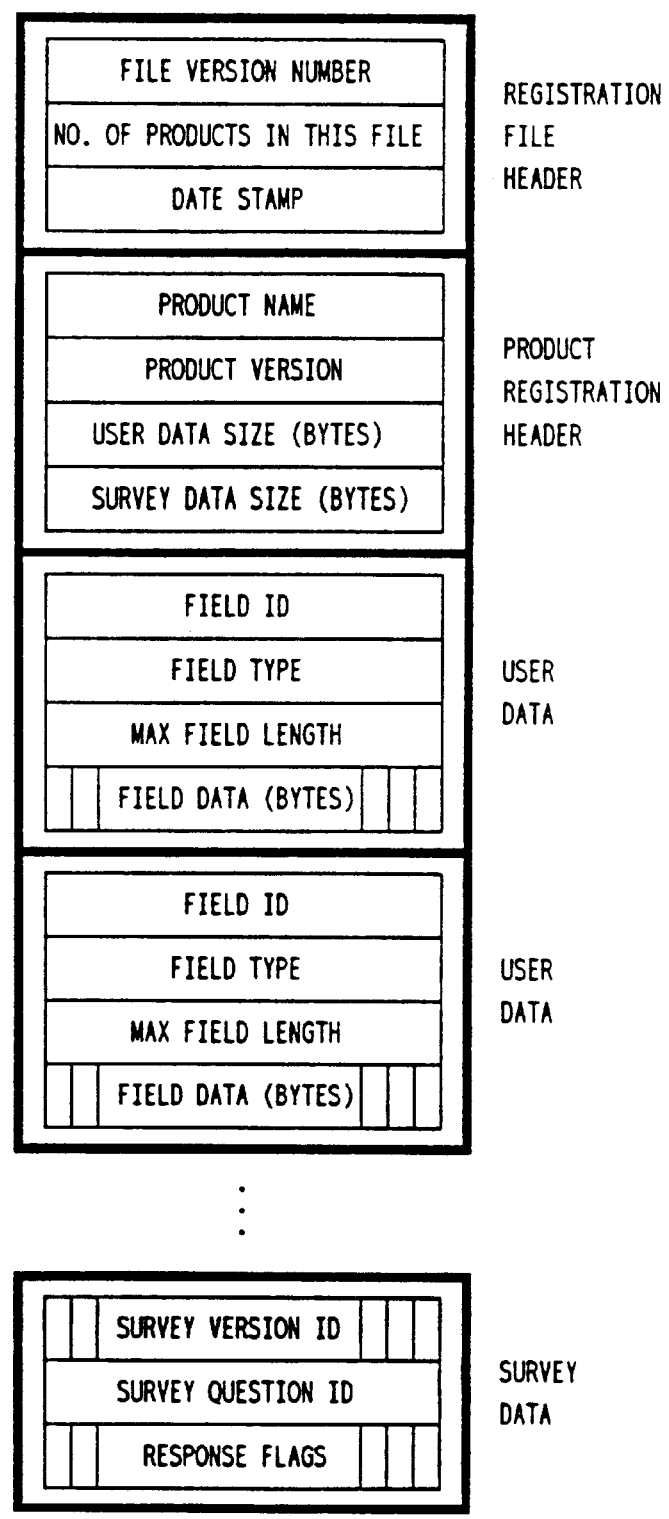
FIG. 56 is a representation of the auto registration file format.

Referring now to FIG. 56, there is shown a representation of the auto registration file format. The auto registration module creates the file "reg.tmp" in the Microsoft Windows™ directory to store user data collected from the main auto registration dialog. The reg.tmp file is a temporary file and is deleted when the user exits the auto registration program. The reg.tmp file is transferred from the new node 100 of FIG. 51 to a confidence test server 5104 via modem using X-modem protocol when successful connection is made.

The reg.tmp file comprises a file header followed by blocks of registration data for every product that is being registered in a particular file transfer. The registration data comprises user information and survey data. If there is no survey dialog for a particular product or if the user does not make any selections in the optional survey, then that block of optional data will not be part of the registration file.

In alternative embodiments of auto registration, automatic software upgrades are provided through the infrastructure of the auto registration and remote confidence testing services described in this section. In other alternative embodiments, use of the ISDN board is disabled until the video conferencing product has been registered using the auto registration described in this section. The fields of the reg.tmp file represented in FIG. 56 are described in Appendix K of this specification. Appendix K also describes the data structures for auto registration.

Alternative Embodiments

The description for this section is the same as the description for the section of the same name in U.S. patent application Ser. No. 08/157,694.

In the embodiment of FIG. 2, conferencing system 100 comprises three separate boards: video board 204, audio/comm (ISDN) board 206, and LAN board 210. Those skilled in the art will understand that alternative embodiments of the present invention may comprise other board configurations. For example, an alternative embodiment may comprises a combined video/audio board (for performing video capture and audio capture and playback), an ISDN board (for transmitting and receiving data over an ISDN network), and a LAN board (for transmitting and receiving data over a LAN network).

It will be further understood that various changes in the details, materials, and arrangements of the parts which have been described and illustrated in order to explain the nature of this invention may be made by those skilled in the art without departing from the principle and scope of the invention as expressed in the following claims.

APPENDIX A: Conference Manager API

The description for this appendix is the same as the description for the appendix of the same name in U.S. patent application Ser. No. 08/340,172 filed Nov. 15, 1994.

APPENDIX B: Conferencing API

This appendix describes the application programming interface for conferencing API (VCI) 506 of FIG. 5. Conferencing API 506 utilizes the following data types:

| | |
|---|---|
| HCALL | Handle to a Call |
| HCHAN | Handle to a Channel |
| HSTRM | Handle to a Stream |
| HSTGRP | Handle to a Stream Group |
| CSTATUS | VCI Function Status Group |
| LPAVCB | Long Pointer to an AVCB |
| LPCCB | Long Pointer to a CCD |
| LPHSTRM | Long Pointer to aSTRM handle |
| LPHSTGRP | Long Pointer to a STGRP handle |
| LPV_CBACK | Long Pointer to V_CBACK structure |
| LPPARTINFO | Long Pointer to a PARTINFO structure |
| ADDR | Address structure, same as TADDR in TII |
| LPADDR | Long Pointer to a ADDR |

Conferencing API 506 utilizes the following structures that are passed to conferencing API 506 in function calls (e.g., CF_Init, CF_CapMon) and then passed by conferencing API 506 to the audio/video managers:

---

V_CBACK (IParam Structure used in Callbacks)
union {
    struct {

| | | |
|---|---|---|
| LPTADDR | lpCallerAddr | Caller address |
| LPCONN_CHR | lpAttributes | Caller connection attributes |
| LPSTR | lpCallerId | Caller id of peer |
| WORD | wCallerIdLen | Length of Caller id |
| WORD | wDenialReasonCode | Reason for denial |
| WORD | wDenialErrorCode | Error causing denial |

```
        } V_ConReq          Connection Requested
        struct {
            LPCONN_CHR      ipAttributes     Peer connection attributes
            LPPARTINFO      lpPartInfo       Peer participant information
            LPBYTE          lpItone          Itone
            LPVINFO         lpVInfo          Video info
        } V_ConAcc          Connection Accepted
        struct {
            DWORD           dwTransId        Channel transaction ID
            HCONN           hCall            Call handle
            LPCHAN_INFO     lpChanInfo       Channel info structure
        } V_ChanReq         Channel Requested
    } V_EV
    } V_CBACK, FAR *LPV_CBACK;
MTYPE
>>  WORD            wField           Media type:
CCB (Configuration Control Block)
>>  WORD            wVersion         Version Number
AVCB (Audio Video Control Block)
>>  WORD            wAVType          Local or remote AVCB type
>>  Union {
            // local AVCB
            struct {
>>              WORD        wAIn         Audio input hardwre source
>>              WORD        wAGain       Gain of the local microphone
>>              WORD        wAMute       On/Off flag for audio muting
>>              WORD        wVIn         Video input source
>>              DWORD       dwVDRate     Maximum video data rate
>>              WORD        wVContrast   Video contrast adjustment
>>              WORD        wVTint       Video tint adjustment
>>              WORD        wVBright     Video brightness adjustment
>>              WORD        wVColor      Video color adjustment
>>              WORD        wVMonitor    On/Off flag for local video monitoring
>>              WORD        wVMute       On/Off flag for local video muting. As the
                                         flag is turned on/off, it will temporily stop or
                                         restart the related operations, including playing
                                         and sending, being performed on this stream
                                         group. This can be temporarily hold one video
                                         stream and provide more bandwidth for other
                                         streams to use. For example, a video stream
                                         can be paused while an audio stream continues,
                                         to speed up a file transfer.
>>          } localcb
            // remote AVCB
            struct {
>>              WORD        wAOut        Audio output hardware destination
>>              WORD        wAVol        Volume of the local speaker
>>              WORD        wAMute       On/Off flag for audio muting
>>              WORD        wVOut        Video output source
>>              WORD        wVContrast   Video contrast adjustment
>>              WORD        wVTint       Video tint adjustment
>>              WORD        wVBright     Video brightness adjustment
>>              WORD        wVColor      Video color adjustment
>>              WORD        wVMute       On/Off flag for local video muting
            } remotecb
>>  }
>>      // ADDR Information - the address to be used for the conf. application to make a
            Connection/call, via issuing the CF_MakeCall with the remote site.
>>      // NOTE: This is the same as the TADDR structure defined by TII.
>>      struct {
>>          WORD        AddressType      Type of Address, e.g.,
                                         phone number, internet address, etc.
>>          WORD        AddressLength    Size of the following address buffer
>>          BYTE        Address[80]      Address buffer
>>      }
CONN_CHR (Connection Characteristics)
    CONNCHARACTS            Structure defined by Comm Subsystem
    WORD    Quality         Quality of the connection
    WORD    BitRate         Maximum bandwidth for connection
PARTINFO (User Participant Information)
    WORD    wUserId             Unique user ID (unused)
    char    Title[10]           Mr, Ms, Mrs, Dr, etc
    char    LastName[64]        Last name
    char    FirstName[64]       First name
    char    JobPosition[64]     Pres, VP, Manager, etc
    char    CompanyName[64]     Company name
    char    Street[80]          Street
    char    City[32]            City
    char    State_Province[32]  State or province name
    char    Zip_PostalCode[32]  Zip code or postal code
```

-continued

```
    char        Country[32]              Country
    char        Email[64]                Email address
    char        Telephone1[32]           Office phone number
    char        Telephone2[32]           Office phone number
    char        Fax[32]                  Fax number
V_CBACK (IParam Structure used in Callbacks)
    union {
        struct {
            LPTADDR         lpCallerAddr    Caller address
            LPCONN_CHR      lpAttributes    Caller connection attributes
        } V_ConReq          Connection Requested
        struct {
            LPCONN_CHR      lpAttributes    Peer connection attributes
            LPPARTINFO      lpPartInfo      Peer participant information
            LPBYTE          lpItone         Itone
        } V_ConAcc          Connection Accepted
        struct {
            DWORD           dwTransId       Channel transaction ID
            HCONN           hCall           Call handle
            LPCHAN_INFO     lpChanInfo      Channel info structure
        } V_ChanReq         Channel Requested
    } V_EV
```

Conferencing API 506 utilizes the following constants:

Conferencing Stream States:

| | |
|---|---|
| CSST_INIT | Init state |
| CSST_ACTIVE | Active state |
| CSST_FAILED | Failure state |

CStatus Return Values:

| | |
|---|---|
| CF_OK | // |
| CF_ERR_CONF_STATE | // Invalid state to make the call |
| CF_ERR_CALL_STATE | // Invalid conference state |
| CF_ERR_CALL_HANDLE | // Invalid call state |
| CF_ERR_STGRP_STATE | // Invalid call handle |
| CF_ERR_STGRP_HANDLE | // Invalid stream group state |
| CF_ERR_AUDIO_STREAM_STATE | // Invalid stream group handle |
| CF_ERR_VIDEO_STREAM_STATE | // Invalid audio stream state |
| CF_ERR_CHAN_STATE | // Invalid video stream state |
| CF_ERR_ADDRESS_NULL | // Invalid channel state |
| CF_ERR_RESOURCE | // Null address/phone number |
| CF_ERR_SESS_NOT_INIT | // Unexpected resource failure - cleanup detected |
| CF_ERR_SESS_INIT | // Transport stack not initialized |
| CF_ERR_MAX_SESS | // Transport stack already initialized |
| CF_ERR_INV_VTHREAD | // Max no. of transport stacks already initialized |
| CF_ERR_FIND_VTHREAD | // Cannot invoke VTHREAD |
| CF_ERR_CALLERID_TOO_BIG | // Cannot find the VTHREAD window |
| | // Caller id too long |

Conferencing Call States:

| | |
|---|---|
| CCST_NULL | Null State |
| CCST_IDLE | Idle State |
| CCST_CONNECThD | Connected state |
| CCST_CALLING | Calling State |
| CCST_ACCEPTING | Accepting State |
| CCST_CALLED | Called state |
| CCST_CLOSING | Closing State |

Conferencing Channel States:

| | |
|---|---|
| CHST_READY | Ready State |
| CHST_OPEN | Opened state |
| CHST_OPENING | Opening state |
| CHST_SEND | Send state |
| CHST_RECV | Recv state |
| CHST_RESPONDING | Responding state |
| CHST_CLOSING | Closing state |

The functions utilized by conferencing API 506 are defined in the following section.

Initialization API Functions

CF_Init

This function initializes the underlying LMI, video, and audio subsystems, and initializes the data structures for the conferencing service. Also, this function allows the application to choose between the messaging and the callback interfaces to return event notifications. The callback interface allows VCI to call a user designated function to notify the application of incoming events. The messaging interface allows VCI to notify the application of incoming events by posting messages to application message queues. The parameters to the function vary according to the notification method chosen.

CStatus CF_Init (LPSTR lpIniFile, WORD wFlag, CALLBACK lpCallBack, LPCCB lpCcb)

Input:

lpIniFile: Pathname to the conferencing INI file.

wFlag: Indicates the type of notification to be used.

| CALLBACK_FUNCTION | for callback interface |
| CALLBACK_WINDOW | for post message interface | lpCallBack: Callback routine or message interface to return the notifications from the remote site to the application.

Output:
  lpCcb: Pointer to the configuration control block, preallocated by the application, that contains configuration information.

Return Value(s):
  CF_OK: successful completion
  CFB_ERR_VCI+CF_ERR_CONF_STATE: VCI already initialized
  CFB_ERR_VCI+CF_ERR_INV_VTHREAD: cannot invoke callback thread
  CFB_ERR_VCI+CF_ERR_FIND_VTHREAD: cannot find the VTHREAD window
  CFB_ERR_LMI+lmi error num: error in LMI Subsystem
  CFB_ERR_VID+vid error num: error in Video Subsystem Valid Call State(s) to Issue:
  CCST_NULL Call State(s) after Execution:
  CCST_IDLE Callback Function:
  FuncName (WORD wMessage, WORD wParam, LONG lParam)
    wMessage: Message Type (CFM_XXXX_NTFY).
    wParam: Call handle.
    lParam: Additional information which is message-specific.

The parameters of the callback function are equivalent to the last three parameters passed to a Microsoft® Windows™ message handler function (Win 3.1).

CF Uninit

This function shuts down the LMI, audio, and video subsystems. If a conference call is in progress, it is gracefully destroyed.

CStatus CF_Uninit (LPCCB lpCcb)

Input:
  lpCcb: Pointer to the configuration control block that contains configuration information.

Return Value(s):
  CF_OK: successful completion
  CFB_ERR_VCI+CF_ERR_CONF_STATE: VCI already uninitialized Valid Call State(s) to Issue:
  CCST_IDLE Call State(s) after Execution:
  Unchanged Status Message:
  CFM_UNINIT_NTFY: Uninitialization complete.

CF InitTransport

This function initializes a transport stack so that conference calls may be made or received on a particular transport. The maximum video bitrate allowed on this transport is saved.

CStatus CF_InitTransport (LPADDR lpLocalAddress, LPCONN_CHR lpConnAttributes, WORD wVideoBitrate)

Input:
  lpLocalAddress: Pointer to the local address.
  lpConnAttributes: Pointer to connection attributes.
  wVideoBitrate: Maximum video bitrate allowed on this transport.

Return Value(s):
  CF_OK: successful completion
  CFB_ERR_VCI+CF_ERR_CONF_STATE: VCI not initialized
  CFB_ERR_VCI+CF_ERR_MAX_SESS: maximum number of transport stacks initialized
  CFB_ERR_VCI+CF_ERR_SESS_INIT: transport stack already initialized
  CFB_ERR_COM+com error num: error in Comm Subsystem
  CFB_ERR_DGCOM+dgcom error num: error in Datagram Comm Subsystem
  CFB_ERR_LMI+lmi error num: error in LMI Subsystem Valid Call State(s) to Issue:
  CCST_IDLE Call State(s) after Execution:
  Unchanged Status Message:
  CFM_INIT_TRANSP_NTFY: Initialization of transport stack complete.

CF UninitTransport

This function uninitializes a transport stack so calls may no longer be made or received on a particular transport.

CStatus CF_UninitTransport (LPADDR lpLocalAddress)

Input:
  lpLocalAddress: Pointer to the local address.

Return Value(s):
  CF_OK: successful completion
  CFB_ERR_VCI+CF_ERR_CONF_STATE: VCI not initialized
  CFB_ERR_VCI+CF_ERR_SESS_NOT_INIT: transport stack not initialized
  CFB_ERR_VCI+CF_ERR_CALL_STATE: a call is in progress on this transport stack
  CFB_ERR_LMI+lmi error num: error in LMI Subsystem Valid Call State(s) to Issue:
  CCST_IDLE Call State(s) after Execution:
  Unchanged Status Message:
  CFM_UNINIT_TRANSP_NTFY: Uninitialization of transport stack complete.

CF ChangeTransportMaxVideoBitrate

This function changes the maximum video bitrate allowed to be sent/received on a particular transport type.

CStatus CF_ChangeTransportMaxVideoBitrate (LPADDR lpLocalAddress, WORD wVideoBitrate)

Input:
  lpLocalAddress: Pointer to the local address.
  wVideoBitrate: Maximum video bitrate allowed on this transport.

Return Value(s):
  CF_OK: successful completion
  CFB_ERR_VCI+CF_ERR_CONF_STATE: VCI not initialized CFB_ERR_VCI+CF_ERR_SESS_NOT_INIT: transport stack not initialized CFB_ERR_VCI+CF_ERR_CALL_STATE: a call is in progress on this transport stack Valid Call State(s) to Issue:
CCST_IDLE Call State(s) after Execution:
Unchanged Call Management API Functions CF MakeCall This function makes a call to the remote site to establish video conferencing. This call will be performed asynchronously. If the call is successful, the local caller's personal information is sent to the peer. When all related operations for CF_MakeCall are complete, the callback routine (or message) specified in CF_Init will receive the result of this call (CFM_ACCEPT_NTFY, CFM_REJECT_NTFY). The peer application will receive a CFM_CALL_NTFY callback/message as a result of this call.

CStatus CF_MakeCall (LPADDR lpAddress, LPCONN_CHR lpConnAttributes, LPPARTINFO lpPartinfo, WORD wCommTimeOut, WORD wCallTimeOut, LPSTR lpCallerId, WORD wCallerIdLen)
Input:
lpAddress: Pointer to the address of the destination.
lpConnAttributes: Pointer to the attributes requested for the call.
lpPartlnfo: Pointer to participant information of the caller.
wCommTimeOut: Number of seconds to wait for peer to pickup the phone.
wCallTimeOut: Number of seconds to allow the call to be established.
lpCallerId: Caller ID string to send to peer with CONN_REQUESTED.
wCallerIdLen: Length of caller ID string.

Return Value(s):
CF_OK: successful completion
CFB_ERR_VCI+CF_ERR_CONF_STATE: VCI not initialized
CFB_ERR_VCI+CF_ERR_ADDRESS_NULL: invalid address
CFB_ERR_VCI+CF_ERR_CALL_STATE: a call is already in progress
CFB_ERR_VCI+CF_ERR_SESS_NOT_INIT: required transport stack not initialized
CFB_ERR_VCI+CF_ERR_CALLERID_TOO_BIG: caller id is too big
CFB_ERR_VID+video error num: error in Video Subsystem
CFB_ERR_COM+comm error num: error in Comm Subsystem Valid Call State(s) to Issue:
CCST_IDLE Call State(s) after Execution:
CCST_CALLING Peer Message:
CFM_CALL_NTFY: Peer is requesting a call.

Status Message:
CFM_ACCEPT_NTFY: Peer process has accepted the call.
CFM_REJECT_NTFY: Call failed.

CF AcceptCall

This function accepts an incoming call request, received as CFM_CALL_NTFY callback/message. The local callee's personal information is sent to the peer. Both sides will receive a CFM_ACCEPT_NTFY callback/message as a result of this call.

CStatus CF_AcceptCall (HCALL hCall, LPPARTINFO lpPartInfo, WORD wCallTimeOut)
Input:
hCall: Handle to the call (returned by the CFM_CALL_NTFY message).
lpPartInfo: Pointer to the participant information of the callee.
wCallTimeOut: Number of seconds to allow the call to be established.

Return Value(s):
CF_OK: successful completion
CFB_ERR_VCI+CF_ERR_CONF_STATE: VCI not initialized
CFB_ERR_VCI+CF_ERR_CALL_STATE: no call to accept
CFB_ERR_VCI+CF_ERR_CALL_HANDLE: invalid call handle
CFB_ERR_VCI+CF_ERR_SESS_NOT_INIT: transport stack not initialized
CFB_ERR VID+video error num: error in Video Subsystem
CFB_ERR_COM+comm error num: error in Comm Subsystem Valid Call State(s) to Issue:
CCST_CALLED Call State(s) after Execution:
CCST_ACCEPTING Peer Message:
CFM_ACCEPT_NTFY: Peer has accepted the call.

Status Message:
CFM_ACCEPT_NTFY: Local accept functionality is complete.

CF RejectCall

This function rejects an incoming call request, received as CFM_CALL_NTFY callback/message. The peer will receive a CFM_REJECT_NTFY callback/message as a result of this call.

CStatus CF_RejectCall (HCALL hCall)
Input:
hCall: Handle to the call (returned by the CFM_CALL_NTFY message).

Return Value(s):
CF_OK: successful completion
CFB_ERR_VCI+CF_ERR_CONF_STATE: VCI not initiaized
CFB_ERR_VCI+CF_ERR_CALL_STATE: no call to reject
CFB_ERR_VCI+CF_ERR_CALL_HANDLE: invalid call handle
CFB_ERR_COM+comm error num: error in Comm Subsystem Valid Call State(s) to Issue:
CCST_CALLED Call State(s) after Execution:
CCST_IDLE Peer Message:
CFM_REJECT_NTFY: Peer has rejected the call.

CF HangupCall

This function hangs up a previously established call. It releases all system resources, including all types of streams, channels, and data structures allocated during this call. Both sides will receive a CFM_HANGUP_NTFY callback/message as a result of this call.

CStatus CF_HangupCall (HCALL hCall)

Input:
  hCall: Handle to the call.
Return Value(s):
  CF_OK: successful completion
  CFB_ERR_VCI+CF_ERR_CONF_STATE: VCI not initialized
  CFB_ERR_VCI+CF_ERR_CALL_STATE: no call to hang up
  CFB_ERR_VCI+CF_ERR_CALL_HANDLE: invalid call handle
Valid Call State(s) to Issue:
  CCST_CONNECTED, CCST_CALLING, CCST_ACCEPTING, or CCST_CALLED
Call State(s) after Execution:
  CCST_CLOSING
Peer Message:
  CFM_HANGUP_NTFY: Peer has hung up the call.
Status Message:
  CFM_HANGUP_NTFY: Local hangup functionality is complete.

CF GetCallInfo

This function returns the current status infonnation of the specified call. CStatus CF_GetCallInfo (HCALL hCall, LPCONN_CHR lpConnAttributes, LPWORD lpwState, LPPARTINFO lpPartInfo)

Input:
  hCall: Handle to the call.
Output:
  lpConnAttributes: Pointer to connection attributes.
  lpwState: Pointer to current call state.
  lpPartInfo: Pointer to peer's participant information.
Return Value(s):
  CF_OK: successful completion
  CFB_ERR_VCI+CF_ERR_CONF_STATE: VCI not initialized
  CFB_ERR_VCI+CF_ERR_CALL_HANDLE: invalid call handle
Valid Call State(s) to Issue:
  All call states
Call State(s) after Execution:
  Unchanged Initialization and Call Management Messages and Callbacks
CFM CALL NTFY Call request from a remote peer; received by the callee.

Returned Parameters:
  wParam HCALL: Handle to the call (to be sent to CF_AcceptCall/CF_RejectCall).
  lParam LPV_CBACK: Pointer to a structure containing incoming call information
Valid Call States To Receive the Notification:
  CCST_IDLE
State after Receiving the Message:
  CCST_CALLED
CFM PROGRESS NTFY
  Call progress information; received by the caller.

Returned Parameters:
  wParam WORD: Sub-substate of the call. Set to null except when lParam=CF_CALL_GOT_PERMISSION.
  lParam DWORD: Substate of the call.
Valid wParam Values:
  CF_CALL_PERM_PERMITTED: permission granted
  CF_CALL_PERM_SEQNOTRESPONDING: permission granted because LANDesk Personal Conferencing Manager (LDPCM) dead
Valid lParam Values:
  CF_CALL_BUSY: working on the call
  CF_CALL_RINGING: call is ringing at destination
  CF_CALL_LCONNECTED: DLM is connected
  CF_CALL_TCONNECTED: TII is connected
  CF_CALL_ROLLBACK: retrying at p112KB
  CF_CALL_REQUESTING_PERMISSION: getting permission from LDPCM
  CF_CALL_GOT_PERMISSION: got permission from LDPCM
  CF_CALL_FAKERINGING: fake call ringing at destination
Valid Call State(s) to receive the notification
  CCST_CALLING
State(s) after receiving the message
  Unchanged
CFM ACCEPT NTFY
  Call request accepted by peer; received by the caller/callee.
Returned Parameters:
  wParam HCALL: Handle to the call.
  lParam LPV_CBACK: Pointer to a structure containing accepted call information
Valid Call States To Receive the Notification:
  CCST_CALLING (caller) or CCST_ACCEPTING (callee)
State after Receiving the Message:
  CCST_CONNECTED
CFM REJECT NTFY
  Call rejected by peer; received by the caller.
Returned Parameters:
  wParam WORD: Reject sub-subcodes of the call. Set to null except when lParam is set to one of the following reject subcodes.
    CF_REJ_PEER_CONN_FAILED (wParam=Comm error code)
    CF_REJ_LMI_INTERNAL_ERROR (wParam=LMI error code)
    CF_REJ_LOCAL_SEQ_CONN_FAILED (wParam=Comm error code)
    CF_REJ_LOCAL_SEQ_CONN_REJECTED (wParam=Comm rejection subcode)
    CF_REJ_LOCAL_SEQ_CALLEE_CONN_FAILED (wParam=Comm error code)
    CF_REJ_LOCAL_SEQ_CALLEE_CONN_REJECTED (wParam=Comm rejection subcode)
  lParam DWORD: Reject subcode of the call.
Valid wParam values
  CF_REJ_TIMEOUT: Comm reject, call timed out
  CF_REJ_ADDRESS: Comm reject, bad address
  CF_REJ_NETWORK_BUSY: Comm reject, network busy
  CF_REJ_STATION_BUSY: Comm reject, destination rejection CF_REJ_REJECTED: Comm reject, call rejected at destination
CF_REJ_NET_ERROR: Comm reject, network failure
CF_REJ_NO_RESPONSE: Comm reject, no response from remote end
CF_REJ_INTERNAL_COMM: Comm reject, internal error in Comm subsystem
CFB_ERR_COM+comm error num: error in Comm Subsystem
CFB_ERR_LMI+lmi error num: error in LMI Subsystem Valid lParam values
CF_REJ_TIMEOUT: Comm reject, call timed out
CF_REJ_ADDRESS: Comm reject, bad address
CF_REJ_NETWORK_BUSY: Comm reject, network busy
CF_REJ_STATION_BUSY: Comm reject, destination rejection
CF_REJ_REJECTED: Comm reject, call rejected at destination
CF_REJ_NET_ERROR: Comm reject, network failure
CF_REJ_NO_RESPONSE: Comm reject, no response from remote end
CF_REJ_INTERNAL_COMM: Comm reject, internal error in Comm subsystem
CF_REJ_PEER_CONN_FAILED: connection to peer failed
CF_REJ_INTERNAL_POST_CONNECT: internal VCI error after connection established
CF_REJ_INTERNAL_PROTOCOL_FAIL: internal VCI error with PCA protocol (post connection)
CF_REJ_LOCAL_SEQ_NOT_BOUND: no local LDPCM binding
CF_REJ_LOCAL_SEQ_NO_BANDWITH: local LDPCM refused permission
CF_REJ_LOCAL_SEQ_LOWER_BW: local LDPCM offe red lower bandwidth
CF_REJ_LMI_RESOURCE_FAILURE: LMI resource failure
CF_REJ_LMI_INTERNAL_ERROR: LMI internal error
CF_REJ_LOCAL_SEQ_CONN_FAILED: connection to LDPCM failed
CF_REJ_LOCAL_SEQ_CONN_REJECTED: connection to LDPCM rejected
CF_REJ_LOCAL_SEQ_INTERNAL_ERROR_SEQ: local LDPCM internal error
CF_REJ_LOCAL_SEQ_CALLEE_CONN_FAILED: connection from LDPCM to callee failed
CF_REJ_LOCAL_SEQ_CALLEE_CONN_REJECTED: connection from LDPCM to callee rejected
CF_REJ_LOCAL_SEQ_CALLEE_IN_CONF: callee already in a conference
CF_REJ_LOCAL_SEQ_TOO_FAST: local LDPCM not done processing last request
CF_REJ_REMOTE_SEQ_NO_BANDWIDTH: remote LDPCM refused permission
CF_REJ_REMOTE_SEQ_LOWER_BW: remote LDPCM offered lower bandwidth Valid Call State(s) to receive the notification
CCST_CALLING
State(s) after receiving the message
CCST_IDLE CFM HANGUP NTFY
Call terminated locally or remotely; received by the caller/callee.
Returned Parameters:
wparam HCALL: Handle to the call.
lParam DWORD: Hangup subcode. May be null.
Valid Hangup Subcode Values:
CF_HANGUP_INTERNAL_POST_CONNECT: internal VCI error after connection established
CF_HANGUP_INTERNAL_PROTOCOL_FAIL: internal VCI error with PCA protocol (post connection)
Valid Call State(s) to Receive the Notification:
CCST_CONNECTED or CCST_CLOSING
State(s) after Receiving the Message:
CCST_IDLE CFM UNINIT NTFY
VCI uninitialized; received by the caller/callee.
Valid Call States To Receive the Notification:
CCST_IDLE
State after Receiving the Message:
Unchanged CFM ERROR NTFY
Error occurred; received by the caller/callee.
Returned Parameters:
lParam DWORD: Error code
Valid Error Code:
CFB_ERR_COM+comm error num: error in Comm Subsystem
Valid Call States To Receive the Notification:
Any Call State
State after Receiving the Message:
Unchanged CFM INIT TRANSP NTFY
Transport stack initialized; received by the caller/callee.
Returned Parameter(s):
wParam WORD: Status code.
lParam LPADDR: Local address.
Valid status codes
CF_OK: successful completion
CFB_ERR_COM+comm error num: error in Comm Subsystem
CFB_ERR_DGCOM+dgcom error num: error in Datagram Comm Subsystem
CFB_ERR_LMI+lmi error num: error in LMI Subsystem
Valid Call State(s) to Receive the Notification:
CCST_IDLE
State(s) after Receiving the Message:
Unchanged CFM UNINIT TRANSP NTFY
Transport stack uninitialized; received by the caller/callee.
Returned Parameter(s):
lParam DWORD: Status code.
Valid Status Code:
CF_OK: successful completion
Valid Call State(s) to Receive the Notification:
CCST_IDLE
State(s) after Receiving the Message:
Unchanged CFM DENIAL NTFY
Call came in but was denied by LDPCM; received by the caller/callee.

Returned Parameter(s):
  lParam LPV_CBACK: Pointer to a structure containing denial information.
    WORD wDenialReasonCode: Reason for denial.
    WORD wDenialErrorCode: Error causing denial.
  The denial error code is only set for the following denial reasons:
    CF_REJ_LMI_INTERNAL_ERROR
      (wDenialErrorCode=LMI error code)
    CF_REJ_LOCAL_SEQ_CONN_FAILED
      (wDenialErrorCode=Comm error code)
    CF_REJ_LOCAL_SEQ_CONN_REJECTED
      (wDenialErrorCode=Comm rejection subcode)
  Valid wDenialReasonCode Values:
    CF_REJ_LOCAL_SEQ_NOT_BOUND: no local LDPCM binding
    CF_REJ_LOCAL_SEQ_NO_BANDWIDTH: local LDPCM refused permission
    CF_REJ_LOCAL_SEQ_LOWER_BW: local LDPCM offered lower bandwidth
    CF_REJ_LMI_RESOURCE_FAILURE: LMI resource failure
    CF_REJ_LMI_INTERNAL_ERROR: LMI internal error
    CF_REJ_LOCAL_SEQ_CONN_FAILED: connection to LDPCM failed
    CF_REJ_LOCAL_SEQ_CONN_REJECTED: connection to LDPCM rejected
    CF_REJ_LOCAL_SEQ_INTERNAL_ERROR_SEQ: local LDPCM internal error
    CF_REJ_LOCAL_SEQ_TOO_FAST: local LDPCM not done processing last request
  Valid wDenialErrorCode Values:
    CF_REJ_TIMEOUT: Comm reject, call timed out
    CF_REJ_ADDRESS: Comm reject, bad address
    CF_REJ_NETWORK_BUSY: Comm reject, network busy
    CF_REJ_STATION_BUSY: Comm reject, destination rejection
    CF_REJ_REJECTED: Comm reject, call rejected at destination
    CF_REJ_NET_ERROR: Comm reject, network falure
    CF_REJ_NO_RESPONSE: Comm reject, no response from remote end
    CF_REJ_INTERNAL_COMM: Comm reject, internal error in Comm subsystem
    CFB_ERR_COM+comm error num: error in Comm Subsystem
    CFB_ERR_LMI+lmi error num: error in LMI Subsystem
Valid Call State(s) to Receive the Notification:
  CCST_IDLE
State(s) after Receiving the Message:
  Unchanged
CFM KILL NTFY
  Call killed by LDPCM; received by the caller/callee.
Returned Parameter(s):
  wParam WORD: Number of minutes before kill.
  lParam LPSTR: Notification message.
Valid Call State(s) to Receive the Notification:
  CCST_CONNECTED
State(s) after receiving the message
  Unchanged
Audio/Video Stream Management API Functions
CF CapMon
  This function starts the capture of video signals from the local camera and displays them in the local video window which is pre-opened by the application. It also starts the capture of audio signals from the local microphone. The monitor function can be turned on/off later using CF_ControlStream calls. This function allows the user to preview his/her appearance before sending the signals out to the peer.
  CStatus CF_CapMon (HWND hWnd, LPHSTGRP lphStgrp, LPAINFO lpAinfo, LPVINFO lpVinfo)
Input:
  hWnd: Handle to the local video window pre-opened by the application.
  lpAinfo: Pointer to AINFO struct passed from the application.
  lpVinfo: Pointer to VINFO struct passed from the application.
Output:
  lphStgrp: Pointer to the handle of a stream group being captured (local stream group).
Return Value(s):
  CF_OK: successful completion
  CFB_ERR_VCI+CF_ERR_CONF_STATE: VCI not initialized
  CFB_ERR_VCI+CF_ERR_RESOURCE: unexpected resource failure
  CFB_ERR_VCI+CF_ERR_STGRP_STATE: invalid stream group state
  CFB_ERR_VCI+CF_ERR_AUDIO_STREAM_STATE: invalid audio stream state
  CFB_ERR_VCI+CF_ERR_VIDEO_STREAM_STATE: invalid video stream state
  CFB_ERR_AUD+audio error num: error in Audio Subsystem
  CFB_ERR_VID+video error num: error in Video Subsystem
Valid Stream Group State(s) to Issue:
  CSST_INIT
Stream Group State(s) after Execution:
  CSST_ACTIVE
CF PlayRcvd
  This function starts the reception and display (via the software play function) of remote video signals in the remote video window which is pre-opened by the application. It also starts the reception and playback of remote audio signals back through the local speakers. The play function that is automatically invoked as part of this function can be later turned on/off by the application by issuing calls to CF_PlayStream. This function can only be correctly invoked after the call is successfully made. Otherwise, CF_ERR_CALL_STATE will be returned.
  CStatus CF_PlayRcvd (HWND hWnd, HCALL hCall, LPHSTGRP lphStgrp, LPAINFO lpAinfo, LPVINFO lpVinfo)
Input:
  hWnd: Handle to the remote video window pre-opened by the application.
  hCall: Handle to the call.
  lpAinfo: Pointer to AINFO struct passed from the application.

lpVinfo: Pointer to VINFO struct passed from the application.
Output:
  lphStgrp: Pointer to the handle of a stream group being received (remote stream group).
Return Value(s):
  CF_OK: successful completion
  CFB_ERR_VCI+CF_ERR_CONF_STATE: VCI not initialized
  CFB_ERR_VCI+CF_ERR_CALL_STATE: no call in progress
  CFB_ERR_VCI+CF_ERR_CALL_HANDLE: invalid call handle
  CFB_ERR_VCI+CF_ERR_RESOURCE: unexpected resource failure
  CFB_ERR_VCI+CF_ERR_STGRP_STATE: invalid stream group state
  CFB_ERR_VCI+CF_ERR_AUDIO_STREAM_STATE: invalid audio stream state
  CFB_ERR_VCI+CF_ERR_VIDEO_STREAM_STATE: invalid video stream state
  CFB_ERR_AUD+audio error num: error in Audio Subsystem
  CFB_ERR_VID+video error num: error in Video Subsystem
Valid State(s) to Issue:
  call state: CCST_CONNECTED
  stream group state: CSST_INIT
State(s) after execution
  call state: Unchanged
  stream group state: CSST_ACTIVE CF PlayStream
  This function starts or stops playing the captured video and audio streams of a specified stream group (always remote).
  CStatus CF_PlayStream (HWND hWnd, HSTGRP hStgrp, WORD wAVFlag)
Input:
  hWnd: Handle to the playback window pre-opened by the application.
  hStgrp: Handle to the stream group to be modified.
  wAVFlag: Start/stop flag.
    AUDIO_ON
    AUDIO_OFF
    VIDEO_ON
    VIDEO_OFF
    AV_ON (VIDEO_ON|AUDIO_ON)
    AV_OFF (VIDEO_OFF|AUDIO_OFF)
    AON_VOFF (VIDEO_OFF|AUDIO_ON)
    AOFF_VON (VIDEO_ON|AUDIO_OFF)
Return Value(s):
  CF_OK: successful completion
  CFB_ERR_VCI+CF_ERR_CONF_STATE: VCI not initialized
  CFB_ERR_VCI+CF_ERR_STGRP_HANDLE: invalid stream group handle
  CFB_ERR_VCI+CF_ERR_RESOURCE: unexpected resource failure
  CFB_ERR_VCI+CF_ERR_STGRP_STATE: invalid stream group state
  CFB_ERR_VCI+CF_ERR_AUDIO_STREAM_STATE: invalid audio stream state
  CFB_ERR_VCI+CF_ERR_VIDEO_STREAM_STATE: invalid video stream state
  CFB_ERR_AUD+audio error num: error in Audio Subsystem
  CFB_ERR_VID+video error num: error in Video Subsystem
Valid Stream Group State(s) to Issue:
  CSST_ACTIVE
Stream Group State(s) after Execution:
  Unchanged CF RecordStream
  This function starts or stops recording captured video and audio streams of a specified stream group into a specified file. The only supported file format is an audio-video-interleaved (AVI) File. Also, recording streams in a file will overwrite, instead of append, to an existing file.
  CStatus CF_RecordStream (HWND hWnd, HSTGRP hStgrp, WORD wFormat, WORD wFlag, LPSTR lpFile)
Input:
  hWnd: Handle to the window pre-opened by the application.
  hStgrp: Handle to the stream group to be modified.
  wFormat: File format for recording.
  wFlag: Start/stop flag.
    AUDIO_ON
    AUDIO_OFF
    VIDEO_ON
    VIDEO_OFF
    AV_ON (VIDEO_ON|AUDIO_ON)
    AV_OFF (VIDEO_OFF|AUDIO_OFF)
    AON_VOFF (VIDEO_OFF|AUDIO_ON)
    AOFF_VON (VIDEO_ON|AUDIO_OFF)
  lpFile: Pathname to the AVI file to record the A/V streams.
Return Value(s):
  CF_OK: successful completion
Valid Stream Group State(s) to Issue:
  All stream group states
Stream Group State(s) after Execution:
  Unchanged CF ControlStream
  This function sets the parameters to control the capture or playback functions of the local or remote audio/video stream groups.
  CStatus CF_ControlStream (HStGrp hStgrp, WORD wField, LPAVCB lpAvcb)
Input:
  hStgrp: Handle to a stream group to be modified.
  wfield: Field of the AVCB to be modified.
  lpAvcb: Pointer to the AVCB.
Return Value(s):
  CF_OK: successful completion
Valid Stream Group State(s) to Issue:
  All stream group states except CSST_INIT
Stream Group State(s) after Execution:
  Unchanged CF GetStreamInfo
  This function returns the current stream group state and the AVCB, preallocated by the application, of the specified stream group.
  CStatus CF_GetStreamInfo (HSTGRP hStgrp, LPWORD lpwSstate, LPAVCB lpAvcb)
In put:

hStgrp: Handle to a stream group.
Output:
  lpwState: The current application state.
  lpAvcb: The pointer to the AVCB preallocated by the application.
Return Value(s):
  CF_OK: for successful completion
Valid Stream Group State(s) to Issue:
  All stream group states
Stream Group State(s) after Execution:
  Unchanged CF DestroyStream This function destroys the specified stream group that was created by CF_CapMon or CF_PlayRcvd. As part of the destroy process, all operations (e.g., sending/playing) being performed on the stream group will be stopped and all allocated system resources will be freed.

CStatus CF_DestroyStream (HSTGRP hStgrp)
Input:
  hStgrp: Handle to a stream group to be destroyed.
Return Value(s):
  CF_OK: successful completion
  CFB_ERR_VCI+CF_ERR_CONF_STATE: VCI not initaized
  CFB_ERR_VCI+CF_ERR_STGRP_HANDLE: invalid stream group handle
  CFB_ERR_VCI+CF_ERR_RESOURCE: unexpected resource failure
Valid Stream Group State(s) to Issue:
  All stream group states except CCST_INIT
Stream Group State(s) after Execution:
  CCST_INIT CF SendStream This function starts or stops sending the captured audio/video streams of a specified stream group (always local) to the peer.

CStatus CF_SendStream (HCALL hCall, HSTGRP hStgrp, WORD wAVFlag)
Input:
  hCall: Handle to the call.
  hStgrp: Handle to the stream group.
  wAVFlag: Start/stop flag.
    AUDIO_ON
    AUDIO_OFF
    VIDEO_ON
    VIDEO_OFF
    AV_ON (VIDEO_ON|AUDIO_ON)
    AV_OFF (VIDEO_OFF|AUDIO_OFF)
    AON_VOFF (VIDEO_OFF|AUDIO_ON)
    AOFF_VON (VIDEO_ON|AUDIO_OFF)
Return Value(s):
  CF_OK: successful completion
  CFB_ERR_VCI+CF_ERR_CONF_STATE: VCI not initialized
  CFB_ERR_VCI+CF_ERR_CALL_STATE: no call in progress
  CFB_ERR_VCI+CF_ERR_CALL_HANDLE: invalid call handle
  CFB_ERR_VCI+CF_ERR_STGRP_HANDLE: invalid stream group handle
  CFB_ERR_VCI+CF_ERR_RESOURCE: unexpected resource failure
  CFB_ERR_VCI+CF_ERR_STGRP_STATE: invalid stream group state
  CFB_ERR_VCI+CF_ERR_AUDIO_STREAM_STATE: invalid audio stream state
  CFB_ERR_VCI+CF_ERR_VIDEO_STREAM_STATE: invalid video stream state
  CFB_ERR_AUD+audio error num: error in Audio Subsystem
  CFB_ERR_VID+video error num: error in Video Subsystem
Valid State(s) to Issue:
  call state: CCST_CONNECTED
  stream group state: CCST_ACTIVE
State(s) after execution
  call state: Unchanged
  stream group state: Unchanged CF Mute This function starts or stops sending the captured audio/video streams of a specified stream group (always local) to the peer.

CStatus CF_Mute (HCALL hCall, HSTGRP hStgrp, WORD wAVFlag)
Input:
  hCall: Handle to the call.
  hStgrp: Handle to the stream group.
  wAVFlag: Start/stop flag.
    AUDIO_ON
    AUDIO_OFF
    VIDEO_ON
    VIDEO_OFF
    AV_ON (VIDEO_ON|AUDIO_ON)
    AV_OFF (VIDEO_OFF|AUDIO_OFF)
    AON_VOFF (VIDEO_OFF|AUDIO_ON)
    AOFF_VON (VIDEO_ON|AUDIO_OFF)
Return Value(s):
  CF_OK: successful completion
  CFB_ERR_VCI+CF_ERR_CONF_STATE: VCI not initialized
  CFB_ERR_VCI+CF_ERR_CALL_STATE: no call in progress
  CFB_ERR_VCI+CF_ERR_CALL_HANDLE: invalid call handle
  CFB_ERR_VCI+CF_ERR_STGRP_HANDLE: invalid stream group handle
  CFB_ERR_VCI+CF_ERR_RESOURCE: error with internal data structures
  CFB_ERR_VCI+CF_ERR_STGRP_STATE: invalid stream group state
  CFB_ERR_VCI+CF_ERR_AUDIO_STREAM_STATE: invalid audio stream state
  CFB_ERR_VCI+CF_ERR_VIDEO_STREAM_STATE: invalid video stream state
  CFB_ERR_AUD+audio error num: error in Audio Subsystem
  CFB_ERR_VID+video error num: error in Video Subsystem
Valid State(s) to Issue:
  call state: CCST_CONNECTED
  stream group state: CCST_ACTIVE
State(s) after execution
  call state: Unchanged
  stream group state: Unchanged CF SnapStream This function takes a snapshot of the video stream of the specified stream group and returns a still image (reference) frame in a buffer, allocated internally by VCI, to the application. The only supported image format is Device Independent Bitmap (DIB).

CStatus CF_SnapStream (HStGRP hStgrp, WORD wFormat, LPSTR FAR* lpLpVbits, LPBITMAPINFO lpBmi)
Input:
  hStgrp: Handle to a stream group.
  wFormat: Still image format.
  lpBmi: Pointer to the BITMAPINFO structure of maximum extent (256 color).
Output:
  lpLpVbits: Pointer to DIB data, allocated internally.
Return Value(s):
  CF_OK: successful completion
  CFB_ERR_VCI+CF_ERR_CONF_STATE: VCI not initialized
  CFB_ERR_VCI+CF_ERR_STGRP_HANDLE: invalid stream group handle
  CFB_ERR_VCI+CF_ERR_RESOURCE: unexpected resource failure
  CFB_ERR_VCI+CF_ERR_STGRP_STATE: invalid stream group state
  CFB_ERR_VCI+CF_ERR_VIDEO_STREAM_STATE: invalid video stream state
  CFB_ERR_VID+video error num: error in Video Subsystem
Valid Stream Group State(s) to Issue:
  CCST_ACTIVE
Stream Group State(s) after Execution:
  Unchanged CF GetAudVidStream This function returns the audio and video stream handles for the specified stream group.

CStatus CF_GetAudVidStream (HStGrp hStgrp, LPHSTRM lpHAStrm, LPHSTRM lpHVStrm)
Input:
  hStgrp: Handle to a stream group.
Output:
  lpHAStrm: Pointer to the handle of the audio stream.
  lpHVStrm : Pointer to the handle of the video stream.
Return Value(s):
  CF_OK: successful completion
  CFB_ERR_VCI+CF_ERR_CONF_STATE: VCI not initialized
  CFB_ERR_VCI+CF_ERR_STGRP_HANDLE: invalid stream group handle
  CFB_ERR_VCI+CF_ERR_RESOURCE: error with internal data structures
Valid Stream Group State(s) to Issue:
  CCST_ACTIVE
Stream Group State(s) after Execution:
  Unchanged Channel Management API Functions CF RegisterChanMgr This function registers a callback or an application window whose message processing function will handle notifications generated by network channel initialization operations. This function is invoked before any CF_OpenChannel calls are made.

CStatus CF_RegisterChanMgr (HCALL hCall, WORD wFlag, LPVOID CallBack)
Input:
  hcall: Handle to the call.
  wflag: Indicates the type of notification to be used:

| | |
|---|---|
| CALLBACK_FUNCTION | for callback interface |
| CALLBACK_WINDOW | for post message interface |

CallBack: Either a pointer to a callback function or a window handle to which messages will be posted, depending on flags.
Return Value(s):
  CF_OK: successful completion
  CFB_ERR_VCI+CF_ERR_CONF_STATE: VCI not initialized
  CFB_ERR_VCI+CF_ERR_CALL_STATE: no call in progress
  CFB_ERR_VCI+CF_ERR_CALL_HANDLE: invalid call handle
Valid Call State(s) to Issue:
  CCST_CONNECTED
Call State(s) after Execution:
  Unchanged
Callback Function:
  FuncName (WORD wMessage, WORD wParam, LONG lParam)
    wMessage: Message Type (CFM_XXXX_NTFY).
    wParam: Call Handle.
    lParam: Additional Information which is message-specific.
  The parameters of the callback function are equivalent to the last three parameters passed to a Microsoft® Windows™ message handler function (Win 3.1).

CF OpenChannel

This function requests to open a network channel with the peer application. The result of the action is given to the application by invoking the callback routine specified by the call to CF_RegisterChanMgr. The application must specify an ID for this transaction. This ID is passed to the callback routine or posted in a message.

CStatus CF_OpenChannel (HCALL hCall, LPCHAN_INFO lpChan, DWORD dwTransID)
Input:
  hCall: Handle to the call.
  lpChan: Pointer to a channel structure. Filled by application. The structure contains:
    A channel number.
    Priority of this channel relative to other channels on this connection. Higher numbers represent higher priority.
    Timeout value for the channel.
    Reliability of the channel.
    Channel specific information. See CHAN_INFO definition in TII.
  dwTransID: An application defined identifier that is returned with status messages to identify the channel request that the message belongs to.
Return Value(s):
  CF_OK: successful completion CFB_ERR_COM+comm error num: error in Comm Subsystem
Valid State(s) to Issue:
call state: CCST_CONNECTED
channel state: CHST_READY
State(s) after Execution:
call state: Unchanged
channel state: CHST_OPENING
Peer Message:
CFM_CHAN_OPEN_NTFY: Peer is requesting a channel.
Status Messages:
CFM_CHAN_ACCEPT_NTFY: Peer accepted the channel request.
CFM_CHAN_REJECT_NTFY: Peer rejected the channel request.

CF AcceptChannel

This function accepts an incoming channel request, received as CFM_CHAN_OPEN_NTFY callback/message. The result is a one-way network channel for receiving data. The peer will receive a CFM_CHAN_ACCEPT_NTFY callback/message as a result of this call.

CStatus CF_AcceptChannel (HCHAN hChan, DWORD dwTransID)
Input:
hChan: Handle to the channel.
dwTransID: A user defined identifier that was received as part of the CFM_CHAN_OPEN_NTFY message.
Return Value(s):
CF_OK: successful completion
CFB_ERR_COM+comm error num: error in Comm Subsystem
Valid State(s) to Issue:
call state: CCST_CONNECTED
channel state: CHST_RESPONDING
State(s) after Execution:
call state: Unchanged
channel state: CHST_OPEN
Peer Message:
CFM_CHAN_ACCEPT_NTFY: Peer accepted the channel request.

CF RejectChannel

This function rejects an incoming channel request, received as CFM_CHAN_OPEN_NTFY callback/message. The peer will receive a CFM_CHAN_REJECT_NTFY callback/message as a result of this call.

CStatus CF_RejectChannel (HCHAN hChan, DWORD dwTransID)
Input:
hChan: Handle to the channel.
dwTransID: A user defined identifier that was received as part of the CFM_CHAN_OPEN_NTFY message.
Return Value(s):
CF_OK: successful completion
CFB_ERR_COM+comm error num: error in Comm Subsystem
Valid State(s) to Issue:
call state: CCST_CONNECTED
channel state: CHST_RESPONDING
State(s) after Execution:
call state: Unchanged
channel state: CHST_READY
Peer Message:
CFM_CHAN_REJECT_NTFY: Peer rejected the channel request.

CF RegisterChanHandler

This function registers a callback or an application window whose message processing function will handle notifications generated by TII network channel IO activities. The channels that are opened will receive TII CHAN_DATA_SENT notifications, and the channels that are accepted will receive TII CHAN_RCV_COMPLETE notifications.

CStatus CF_RegisterChanHandler (HCHAN hChan, WORD wFlag, LPVOID CallBack)
Input:
hChan: Handle to the channel.
wFlag: Indicates the type of notification to be used:

| | |
|---|---|
| CALLBACK_FUNCTION | for callback interface |
| CALLBACK_WINDOW | for post message interface |
| NOCALLBACK | for polled status interface |

CallBack: Either a pointer to a callback function or a window handle to which messages will be posted, depending on flags.
Return Value(s):
CF_OK: successful completion
CFB_ERR_COM+comm error num: error in Comm Subsystem
Valid State(s) to Issue:
call state: CCST_CONNECTED
channel state: CHST_OPEN
State(s) after Execution:
call state: Unchanged
channel state: CHST_SEND (for outgoing channel) CHST_RECV (for incoming channel)
Callback Function:
FuncName (WORD wMessage, WORD wParam, LONG lParam)
wMessage: Message Type (CFM_XXXX_NTFY).
wParam: Word parameter.
lParam: Long parameter.
The parameters of the callback function are equivalent to the last three parameters passed to a Microsoft® Windows™ message handler function (Win 3.1).

CF CloseChannel

This function closes a network channel that was previously opened by CF_AcceptChannel or CF_OpenChannel. The handler for this channel is automatically de-registered. Both sides will receive a CFM_CHAN_CLOSE_NTFY callback/message as a result of this call.

CStatus CF_CloseChannel (HCHAN hChan, DWORD dwTransID)
Input:
hChan: Handle to the channel to be closed.
dwTransID: An application defined identifier that is returned with the response notification.
Return Value(s):
CF_OK: successful completion
CFB_ERR_COM+comm error num: error in Comm Subsystem
Valid State(s) to Issue:
call state: CCST_CONNECTED
channel state: CHST_SEND, CHST_RECV, CHST_OPEN State(s) after Execution:
  call state: Unchanged
  channel state: CHST_CLOSING
Peer Message:
  CFM_CHAN_CLOSE_NTFY: Peer closed the channel.
Status Message:
  CFM_CHAN_CLOSE_NTFY: Local close processing is complete.
CF SendData
This function sends data to the peer. If the channel is not reliable and there are no receive buffers posted on the peer machine, the data will be lost. The Channel Handler in the VCI subsystem will receive a TII CHAN_DATA_SENT callback/message as a result of this call.
  CStatus CF_SendData (HCHAN hChan, LPSTR lpsBuffer, WORD wBuflen, DWORD dwTransID)
Input:
  hChan: Handle to the channel.
  lpsBuffer: Pointer to the buffer to be sent.
  wBuflen: Length of the buffer in bytes.
  dwTransID: This is a user defined transaction ID which will be passed to the channel handler along with other status message data to identify the transaction that the response belongs to.
Return Value(s):
  CF_OK: successful completion
  CFB_ERR_COM+comm error num: error in Comm Subsystem
Valid State(s) to Issue:
  call state: CCST_CONNECTED
  channel state: CHST_SEND
State(s) after Execution:
  call state: Unchanged
  channel state: Unchanged
Peer Messages:
  CHAN_RCV_COMPLETE: Data was received (TII message).
  CHAN_LOST_DATA: Data was lost because of no CF_RecvData call (TII message).
Status Messages:
  CHAN_DATA_SENT: Data is being sent and buffer is available for reuse (TII message).
  CHAN_LOST_DATA: Data could not be sent (TII message).
CF RecvData
This function posts receive buffers to the system. When the system has received data in the given buffers, the Channel Handler in the VCI subsystem will receive a TII CHAN_RCV_COMPLETE callback/message as a result of this call.
  CStatus CF_RecvData (HCHAN hChan, LPSTR lpsBuffer, WORD wBuflen, DWORD dwTransID)
Input:
  hChan: Handle to the channel.
  lpsBuffer: Pointer to the buffer to be filled in.
  wBuflen: The length of the buffer in bytes. Maximum bytes to receive.
  dwTransID: This is a user defined transaction ID which will be passed to the channel handler along with other status message to identify the transaction that the response belongs to.
Return Value(s):
  CF_OK: successful completion
  CFB_ERR_COM+comm error num: error in Comm Subsystem
Valid State(s) to Issue:
  call state: CCST_CONNECTED
  channel state: CHST_RECV
State(s) after Execution:
  call state: Unchanged
  channel state: Unchanged
Status Messages:
  CHAN_RCV_COMPLETE: Indicates that data was received.
  CHAN_LOST_DATA: Indicates that the buffer was too small for an incoming data message, or some other data error. The contents of the data buffer are undefined.
CF GetChanInfo
This function returns status information of a specified channel (i.e., bandwidth information, number of sends/second, number of receives/second, etc.).
  CStatus CF_GetChanInfo (HCHAN hChan, LPCHAN_INFO lpChanInfo)
Input:
  hChan: Handle to the specified channel.
  lpChanInfo: Pointer to a CHAN_INFO struct.
Return Value(s):
  CF_OK: successful completion
  CFB_ERR_VCI+CF_ERR_CHAN_STATE: invalid channel state
  CFB_ERR_COM+comm error num: error in Comm Subsystem
Valid State(s) to Issue:
  call state: CCST_CONNECTED
  channel state: Any channel state except CHST_NULL, CHST_READY
State(s) after Execution:
  call state: Unchanged
  channel state: Unchanged
Channel Management Messages and Callbacks
CFM CHAN OPEN NTFY (Channel open being requested by peer)
Returned Parameters:
  wParam HCHAN: Handle to the channel to be used subsequently by the application.
  lParam LPCHANMGR_CB: Pointer to information about incoming channel request.
Valid State(s) to Receive the Notification:
  call state: CCST_CONNECTED
  channel state: CHST_READY
State(s) after Receiving the Message:
  call state: Unchanged
  channel state: CHST_RESPONDING
CFM CHAN ACCEPT NTFY (Channel open request accepted by peer)
Returned Parameters:
  wParam HCHAN: Handle to the channel to be used subsequently by the application.
  lParam DWORD: TransID provided by the application that identifies the application transaction related to this notification.
Valid State(s) to Receive the Notification:
  call state: CCST_CONNECTED
  channel state: CHST_OPENING State(s) after Receiving the Message:
  call state: Unchanged
  channel state: CHST_OPEN
  CFM CHAN REJECT NTFY (Channel open request rejected by peer)
Returned Parameters:
  lParam DWORD: TransID provided by the application that identifies the application transaction related to this notification.
Valid State(s) to Receive the Notification:
  call state: CCST_CONNECTED
  channel state: CHST_OPENING
State(s) after Receiving the Message:
  call state: Unchanged
  channel state: CHST_READY
  CFM CHAN CLOSE NTFY (Channel close being initiated locally or remotely)
Returned Parameters:
  wParam HCHAN: Handle to the channel.
  lParam DWORD: If the callback is a remote close indication, (lParam=0). If the callback is a response to a locally initiated CloseChannel, lParam=TransID specified by application.
Valid State(s) to Receive the Notification:
  call state: CCST_CONNECTED
  channel state: CHST_SEND, CHST_RECV, CHST_OPEN, CHST_CLOSING
State(s) after Receiving the Message:
  call state: Unchanged
  channel state: CHST_READY APPENDIX C: Video API This appendix describes the application programming interface for video API 508 of FIG. 5. The description for this appendix is the same as the description for the appendix of the same name in U.S. patent application Ser. No. 08/340,172 filed Nov. 15, 1994. One difference is the addition of the following video stream functions:

VGetFormats
  VSTATUS VGetFormats (DWORD, LPDWORD);

The VGetFornats function takes a DWORD format id and returns a DWORD format id. If the specified format id is equal to null (='0'), then the first format id, from the set of all formats supported, is returned. Otherwise, the next format id, from the set of all formats supported, is returned. If the returned format id is equal to null, then there is not a next format, relative to the input format id specified.

VFormatCaps
  VSTATUS VFormatCaps (DWORD, LPVCAPS);

The VFormatCaps function returns the video capabilities for a given format id. VFormatCaps takes a DWORD format id (see the VGetFormats definition) and a far pointer reference to a VCAPS structure. VFormatCaps returns a completed VCAPS structure and a VSTATUS return status code. The VCAPS structure is defined as follows:

```
typedef struct
{
    WORD    wFormat;
    WORD    wReserved;
    DWORD   dwFeatures;
    WORD    wWidth;
    WORD    wHeight;
    WORD    wMaxFrameRate;
} VCAPS;
```

The wFormat WORD is defined as follows:

| #define | CAPT_FORMAT_IRV | 1 |
| #define | CAPT_FORMAT_YUV | 3 |
| #define | CAPT_FORMAT_MRV | 16 |

Bit 1 of the dwFeatures DWORD is the zoom flag; bit 2 is the mirroring flag; and bit 31 is the conf/still flag. If a given bit is set (='1'), then the specified feature is supported by the format; else, if the bit is not set (='0'), then the specified feature is not supported by the format. For example, a dwFeatures value of 0x80000004 specifies a format that supports conferencing and mirroring and does not support zoom. The zoom and mirroring bits match the VINFO flags specification for a video stream object.

APPENDIX D: Audio API

The description for this appendix is the same as the description for the appendix of the same name in U.S. patent application Ser. No. 08/340,172 filed Nov. 15, 1994.

APPENDIX E: Comm API

This appendix describes the application programming interface for comm API (TII) 510 of FIG. 5. The description for this appendix is the same as the description for the appendix of the same name in U.S. patent application Ser. No. 08/340,172 filed Nov. 15, 1994. Two differences are in the RejectConnection and MakeConnection functions, which are defined as follows:

MakeConnection

The MakeConnection function attempts to connect to a peer application. The Session Handler (callback routine or the message handler) for the specified Session will receive status of the connection. When the connection is accepted by the peer, the Connection Handle will be given to the Session Handler. The peer session will receive a CONN_REQUESTED callback/message as a result of this call.

TSTATUS MakeConnection (HSESS Sessionhandle, DWORD TransId, LPTADDR lpCalleeAddr, LPCONN_CHR lpConnAttributes, WORD TimeOut, WORD ChanMgrFlags, LPVOID ChanMgr, LPVOID UserData, WORD UserDataLen)

Parameters:

| SessionHandle | Handle for session, obtained via BeginSession. |
| TransId | User defined identifier which will be returned to the Session Handler along with the response notification. |
| lpCalleeAddr | Pointer to the address structure (containing a phone number, IPaddress etc.) of callee. |
| lpConnAttributes | Pointer to the connection attributes. |
| TimeOut | Number of seconds to wait for peer to pickup the phone. |
| ChanMgr | The Channel Manager for this connection. This is either a pointer to a callback function, or a window handle to which messages will be posted, depending on chanMgrFlags. |
| ChanMgrflags | Indicates tbe type of notification to be used for the Channel Manager:<br>CY_CALLBACK_FUNCTION for callback interface<br>CY_CALLBACK_WINDOW for post message interface |

-continued

| | |
|---|---|
| UserData | Pointer to up to 64 bytes of user defined data to be sent with the connection request. |
| UserDataLen | Length of the user data block specified in the UserData pointer. |

Return values:

| | |
|---|---|
| SESS_INVALID | The Session handle is invalid. |
| TOO_MANY_CONN | The finite number of connections Supported by TII was exceeded. |

Status Messages (sent to the Session Handler):

| | |
|---|---|
| CONN_ACCEPTED | The peer process has accepted the call. |
| CONN_REJECTED | The Peer process bas rejected the call. |
| CONN_TIMEOUT | No answer from peer. |

Peer Messages:
CONN_REQUESTED
The CONN_REQUESTED callback is defined as follows:

```
CONN_REQUESTED
    wParam  Connection handle.
    lparam  Pointer to incoming connection information structure:
            {WORD           Session Handle
            LPTADDR         Pointer to caller's address
            LPCONN_CHR      Pointer to connection attributes
            LPVOID          UserData
            WORD     }      UserDataLen
```

The UserData field in the connection information structure points to a block of up to 64 bytes specified by the caller in the MakeConnection call. The UserDataLen field contains the number of transmitted bytes in the UserData field.
RejectConnection
The RejectConnection function is defined as follows:
TSTATUS RejectConnection (HCONN hConn, WORD ReasonCode)
Parameters:

| | |
|---|---|
| hConn | Handle to the connection (received as part of the CONN_REQUESTED callback/message). |
| ReasonCode | The reason that the connection is being rejected. The user may send any WORD value, however, if the value is less than T_REJ_USER_MIN, it will be interpreted as a TII defined reason code. See below for a list of the valid TII defined reason codes. |

Return values:

| | |
|---|---|
| SUCESSFUL | Connection reject was returned to peer. |
| CONN_INVALID | The Connection handle was invalid. |

The CONN_REJECTED callback is as follows:

| CONN_REJECTED (response to MakeConnection request) | |
|---|---|
| wParam | Reason for rejection. |
| lParam | TransId (specified by app in earlier request). |

If the particular media in use supports the propagation of a user defined reason code with the rejection, the value given in the ReasonCode parameter in the RejectConnection call will be given in the wParam of the callback. If the remote site did not specify a reason for the rejection, the wParam is loaded with the local reason for the rejection (if the rejection was not because the remote site called RejectConnection) or the generic value T_REJ_REJECTED. The rejection reasons are extended as follows:

// CONN_REJECTED sub-states. These will be returned in wParam.

| | |
|---|---|
| #define T_REJ_BUSY | 1 |
| #define T_REJ_REJECTED | 2 |
| #define T_REJ_NET_CONGESTED | 3 |
| #define T_REJ_NO_RESPONSE | 4 |
| #define T_REJ_NET_FAIL | 5 |
| #define T_REJ_INTERNAL | 6 |
| #define T_REJ_USER_MIN | 7 |

Any value greater than or equal to T_REJ_USER_MIN is assumed by the comm stack to represent a user defined rejection code.

APPENDIX F: MDM API

This appendix describes the application programming interface for media dependent module (MDM) 1720 of FIG. 17.

Data Structures

This section describes the data structures which MDM presents externally. The MDM generates identifiers to refer to both sessions and connections. These identifiers are unique across all DLMs and MDMs present. Therefore, the DLMs and MDMs do not have conflicting formats of identifiers. This section describes how an MDM constructs session and connection ids.

An MDM session ID is a 32-bit unsigned integer. Bits 0 through 7 represent the ID of the MDM. This is the same value given to the MDM in MDM_BeginSession as well as given to the GDL in GDL_LoadMDM. It is the system wide ID for the particular MDM. Bits 8 through 15 represent the ID of the DLM which is calling this MDM. Bits 16 through 23 represent the session index. This value should begin at 0 for the first session and be incremented for each additional session opened on the MDM. All other bits of the session ID are reserved for future use.

An MDM connection ID is a 32-bit unsigned integer. Bits 0 through 23 represent the same values as given in the MDM Session ID. The MDM Connection ID adds the connection index into bits 24 through 31 of the DWORD. This value should begin at 0 for the first connection on a particular session and be incremented for each additional connection opened on the session.

MDM Characteristics

Since one particular DLM is able to operate with several MDMs, the DLM is able to adapt to the characteristics of a particular MDM. The MDM Characteristics structure is used by MDM_GetCharacteristics to report relevant data about the MDM.

```
struct MDMCHARS
{
    BYTE MDMID;          // The MDM identifier used to refer to this MDM.
    WORD PacketSize;     // The most efficient packet size for transmission on the
                         // network.
    BYTE MaxSessions;    // Maximum number of sessions that the MDM can support.
    BYTE MaxConnections; // Max. no. of connections that the MDM can support.
}
```

Connection Characteristics

When the user opens a connection via MDM_MakeConnection, the user specifies the requested characteristics of the connection. This is specified in the CONNCHAR structure.

```
struct CONNCHAR
{
    WORD Quality;   // Network defined quality of the connection.
    WORD BitRate;   // Requested bit rate of the connection.
};
```

TADDR

A TADDR structure is used to represent a network address. MDM uses this to specify all network specify addresses.

```
struct TADDR
{
WORD AddressType;    // Identifier which specifies how the address block is to be interpreted
                     // by the lower layers.
WORD AddressLength;  // Number of significant bytes in the Address block.
BYTE Address[80];    // Address information for the lowest network layer.
};
```

The address type specifies the DLM and MDM that is to interpret this address. The upper byte of the word specifies the DLM ID and the lower byte specifies the MDM ID.

MDM Event

An MDM event is used in the session callback to indicate that an event has taken place on the network.

As with the DLM, the MDM establishes a connection between two machine before data can be transferred. This section details the functions used to establish sessions and connections on an MDM. The following functions are used for connection management:

MDM_BeginSession
    MDM_EndSession
    MDM_Listen
    MDM_MakeConnection
    MDM_AcceptConnection
    MDM_RejectConnection
    MDM_CloseConnection The following calls are allowed in an interrupt context, all other functions are not called from an interrupt context:

MDM_MakeConnection
    MDM_AcceptConnection
    MDM_RejectConnection
    MDM_CloseConnection Operations on connections generate session callbacks. The MDM generates the following events to the session callback function during connection establishment and tear-down:

```
struct MDMEVENT
{
    WORD EventType;              // Specifies the type of event which triggered the callback.
    WORD Status;                 // Indicates the status of the event.
    BYTE DlmId;                  // Unique DLM ID of the DLM to process the event.
    BYTE MdmId;                  // Unique MDM ID of the MDM generating the event.
    DWORD MdmSessionId;          // Session ID, assigned by the MDM, on which the event
                                 // occurred.
    DWORD MdmConnId;             // Indicates the Connection Id, assigned by MDM, on which
                                 // this event occurred.
    DWORD Token;                 // The token value was given in the call to initiate an action.
                                 // When the callback notifies the user that the action is
                                 // complete, the token is returned in this field.
    LPTADDR Addr;                // Specifies the LPTADDR of the caller.
    LPCONNCHAR Characteristics;  // This field is a LPCONNCHR to the connection
                                 // characteristics.
    LPBYTE UserData;             // Pointer to the data specified in the UserData parameter of the
                                 // DLM_MakeConnection call for this connection.
    WORD UserDataLen;            // Number of valid bytes in the UserData block.
}
```

Interface for Connection Oriented Call Control

CONN_REQUESTED
    CONN_ESTABLISHED

CONN_REJECTED
CONN_CLOSE_COMPLETE
CONN_CLOSE_NOTIFY
SESS_CLOSED
SESS_ERROR
CONN_ERROR

Referring now to FIG. 57, there are shown connection diagrams that show the interactions between a DLM and an MDM in connection and session establishment and teardown.

Session Callback

Most of the session and connection management functions of the MDM are asynchronous. They initiate an action and when that action is complete, MDM will call back to the user via the session callback. The calling convention for the callback is as follows:

void FAR PASCAL SessionCallback(LPMDMEVENT Event)

Event is a far pointer to an MDM event structure.

For each function which generates a callback, all of the fields of the MDM event structure are listed. If a particular field contains a valid value during a callback, an X is placed in the table for the callback. Some fields are only optionally returned by the MDM. Optional fields are noted with an 'O' in the tables. If a pointer field is not valid or optionally not returned, the MDM will pass a NULL pointer in its place. The upper layer does not assume that pointer parameters such as LPMDMEVENT, LPTADDR, and LPCONNCHAR are in static memory. If the upper layer needs to process them in a context other than the callback context, it makes a private copy of the data.

MDM BeginSession

This call prepares MDM for subsequent connection establishment. It is called at both ends before a connection is made or accepted.

WORD MDM_BeginSession(BYTE DlmId, BYTE MdmId, LPTADDR LocalAddress, FARPROC SessionCallback, LPDWORD lpMdmSessionId)

Session IDs are unique across all MDMs. MDM_BeginSession will detect the absence of the underlying transport and report an error to the upper layer. Well-behaved MDMs do not hang in the absence of the transport.

Parameters:

| DlmId | Identifier for DLM calling the MDM. |
| MdmId | Identifier for MDM being called. |
| LocalAddress | Far pointer to TADDR at which connection will be established. |
| SessionCallback | FARPROC at which the upper layer will be notified of session events. |
| lpMdmSessionId | Far Pointer to Session identifier returned by this call. |

Return Value (Status Indication):

| E_OK | Session opened correctly. |
| E_NOSESSION | Too many sessions already opened. |
| E_NOMEM | Unable to allocate memory for session. |
| E_NETERR | An error has occurred in the network layer. |
| E_INTERNAL | An internal error has occurred in the MDM |

Local Callbacks: NONE-MDM_BeginSession returns synchronously
Peer Callbacks: NONE MDM EndSession This function ends the specified session.

WORD MDM_EndSession(DWORD MdmSessionId)

Parameters:

MdmSessionID: Session identifier returned in MDM_BeginSession

Return Value (Status Indication):

| E_OK | Session closed correctly. |
| E_SESSNUM | MdmSessionID is not valid. |
| E_SESSUNUSED | Session is not in use. |
| E_SESSCLOSED | Session has been closed. |
| E_SESSNOTOPEN | Session is not open. |
| E_IDERR | Session is not active on this MDM. |
| E_CONNSOPEN | Connections are open on this session. |
| E_INTERNAL | An internal error has occurred in the MDM |

Local Callbacks:

SESS_CLOSED

| Event Parameter | SESS_CLOSED |
|---|---|
| EventType | X |
| Status | X |
| DlmId | X |
| MdmId | X |
| MdmSessionId | X |
| MdmConnId | |
| Token | |
| Addr | |
| Characteristics | |
| UserData | |
| UserDataLen | |

Peer Callbacks: NONE

MDM Listen

This function initiates a listen at the specified address.

WORD MDM_Listen(DWORD MdmSessionId, LPCONNCHAR Characteristics) When an incoming connection request arrives, asynchronous notification is done to the Session callback function. The Listen stays in effect until MDM_EndSession is performed.

Parameters:

| MdmSessionID | Session identifier returned in MDM_BeginSession |
| Characteristies | Characteristics is a far pointer to media specific characteristics that have been passed un-interpreted by the upper layers. They specific the characteristics requested by the user. The actual characteristics provided by the MDM are returned in the callback structure. |

Return Value (Status Indication):

| E_OK | Listen succeeded, operation is pending to the network. |
| E_SESSNUM | MdmSessionID is not valid. |
| E_SESSUNUSED | Session is not in use. |
| E_SESSCLOSED | Session has been closed. |
| E_SESSNOTOPEN | Session is not open. |
| E_IDERR | Session is not active on this MDM. |
| E_NETBRR | An error has occurred in the network layer. |
| E_INTERNAL | An internal error has occurred in the MDM |

Local Callbacks:

CONN_REQUESTED

| Event Parameter | CONN_REQUESTED |
|---|---|
| EventType | X |
| Status | X |
| DlmId | X |
| MdmId | x |
| MdmSessionId | X |
| MdmConnId | X |
| Token | |
| Addr | X |
| Characteristics | X |
| UserData | |
| UserDataLen | |

Peer Callbacks: NONE
   MDM MakeConnection
   This function makes a connection to the specified address.
WORD MDM_MakeConnection (DWORD MdmSessionId, LPCONNCHAR Characteristics, DWORD Token, FARPROC SendCallback, FARPROC ReceiveCallback, LPTADDR CalleeAddress, LPBYTE UserData, WORD UserDataLen)
The MDM connection ID of the new connection is returned in the callback. Connection IDs are unique across all MDMs.
Parameters:

| | |
|---|---|
| MdmSessionID | Session identifier returned in MDM_BeginSession |
| Token | The Token is preserved by MDM in the response callback. This allows the upper layer to match the response with this request. The MDM also returns Token with all data callbacks associated with this connection. |
| Characteristics | Characteristics is a far pointer to media specific characteristics that have been passed un-interpreted by the upper layers. They specify the characteristics requested by the user. The actual characteristics provided by the MDM are returned in the callback structure. |
| SendCallback | Upper layer function which is called back on send completion. |
| ReceiveCallback | Upper layer function which is called back on data received. |
| CalleeAddress | Far Pointer to TADDR of remote address to be called. |
| UserData | Pointer to a block of up to 64 bytes of data that is to be supplied to the remote user on the CONNECTION_REQUEST callback. |
| UserDataLen | Number of valid bytes in the UserData block. |

Return Value (Status Indication):

| | |
|---|---|
| E_OK | Connection synchronously successful, connect operation is pending on the network. |
| E_SESSNUM | MdmSessionID is not valid. |
| E_SESSUNUSED | Session is not in use. |
| E_SESSCLOSED | Session has been closed. |
| E_SESSNOTOPEN | Session is not open. |
| E_IDERR | Session is not active on this MDM. |
| E_NOCONN | Unable to allocate local connection. |
| E_CHARACT | Unable to allocate connnection with desired characteristics. |
| E_NETERR | An error has occurred in the network layer. |
| E_ADDRESS | Invalid address or address type. |
| E_INTERNAL | An internal error has occurred in the MDM |

Local Callbacks:
   CONN_ESTABLISHED

CONN_REJECTED

| Event Parameter | CONN_REJECTED | CONN_ESTABLISHED |
|---|---|---|
| EventType | X | X |
| Status | X | X |
| DlmId | X | X |
| MdmId | X | X |
| MdmSessionId | X | X |
| MdmConnId | | X |
| Token | X | X |
| Addr | | O |
| Characteristics | | X |
| UserData | | |
| UserDataLen | | |

Peer Callbacks: CONN_REQUESTED-Satisfies a previous MDM_Listen on this address.

| Event Parameter | CONN_REQUESTED |
|---|---|
| EventType | X |
| Status | X |
| DlmId | X |
| MdmId | X |
| MdmSessionId | X |
| MdmConnId | X |
| Token | |
| Addr | |
| Characteristics | X |
| UserData | X |
| UserDataLen | X |

MDM AcceptConnection
   This function accepts an incoming connection request.
   WORD MDM_AcceptConnection(DWORD MdmConnId, DWORD Token, FARPROC SendCallback, FARPROC ReceiveCallback);
The Token is preserved by MDM in the response callback. This allows the upper to match the response with this request. The Connection Id is returned in the callback. The MDM also returns Token with all callbacks associated with this connection. SendCallback and ReceiveCallback specify the upper layer functions to be called when a previous send is complete or data has been received.
Parameters:

| | |
|---|---|
| MdmConnID: | Connection identifier returned in the CONN_REQUESTED callback. |
| Token | The Token is preserved by MDM in the response callback. This allows the upper to match the response with this request. The MDM also returns Token with all data callbacks associated with this connection. |
| SendCallback | Upper layer function which is called back on send completion. |
| ReceiveCallback | Upper layer function which is called back on data received. |

Return Value (Status Indication):

| | |
|---|---|
| E_CK | Accept operation succeeded, operation is pending on the network. |
| E_SESSNUM | MdmConnID is not on a valid session. |
| E_SESSUNUSED | Session is not in use. |
| E_SESSNOTOPEN | Session is not open. |
| E_IDERR | MdmConnID does not refer to a connection on this MDM. |
| E_CONNNUM | MdmConnID is not valid. |
| E_CONNUNUSED | Connection is not in use. |
| E_CONNSTATE | Connection has been closed or is already open. |

E_NETERR    An error has occurred in the network layer.
E_INTERNAL  An internal error has occurred in the MDM Local Callbacks:
   CONN_ESTABLISHED

| Event Parameter | CONN_ESTABLISHED |
|---|---|
| EventType | X |
| Status | X |
| DlmId | X |
| MdmId | X |
| MdmSessionId | X |
| MdmConnId | X |
| Token | X |
| Addr | O |
| Characteristics | X |
| UserData | |
| UserDataLen | |

Peer Callbacks:
   CONN_ESTABLISHED Satisfies a previous MDM_MakeConnection on this address.

| Event Parameter | CONN_ESTABLISHED |
|---|---|
| EventType | X |
| Status | X |
| DlmId | X |
| MdmId | X |
| MdmSessionId | X |
| MdmConnId | X |
| Token | X |
| Addr | O |
| Characteristics | X |
| UserData | |
| UserDataLen | |

MDM RejectConection
   This function rejects an incoming connection request. it returns a WORD status.
   WORD MDM_RejectConnection(DWORD MdmConnId, WORD ReasonCode)
Parameters:
   MdmConnID: Connection identifier returned in the CONN_REQUESTED callback.
   ReasonCode The user defined reason code for this rejection. Returned to the remote use as the Status field in the event structure of the CONNECTION_REJECTED callback.
Return Value (Status Indication):

| | |
|---|---|
| E_OK | Connection successfully rejected. |
| E_SESSNUM | MdmConnID is not on a valid session. |
| E_SESSUNUSED | Session is not in use. |
| E_SESSNOTOPEN | Session is not open. |
| E_IDERR | MdmConnID does not refer to a connection on this MDM. |
| E_CONNNUM | MdmConnID is not valid. |
| E_CONNUNUSED | Connection is not in use. |
| E_CONNSTATE | Connection has been closed or is already open. |
| E_NETERR | An error has occurred in the network layer. |
| E_INTERNAL | An internal error has occurred in the MDM |

Local Callbacks:
   None
Peer Callbacks:
   CONN_REJECTED Satisfies a previous MDM_MakeConnection on this address.

| Event Parameter | CONN_REJECTED |
|---|---|
| EventType | X |
| Status | X |
| DlmId | X |
| MdmId | X |
| MdmSessionId | X |
| MdmConnId | X |
| Token | X |
| Addr | |
| Characteristics | |
| UserData | |
| UserDataLen | |

MDM CloseConnection
   This function tears down an established connection. It returns a WORD status; the actual result is notified asynchronously via the callback function. This call is allowed only for established connections.
   WORD MDM_CloseConnection(DWORD MdmConnId, DWORD Token);
Parameters:

| | |
|---|---|
| MdmConnID: | Connection identifier returned in the CONN_REQUESTED callback. |
| Token | Uninterpreted value returned to the upper layer in the callback. |

Return Value (Status Indication):

| | |
|---|---|
| E_OK | Synchronous part of close operation was successful, operation is pending on the network. |
| E_SESSNUM | MdmConnID is not on a valid session. |
| E_SESSUNUSED | Session is not in use. |
| E_SESSNOTOPEN | Session is not open. |
| E_IDERR | MdmConnID does not refer to a connection on this MDM. |
| E_CONNNUM | MdmConnID is not valid. |
| E_CONNUNUSED | Connection is not in use. |
| E_CONNCLOSED | Connection has been closed already. |
| E_NETERR | An error has occurred in the network layer. |
| E_INTERNAL | An internal error has occurred in the MDM |

Local Callbacks:
   CONN_CLOSE_COMPLETE

| Event Parameter | CONN_CLOSE_COMPLETE |
|---|---|
| EventType | X |
| Status | X |
| DlmId | X |
| MdmId | X |
| MdmSessionId | X |
| MdmConnId | X |
| Token | X |
| Addr | |
| Characteristics | |
| UserData | |
| UserDataLen | |

Peer Callbacks: CONN_CLOSE_NOTIFY

| Event Parameter | CONN_CLOSE_NOTIFY |
|---|---|
| EventType | X |
| Status | X |
| DlmId | X |

| Event Parameter | CONN_CLOSE_NOTIFY |
|---|---|
| MdmId | X |
| MdmSessionId | X |
| MdmConnId | X |
| Token | |
| Addr | |
| Characteristics | |
| UserData | |
| UserDataLen | |

Interface for Connection Oriented Data Transmission

The data transfer interface to the MDM is responsible for sending data from the local computer to the remote site. It also is based on the entry point, callback model. A DLM interfaces to an MDM through the functions MDM_ClearToSend, MDM_Send, and MDM_GetCharacteristics. In response to a previous send operation completing or reception of data on the network, the MDM notifies the DLM via callback functions. The common data type between a DLM and an MDM is the link packet.

Send Complete Callback

The send complete callback is activated when a link packet has been sent on the network. The entry point is defined in the SendCallback parameter of MDM_MakeConnection. It is a far pointer to a far PASCAL function defined as follows:

void FAR PASCAL DLM_SendComplete(LPPTR LinkPacket, DWORD MDMConnID,

DWORD Token, WORD Size, WORD Status)

Parameters:

| | |
|---|---|
| LinkPacket: | Link packet that was sent. |
| MDMConnID | MDM Connection ID on which the data was sent. |
| Token | Token for the connection specified earlier via MDM_MakeConnection or MDM_AcceptConnection. |
| Size | Number of bytes transmitted. Does not include the size of the link packet header information that was also transmitted. |
| Status | Status of the operation. |

For simplicity, it is the responsibility of the subsystem that allocated the link packet to free it. The link packet used in a send is allocated in the DLM and therefore, the MDM will not free it after the call to the send complete callback. The MDM assumes that after the send complete callback, the pointer to the link packet is no longer valid. Therefore, the DLM can free the link packet within the send complete callback.

Receive Callback

The data receive callback is activated when a link packet arrives on the network. The entry point is defined in the ReceiveCallback parameter of MDM_MakeConnection. It is a far pointer to a far PASCAL function defined as follows:

void FAR PASCAL DLM_Received(LPPTR LinkPacket, DWORD MDMConnID, DWORD

Token, WORD ByteCount, WORD Status)

Parameters:

| | |
|---|---|
| LinkPacket: | Link packet that was sent. |
| MDMConnID | MDM Connection ID on which the data was sent. |
| Token | Token for the connection specified earlier via MDM_MakeConnection or MDM_AcceptConnection. |
| ByteCount | Number of bytes of data received, does not include the size of the link packet header information. |
| Status | Status of the operation. |

Because of the assumptions about allocating and freeing link packets, the MDM which allocated the link packet will free it immediately after the receive callback returns. Therefore, it is the responsibility of the DLM to copy the data out of the link packet before the callback routine returns.

MDM ClearToSend

The function MDM_ClearToSend verifies that a link packet of the given size can currently be sent on the network on the specified MDM connection (returned earlier via MDM_MakeConnection or a CONN_ESTABLISHED callback). DLM uses this finction to perform flow control.

BOOL MDM_ClearToSend(DWORD MDMConnId, WORD ByteCount)

Parameters:

| | |
|---|---|
| MDMConnID: | Connection on which data may be sent. |
| ByteCount: | Number of bytes of data to send. This will correspond to the number of data bytes within a link packet, not including the header information. |

Return Value:

| | |
|---|---|
| TRUE | Data can currently be sent. |
| FALSE | Sending the indicated data is not currently possible. |

Local Callbacks: None
Peer Callbacks: None

MDM Send

The function MDM_Send is responsible for sending a link packet on the network immediately. Flow control is verified by a preceding call to MDM_ClearToSend. The return value is the synchronous status of the network send operation. MDM_Send is however, an asynchronous function. If the return value indicates success, a send complete callback will be generated into the calling DLM for this link packet. If the return value indicates failure, no callback will occur and the operation has ended.

WORD MDM_Send(DWORD MDMConnID, LPPTR LinkPacket, WORD ByteCount);

Parameters:

| | |
|---|---|
| MDMConnID: | Connection on which data will be sent. |
| LinkPacket | Fully formatted link packet containing the data. |
| ByteCount: | Number of bytes of data to send. This will correspond to the number of data bytes within a link packet, not including the header information. |

Return Value (Status Indication):

| | |
|---|---|
| E_OK | Buffer was accepted and enqueued for transmission. |
| E_SESSNUM | MDMConnID is not on a valid session. |
| E_SESSUNUSED | Session is not in use. |
| E_SESSCLOSED | Session has been closed. |
| E_SESSNOTOPEN | Session is not open. |
| E_IDERR | MDMConnID does not refer to a connection on this MDM. |

-continued

| | |
|---|---|
| E_CONNNUM | MDMConnID is not valid. |
| E_CONNUNUSED | Connection is not in use. |
| E_CONNCLOSED | Connection has been closed. |
| E_CONNNOTOPEN | Connection is not currently open. |
| E_NOMEM | Unable to allocate enough memory to perform the send. |
| E_INTERNAL | An internal error has occurred within the MDM. |
| E_NETERR | An error has occurred in the network layer. |

Local Callbacks:
  Callback to the defined send complete function for the connection on which the data was sent.
Peer Callbacks:
  Callback to the defined data receive function for the connection on which the data arrives.
MDM GetCharacteristics
  This function is used by a DLM to get relevant data about an MDM, such as the most efficient size of link packets. It is a synchronous function and the return value indicates the status of the operation. If it indicates success, the appropriate fields of the structure pointed to by the parameter are set to values defined for this MDM.
    WORD MDM_GetCharacteristics(LPMDMCHARS Characteristics)
Parameters:
  Characteristics: Pointer to a characteristics structure to be filled by MDM_GetCharacteristics.
Return Value (Status Indication):
  E_OK Successful completion.
Local Callbacks: None
Peer Callbacks: None APPENDIX G: MDMHelpr API
  This appendix describes the application programming interface for MDM helper (MDMHelpr) 1722 of FIG. 17.
WMC OPEN
  An application sends a WMC_OPEN message to inform the helper that the application will use the helper until a WMC_CLOSE is sent.
Parameters:

| | |
|---|---|
| wParam = (WPARAM) 0; | // not used (zero). |
| lParam = (LPARAM) 0; | // not used (zero). |

Returns:
  The return value is the procedural instance callback address used during the SendMessage call.
  If error occurs, NULL is returned.
Example:

```
FARPROC pfHelprCallback = (FARPROC)SendMessage(hWnd,
WMC_OPEN, 0,0);
if(!pfHelprCallback)
{   return ERROR;
}
```

WMC CLOSE
  An application sends a WMC_CLOSE message to inform the helper that the application will no longer use the helper.

Parameters:

| | |
|---|---|
| wParam = (WPARAM) 0; | // not used (zero) |
| lParam = (LPARAM) 0; | // not used (zero) |

Returns:
  The return value is always zero.
Example:
  SendMessage(hWnd, WMC_CLOSE, 0,0);
WMU SEND MESSAGE
  An application uses WMU_SEND_MESSAGE to get the helper task context for the callback.
Parameters:

| | |
|---|---|
| wParam = (WPARAM) wMessage; | // message passed |
| lParm = (LPARAM)(FARPROC)pfCallback; | // callback address |

Parameter Description:

| | |
|---|---|
| wMessage | Value of wParam. Specifies the message passed to the callback. |
| pfCallback | Value of lParam. Specifies the callback function. |

Returns:
  The return value specifies the result of the message processing and depends on the message sent.
Example:

SendMessage(hWnd, WMU_SEND_MESSAGE, USER_MESSAGE, (LPARAM)(FARPROC)Callback);

WMU POST MESSAGE
  An application uses WMU_POST_MESSAGE to get the helper task context for the callback.
Parameters:

| | |
|---|---|
| wParam = (WPARAM) wMessage; | // message passed |
| lParm = (LPARAM)(FARPROC)pfCallback; | // callback address |

Parameter Description:

| | |
|---|---|
| wMessage | Value of wParam. Specifies the message passed to the callback. |
| pfCallback | Value of lParam. Specifies the callback function. |

Returns: There is no return value.
Example:

SendMessage(hWnd, WMU_POST_MESSAGE, USER_MESSAGE, (LPARAM)(FARPROC)Callback);

WMC ADD CLIENT
  An application uses WMC_ADD_CLIENT to register itself as a client of the helper.

Parameters:

| | |
|---|---|
| wParam = (WPARAM)wToken; | // user supplied token |
| lParam = (LPARAM)(FARPROC)pfCallback; | // callback address |

Parameter Description:

| | |
|---|---|
| wToken | Value of wParam. Specifies the token passed to the client during callback. |
| pfCallback | Value of lParam. Specifies the callback function. |

Returns:
   Returns new handle to client to be used by client for all subsequent client services. Returns E_INTERNAL if error occurs.
Example:
   WORD hClient=(WORD)SendMessage(hWnd, WMU_ADD_CLIENT, 1, (LPARAM)(FARPROC)Callback);

WMC DELETE CLIENT
   An application uses WMC_DELETE_CLIENT to deregister itself and free resources owned by the helper.
Parameters:

| | |
|---|---|
| wParam = (WPARAM)hClient; | // handle of client |

Parameter Description:

| | |
|---|---|
| hClient | Value of wParam. Specifies the client handle assigned in WMC_ADD_CLIENT. |

Returns: There is no return value.
Example:

| |
|---|
| SendMessage(hWnd, WMU_DELETE_CLIENT, hClient, 0); |

WMC SEND MESSAGE
   An application uses WMC_SEND_MESSAGE to get the helper task context for the callback.
Parameters:

| | |
|---|---|
| wParam = (WPARAM)hClient; | // handle of client |
| lParam = (LPARAM)dwToken; | // user supplied token |

Parameter Description:

| | |
|---|---|
| hClient | Value of wParam. Specifies the client handle assigned in WMC_ADD_CLIENT. |
| pfCallback | Value of lParam. Specifies the callback function. |

Returns:
   The return value specifies the result of the message processing and depends on the message sent.
Example:

| |
|---|
| SendMessage(hWnd, WMC_SEND_MESSAGE, hClient, USER_MESSAGE); |

WMC POST MESSAGE
   An application uses WMC_POST_MESSAGE to get the helper task context for the callback.

Parameters:

| | |
|---|---|
| wParam = (WPARAM)hClient; | // handle of client |
| lParam = (LPARAM)dwToken; | // user supplied token |

Parameter Description:

| | |
|---|---|
| hClient | Value of wParam. Specifies the client handle assigned in WMC_ADD_CLIENT. |
| pfCallback | Value of lParam. Specifies the callback function. |

Returns: There is no return value.
Example:

| |
|---|
| PostMessage(hWnd, WMC_SEND_MESSAGE, hClient, USER_MESSAGE); |

WMC ADD WMTIMER
   An application uses WMC_ADD_WMTIMER to create an event callback for a registed client.
Parameters:

| | |
|---|---|
| wParam = (WPARAM)hClient; | // handle of client |
| lParam = LPEVENT_INFO; | // event control block |

Parameter Description:

| | |
|---|---|
| hClient | Value of wParam. Specifies the client handle assigned in WMC_ADD_CLIENT. |
| pfEventInfo | Value of lParam. Specifies the address of the EVENT_INFO structure. |

Returns:
   Returns E_OK if message completed. Returns E_INTERNAL if hClient specifies an invalid client or the helpers event list is full.
Comments:
   The callback generated from this event is a guaranteed Task timer callback.
Example:

| |
|---|
| EVENT_INFO sInfo;<br>sInfo.dwToken = 1;<br>sInfo.dwInterval = 1000;  // number of milliseconds<br>SendMessage(hwnd, WMC_ADD_WMTIMER, hClient, (LPARAM)(LPEVENT_INFO)&sInfo); |

WMC ADD MMTIMER
   An application uses WMC_ADD_MMTIMER to create an event callback for a registed client.
Parameters:

| | |
|---|---|
| wParam = (WPARAM)hClient; | // handle of client |
| lParam = LPEVENT_INFO; | // event control block |

Parameter Description:

| | |
|---|---|
| hClient | Value of wParam. Specifies the client handle assigned in WMC_ADD_CLIENT. |

-continued

| | |
|---|---|
| pEventInfo | Value of lParam. Specifies the address of the EVENT_INFO structure. |

Returns:

Returns E_OK if message completed. Returns E_INTERNAL if hClient specifies an invalid client or the helpers event list is full.

Comments:

The callback generated from this event is a guaranteed multimedia timer callback.

Example:

```
EVENT_INFO sInfo;
sInfo.dwToken = 2;
sInfo.dwInterval = 100;   // number of milliseconds
SendMessage(hWnd, WMC_ADD_MMTIMER, hClient,
(LPARAM)(LPEVENT_INFO)&sInfo);
```

WMC DELETE CLIENT EVENT

An application uses WMC_DELETE_CLIENT_EVENT to remove event callback for a registered client.

Parameters:

| | |
|---|---|
| wParam = (WPARAM)hClient; | // handle of client |
| lParam = (LPARAM)dwToken; | // user token |

Parameter Description:

| | |
|---|---|
| hClient | Value of wParam. Specifies the client handle assigned in WMC_ADD_CLIENT. |
| dwToken | Value of lParam. Specifies the supplied token used when adding the event. |

Returns: There is no return value.

Example:

SendMessage(hWnd, WMC_DELETE_CLIENT_EVENT, hClient, 1);

WMC SET CLIENT SOCKET

An application uses WMC_SET_CLIENT_SOCKET to associate a socket ID with a client for subsequent socket related callbacks.

Parameters:

| | |
|---|---|
| wParam = (WPARAM) hClient; | // handle of client |
| LOWORD(lParam) = wSocketID; | // socket ID to associate with client |

Parameter Description:

| | |
|---|---|
| hClient | Value of wParam. Specifies the client handle assigned in WMC_ADD_CLIFNT. |
| wSocketID | LOWORD of lParam. Specifies the socket ID. |

Returns:

Returns E_OK if message completed or E_INTERNAL if hClient specifies an invalid client.

Example:

SendMessage(hWnd, WMC_SET_CLIENT_SOCKET, hClient, 1);

APPENDIX H: LPM API

This appendix describes the application programming interface for link packet manager (LPM) 1724 of FIG. 17. In particular, this section describes the internals of the link packet format and how the necessary fields are generated. Link packets are divided into three parts:

(1) A non-transmittable links structure to be used for general bookkeeping of the link packet.

(2) A transmittable header structure which specifies the destination address and other information about the context of the packet.

(3) The data block which is simply an array of bytes.

The C definition for a link packet is as follows:

```
struct LINKPACKET
{
    struct linkstruct links;
    struct headstruct header;
    BYTE datablock[n];
}
```

The number of bytes in the data block is variable depending on the requested size of the link packet.

The link structure is defined as follows:

```
struct linkstruct
{
    struct LINKPACKET FAR *next;
    struct LINKPACKET FAR *prev;
    WORD availablesize;
    union user_fields
    {
        Various
    }
}
```

The link packets are be used by both the DLM and the MDM, placed on various queues, and stored into various structures. In order to facilitate putting packets into data structures, the links structure contains generic pointers (prev and next) that can be used by the subsystems. Since each subsystem may use the next and prev pointers, they are not preserved across calls outside of the subsystem. The availablesize parameter specifies the maximum number of bytes which can be stored in the data block. Finally, user_fields union contains various MDM and DLM specific data.

The header block of the link packet is transmitted on the network along with the data since it contains information to be used for reconstructing the message on the receiving channel.

```
struct headstruct
{
    WORD size;
    BYTE recchan;
    BYTE origchan;
    WORD seqoff;
    WORD totalsize;
}
```

The fields of the header are defined as follows:

| | |
|---|---|
| size | The number of bytes of the transmittable data, the size of the header plus the number of bytes in the data block. |
| recchan | The channel ID of the channel to receive this link packet. |
| origchan | The channel ID of the channel which originated the data. |
| seqoff | The offset from the beginning of the user's data packet of the start of this link packet. |
| totalsize | The total number of bytes of the user's data packet which is being transmitted. |

Entry Points
There are four functions of the LPM:
LPM_CreatePackets
LPM_DestroyPackets
LPM_Get
LPM_Free
LPM_Get and LPM_Free may be called from an interrupt or callback context. LPM_CreatePackets and LPM_DestroyPackets may not.
LPM CreatePackets
Each subsystem is responsible for allocating a pool of link packets for its exclusive use. This is done through a call to LPM_CreatePackets which builds the requested number of link packets and returns a handle to the pool of packets. Whenever packets are to be allocated or freed, the user specifies the pool to use.
WORD LPM_CreatePackets(WORD PacketSize, WORD NumLinkPackets, DWORD FAR *lpPacketKey)
Parameters:

| | |
|---|---|
| PacketSize: | Number of bytes in the data block of each link packet. Note that this does not include the size of the header information. |
| NumLinkPackets: | Number of link packets to place in the pool. |
| lpPacketKey | Far Pointer to a DWORD which will receive the packet key, i.e., the handle to the pool of packets. |

Return Value (Status Indication):

| | |
|---|---|
| E_OK | Packets created successfully. |
| E_NOMEM | Unable to allocate memory for packets. |

LPM DestroyPackets
LPM_DestroyPackets is used to free the memory used by an entire pool of link packets. After a successful call, the packet key is no longer valid for allocating or freeing link packets. If the function returns E_NODESTROY, packets were in use and no destroy action took place. In this case, the packet key is still valid.
WORD LPM_DestroyPackets(DWORD PacketKey)
Parameters:

| | |
|---|---|
| PacketKey | Key to the pool of packets to free. |

Return Value (Status Indication):

| | |
|---|---|
| E_OK | Packets destroyed successfully. |
| E_NODESTROY | Packet in use in the pool, unable to destroy the Unable to destroy packets. |

LPM Get
LPM Get is used to allocate a link packet of a requested size from a pool of link packets.

LPPTR LPM_Get(WORD Size, DWORD PacketKey)
Parameters:

| | |
|---|---|
| Size: | Number of bytes required in the data block of the link packet. Note that this does not include the size of the header information. |
| PacketKey | Key to the pool of packets. |

Return Value: Pointer to the link packet

| | |
|---|---|
| NULL | Packet could not be allocated, either the size was incorrect or all packets in this pool are in use. |

LPM Free
LPM_Free is used to return a link packet to the pool to be used by another requester. void LPM_Free(LPPTR LinkPacket, DWORD PacketKey)
Parameters:

| | |
|---|---|
| LinkPacket: | The link packet to free. |
| PacketKey | Key to the pool of packets |

Return Value: None
APPENDIX I: GDL API
This appendix describes the application programming interface for global dynamic loader (GDL) 1706 of FIG. 17. The GDL uses the following types to return the entry points of a newly loaded library to the caller. For a DLM, the structure is as follows:

```
struct DLMENTRY
{
    FARPROC DLM_BeginSession;
    FARPROC DLM_EndSession;
    FARPROC DLM_Listen;
    FARPROC DLM_MakeConnection;
    FARPROC DLM_AcceptConnection;
    FARPROC DLM_RejectConnection;
    FARPROC DLM_CloseConnection;
    FARPROC DLM_Open;
    FARPROC DLM_Send;
    FARPROC DLM_PostBuffer;
    FARPROC DLM_Close;
    FARPROC DLM_GetCharacteristics;
};
```

Each field of the structure contains the address of the correspondingly named DLM entry point. For an MDM, the structure is as follows:

```
struct MDMENTRY
{
    FARPROC MDM_BeginSession;
    FARPROC MDM_EndSession;
    FARPROC MDM_Listen;
    FARPROC MDM_MakeConnection;
    FARPROC MDM_AcceptConnection;
    FARPROC MDM_RejectConnection;
    FARPROC MDM_CloseConnection;
    FARPROC MDM_Send;
    FARPROC MDM_ClearToSend;
    FARPROC MDM_GetCharacteristics;
};
```

Each field of the structure contains the address of the correspondingly named MDM entry point.
Entry Points The user interfaces to GDL via the functions GDL_LoadDLM GDL_UnloadDLM, GDL_LoadMDM, and GDL_UnloadMDM. Each of these functions and their data structures are described in detail below.

GDL LoadDLM

This function brings a specified DLM into memory and prepares it for execution.

WORD GDL_LoadDLM(BYTE DLMID, LPDLMENTRY EntryStructPtr)

If the requested library is not currently loaded, GDL_LoadDLM maps the given DLMID to the library name and loads the requested library from the disk. It initializes the library by calling the LibMain function. It then initializes the reference count of the library, and returns via the EntryStructPtr parameter, the entry points of this particular DLM. The return value of this function is a status indication. If the requested library has already been loaded, it simply increments the reference count, and returns the structure of entry points.

Parameters:

| | |
|---|---|
| DLMID: | Global identifier of the DLM that is to be loaded. |
| EntryStructPtr | Output parameter, the entry points of the newly loaded library. |

Return Value (Status Indication):

| | |
|---|---|
| E_OK | Library sucessfully loaded. |
| E_NOLOAD | Library not loaded. |

GDL UnloadDLM

This function removes a specified DLM from memory.

WORD GDL_UnloadDLM(BYTE DLMID)

This function decrements the reference count for the specified DLM. All future references to this DLM should be considered invalid. If the reference count goes to 0, it calls the library's WEP and removes the library from memory.

Parameters:

| | |
|---|---|
| DLMID: | Global identifier of the DLM that is to be unloaded. |

Return Value (Status Indication):

| | |
|---|---|
| E_OK | Library successfully unloaded. |

GDL LoadMDM

This function brings a specified MDM into memory and prepares it for execution.

WORD GDL_LoadMDM(BYTE MDMID, LPMDMENTRY EntryStructPtr)

If the requested library is not currently loaded, GDL_LoadMDM maps the given MDMID to the library name and loads the requested library from the disk. It performs initialization of the library by calling the library's LibMain function and initializes the reference count of the library. It returns via the EntryStructPtr parameter, the entry points of this particular MDM. The return value of this function is a status indication. If the requested library has already been loaded, it simply increments the reference count, and returns the structure of entry points.

Parameters:

| | |
|---|---|
| MDMID: | Global identifier of the MDM that is to be loaded. |
| EntryStructPtr | Output parameter, the entry points of the newly loaded library. |

Return Value (Status Indication):

| | |
|---|---|
| E_OK | Library sucessfully loaded. |
| E_NOLOAD | Library not loaded. |

GDL UnloadMDM

This function removes a specified MDM from memory.

WORD GDL_UnloadMDM(BYTE MDMID)

This function decrements the reference count for the specified MDM. All future references to this MDM should be considered invalid. If the reference count goes to 0, it calls the library's WEP and removes the library from memory.

Parameters:

| | |
|---|---|
| MDMID: | Global identifier of the MDM that is to be unloaded. |

Return Value (Status Indication):

| | |
|---|---|
| E_OK | Library successfully unloaded. |

ID to Library Name Mapping

For each ID, the GDL translates this into a library name to load, a mapping is as follows:

| DLM ID | Library Name | |
|---|---|---|
| 0 | DLM.DLL | |

| MDM ID | Library Name | Network Implementation |
|---|---|---|
| 0 | MDM.DLL | |
| 1 | MDMNBIOS.DLL | NetBIOS |
| 2 | MDMTEL.DLL | Teleos ISDN |
| 3 | MDMTTY.DLL | Serial/MODEM |

APPENDIX J: LMI API

This appendix describes the application programming interface for LAN management interface (LMI) 556 of FIG. 5.

Loading, Unloading and Starting Comm Sessions

In conferencing system 100, a call to LMI_Init is followed by one or more calls to LMI_AddLANTransport. Before conferencing system 100 shuts down, all transports which were started with LMI_AddLANTransport are shut down with LMI_DeleteLANTransport. Then LMI_UnInit is called. All of these functions usually finish asynchronously, except for LMI_Init.

LMI Init

The LMI_Init function is called after loading LMI to initialize LMI for further use. The parameters supply the path to the PSVIDEO.INI file and the VCI window handle. LMI posts messages to VCI 506 using the VCI window handle supplied to this function whenever asynchronous completion of an LMI function needs to be signaled. The LMI_Init function invokes the Microsoft® Windows™ WinExec function of the LMITRD.EXE task. LMI_Init returns its result synchronously: either LMI_OK, or else an error code (see LMI_OK in lmi.h). The LMI_Init function is defined as follows:

| | |
|---|---|
| LMI_ALT_FULL: | The number of LMI_AddLANTransport calls has overtaxed LMI's internal data structure. It is permitted to call LMI_AddLANTransport with the three supported LAN transports. |
| LMI_ALT_DELETING: | The transport is currently being asynchronously deleted and cannot be added. |
| LMI_ALT_GETLOCALADDR: | GetLocalAddress failed. |
| LMI_ALT_MGMTSESSFAIL: | The BeginSession failed. |
| LMI_ALT_INTERNALERR: | Some other synchronous problem occurred in starting the session. |

```
extern WORD FAR PASCAL_export
LMI_Init(LPCSTR lpszINIFile, HWND hVCIThread);
```

LMI UnInit

The LMI_UnInit function is called by VCI 506 to shut down LMI. It s completion is signalled to VCI 506 by posting LMI_INIT_NTFY to VCI 506. The LMI_UnInit function is defined as:

```
extern void FAR PASCAL_export
LMI_UnInit();
```

LMI AddLANTransport

The LMI_AddLANTransport function is called once for each transport that LMI will begin a session on. Depending on whether and how many calls are made, LMI can begin a session on one, two, or all of the IP, IPX, a nd NetBIOS transports. As an asynchronous consequence of successfully starting a TII session on the transport, a datagram session will also be started on that transport, but a datagram session is only started if this client is bound to the management computer on this particular transport. The first of these one or two operations to fail, or their success, is signalled to VCI 506 asynchronously with the LMI_ADDTRANS_RESPONSE message. The LMI_AddLANTransport function is defined as follows:

```
extern WORD FAR PASCAL_export
LMI_AddLANTransport( LPTADDR lpOurAddrTypeInTADDR,
TSTATUS FAR * lpSyncCommError, BOOL FAR * lpfOpIsComplete );
```

The LPTADDR is only dereferenced to extract its address type (transport id) which defines the session to start. This function is a no-op and synchronously returns success when called with any address types other than the 3 supported LAN address types.

lpSyncComm Error is the TSTATUS of the first comm operation to fail. If lpSynccommError is nonzero on return, there is either a failure from the GetLocalAddress operation or the BeginSession.

Completion of the LMI_Add LAN Transport function is synchronous or asynchronous depending on the state of *lpfOpIsComplete on return. TRUE implies a synchronous return and FALSE implies an asynchronous return. Asynchronous completion is signalled to VCI 506 with the LMI_ADDTRANS_RESPONSE message. The following synchronous errors can be returned:

LMI DeleteLANTransport

The LMI_DeleteLANTransport function will shut down the TII session on the transport defined by the AddressType field of the LPTADDR. As an asynchronous result of the shutdown of the TII session, the datagram session on this transport will be shut down if it exists. The LMI_DeleteLANTransport function is defined as follows:

```
extern WORD FAR PASCAL_export
LMI_DeleteLANTransport( LPTADDR lpOurAddrTypeInTADDR,
BOOL FAR * lpfOpIsComplete );
```

If *lpfOpIsComplete is TRUE on exit, the LMI_DeleteLANTransport function returns LMI_OK or else a synchronous error code. Otherwise, the result of the operation is signaled by sending the LMI_DELTRANS_RESPONSE message to VCI 506.

Requesting Permission to Conference

LMI is called to request permission to call a peer or to receive a call from a peer, whether or not the address type involved is a LAN address. As a result, LMI is able to be synchronized with the conferencing state of VCI 506. Permission is actually requested of the management computer only when the peer address is a LAN address and there exists an address of the same type as the peer's address in the SQBIND.INI file.

Normally, the sequence of calls is LMI_RequestPermission followed by LMI_CallCommit. If LMI_CallCommit's parameter is FALSE, there will be no conference and the call sequence terminates. If, on the other hand, TRUE is passed to LMI_CallCommit, then LMI_ConferenceCommit is called at the end of client negotiation to indicate whether the conference is actually going to occur and terminate the call sequence.

It is permitted to call LMI_ConferenceCommit(FALSE, . . . ) at any time after LMI_RequestPermission to terminate the call sequence. This provides a way for VCI 506 to signal LMI asynchronously that the caller has hung up or that the peer-to-peer connection has been broken prematurely.

If LMI_ConferenceCommit(TRUE, . . . ) is called, LMI_ConferenceLeave is called when that conference has terminated.

LMI RequestPermission

The LMI_RequestPermission function is called by VCI 506 when a call is intended to be made, or else the call is made when the peer-to-peer call has been received and before it is accepted. The LMI_RequestPermission function is defined as follows:

```
extern LMI_PermStatus FAR PASCAL_export
LMI_RequestPermission( BOOL fIAmCaller, LPTADDR
lpLocalAddress, LPTADDR lpPeerAddress, DWORD dwBandwidth );
```

The fIAmCaller flag is TRUE if this computer is the caller, or FALSE if this computer is the callee. The lpLocalAddress is only dereferenced for its AddressType field. The lpPeerAddress on the other hand is used in its entirety. The dwBandwidth figure is the bandwidth requested for the conference. The bandwidth requested in the LMI_RequestPermission function call is not exceeded during future negotiation between the peers.

The LMI_RequestPermission function returns a synchronous result of LMI_PermStatus type as follows:

| | |
|---|---|
| LMI_PS_Permitted_NoSequoiaBinding: | There is no need of a management computer. This does not absolve VCI 506 of the responsibility of doing the rest of the permission request call sequence. |
| LMI_PS_Pending_RequestingPermission: | VCI 506 should wait for the LMI_PERM_RESPONSE message before proceeding with the call. |
| LMI_PS_Denied_NoSequoiaBinding: | VCI 506 should not proceed with calling or accepting because this client is not bound to a management computer. |
| LMI_PS_Permitted_NoSequoiaBinding: | VCI 506 is permitted to call or accept because there is no management computer binding and the Strict flag in PSVIDEO.INI is explicitly 0. |

LMI CallCommit

The LMI_CallCommit function is called after the synchronous or asynchronous completion of LMI_RequestPermission. The flag indicates (as appropriate) whether the caller has chosen to call or the callee has chosen to receive. VCI 506 does not elect to call or receive without having received permission as a consequence of LMI_RequestPermission. The LMI_CallCommit function is defined as follows:

```
extern void FAR PASCAL_export
LMI_CallCommit( BOOL fWillCall );
```

LMI_CallCommit designates FALSE in this call if the total amount of bandwidth that was requested in LMI_RequestPermission was not granted by LMI. In an alternative embodiment, VCI may chose to call or receive with a lower granted bandwidth.

LMI ConferenceCommit

The LMI_ConferenceCommit function indicates whether or not this client will actually embark on a conference. It is callable any time after LMI_RequestPernmission, but designates that the conference will proceed only if it is called after LMI_CallCommit(TRUE).

```
extern void FAR PASCAL_export
LMI_ConferenceCommit( BOOL fWillConference, LPCSTR
lpszCallerName, LPCSTR lpszCalleeName, DWORD dwBandwidth);
```

The fWillConference parameter is TRUE if the conference will proceed, otherwise FALSE. The lpszCallerName and lpszCalleeName strings provide the human-readable names of the conferees. This name information is optional (one or both of these parameters can be NULL). These parameters control whether these names are available on the management computer application's active connections list. The dwBandwidth figure contains the audio/video bandwidth which was negotiated between the peers. This value is less than or equal to that which was originally requested in LMI_RequestPermission.

LMI ConferenceLeave

The LMI_ConferenceLeave function indicates that the conference which was committed with LMI_ConferenceCommit has ended. The LMI_ConferenceLeave function is defined as follows:

```
extern void FAR PASCAL_export
LMI_ConferenceLeave();
```

Miscellaneous LMI Entry Point

LMI GetErrorText

The LMI_GetErrorText function decodes the sequence of error codes begun by LMI_OK (see LMI.H). It uses the same algorithm as the other subsystems of conferencing system 100. The LMI_GetErrorText function is defined as:

```
extern WORD FAR PASCAL_export
LMI_GetErrorText( WORD wErrorCode, LPSTR lpszErrorString,
WORD wSize );
```

Asynchronous Messages from LMI to VCI

LMI UNINIT NTFY

The LMI_UNINIT_NTFY message is posted to VCI 506 as a consequence of calling LMI_Uninit. Upon receipt of this message, LMI is eligible for unloading.

LMI KILL CALL

The LMI_KILL_CALL message is posted to VCI 506 as a consequence of receiving the kill datagram from the management computer for the purpose of forcing an end to the current conference within a fixed amount of time. The wParam parameter contains the grace period in minutes (0 means immediate). The lParam points to the null-terminated string which documents a reason for the kill as designated by the LAN administrator (the operator of the management computer). The reason string is statically allocated within LMI and hence can be overwritten by subsequent kills.

LMI PERM RESPONSE

The LMI_PERM_RESPONSE message is posted to VCI 506 as a consequence of calling LMI_RequestPermission and receiving the LMI_PS_Pending_RequestingPermission return from that function. The following table explains the wParam and lParam parameters in the message. In all cases, the LMI_PS_Denied_* values indicate that permission to conference is denied.

| wParam | Explanation |
| --- | --- |
| LMI_PS_Denied_ProtocolsUnfinished | Previous management protocols have not yet shut down. |
| lParam: Unused | |
| LMI_PS_Permitted_BandwidthGranted | The request was granted. |
| lParam: Granted Bandwidth | |
| LMI_PS_Permitted_BandwidthPartial | Less bandwidth was granted. |
| lParam: Granted Bandwidth (less than requested) | |
| LMI_PS_Denied_NoBandwidth | No bandwidth was granted. |
| lParam: Unused | |
| LMI_PS_Denied_CalleeInConf | The callee is busy with another client. |
| lParam: Unused | |
| LMI_PS_Denied_SequoiaInternalError | Management computer problems which are not covered elsewhere. Most are related to comm. |
| lParam: LMI_RPE_PROTOCOLFAILURE LMI_RPE_SEQUOIARESOURCEFAILURE LMI_RPE_MSGCORRUPTION LMI_RPE_PROTOCOLFAILURE LMI_RPE_ACCEPTCONNERROR LMI_RPE_OPENCHANERROR LMI_RPE_ACCEPTCHANERROR LMI_RPE_REGCHANHANDLERERROR LMI_RPE_CONNACCEPTUNEXPECTED LMI_RPE_CHANREQUESTUNEXPECTED LMI_RPE_CHANACCEPTUNEXPECTED LMI_RPE_CHANREJECTUNEXPECTED LMI_RPE_SENDERROR LMI_RPE_RECEIVEERROR LMI_RPE_CONNERROR LMI_RPE_PROTOCOLFAILURE | |
| LMI_PS_Denied_CalleeConnFailed | Management computer could not contact the callee. |
| lParam: TSTATUS of failure | |
| LMI_PS_Denied_CalleeConnRejected | Management computer could not contact the callee. |
| lParam: TSTATUS of failure | |
| LMI_PS_Denied_CalleeConnTimeout | Management computer could not contact the callee. |
| lParam: Unused | |
| LMI_PS_Permitted_SequoiaNotResponding | Management computer could not be reached, but mode is non-strict. |
| lParam: Unused | |
| LMI_PS_Denied_LocalResourceFailure | LMI has run out of its local memory. |
| lParam: Unused | |
| LMI_PS_Denied_LocalInternalError | See LMI_PS_Denied_SequoiaInternalError |
| LMI_PS_Denied_SequoiaConnFailed | Failure to reach management computer: |
| lParam: TSTATUS of failure | |
| LMI_PS_Denied_SequoiaConnRejected | Failure to reach management computer. |
| lParam: TSTATUS of failure | |
| LMI_PS_Denied_SequoiaConnTimeout | Failure to reach management computer. |
| lParam: Unused | |

LMI ADDTRANS RESPONSE

The LMI_ADDTRANS_RESPONSE message is a consequence of the LMI_AddLANTransport call. The wParam is the AddressType which was given to LMI_AddLANTransport. The lParam is LMI_OK if the transport was successfully added. Otherwise, the low word of lParam is one of {LMI_ALT_MGMTSESSFAIL, LMI_ALT_DGSESSFAIL, LMI_ALT_INTERNALERR} according to whether the TII session failed, the datagram sessions failed, or there was a miscellaneous algorithmic error, respectively. If the TII session failed, then the high word of lParam is the offending TSTATUS. If the datagram session failed, then the high word of lParam is the error code from the datagram session. The high word is unused for internal errors.

LMI DELTRANS RESPONSE

The LMI_DELTRANS_RESPONSE message is a consequence of the LMI_DeleteLANTransport call. The wParam is the AddressType which was given to LMI_DeleteLANTransport. The lParam is unused.

LMI.H

The LMI.H include file is defined as follows:

```
#ifndef LMI_H
#define LMI_H /* #defined if lmi.h has been included */
#ifdef _cplusplus
extern "C" {
#endif
#include <cycommon.h>
#include <tii.h>
// Messages from LMI to VCI
#define LMI_UNINIT_NTFY FIRST_LMI_MSG       // wParam: LMI error code; lParam: unused
#define LMI_KILL_CALL ((FIRST_LMI_MSG)+1)   // wParam: grace period (in minutes)
                                            // lParam: reason string
#define LMI_PERM_RESPONSE ((FIRST_LMI_MSG)+2)  // wParam: LMI_PennStatus
                                               // lParam: bandwidth/error code
#define LMI_ADDTRANS_RESPONSE ((FIRST_LMI_MSG)+3)  // wParam: addrtype
                                                   // lParam: LMI error code
                                                   // (LOWORD), COMM error
                                                   // code (HIWORD)
#define LMI_DELTRANS_RESPONSE ((FIRST_LMI_MSG)+4)  // wParam: addrtype
                                                   // lParam: LMI error code
// Messages from LMI DLL to LMI thread
#define LMI_SHUTDOWN ((FIRST_LMI_MSG)+5)
// Error codes (explanatory text can be looked up via LMI GetErrorText)
#define LMI_OK 0
// LMI_Init errors
#define LMI_IE_WINEXEC 1            // error creating lmitrd.exe task
#define LMI_IE_MEMALLOC 2           // error allocating internal memory
#define LMI_IE_COMMINIT 3           // error initializing internal LMI comm subsystem
// LMI_AddLANTransport errors
#define LMI_ALT_FULL 4              // transport table full
#define LMI_ALT_NOSUCHATYPE 5       // unrecognized transport type
#define LMI_ALT_DELETING 6          // in process of deleting this transport
#define LMI_ALT_GETLOCALADDR 7      // error in GetLocalAddress (comm error returned also)
#define LMI_ALT_MGMTSESSFAIL 8      // error in BeginSession of management session
                                    // (comm error returned also)
#define LMI_ALT_DGSESSFAIL 9        // error in BeginSession of datagram session
                                    // (dg comm error returned also)
#define LMI_ALT_INTERNALERR 10      // internal error
// LMI_DeleteLANTransport errors
#define LMI_DLT_NOSUCHATYPE 11      // unrecognized transport type
// LMI_RequestPermission internal errors (returned in LMI_PERM_RESPONSE LPARAM)
#define LMI_RPE_PROTOCOLFAILURE 12
#define LMI_RPE_MSGCORRUPTION 13
#define LMI_RPE_ACCEPTCONNERROR 14
#define LMI_RPE_OPENCHANERROR 15
#define LMI_RPE_ACCEPTCHANERROR 16
#define LMI_RPE_REGCHANHANDLERERROR 17
#define LMI_RPE_CONNACCEPTUNEXPECTED 18
#define LMI_RPE_CHANREQUESTUNEXPECTED 19
#define LMI_RPE_CHANACCEPTUNEXPECTED 20
#define LMI_RPE_CHANREJECTUNEXPECTED 21
#define LMI_RPE_SENDERROR 22
#define LMI_RPE_RECEIVEERROR 23
#define LMI_RPE_CONNERROR 24
#define LMI_RPE_SEQUOIARESOURCEFAILURB 25
#define LMI_ERR_MAX 25      // max error number
// Permission status returned synchronously from
// LMI_RequestPermission and asynchronously as WPARAM of
// LMI_PERM_RESPONSE
typedef enum {
    LMI_PS_Permitted_NoSequoiaBinding = 0,       // synchro
    LMI_PS_Permitted_BandwidthGranted,
    LMI_PS_Permitted_BandwidthPartial,
    LMI_PS_Permitted_SequoiaNotResponding,       // no error codes
    LMI_PS_Pending_RequestingPermission = 0x100, // synchro
    LMI_PS_Denied_NoSequoiaBinding = 0x200,      // synchro
// connection to sequoia succeeded
    LMI_PS_Denied_NoBandwidth,
    LMI_PS_Denied_CalleeInConf,
// connection to sequoia failed
    LMI_PS_Denied_LocalResourceFailure,
    LMI_PS_Denied_LocalInternalError,       // #define LMI error code
    LMI_PS_Denied_SequoiaConnFailed,        // #define COMM error code
    LMI_PS_Denied_SequoiaConnRejected,      // #define COMM reject code
    LMI_PS_Denied_SequoiaConnTimeout,       // something on manager failed
    LMI_PS_Denied_SequoiaInternalError,     // #define LMI error code
    LMI_PS_Denied_CalleeConnFailed,         // #define COMM error code
    LMI_PS_Denied_CalleeConnRejected,       // #define COMM reject code
    LMI_PS_Denied_CalleeConnTimeout,
    LMI_PS_Denied_ProtocolsUnfinished
```

```
} LMI_PermStatus;
extern WORD FAR PASCAL __export
LMI_GetErrorText( WORD wErrorCode, LPSTR lpszErrorString, WORD wSize );
extern WORD FAR PASCAL _export
LMI_Init(LPCSTR lpszINIFile, HWND hVCIThread);
extern void FAR PASCAL _export
LMI_UnInit( );
// lpSyncCommError will be valid if return value is LMI_ALT_GETLOCALADDR,
// LMI_ALT_MGMTSESSFAIL, or LMI_ALT_DGSESSFAIL
extern WORD FAR PASCAL _export
LMI_AddLANTransport( LPTADDR lpOurAddrTypeInTADDR, TSTATUS FAR *
lpSyncCommError, BOOL FAR * IpfOpIsComplete);
extern WORD FAR PASCAL _export
LMI_DeleteLANTransport( LPTADDR lpOurAddrTypeInTADDR, BOOL FAR * lpfO)pIsComplete);
extern LMI_PermStatus FAR PASCAL _export
LMI_RequestPermission(    BOOL fIAmCaller, LPTADDR lpLocalAddress, LPTADDR
                          lpPeerAddress, DWORD dwBandwidth );
extern void FAR PASCAL _export
LMI_CallCommit( BOOL fWillCall );
extern void FAR PASCAL _export
LMI_ConferenceCommit( BOOL fWillConference, LPCSTR lpszCallerName, LPCSTR
lpszCalleeName, DWORD dwBandwidth);
extern void FAR PASCAL _export
LMI_ConferenceLeave( );
#ifdef_cplusplus
}
#endif
#endif /* LMI_H */
```

APPENDIX K: Auto Registration

This appendix describes the file formats and data structures for auto registration.

File Format for Auto Registration

This section describes the fields of the auto registration file reg.tmp represented in FIG. 56. The registration file header comprises a file version number, the number of products being registered through this file, and the date of registration.

The file version number has a field length of 5 bytes and a format of "&ARxx" where "xx" denotes the version number of the file format. "xx" starts with "0A" and may increase to "0B", "0C", . . . , "FF" as and when the file format is changed to meet requirements.

The number of products registered by this file has a field length of 1 byte.

The date stamp indicates the date the product is registered. The data stamp is an unsigned long integer of 4 bytes, where the highest byte represents the month, the next highest byte represents the day of the month and the lowest word represents the year.

The product registration header, which immediately follows the registration file header, is the registration header for the first product in the file. In the case of single-product registration, this will be the only product registration header in the reg.tmp file. The product registration header comprises a product name, a product version, the user data size, and the survey data size.

The product name is an array of 64 characters for the name of the product and has a field length of 64 bytes.

The product version number is an array of characters for the version of the product and has a field length of 32 bytes.

The user data size holds the length (in bytes) of the user data. This information is used to calculate the offset of the beginning of the next block of user data in the file. The user data size has a field length of 2 bytes.

The survey data size holds the length (in bytes) of the survey data. This information is used to calculate the offset of the beginning of the next block of survey data in the file. The survey data size has a field length of 2 bytes.

Following the product registration header is a sequence of user data blocks. Each block of user data comprises user data that is collected in the registration dialog box. A user data block comprises a field identification number, a field type, the maximum field length for each field, and a stream of bytes of actual data for the field.

The following field IDs are defined for the field identification number:

| | | |
|---|---|---|
| #define AR_ID_FNAME | 1 | // first name |
| #define AR_ID_LNAME | 2 | // last name |
| #define AR_ID_ADDR1 | 3 | // first line of street address |
| #define AR_ID_ADDR2 | 4 | // second line of street address |
| #define AR_ID_CITY | 5 | // city |
| #define AR_ID_STATE | 6 | // state |
| #define AR_ID_COUNTRY | 7 | // country |
| #define AR_ID_POSTALCODE | 8 | // post office zip code |
| #define AR_ID_COUNTRYCODE | 9 | // country code |
| #define AR_ID_AREACODE | 10 | // area code |
| #define AR_ID_PHONENUM | 11 | // telephone number |
| #define AR_ID_FAXNUM | 12 | // facsimile number |
| #define AR_ID_ISDNNUM | 13 | // ISDN number |
| #define AR_ID_ORGN | 14 | // organization |
| #define AR_ID_TITLE | 15 | // title |
| #define AR_ID_SERIALNUM | 16 | // unique product serial number |
| #define AR_ID_EMAIL | 17 | // EMail address |

The field identification number has a field length of 1 byte.

The following field types are defined:

| | | |
|---|---|---|
| o | AR_TYPE_ALPHA | alphabet only |
| o | AR_TYPE_NUM | numbers only |
| o | AR_TYPE_ALPHANUM | alphabets and numbers |
| o | AR_TYPE_DATE | date |
| o | AR_TYPE_TIME | time |
| o | AR_TYPE_SINGLE_CHOICE | one-of-many choices |
| o | AR_TYPE_MULTIPLE_CHOICE | many-of-many choices |

The field type has a field length of 1 byte.

The maximum field length specifies the maximum field length of any field. It is used to seek through the file to the correct location. The maximum field length has a field length of 2 bytes.

The field data is the actual data stream. The field length of the field data depends on the field.

Following the blocks of user data is one or more blocks of the survey data. Each survey data block comprises a survey version identification, a survey question identification, and a set of response flags that are the attributes of each question-response pair.

The survey version identification specifies the version of the survey for a product. The survey identification is an array of characters and has a field length of 8 bytes.

The survey question identification identifies a specific question in a survey. In conjunction with the survey version ID, any question in any version of survey can be identified. The survey question identification has a field length of 2 bytes.

The response flags is a 2-byte field with each bit representing the response to the corresponding question. Bit 0 represents response 1, bit 1 represents response 2, and so on. The response flags has a limit of 16 responses to a question. If a bit is set to 1, it represents the fact that the user selected that particular choice. If set to 0, the user did not make that selection.

Data Structures for Auto Registration

The following is a portion of the text in the file autoreg.h that describes the data structures for auto registration:

```
#define AR_STATE_MAXLEN 32
#define AR_COUNTRY_MAXLEN 32
#define AR_POSTALCODE_MAXLEN 32
#define AR_COUNTRYCODE_MAXLEN 32
#define AR_AREACODE_MAXLEN 32
#define AR_PHONENUM_MAXLEN 32
#define AR_FAXNUM_MAXLEN 32
#define AR_ORGN_MAXLEN 32
#define AR_TITLE_MAXLEN 32
// The ATFR data type defines the attributes of the
// autoregistration data items. The list of common data items
// in the AUTOREG data type will be of type ATTR.
typedef struct tagAttr
{
    BYTE    bySend;           // Is this item to be transmitted?
    BYTE    byFieldId;        // Global indentification of this field.
    BYTE    byFieldType;      // Field type (alpha, numeric, alphanumeric, date, time,
                              // multiple choice, etc.)
    WORD    wMaxFieldLength;  // Maximum length of this field in bytes.
    BYTE    byBuf[AR_MAXSIZE];
} ATTR;
// The auto-registration structure
typedef struct tagAutoReg {
    WORD    wStructSize;      // Size of this structure.
    HWND    hwndOwner;        // Window that owns the dialog box (may be NULL).
    LPCSTR  lpszMediaDllPath; // Pathname of media dll to use.
    DWORD   dwFlags;          // Flags.
    LPARAM  dwAppParam;       // 32 bits of app specific data.
    LPARAM  dwMediaParam;     // 32 bits of media specific data.
// Application callback.
LRESULT (CALLBACK* lpfnAppCallback)(HINSTANCE, LPARAM);
// Glg hook proc.
UINT (CALLBACK* lpfnDialogHook)(HWND, UINT, WPARAM, LPARAM);
    HINSTANCE hMediaDLL;      // Instance handle to get comm procedures from.
    HINSTANCE hInstance;      // Instance handle to load dialog template from.
    LPCSTR    lpTemplate;     // Resource name of dialog template, or ptr to loaded dialog
                              // template.
    // The following are the items that are common to all products. Not all of the items are
    // "visible" in the common dialog box. When more fields are added for any product, the
    // custom dialog is handled by a hook function. The module containing the hook function will
    // validate the data items that it supports and will provide access to these through an array of
    // the ATTR structures. A function, xxxxGetCustomDlgItems( ), will be available which will
    // pass back a pointer to the array of ATTR structures. xxxx is a place holder for the media.
    ATTR FirstName;
    ATTR Addr1;
    ATTR Addr2;
    ATTR City;
    ATTR State;
    ATTR Country;
    ATTR PostalCode;
    ATTR Email;
    ATTR ISDNNum;
    ATTR PhoneNum;
    ATTR FaxNum;
    ATTR Orgn;
    ATTR Title;
} AUTOREG;
typedef struct tagDateTime
{
    BYTE byMonth;
```

```
        BYTE    byDay;
        BYTE    byCentury;
        BYTE    byYear;
        BYTE    byHr;
        BYTE    byMin;
        BYTE    bySec;
} DATETIME;
typedef struct tagProductInfo
{
        BYTE    byName[AR_MAX_PRODUCT_NAME_LEN];
        BYTE    byVersion[AR_MAX_VERSION_LEN];
        BYTE    bySerialNum[AR_MAX_SERNUM_LEN];    // Product serial number.
} PRODUCTINFO;
typedef struct tagRegFileHeader
{
        BYTE    bySignature[5];
        BYTE    byNumProducts;
        BYTE    bySendMoreInfo;
        // BYTE byAddToIntelDirectory; now a bit in bySendMoreInfo.
        unsigned long ulDateOfReg;
} REGFILEHEADER;
typedef struct tagRegHeader
{
        PRODUCTINFO   ProdInfo;
        WORD          wUserDataSize;
        WORD          wSurveyDataSize;
} REGHEADER;
typedef struct tagRegInfo
{
        BYTE    byIsBundle;
        BYTE    byBundleSize;
        BYTE    byRegName[AR_MAX_REG_NAME_LEN];      // name to use for this product under
                                                    // [PRODUCT].
        BYTE    byMediaName[AR_MAX_MEDIA_NAME_LEN];  // name to use for this product
                                                    // under [MEDIA]
        PRODUCTINFO FAR *lpProdInfo;
} REGINFO;
typedef REGINFO FAR* LPREGINFO;
// If byIsBundle = TRUE, byBundleSize > 1.
// If byIsBundle = FALSE, byBundleSize = 1 (will be set to default).
// Structures related to responses to optional survey questions.
typedef struct tagResponse    // Response for each choice for a question.
{
        BYTE    ResType    : 2;           // Combo or radio button or text.
        BYTE    Response   : 2;
        BYTE    Reserved   : 4;
} Response;
typedef struct tagResponsePacket     // A set of 16 responses.
{
        Response    Res1;
        Response    Res2;
        Response    Res3;
        Response    Res4;
        Response    Res5;
        Response    Res6;
        Response    Res7;
        Response    Res8;
        Response    Res9;
        Response    Res10;
        Response    Res11;
        Response    Res12;
        Response    Res13;
        Response    Res14;
        Response    Res15;
        Response    Res16;
        char        szTextResp[64];       // Buffer for text response.
} ResponsePacket;
typedef struct tagQAPacket
{
        char            szSurveyVersion[8];  // Version number of survey (7 chars +'*0').
        UINT            QID;                 // Identification number for survey question.
        ResponsePacket  rpRespPacket;        // Checkbox/radio button|text.
} QAPacket;
typedef struct tagQA
{
        LPSTR       lpszQ;      // Pointer to survey question string.
        LPSTR FAR   *lpsZA;     // Pointer to an array of user's answers.
        QAPacket    qapPacket;  // Response to question
} QA;
```

What is claimed is:

1. A process for processing audio signals, comprising the steps of:
   (a) generating audio signals corresponding to sounds emanating from a local user using a microphone that is part of a combined microphone/speaker earpiece;
   (b) filtering the audio signals using a local audio processing system including a digital filter which is implemented as a stackable driver on a computer processor to reduce distortions in the audio signals, wherein the filter is implemented using a cascade of a second-order high-pass Chebyshev Type I Infinite Impulse Response filter and a sixth-order Infinite Impulse Response filter designed using Steiglitz approximation; and
   (c) transmitting the filtered audio signals from the local audio processing system to a remote audio processing system for playback to a remote user.

2. The process of claim 1, wherein the stackable driver is implemented under a Spectron Microsystems SPOX™ operating system.

3. The process of claim 1, wherein the stackable driver is selectively enabled and disabled.

4. The process of claim 1, wherein the filter is designed to correct for distortions due to reverberation signals that reflect off the cheek of a user of the earpiece.

5. The process of claim 1, wherein the filter is designed to correct for distortions due to sounds that become out of phase at the microphone.

6. The process of claim 1, wherein the filter is designed to correct for distortions due to directionality/loss of relatively high frequencies of the audio signals.

7. The process of claim 1, wherein the filter produces an approximately 3 dB bump at approximately 2 kHz.

8. The process of claim 1, wherein the combined earpiece is a Plantronics Enterprise™ headset.

9. The process of claim 1, wherein step (b) comprises the steps of:
   (1) digitizing the audio signals using the local audio processing system; and
   (2) applying the digital filter to the digital audio signals using the local audio processing system to generate the filtered audio signals, and step (c) comprises the steps of:
      (1) compressing the filtered audio signals using the local audio processing system; and
      (2) transmitting the compressed audio signals from the local audio processing system to the remote audio processing system for decompression and playback to the remote user; and further comprising the steps of:
         (d) receiving remote compressed audio signals by the local audio processing system from the remote audio processing system;
         (e) decompressing the remote compressed audio signals by the local audio processing system; and
         (f) playing the remote decompressed audio signals with a speaker that is part of the combined microphone/speaker earpiece.

10. The process of claim 1, wherein:
   the combined earpiece is a Plantronics Enterprise™ headset;
   the digital filter is implemented as a stackable driver on a computer processor under a Spectron Microsystems SPOX™ operating system;
   the stackable driver is selectively enabled and disabled; and
   the digital filter is implemented using a cascade of a second-order high-pass Chebyshev Type I Infinite Impulse Response filter and a sixth-order Infinite Impulse Response filter designed using Steiglitz approximation that produces an approximately 3 dB bump at approximately 2 kHz.

11. The process of claim 10, wherein the digital filter is designed to correct for distortions due to reverberation signals that reflect off the cheek of a user of the earpiece, sounds from the user's mouth that become out of phase at the microphone, and directionality/loss of relatively high frequencies of the audio signals.

12. The process of claim 10, wherein step (c) comprises the steps of:
   (1) compressing the filtered audio signals using the local audio processing system; and
   (2) transmitting the compressed audio signals from the local audio processing system to the remote audio processing system for decompression and playback to the remote user.

13. A system for processing audio signals, comprising:
   (a) an earpiece comprising a microphone; and
   (b) a local audio processing system, wherein:
      the microphone is adapted to generate audio signals corresponding to sounds emanating from a local user;
      the local audio processing system is adapted to apply a digital filter implemented as a stackable driver on a computer processor to the audio signals to reduce distortions in the audio signals, wherein the filter is implemented using a cascade of a second-order high-pass Chebyshev Type I Infinite Impulse Response filter and a sixth-order Infinite Impulse Response filter designed using Steiglitz approximation; and
      the local audio processing system is adapted to transmit the filtered audio signals from the local audio processing system to a remote audio processing system for playback to a remote user.

14. The system of claim 13, wherein the stackable driver is implemented under a Spectron Microsystems SPOX™ operating system.

15. The system of claim 13, wherein the stackable driver is selectively enabled and disabled.

16. The system of claim 13, wherein the filter is designed to correct for distortions due to reverberation signals that reflect off the cheek of a user of the earpiece.

17. The system of claim 13, wherein the filter is designed to correct for distortions due to sounds that become out of phase at the microphone.

18. The system of claim 13, wherein the filter is designed to correct for distortions due to directionality/loss of relatively high frequencies of the audio signals.

19. The system of claim 13, wherein the filter is adapted to produce an approximately 3 dB bump at approximately 2 kHz.

20. The system of claim 13, wherein the combined earpiece is a Plantronics Enterprise™ headset.

21. The system of claim 13, wherein:
   the local audio processing system is adapted to digitize the audio signals;

the local audio processing system is adapted to apply the digital filter to the digital audio signals;

the local audio processing system is adapted to compress the filtered audio signals;

the local audio processing system is adapted to transmit the compressed audio signals to the remote audio processing system for decompression and playback to the remote user;

the local audio processing system is adapted to receive remote compressed audio signals from the remote audio processing system;

the local audio processing system is adapted to decompress the remote compressed audio signals; and a speaker of the earpiece is adapted to render the remote decompressed audio signals.

22. The system of claim 13, wherein:

the combined earpiece is a Plantronics Enterprise™ headset;

the digital filter is implemented as a stackable driver on a computer processor under a Spectron Microsystems SPOX™ operating system;

the stackable driver is selectively enabled and disabled; and the digital filter is implemented using a cascade of a second-order high-pass Chebyshev Type I Infinite Impulse Response filter and a sixth-order Infinite Impulse Response filter designed using Steiglitz approximation that produces an approximately 3 dB bump at approximately 2 kHz.

23. The system of claim 22, wherein the digital filter is designed to correct for distortions due to reverberation signals that reflect off the cheek of a user of the earpiece, sounds from the user's mouth that become out of phase at the microphone, and directionality/loss of relatively high frequencies of the audio signals.

24. The system of claim 22, wherein:

the local audio processing system is adapted to compress the filtered audio signals; and the local audio processing system is adapted to transmit the compressed audio signals to the remote audio processing system for decompression and playback to the remote user.

25. A process for processing audio signals, comprising the steps of:

(a) generating, with a microphone of an earpiece comprising the microphone, audio signals corresponding to sounds emanating from a local user having a head having a mouth, an ear, and a cheek between the mouth and ear;

(b) filtering, with a digital filter of a local audio processing system, the audio signals to reduce distortions in the audio signals due to the microphone being separated from the local user's mouth and in physical contact with the head when the earpiece is mounted at the local user's ear, wherein the distortions are caused by one of reverberation signals that reflect off the cheek of the local user and sounds from the local user's mouth that become out of phase at the microphone, wherein the digital filter is implemented as a stackable driver on a computer processor; and (c) transmitting, with the local audio processing system, the filtered audio signals to a remote audio processing system for playback to a remote user.

26. A system for processing audio signals, comprising:

(a) an earpiece comprising a microphone for generating audio signals corresponding to sounds emanating from a local user having a head having a mouth, an ear, and a cheek between the mouth and ear; and (b) a local audio processing system comprising a digital filter implemented as a stackable driver on a computer processor, wherein the local audio processing system is for filtering the audio signals with the digital filter to reduce distortions in the audio signals due to the microphone being separated from the local user's mouth and in physical contact with the head when the earpiece is mounted at the local user's ear, wherein the distortions are caused by one of reverberation signals that reflect off the cheek of the local user and sounds from the local user's mouth that become out of phase at the microphone, and the local audio processing system is for transmitting the filtered audio signals to a remote audio processing system for playback to a remote user.

* * * * *